US011644834B2

(12) United States Patent
Ditty et al.

(10) Patent No.: US 11,644,834 B2
(45) Date of Patent: May 9, 2023

(54) SYSTEMS AND METHODS FOR SAFE AND RELIABLE AUTONOMOUS VEHICLES

(71) Applicant: NVIDIA Corporation, Santa Clara, CA (US)

(72) Inventors: Michael Alan Ditty, San Jose, CA (US); Gary Hicok, Mesa, AZ (US); Jonathan Sweedler, Los Gatos, CA (US); Clement Farabet, Mill Valley, CA (US); Mohammed Abdulla Yousuf, San Jose, CA (US); Tai-Yuen Chan, San Jose, CA (US); Ram Ganapathi, San Jose, CA (US); Ashok Srinivasan, Palo Alto, CA (US); Michael Rod Truog, Los Gatos, CA (US); Karl Greb, Sugar Land, TX (US); John George Mathieson, Las Vegas, NV (US); David Nister, Bellevue, WA (US); Kevin Flory, Livermore, CA (US); Daniel Perrin, Fort Collins, CO (US); Dan Hettena, Princeton, NJ (US)

(73) Assignee: NVIDIA Corporation, Santa Clara, CA (US)

( * ) Notice: Subject to any disclaimer, the term of this patent is extended or adjusted under 35 U.S.C. 154(b) by 488 days.

(21) Appl. No.: 16/186,473

(22) Filed: Nov. 9, 2018

(65) Prior Publication Data
US 2019/0258251 A1    Aug. 22, 2019

Related U.S. Application Data

(60) Provisional application No. 62/584,549, filed on Nov. 10, 2017.

(51) Int. Cl.
*G05D 1/02*    (2020.01)
*G06V 20/58*    (2022.01)
(Continued)

(52) U.S. Cl.
CPC ......... *G05D 1/0088* (2013.01); *G05D 1/0248* (2013.01); *G05D 1/0274* (2013.01);
(Continued)

(58) Field of Classification Search
CPC .. G05D 1/0088; G05D 1/0248; G05D 1/0274; G05D 2201/0213; G06F 15/7807;
(Continued)

(56) References Cited

U.S. PATENT DOCUMENTS 9,710,714 B2 *  7/2017  Chen ........................ G01S 17/86
10,282,995 B2 *  5/2019  Heinla ................. G08G 1/0104
(Continued)

FOREIGN PATENT DOCUMENTS

WO    2017/177128 A1    10/2017

OTHER PUBLICATIONS

Li Du and Yuan Du (Dec. 20, 2017). Hardware Accelerator Design for Machine Learning, Machine Learning—Advanced Techniques and Emerging Applications, Hamed Farhadi, IntechOpen, DOI: 10.5772/intechopen.72845. Available from: https://www.intechopen.com/chapters/58659 (Year: 2017).*
(Continued)

*Primary Examiner* — Ig T An
(74) *Attorney, Agent, or Firm* — Nixon & Vanderhye P.C.

(57) ABSTRACT

Autonomous driving is one of the world's most challenging computational problems. Very large amounts of data from cameras, RADARs, LIDARs, and HD-Maps must be processed to generate commands to control the car safely and comfortably in real-time. This challenging task requires a dedicated supercomputer that is energy-efficient and low-power, complex high-performance software, and breakthroughs in deep learning AI algorithms. To meet this task, the present technology provides advanced systems and methods that facilitate autonomous driving functionality,
(Continued)

EXAMPLE CAMERA TYPES AND LOCATIONS including a platform for autonomous driving Levels 3, 4, and/or 5. In preferred embodiments, the technology provides an end-to-end platform with a flexible architecture, including an architecture for autonomous vehicles that leverages computer vision and known ADAS techniques, providing diversity and redundancy, and meeting functional safety standards. The technology provides for a faster, more reliable, safer, energy-efficient and space-efficient System-on-a-Chip, which may be integrated into a flexible, expandable platform that enables a wide-range of autonomous vehicles, including cars, taxis, trucks, and buses, as well as watercraft and aircraft.

60 Claims, 62 Drawing Sheets

(51) Int. Cl.
| | | |
|---|---|---|
| *G06V 20/56* | (2022.01) | |
| *G05D 1/00* | (2006.01) | |
| *G06F 15/78* | (2006.01) | |
| *G06N 3/063* | (2006.01) | |
| *G06N 3/04* | (2006.01) | |

(52) U.S. Cl.
CPC ......... *G06F 15/7807* (2013.01); *G06N 3/063* (2013.01); *G06V 20/58* (2022.01); *G06V 20/588* (2022.01); *G05D 2201/0213* (2013.01); *G06N 3/0454* (2013.01)

(58) Field of Classification Search
CPC ........... G06K 9/00798; G06K 9/00805; G06N 3/063; G06N 3/0454
See application file for complete search history.

(56) References Cited

U.S. PATENT DOCUMENTS

| | | | |
|---|---|---|---|
| 10,380,886 B2 * | 8/2019 | Ran | .................... G08G 1/0133 |
| 10,829,116 B2 * | 11/2020 | Iagnemma | ............ B60W 10/20 |
| 2010/0149193 A1 | 6/2010 | Yu | |
| 2013/0061033 A1 | 3/2013 | Kim et al. | |
| 2016/0321074 A1 | 11/2016 | Hung et al. | |
| 2017/0061625 A1 | 3/2017 | Estrada et al. | |

OTHER PUBLICATIONS

International Search Report and Written Opinion of the International Search Authority dated Apr. 26, 2019, issued in International Application No. PCT/US2018/060205, 18 pages.
Foley, Denis, et al., "Ultra-Performance Pascal GPU and NVLink Interconnect," IEEE Computer Society, IEEE Micro, vol. 37, No. 2, Mar./Apr. 2017, 11 pages, XP11648831A.
European Communication issued in EP Application No. 18 816 312.2 dated Jul. 22, 2022 (5 pages).
European communication issued in Application No. 18816312.5 dated Nov. 11, 2021 (5 pages).

\* cited by examiner

LEVELS OF DRIVER ASSISTANCE, ADAS, AND AUTONOMOUS DRIVING

| Controllability | | Severity | | Exposure | |
|---|---|---|---|---|---|
| C0 | Controllable in general | S0 | No injuries | E0 | Incredibly unlikely |
| C1 | Simply controllable | S1 | Light to moderate injuries | E1 | Very low probability |
| C2 | Normally controllable | S2 | Severe to life-threatening injuries | E2 | Low probability |
| C3 | Difficult to control or uncontrollable | S3 | Life-threating to fatal injuries | E3 | Medium probability |
| | | | | E4 | High probability |

FIG. 2

FACTORS FOR DETERMINING ASIL RISK

TRAINING NEURAL NETWORKS TO RECOGNIZE TRAFFIC SIGNS

EXAMPLE SELF-DRIVING VEHICLE

EXAMPLE CAMERA TYPES AND LOCATIONS

CLOUD BASED DATACENTER COMMUNICATION WITH AUTONOMOUS VEHICLE

PLATFORM

EXEMPLARY ADVANCED SoC FOR L3-L5 ARCHITECTURE, WITH DLA ACCELERATORS

EXEMPLARY ADVANCED SoC FOR L3-L5 ARCHITECTURE, WITH DLA ACCELERATORS

PROGRAMMABLE VISION ACCELERATOR (PVA) BLOCK DIAGRAM

HARDWARE ACCELERATION CLUSTER MEMORY

MULTIPLE NEURAL NETWORKS RUNNING ON DLA MAY BE USED TO INTERPRET TRAFFIC SIGNALS

ADVANCED SoC CONTROLLING AN AUTONOMOUS VEHICLE

| ASIL before Decomposition | ASIL after Decomposition |
|---|---|
| ASIL D Requirement | ASIL C(D) Requirement + ASIL A(D) Requirement<br>or<br>ASIL B(D) Requirement + ASIL B(D) Requirement<br>or<br>ASIL D(D) Requirement + QM(D) Requirement |
| ASIL C Requirement | ASIL B(C) Requirement + ASIL A(C) Requirement<br>or<br>ASIL C(C) Requirement + QM(C) Requirement |
| ASIL B Requirement | ASIL A(B) Requirement + ASIL A(B) Requirement<br>or<br>ASIL B(B) Requirement + QM(B) Requirement |
| ASIL A Requirement | ASIL A(A) Requirement + QM(A) Requirement |

FIG. 14
ASIL DECOMPOSITION

FUNCTIONAL SAFETY IN EMBODIMENT WITH SINGLE ADVANCED SoC

PLATFORM WITH THREE SoCs, INCLUDING ONE ADVANCED SoC

EXEMPLARY PLATFORM ARCHITECTURE FOR L3-L5

SECOND EXEMPLARY PLATFORM ARCHITECTURE FOR L3-L5 (WITH X86 CPU)

THIRD EXEMPLARY PLATFORM ARCHITECTURE FOR L3-L5 (WITH X86 CPU)

MULTIPLE ADVANCED SoCs CONTROLLING AN AUTONOMOUS VEHICLE

EXEMPLARY ARCHITECTURE WITH EIGHT ADVANCED SoCs AND DGPUs

EXEMPLARY ARCHITECTURE WITH ONE ADVANCED SoC AND FOUR DGPUs

HIGH-LEVEL SYSTEM ARCHITECTURE WITH ALLOCATED ASILS

ARBITRATION MODULES

SYSTEM ARCHITECTURE WITH ALLOCATED ASILS

ADVANCED ADAS SYSTEMS AS SECONDARY COMPUTER

EXAMPLE COMMUNICATION AND
SECURITY SYSTEM ARCHITECTURE

ERROR FLOW HW DETECTION CASE

ERROR FLOW SW DETECTION CASE

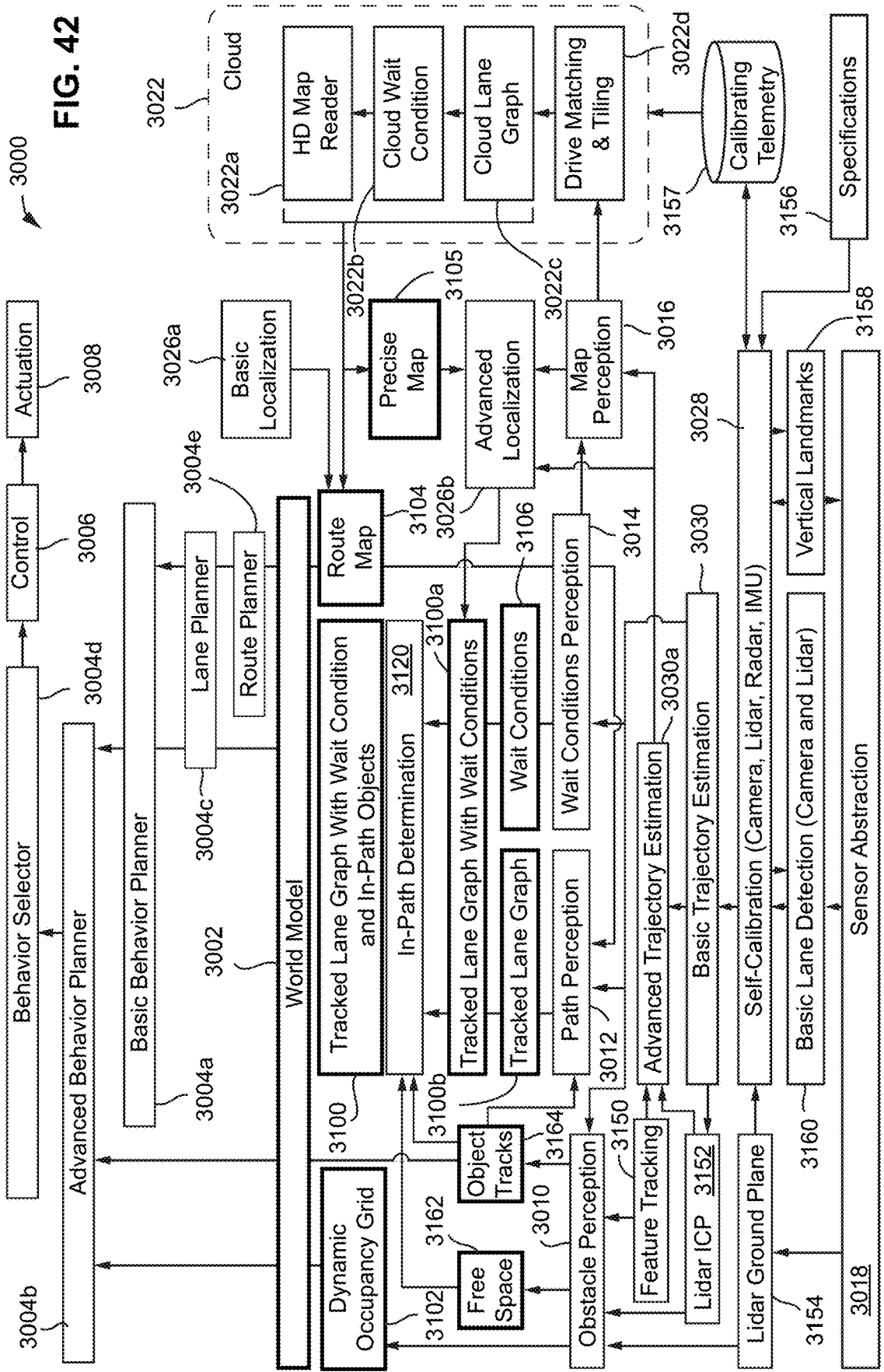

SELF CALIBRATOR

TRAJECTORY ESTIMATION

EXAMPLE SELF-DRIVING TRUCK

EXAMPLE SELF-DRIVING TWO-LEVEL BUS

EXAMPLE SELF-DRIVING ARTICULATED BUS

EXAMPLE SELF-DRIVING TILLER TRUCK

SYSTEMS AND METHODS FOR SAFE AND RELIABLE AUTONOMOUS VEHICLES

I. CLAIM OF PRIORITY

This application claims priority to, and the benefit of U.S. Provisional Patent Application 62/584,549, entitled "Systems and Methods for Safe and Reliable Autonomous Vehicles", filed Nov. 10, 2017 and which is incorporated herein by reference and in its entirety.

II. ABSTRACT

Autonomous driving is one of the world's most challenging computational problems. Very large amounts of data from cameras, RADARs, LIDARs, and HD-Maps must be processed to generate commands to control the car safely and comfortably in real-time. This challenging task requires a dedicated supercomputer that is energy-efficient and low-power, complex high-performance software, and breakthroughs in deep learning AI algorithms. To meet this task, the present technology provides advanced systems and methods that facilitate autonomous driving functionality, including a platform for autonomous driving Levels 3, 4, and/or 5. In preferred embodiments, the technology provides an end-to-end platform with a flexible architecture, including an architecture for autonomous vehicles that leverages computer vision and known ADAS techniques, providing diversity and redundancy, and meeting functional safety standards. The technology provides for a faster, more reliable, safer, energy-efficient and space-efficient System-on-a-Chip, which may be integrated into a flexible, expandable platform that enables a wide-range of autonomous vehicles, including cars, taxis, trucks, and buses, as well as watercraft and aircraft.

III. FEDERALLY SPONSORED RESEARCH OR DEVELOPMENT

None.

IV. APPLICATIONS INCORPORATED BY REFERENCE

The following U.S. patent applications are incorporated by reference herein for all purposes as if expressly set forth:

"Programmable Vision Accelerator", U.S. patent application Ser. No. 15/141,703 filed Apr. 28, 2016, still pending.

"Reliability Enhancement Systems and Methods" U.S. patent application Ser. No. 15/338,247 filed Oct. 28, 2016, now U.S. Pat. No. 10,289,469.

"Methodology of Using a Single Controller (ECU) For a Fault-Tolerant/Fail-Operational Self-Driving System", U.S. Provisional Patent Application Ser. No. 62/524,283 filed on Jun. 23, 2017.

"Method Of Using A Single Controller (ECU) For A Fault-Tolerant/Fail-Operational Self-Driving System" U.S. patent application Ser. No. 15/881,426 filed on Jan. 26, 2018, now U.S. Pat. No. 11,214,273.

V. BACKGROUND

Many vehicles today include Advanced Driver Assistance Systems ("ADAS"), such as automatic lane keeping systems and smart cruise control systems. These systems rely on a human driver to take control of the vehicle in the event of a significant mechanical failures, such as tire blow-outs, brake malfunctions, or unexpected behavior by other drivers.

Driver assistance features, including ADAS and autonomous vehicles, are generally described in terms of automation levels, defined by Society of Automotive Engineers (SAE) "Taxonomy and Definitions for Terms Related to Driving Automation Systems for On-Road Motor Vehicles" Standard No. J3016-201806 published on Jun. 15, 2018; Standard No. J3016-201609 published on Sep. 30, 2016, and prior and future versions of this standard; and National Highway Traffic Safety Administration (NHTSA), US Department of Transportation. FIG. 1 illustrates the autonomous driving levels, ranging from driver-only (Level 0), Assisted (Level 1), Partial Automation (Level 2), Conditional Automation (Level 3), High Automation (Level 4) to Full Automation (Level 5). Today's commercially available ADAS systems generally provide only Level 1 or 2 functionality.

A human driver is required to be in the control loop for automation levels 0-2 but is not required for automation levels 3-5. The ADAS system must provide for a human driver to take control within about one second for levels 1 and 2, within several seconds for level 3, and within a couple of minutes for levels 4 and 5. A human driver must stay attentive and not perform other activities while driving during level 0-2, while the driver may perform other, limited activities for automation level 3, and even sleep for automation levels 4 and 5. Level 4 functionality allows the driver to go to sleep, and if any condition such that the car can no longer drive automatically, and the driver does not take over, the car will pull over safely. Level 5 functionality includes robot-taxis, where driverless taxis operate within a city or campus that has been previously mapped.

The success of Level 1 and Level 2 ADAS products, coupled with the promise of dramatic increases in traffic safety and convenience, have driven investments in self-driving vehicle technology. Yet despite that immense investment, no vehicle is available today that provides Level 4 or Level 5 functionality and meets industry safety standards, and autonomous driving remains one of the world's most challenging computational problems. Very large amounts of data from cameras, RADAR, LIDAR, and HD-Maps must be processed to generate commands to control the car safely and comfortably in real-time. Ensuring that cars can react correctly in a fraction of a second to constant- and rapidly-changing circumstances requires interpreting the torrent of data rushing at it from a vast range of sensors, such as cameras, RADAR, LIDAR and ultrasonic sensors. First and foremost, this requires a massive amount of computational horsepower. This challenging task requires a dedicated supercomputer that is energy-efficient and low-power, complex high-performance software, and breakthroughs in deep learning AI algorithms.

In addition, systems for Level 4-5 autonomous vehicles requires a completely different approach to meet industry safety standards, such as the Industry Organization for Standardization ("ISO") 26262 standard entitled "Road vehicles—Functional safety" (2011 en) and future versions and enhancements of this standard, which defines a process for establishing the safety rating of automotive components and equipment. ISO 26262 addresses possible hazards caused by the malfunctioning of electronic and electrical systems in passenger vehicles, determined by the Automotive Safety Integrity Level ("ASIL"). ASIL addresses four different risk levels, "A", "B", "C" and "D", determined by three factors: (1) Exposure (hazard probability), (2) Controllability (by the driver), and (3) Severity (in terms of injuries). The ASIL risk level is roughly defined as the combination of Severity, Exposure, and Controllability. As FIG. 2 illustrates, ISO 26262 "Road vehicles—Functional safety—Part 9: Automotive Safety Integrity Level (ASIL)-oriented and safety-oriented analyses" (ISO 26262-9:2011 (en)) defines the ASIL "D" risk as a combination of the highest probability of exposure (E4), the highest possible controllability (C3), and the highest severity (S3). An automotive equipment rated as ASIL "D" means that the equipment can safely address hazards that pose the most severe risks. A reduction in any one of the Severity, Exposure, and Controllability classifications from its maximum corresponds to a single level reduction in ASIL "A", "B", "C" and "D" ratings.

Basic ADAS systems (Level 1 or 2) can be easily designed to meet automotive industry functional safety standards, including the ISO 26262 standard, because they rely on the human driver to take over and assert control over the vehicle. For example, if an ADAS system fails, resulting in a dangerous condition, the driver may take command of the vehicle and override that software function and recover to a safe state. Similarly, when the vehicle encounters an environment/situation that the ADAS system cannot adequately control (e.g., tire blow-out, black ice, sudden obstacle) the human driver is expected to take over and perform corrective or mitigating action.

In contrast, Level 3-5 autonomous vehicles require the system, on its own, to be safe even without immediate corrective action from the driver. A fully autonomous vehicle cannot count on a human driver to handle exceptional situations—the vehicle's control system, on its own, must identify, manage, and mitigate all faults, malfunctions, and extraordinary operating conditions. Level 4-5 autonomous vehicles have the most rigorous safety requirements—they must be designed to handle everything that may go wrong, without relying on any human driver to grab the wheel and hit the brakes. Thus, providing ASIL D level functional safety for Level 4 and Level 5 full autonomous driving is a challenging task. The cost for making a single software sub-system having ASIL D functional safety is cost prohibitive, as ASIL D demands unprecedented precision in design of hardware and software. Another approach is required.

Achieving ASIL D functional safety for Level 4-5 autonomous vehicles requires a dedicated supercomputer that performs all aspects of the dynamic driving task, providing appropriate responses to relevant objects and events, even if a driver does not respond appropriately to a request to resume performance of a dynamic driving task. This ambitious goal requires new System-on-a-Chip technologies, new architectures, and new design approaches.

VI. SOME RELEVANT ART

A. ADAS Systems

Today's ADAS systems include Autonomous/adaptive/automatic cruise control ("ACC"), Forward Crash Warning ("FCW"), Auto Emergency Braking ("AEB"), Lane Departure Warning ("LDW"), Blind Spot Warning ("BSW"), and Rear Cross-Traffic Warning ("RCTW"), among others.

ACC can be broadly classified into longitudinal ACC and lateral ACC. Longitudinal ACC monitors and controls the distance to the vehicle immediately ahead of the host or "ego vehicle". Typical longitudinal ACC systems automatically adjust the vehicle speed to maintain a safe distance from vehicles ahead. Lateral ACC performs distance keeping, and advises the host vehicle to change lanes when necessary. Lateral ACC is related to other ADAS applications such as Lane Change Assist ("LCA") and Collision Warning Systems ("CWS").

The most common ACC systems use a single RADAR, though other combinations (multiple RADARs, such as one long range RADAR coupled with two short range RADARs, or combinations of LIDAR and cameras) are possible. Longitudinal ACC systems use algorithms that can be divided into two main groups: rule-based and model-based approaches. Rule-based longitudinal ACC approaches use if—then rules, which may be executed on any processor, including an FPGA, CPU, or ASIC. The input signals typically include distance to the vehicle ahead, and current speed of vehicle, etc. and the outputs are typically throttle and brake. For example, a longitudinal ACC system may use a rule that is familiar to most drivers: if the distance between the ego car and the car ahead is traversable in less than two seconds, reduce vehicle speed. If the vehicle speed is 88 feet per second (equivalent to 60 miles per hour) and the following distance is 22 feet, the time to traverse that distance is only 0.25 seconds. Under these circumstances, a longitudinal ACC system may reduce speed, by controlling the throttle, and if necessary, the brake. Preferably the throttle is used (reducing throttle will slow the vehicle) but if the distance is small and decreasing, the ACC system may use the brake, or disengage and signal a warning to the driver.

Model-based systems are typically based on proportional—integral—derivative controller ("PID controller") or model predictive control ("MPC") techniques. Based on the vehicle's position, distance and the speed of the vehicle ahead, the controller optimally calculates the wheel torque taking into consideration driving safety and energy cost.

Cooperative Adaptive Cruise Control ("CACC") uses information from other vehicles. This information may be received through an antenna and a modem directly from other vehicles (in proximity), via wireless link, or indirectly, from a network connection. Direct links may be provided by vehicle-to-vehicle ("V2V") communication link, while indirect links are often referred to as infrastructure-to-vehicle ("I2V") links. In general, the V2V communication concept provides information about the immediately preceding vehicles (i.e., vehicles immediately ahead of and in the same lane as the ego vehicle), while the I2V communication concept provides information about traffic further ahead. CACC systems can include either or both I2V and V2V information sources. Given the information of the vehicles ahead of the host vehicle, CACC can be more reliable and it has potential to improve traffic flow smoothness and reduce congestion on the road.

ACC systems are in wide use in commercial vehicles today, but often overcompensate or overreact to road conditions. For example, commercial ACC systems may overreact, slowing excessively when a car merges in front, and then regain speed too slowly when the vehicle has moved out of the way. ACC systems have played an important role in providing vehicle safety and driver convenience, but they fall far short of meeting requirements for Level 3-5 autonomous vehicle functionality.

Forward Crash Warning ("FCW") ADAS systems are designed to alert the driver to a hazard, so that the driver can take corrective action. Typical FCW ADAS systems use front-facing camera or RADAR sensors, coupled to a dedicated processor, DSP, FPGA, or ASIC that is electrically coupled to driver feedback, such as a display, speaker, or vibrating component. FCW systems typically provide a warning only—they do not take over the vehicle or actuate the brakes or take other corrective action. Rather, when the FCW system detects a hazard, it activates a warning, in the form of a sound, visual warning, vibration and/or a quick brake pulse. FCW systems are in wide use today, but often provide false alerts. According to a 2017 Consumer Reports survey, about 45 percent of the vehicles with FCW experienced at least one false alert, with several modes reporting over 60 percent false alerts. RADAR-based FCW systems are subject to false positives, because RADAR may report the presence of manhole covers, large cans, drainage grates, and other metallic objects, which can be misinterpreted as indicating a vehicle. Like ACC systems, FCW systems have played an important role in providing vehicle safety and driver convenience, but fall far short of meeting requirements for Level 3-5 autonomous vehicle functionality.

Automatic emergency braking ("AEB") ADAS systems detect an impending forward collision with another vehicle or other object, and may automatically apply the brakes if the driver does not take corrective action within a specified time or distance parameter. Typical AEB ADAS systems use front-facing camera or RADAR sensors, coupled to a dedicated processor, DSP, FPGA, or ASIC. When the AEB system detects a hazard, it typically first alerts the driver to take corrective action to avoid the collision, similar to a FCW system. If the driver does not take corrective action, the AEB system may automatically apply the brakes in an effort to prevent, or at least mitigate, the impact of the predicted collision. AEB systems, may include techniques such as dynamic brake support ("DBS") and/or crash imminent braking ("CIB"). A DBS system provides a driver-warning, similar to a FCW or typical AEB system. If the driver brakes in response to the warning but the dedicated processor, FPGA, or ASIC determines that the driver's action is insufficient to avoid the crash, the DBS system automatically supplements the driver's braking, attempting to avoid a crash. AEB systems are in wide use today, but have been criticized for oversensitivity, and even undesirable "corrections."

Lane-departure warning ("LDW") ADAS systems provide visual, audible, and/or tactile warnings—such as steering wheel or seat vibrations—to alert the driver when the car crosses lane markings. A LDW system does not activate when the driver indicates an intentional lane departure, by activating a turn signal. Typical LDW ADAS systems use front-side facing cameras, coupled to a dedicated processor, DSP, FPGA, or ASIC that is electrically coupled to driver feedback, such as a display, speaker, or vibrating component. LDW ADAS systems are in wide use today, but have been criticized for inconsistent performance, at times allowing a vehicle to drift out of a lane and/or toward a shoulder. LDW ADAS systems are also criticized for providing erroneous and intrusive feedback, especially on curvy roads.

Lane-keeping assist ("LKA") ADAS systems are a variation of LDW systems. LKA systems provide steering input or braking to correct the vehicle if it starts to exit the lane. LKA systems have been criticized for providing counterproductive controls signals, particularly when the vehicle encounters a bicyclist or pedestrians, especially on narrower roads. In particular, when a driver attempts to give an appropriately wide berth to a cyclist or pedestrian, LKW systems have been known to cause the system to steer the car back toward the center of the lane and thus toward the cyclist or pedestrian.

Blind Spot Warning ("BSW") ADAS systems detects and warn the driver of vehicles in an automobile's blind spot. Typical BSW systems provide a visual, audible, and/or tactile alert to indicate that merging or changing lanes is unsafe. The system may provide an additional warning when the driver uses a turn signal. Typical BSW ADAS systems use rear-side facing camera or RADAR sensors, coupled to a dedicated processor, DSP, FPGA, or ASIC that is electrically coupled to driver feedback, such as a display, speaker, or vibrating component. BSW systems are in wide use today, but have been criticized for false positives.

Rear cross-traffic warning ("RCTW") ADAS systems provide visual, audible, and/or tactile notification when an object is detected outside the rear camera range when a vehicle is backing up. Some RCTW systems include AEB to ensure that the vehicle brakes are applied to avoid a crash. Typical RCTW ADAS systems use one or more rear-facing RADAR sensor, coupled to a dedicated processor, DSP, FPGA, or ASIC that is electrically coupled to driver feedback, such as a display, speaker, or vibrating component. RCTW systems, like other ADAS systems, have been criticized for false positives.

Prior art ADAS systems have been commercially successful, but none of them provide the functionality needed for Level 3-5 autonomous vehicle performance.

B. Design Approaches.

1. Classical Computer Vision and the Rules-Based Approach

Two distinctly different approaches have been proposed for autonomous vehicles. The first approach, computer vision, is the process of automatically perceiving, analyzing, understanding, and/or interpreting visual data. Such visual data may include any combination of videos, images, real-time or near real-time data captured by any type of camera or video recording device. Computer vision applications implement computer vision algorithms to solve high-level problems. For example, an ADAS system can implement real-time object detection algorithms to detect pedestrians/bikes, recognize traffic signs, and/or issue lane departure warnings based on visual data captured by an in-vehicle camera or video recording device.

Traditional computer vision approaches attempt to extract specified features (such as edges, corners, color) that are relevant for the given task. A traditional computer vision approach includes an object detector, which performs feature detection based on heuristics hand-tuned by human engineers. Pattern-recognition tasks typically use an initial-stage feature extraction stage, followed by a classifier.

Classic computer vision is used in many ADAS applications, but is not well-suited to Level 3-5 system performance. Because classic computer vision follows a rules-based approach, an autonomous vehicle using classic computer vision must have a set of express, programmed decision guidelines, intended to cover all possible scenarios. Given the enormous number of driving situations, environments, and objects, classic computer vision cannot solve the problems that must be solved to arrive at Level 3-5 autonomous vehicles. No system has been able to provide rules for every possible scenario and all driving challenges, including snow, ice, heavy rain, big open parking lots, pedestrians, reflections, merging into oncoming traffic, and the like.

2. Neural Networks and Autonomous Vehicles

Neural networks are widely viewed as an alternative approach to classical computer vision. Neural networks have been proposed for autonomous vehicles for many years, beginning with Pomerleau's Autonomous Land Vehicle in a Neural Network ("ALVINN") system research in 1989.

ALVINN inspired the Defense Advanced Research Projects Agency ("DARPA") seedling project in 2004 known as DARPA Autonomous Vehicle ("DAVE"), in which a sub-scale radio-controlled car drove through a junk-filled alley way. DAVE was trained on hours of human driving in similar, but not identical, environments. The training data included video from two cameras and the steering commands sent by a human operator. DAVE demonstrated the potential of neural networks, but DAVE's performance was not sufficient to meet the requirements of Level 3-5 autonomous vehicles. To the contrary, DAVE's mean distance between crashes was about 20 meters in complex environments.

After DAVE, two developments spurred further research in neural networks. First, large, labeled data sets such as the ImageNet Large Scale Visual Recognition Challenge ("ILSVRC") became widely available for training and validation. The ILSRVC data-set contains over ten million images in over 1000 categories.

Second, neural networks are now implemented on massively parallel graphics processing units ("GPUs"), tremendously accelerating learning and inference ability. The term "GPU" is a legacy term, but does not imply that the GPUs of the present technology are, in fact, used for graphics processing. To the contrary, the GPUs described herein are domain specific, parallel processing accelerators. While a CPU typically consists of a few cores optimized for sequential serial processing, a GPU typically has a massively parallel architecture consisting of thousands of smaller, more efficient computing cores designed for handling multiple tasks simultaneously. GPUs are used for many purposes beyond graphics, including to accelerate high performance computing, deep learning and artificial intelligence, analytics, and other engineering applications.

GPUs are ideal for deep learning and neural networks. GPUs perform an extremely large number of simultaneous calculations, cutting the time that it takes to train neural networks to just hours, from days with conventional CPU technology.

Deep neural networks are largely "black boxes," comprised of millions of nodes and tuned over time. A DNN's decisions can be difficult if not impossible to interpret, making troubleshooting and refinement challenging. With deep learning, a neural network learns many levels of abstraction. They range from simple concepts to complex ones. Each layer categorizes information. It then refines it and passes it along to the next. Deep learning stacks the layers, allowing the machine to learn a "hierarchical representation." For example, a first layer might look for edges. The next layer may look for collections of edges that form angles. The next might look for patterns of edges. After many layers, the neural network learns the concept of, say, a pedestrian crossing the street.

FIG. 3 illustrates the training of a neural network to recognize traffic signs. The neural network is comprised of an input layer (6010), a plurality of hidden layers (6020), and an output layer (6030). Training image information (6000) is input into nodes (300), and propagates forward through the network. The correct result (6040) is used to adjust the weights of the nodes (6011, 6021, 6031), and the process is used for thousands of images, each resulting in revised weights. After sufficient training, the neural network can accurately identify images, with even greater precision than humans.

C. NVIDIA's Parker SoC and Drive PX Platforms.

GPUs have demonstrated that a CNN could be used to steer a car when properly trained. A Level 3-5 autonomous vehicle must make numerous instantaneous decisions to navigate the environment. These choices are far more complicated than the lane-following and steering applications of the early ALVINN, and DAVE systems.

Following its early work, NVIDIA adapted a System-on-a-Chip called Parker—initially designed for mobile applications—for a controller for a self-driving system called DRIVE™PX 2. The DRIVE™PX 2 platform with Parker supported Autochauffeur and AutoCruise functionality.

To date, no company has successfully built an autonomous driving system for Level 4-5 functionality capable of meeting industry safety standards. It is a daunting task. It has not been done successfully before, and requires numerous technologies spanning different architectural, hardware, and software-based systems. Given infinite training and computing power, all decision-making can—at least theoretically—be handled best with deep learning methodologies. The autonomous vehicle would not need to be programmed with explicit rules, but rather, would be operated by a neural network trained with massive amounts of data depicting every possible driving scenario and the proper outcome. The autonomous vehicle would have the benefit of an infinite collective experience, and would be far more skilled at driving than the average human driver. The collective experiences would, in theory, also include localized information regarding local driving customs—some driving conventions are informal, parochial, and known to locals rather than being codified in traffic laws.

But a single, unified neural network likely cannot make every decision necessary for driving. Many different AI neural networks, combined with traditional technologies, are necessary to operate the vehicle. Using a variety of AI networks, each responsible for an area of expertise, will increase safety and reliability in autonomous vehicles. In addition to a network that controls steering, autonomous vehicles must have networks trained and focused on specific tasks like pedestrian detection, lane detection, sign reading, collision avoidance and many more. Even if a single combination of neural networks could achieve Level 3-5 functionality, the "black box" nature of neural networks makes achieving ASIL D functionality impractical.

VII. SUMMARY

What is needed to solve the problems in existing autonomous driving approaches is an end-to-end platform with one flexible architecture that spans Level 3-5—a comprehensive functional safety architecture that leverages and makes efficient use of computer vision and/or ADAS techniques for diversity and redundancy, and provides a platform for a flexible, reliable driving software stack, along with deep learning tools. What is needed is a faster, more reliable, and even more energy-efficient and space-efficient SoC, integrated into a flexible, expandable platform that enables a wide range of autonomous vehicles, including cars, taxis, trucks, buses, and other vehicles. What is needed is a system that can provide safe, reliable, and comfortable autonomous driving, without the false positives and oversensitivity that have plagued commercial ADAS systems.

Embodiments include systems and methods that facilitate autonomous driving functionality for Levels 3, 4, and/or 5. In some example embodiments herein, conditional, high and full automation levels 3, 4, and 5 are maintained even when a processor component fails. The technology further provides an end-to-end platform with a flexible architecture that provides a comprehensive functional safety architecture that leverages and makes efficient use of computer vision and/or ADAS techniques for diversity and redundancy, provides a platform for a flexible, reliable driving software stack, along with deep learning tools. The example non-limiting technology herein provides a faster, reliable, energy-efficient and space-efficient SoC, integrated into a flexible, expandable platform that enables a wide range of autonomous vehicles, including cars, taxis, trucks, buses, and other vehicles.

VIII. BRIEF DESCRIPTION OF THE DRAWINGS

FIG. 1 is a diagram illustrating Levels of Driver Assistance, ADAS, and Autonomous Driving, in accordance with embodiments of the present technology.

FIG. 2 presents a table of example factors for determining ASIL risk, in accordance with embodiments of the present technology.

FIG. 14 presents a table of example non-limiting ASIL Requirements, in accordance with embodiments of the present technology.

Figure 15:
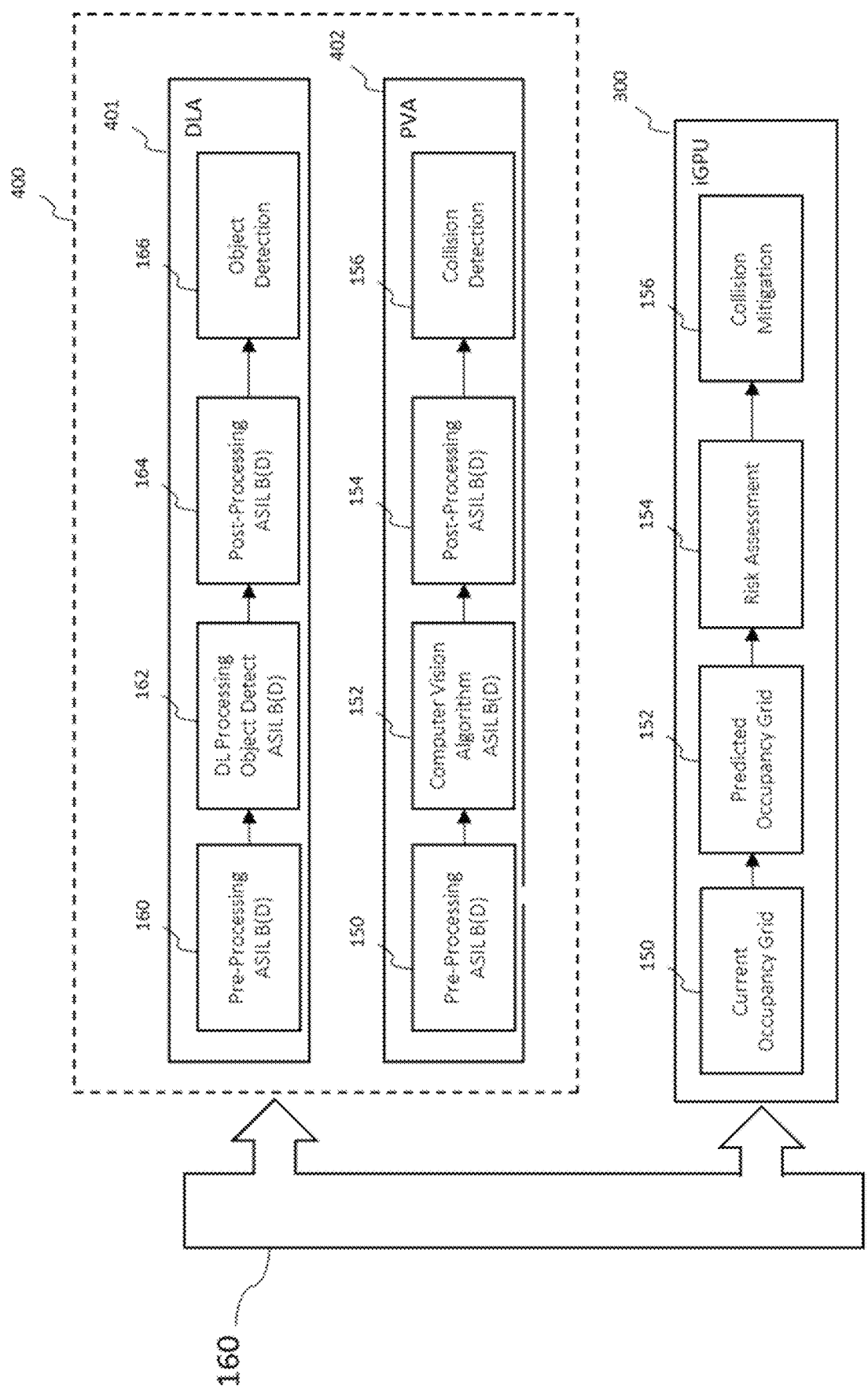

FIG. 15 depicts a block diagram of functional safety features in an advanced SoC, in accordance with embodiments of the present technology.

Figure 16:
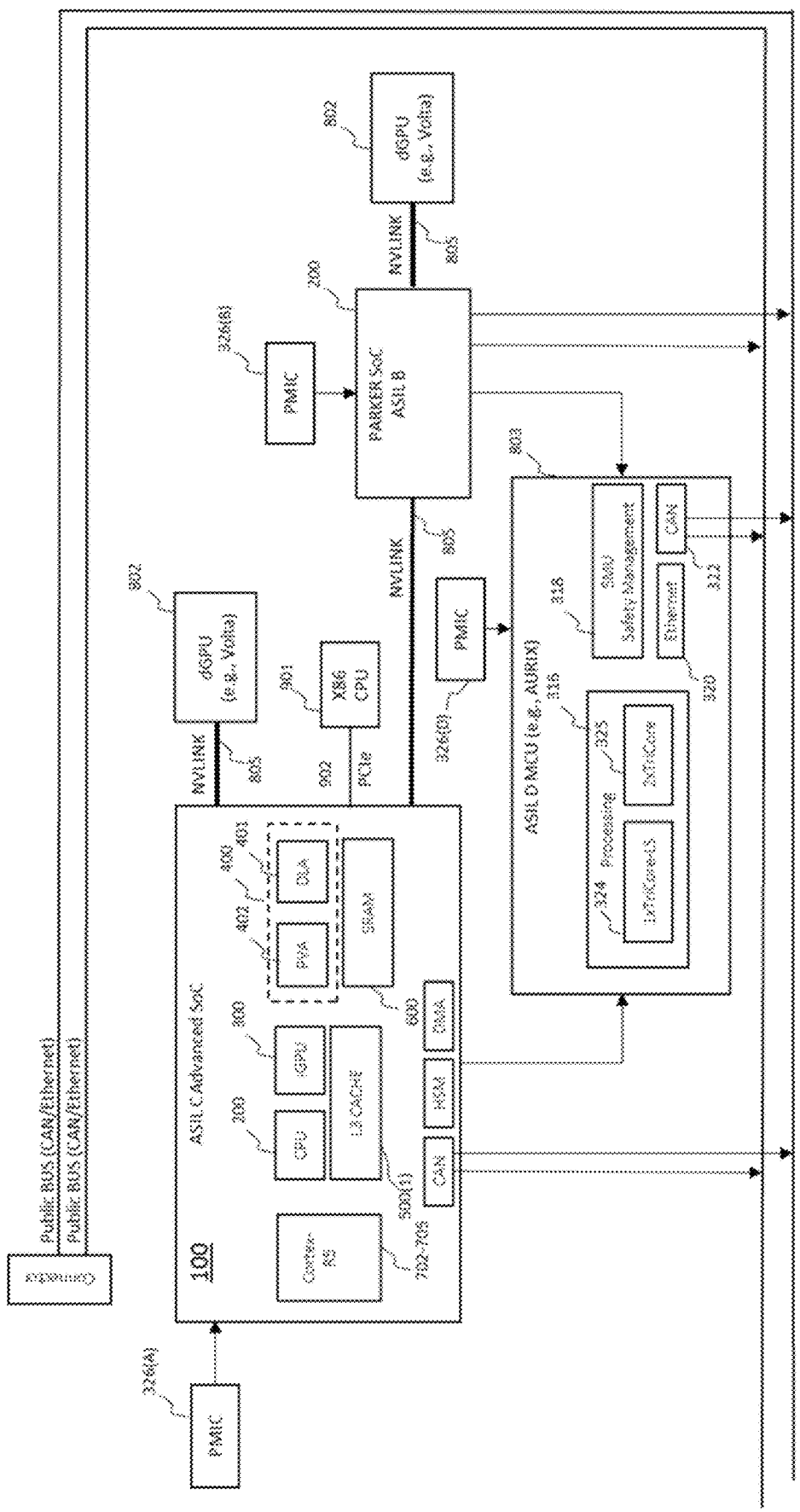

FIG. 16 depicts an example hardware platform with three SoCs, in accordance with embodiments of the present technology.

Figure 17:
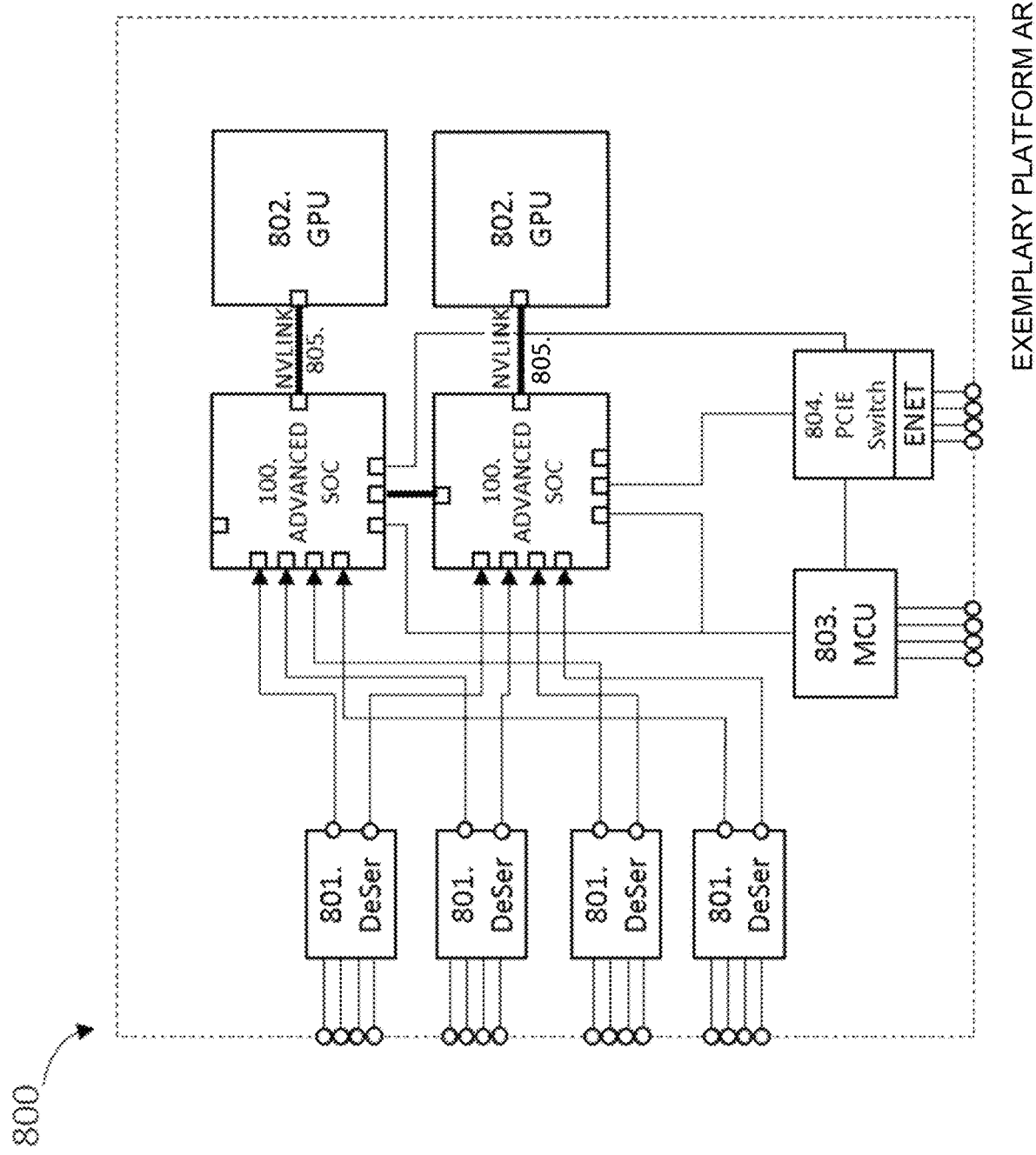

FIG. 17 depicts an example hardware platform architecture, in accordance with embodiments of the present technology.

Figure 18:
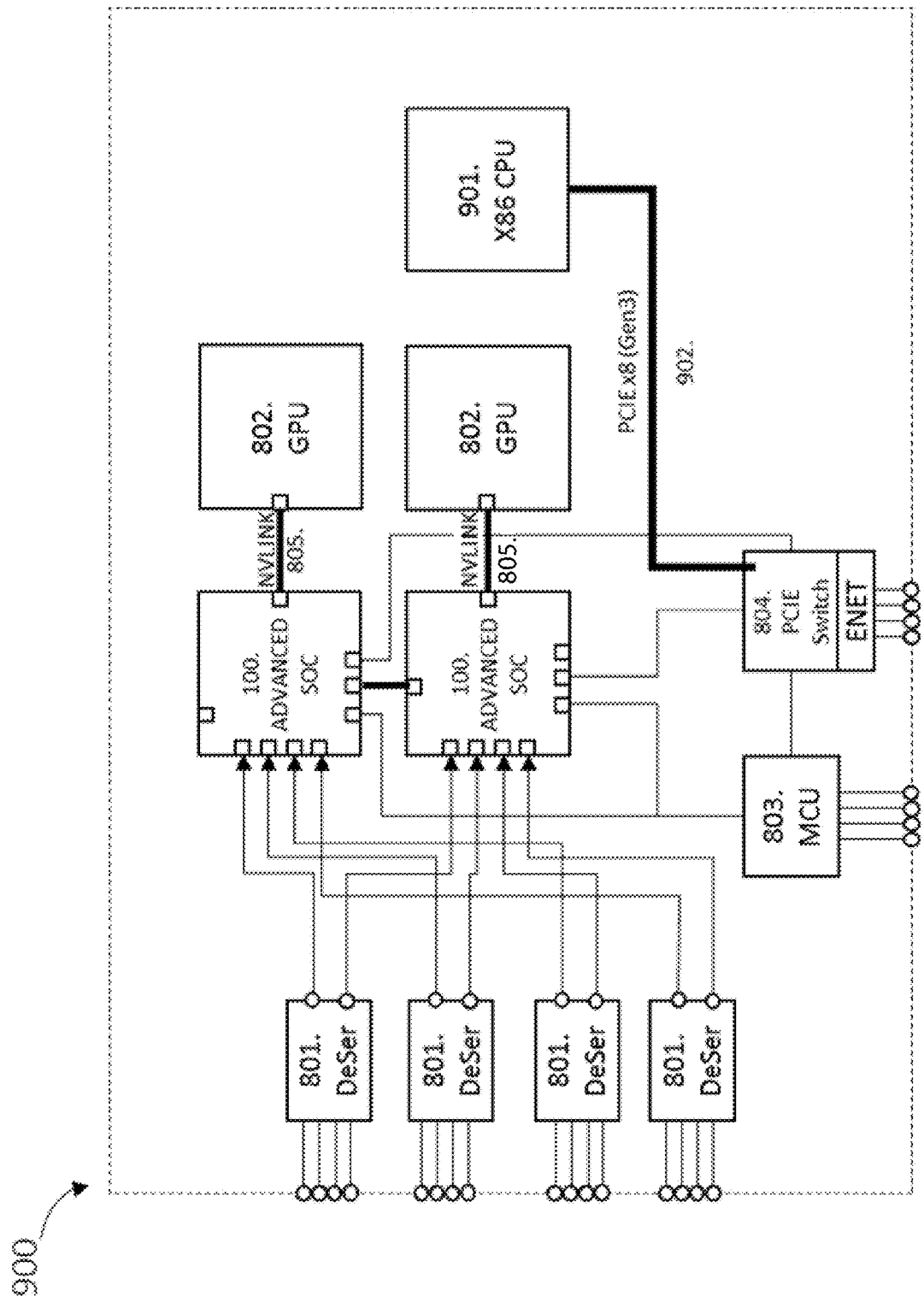

FIG. 18 depicts an example hardware platform architecture including a CPU, in accordance with embodiments of the present technology.

Figure 19:
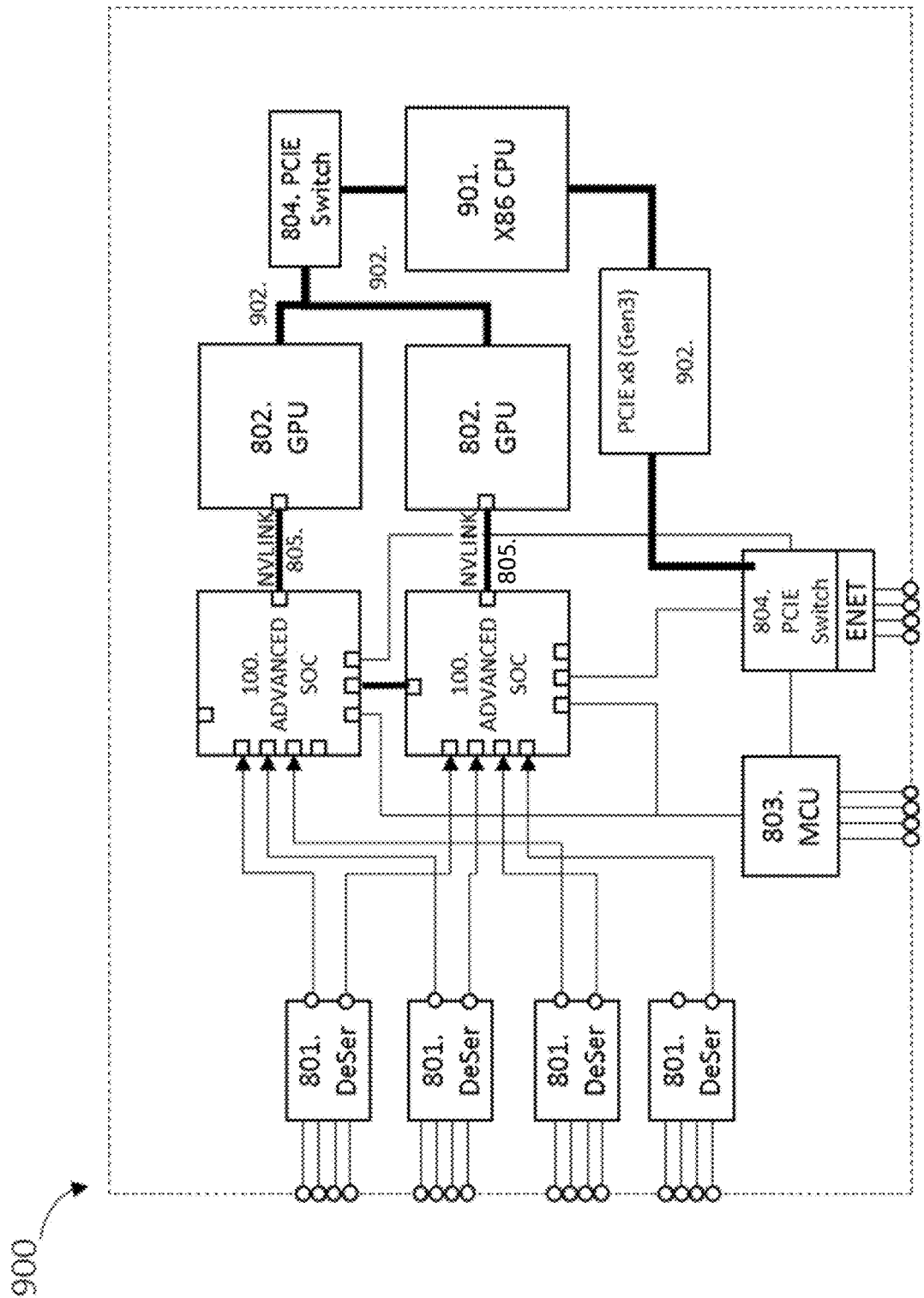

FIG. 19 depicts an alternate example hardware platform architecture that includes a CPU, in accordance with embodiments of the present technology.

Figure 20:
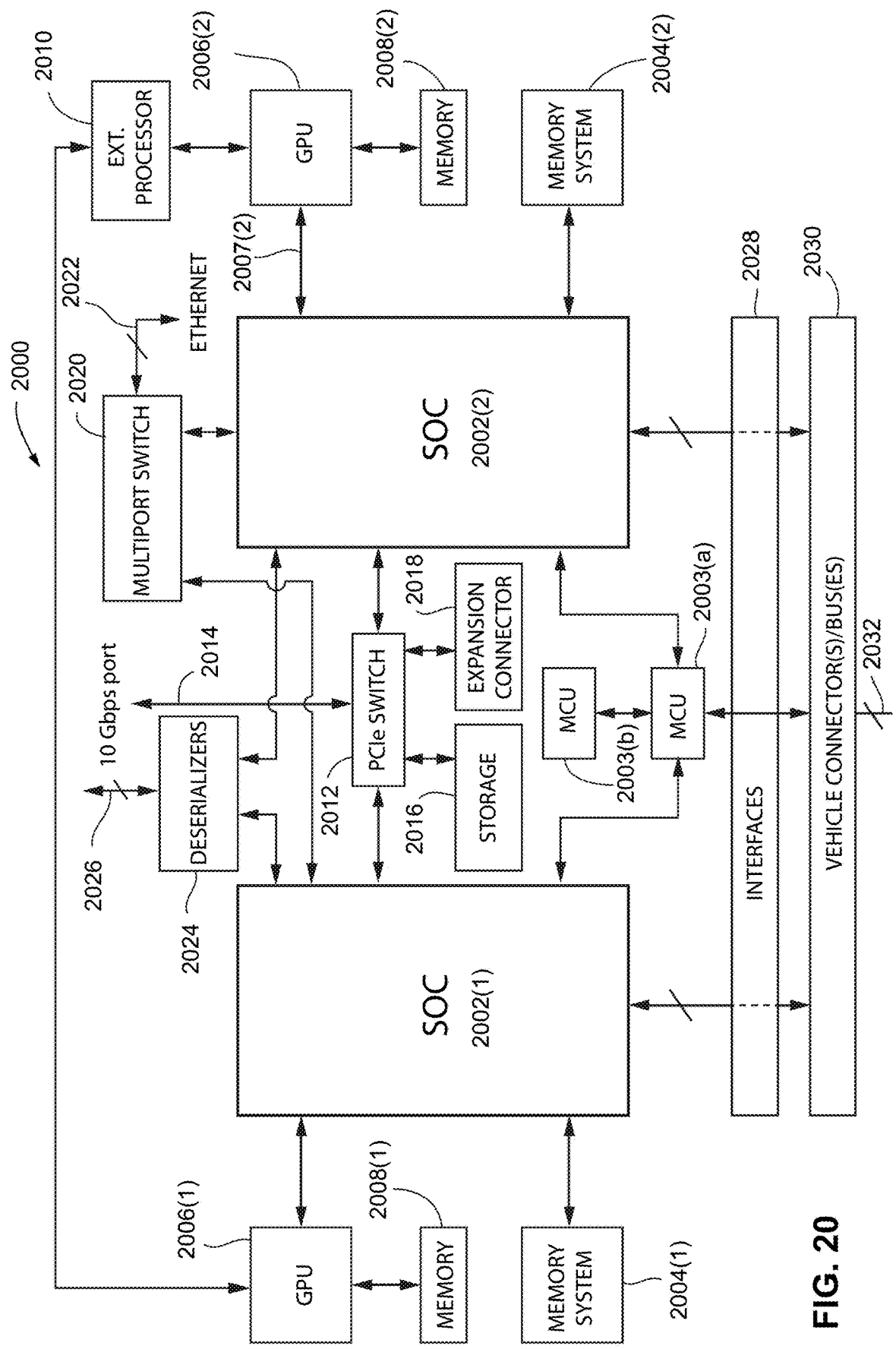

FIG. 20 depicts an example hardware platform architecture with communication interfaces, in accordance with embodiments of the present technology.

Figure 21:
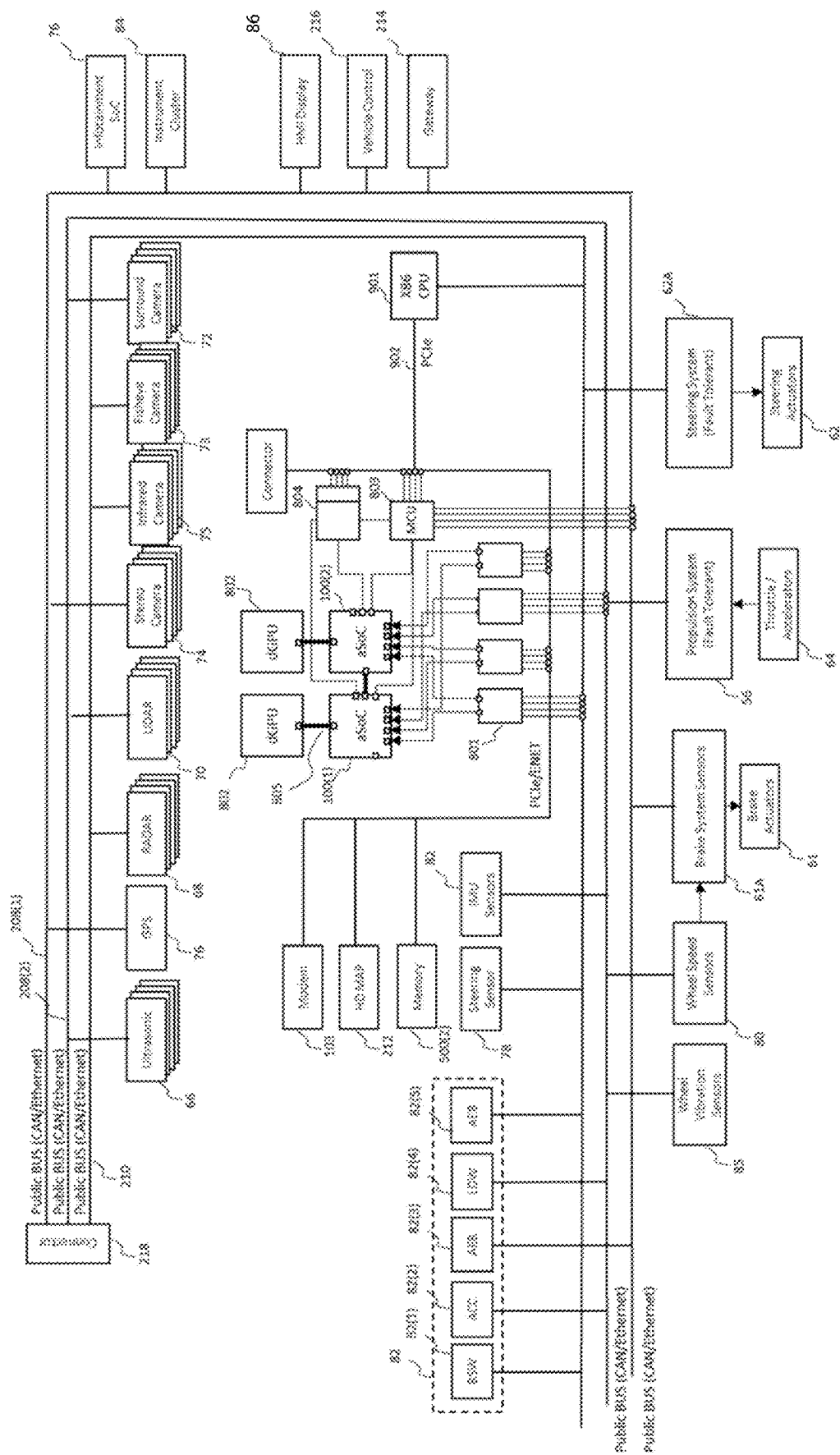

FIG. 21 is a system diagram for an autonomous driving system, in accordance with embodiments of the present technology.

Figure 22:
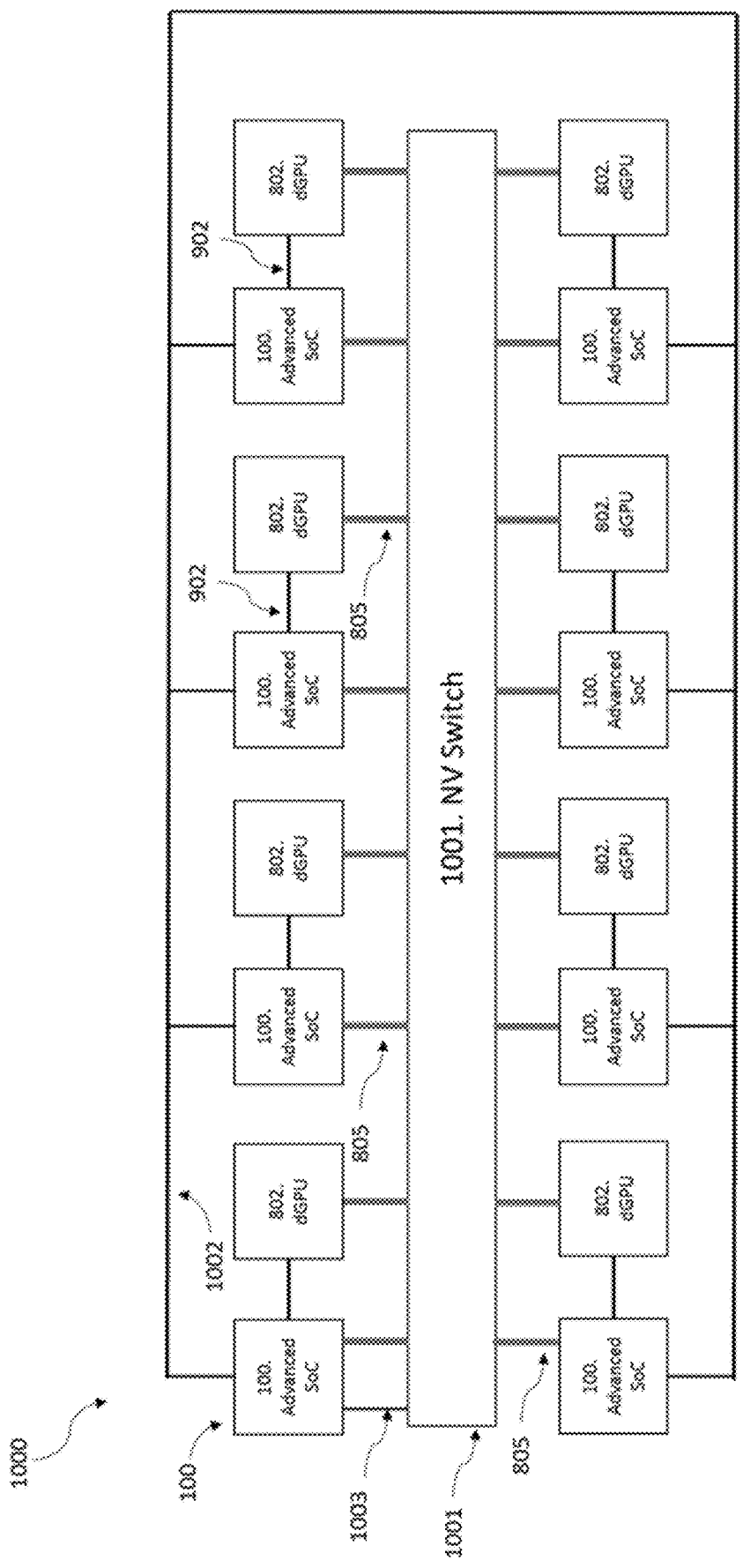

FIG. 22 is an example architecture of an autonomous driving system that includes eight advanced SoCs and discrete GPUs (dGPUs), in accordance with embodiments of the present technology.

Figure 23:
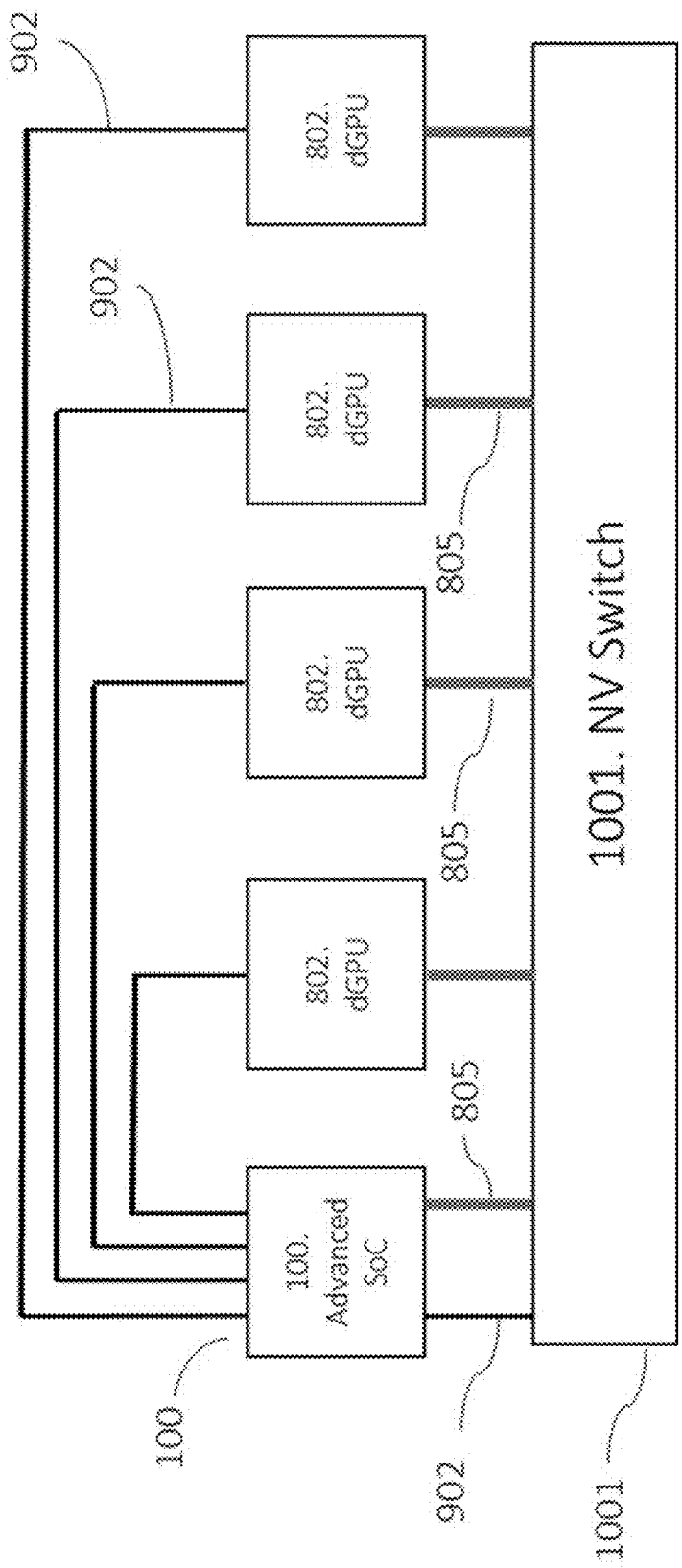

FIG. 23 is an example architecture of an autonomous driving system that includes an advanced SoC and four dGPUs, in accordance with embodiments of the present technology.

Figure 24:
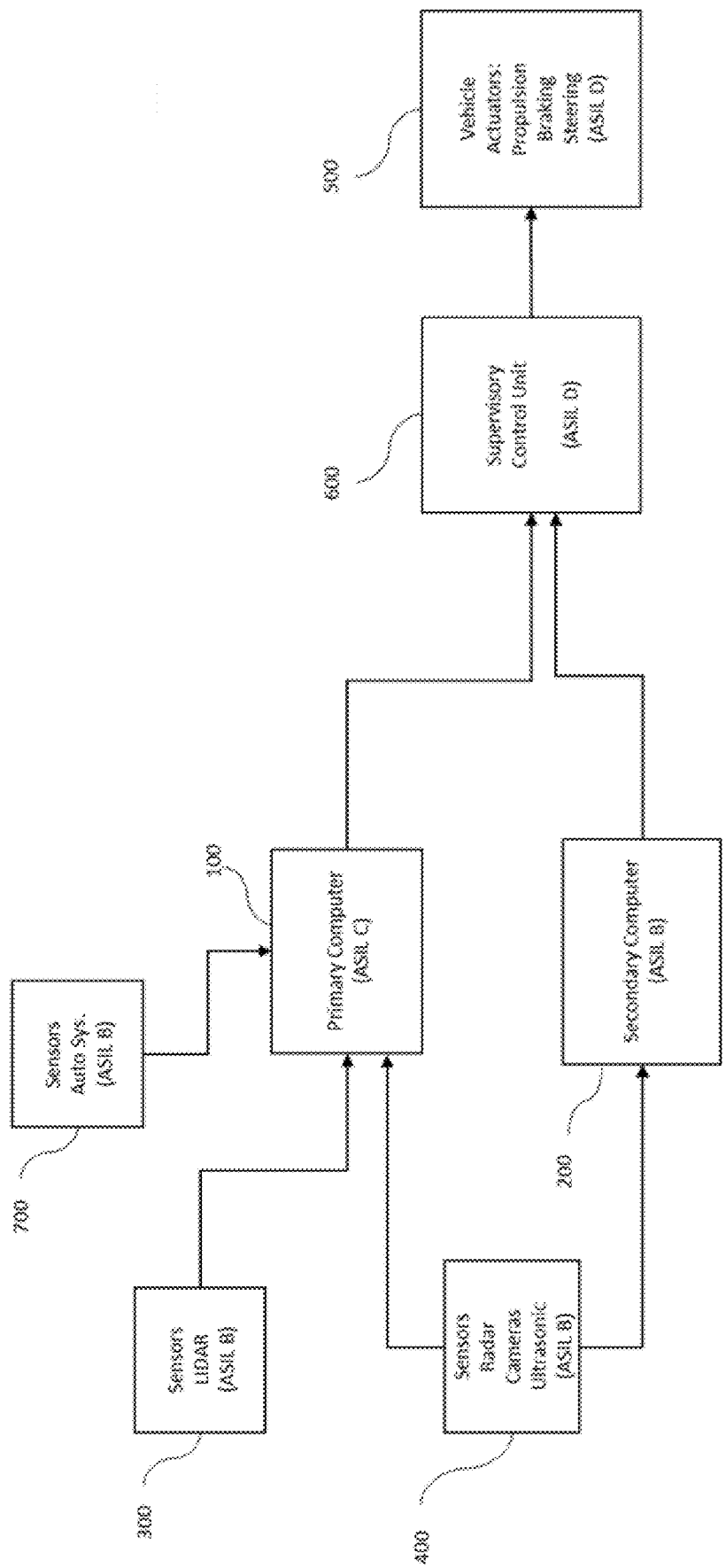

FIG. 24 is a block diagram of a high-level system architecture with allocated ASILs, in accordance with embodiments of the present technology.

Figure 25:
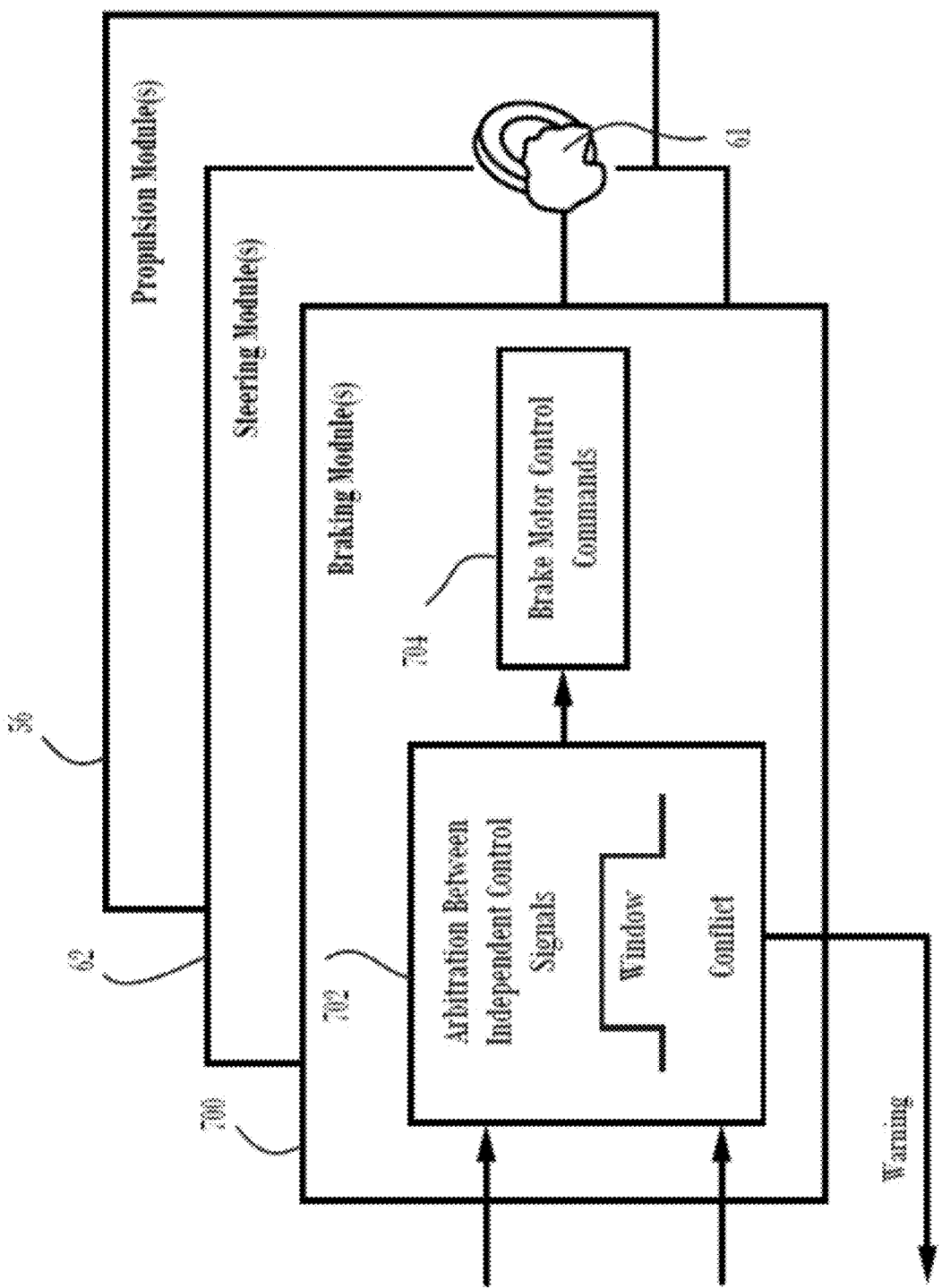

FIG. 25 is a block diagram of example data flow during an arbitration procedure, in accordance with embodiments of the present technology.

Figure 26:
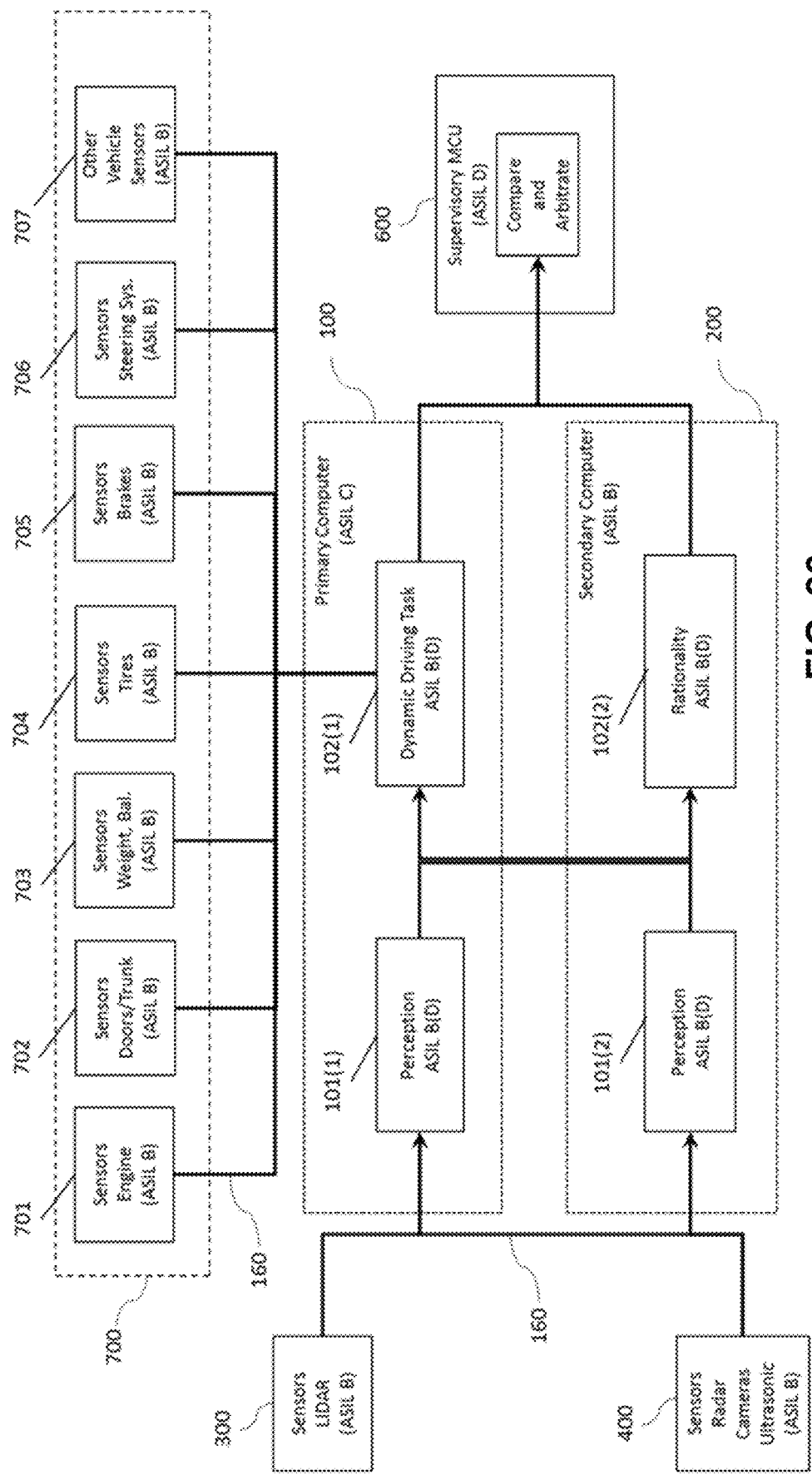

FIG. 26 depicts an example system architecture with allocated ASILs, in accordance with embodiments of the present technology.

Figure 27:
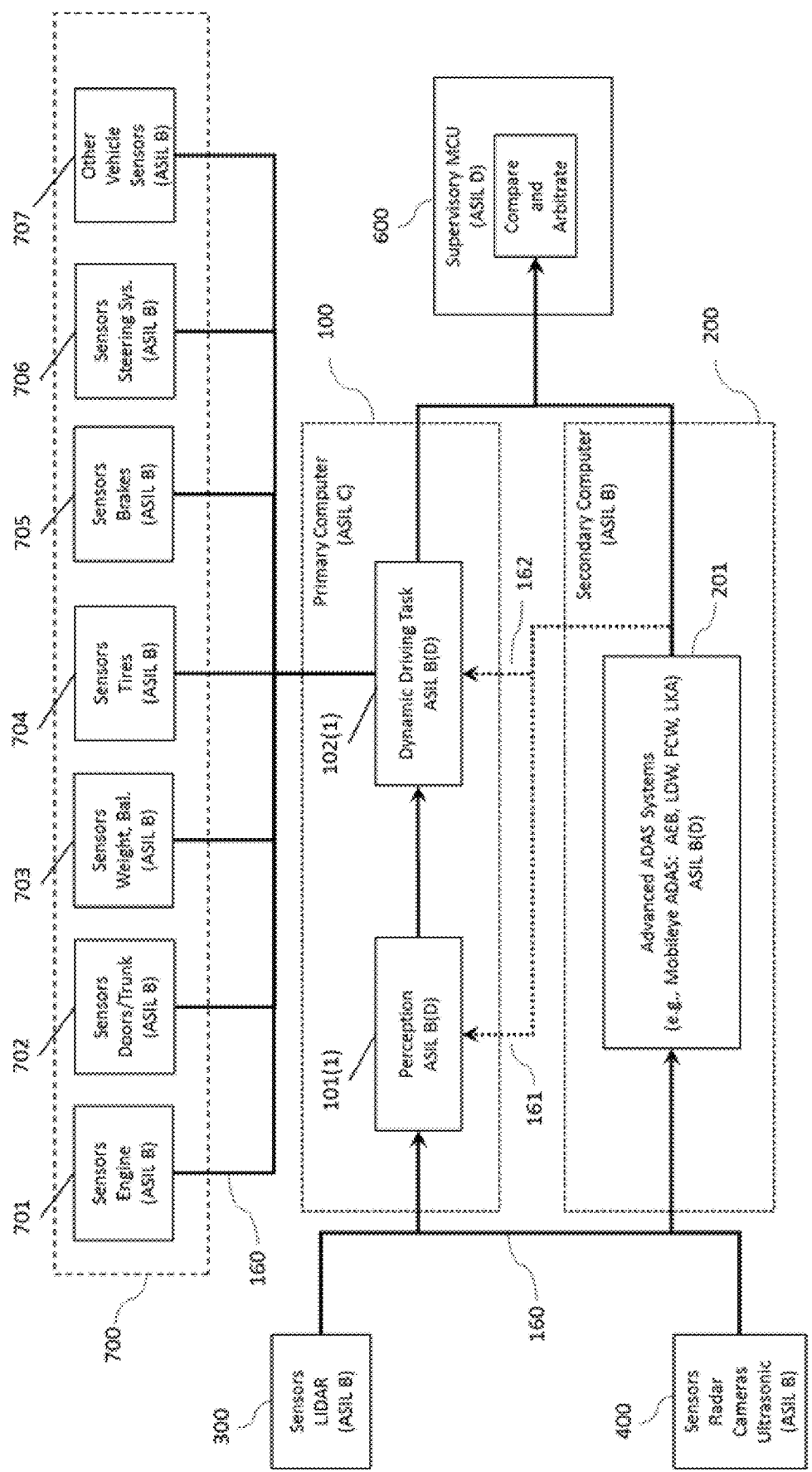

FIG. 27 depicts an example configuration of an advanced ADAS system, in accordance with embodiments of the present technology.

Figure 28:
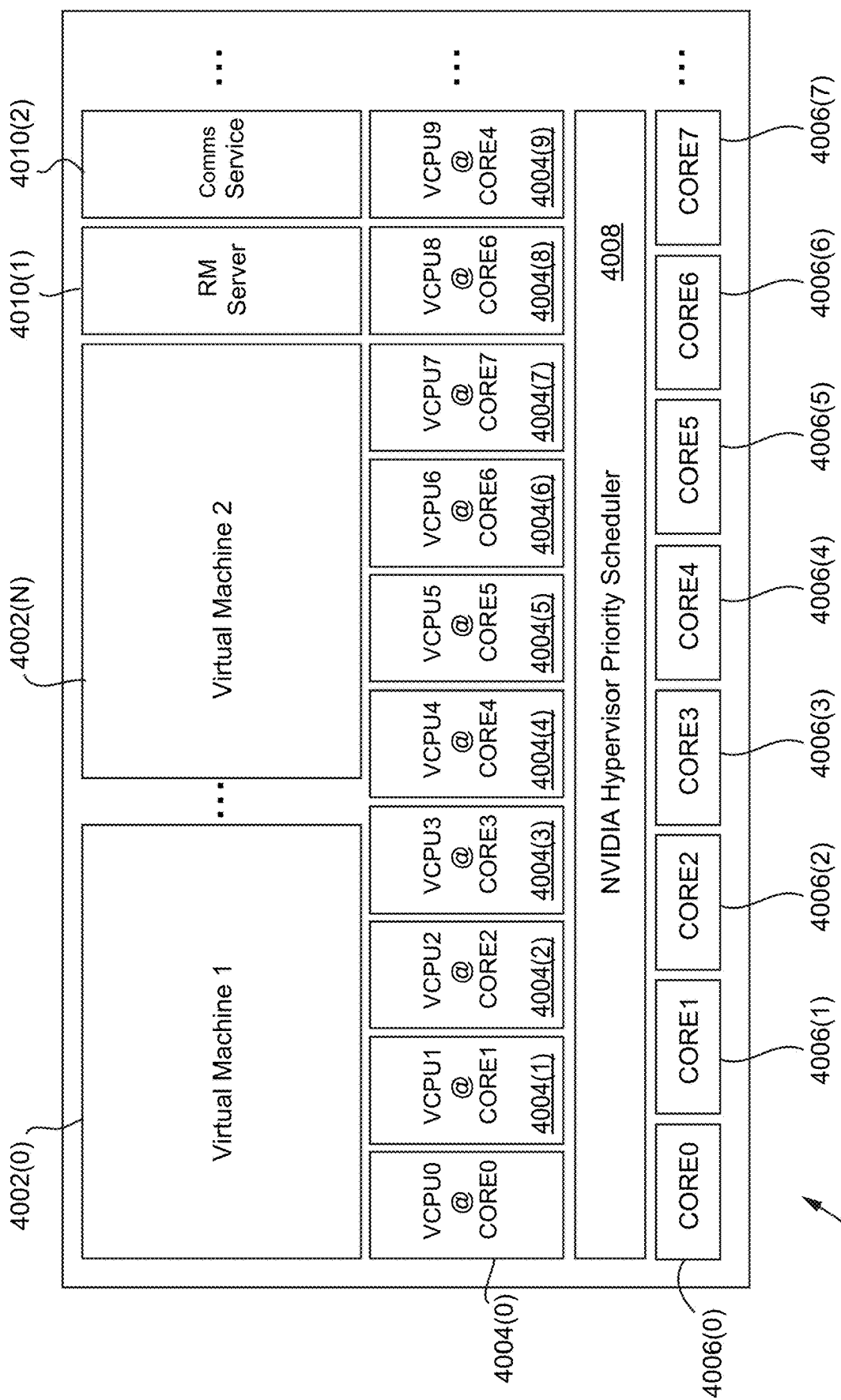

FIG. 28 depicts an example virtual machine configuration for autonomous driving applications, in accordance with embodiments of the present technology.

Figure 29:
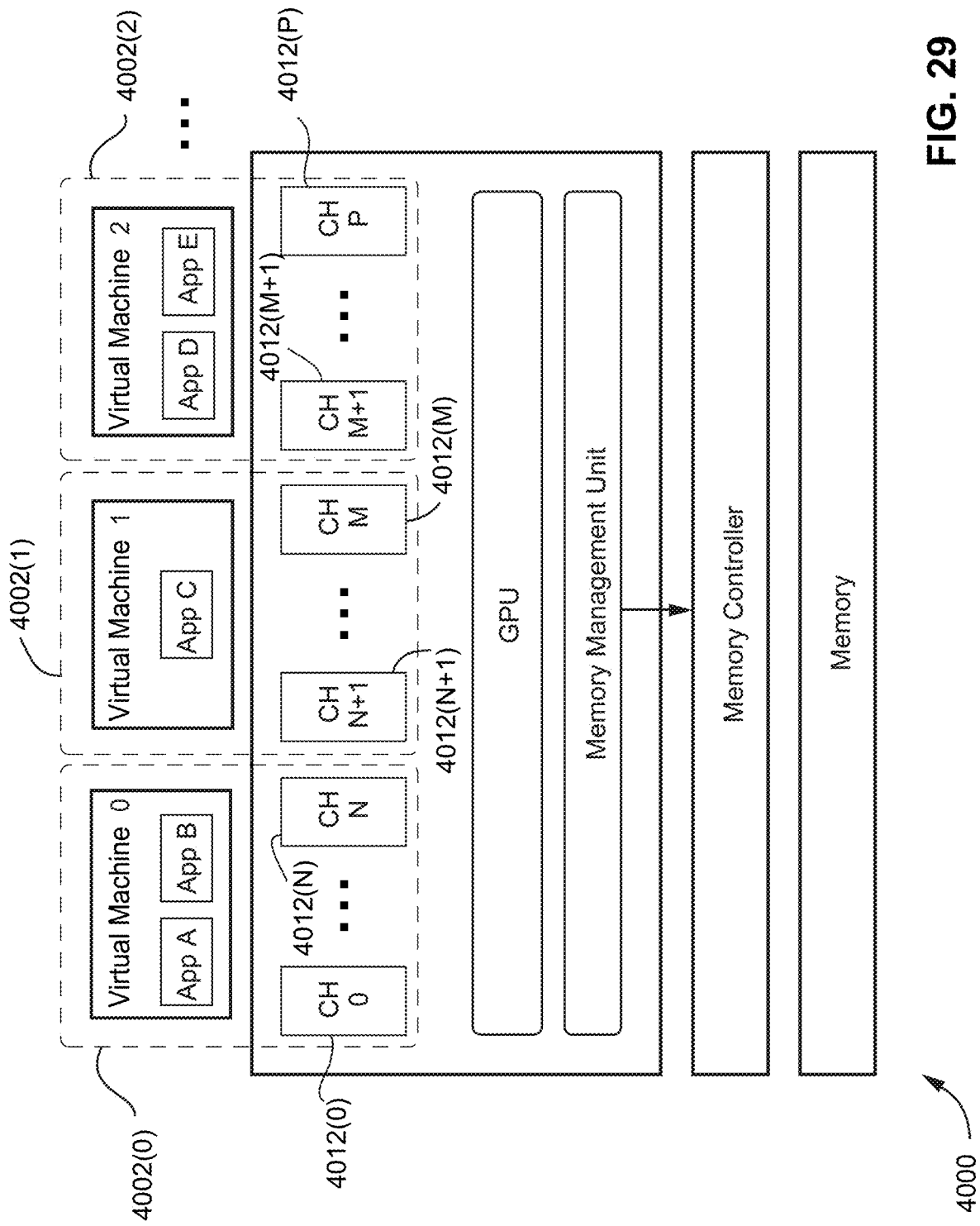

FIG. 29 depicts an example allocation of applications on virtual machines in an autonomous driving system, in accordance with embodiments of the present technology.

Figure 30:
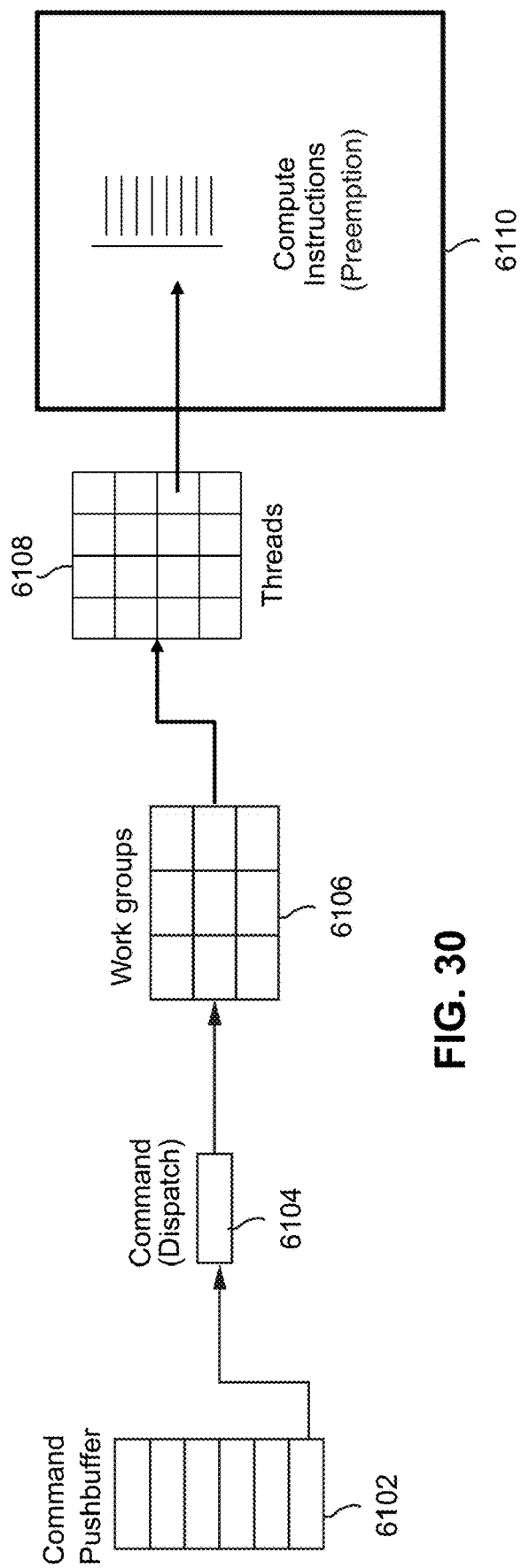

FIG. 30 illustrates an example workflow for performing compute instructions with preemption, in accordance with embodiments of the present technology.

Figure 31:
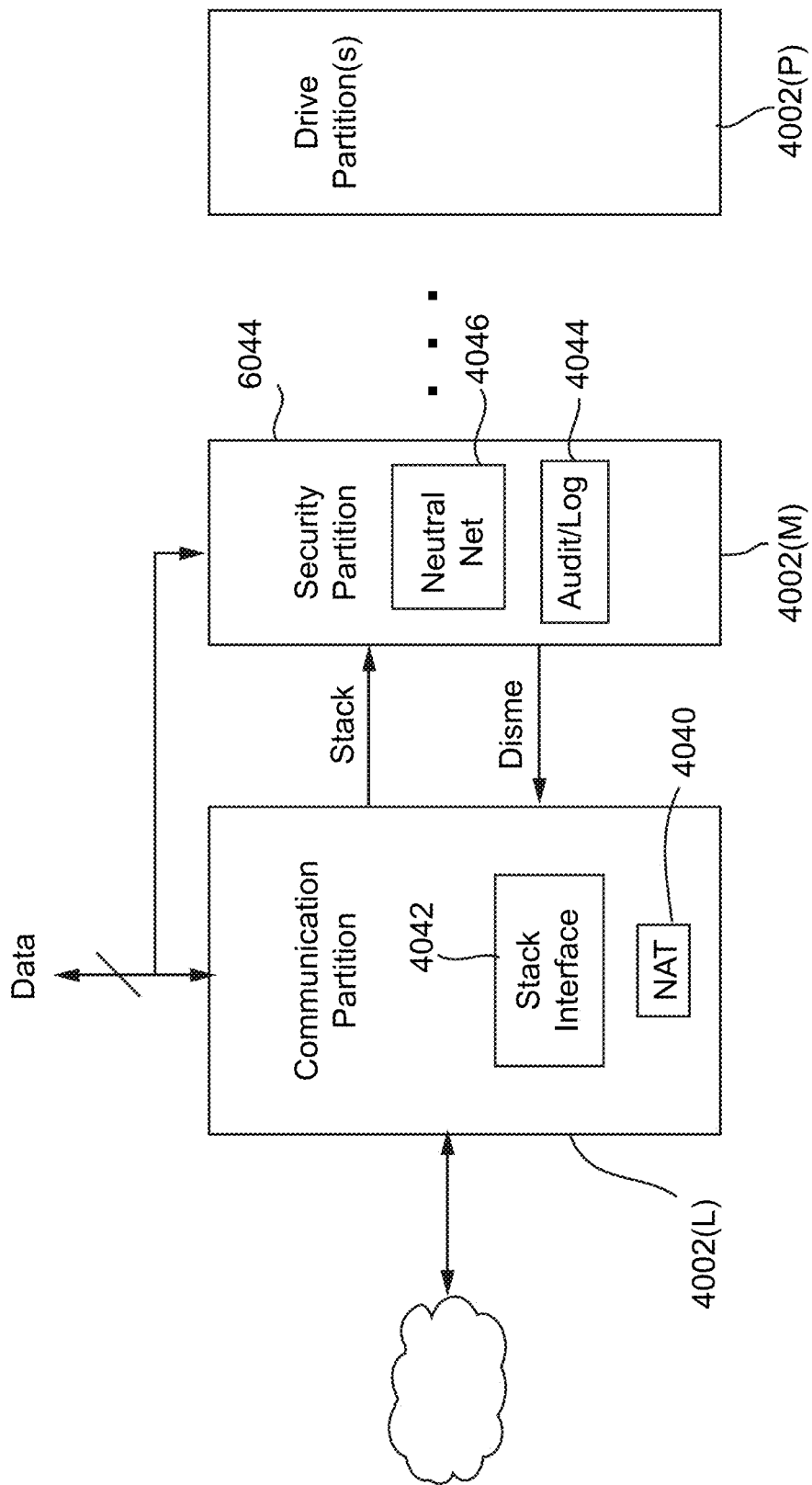

FIG. 31 depicts an example configuration of partitioning services for functional safety in an autonomous driving system, in accordance with embodiments of the present technology.

Figure 32:
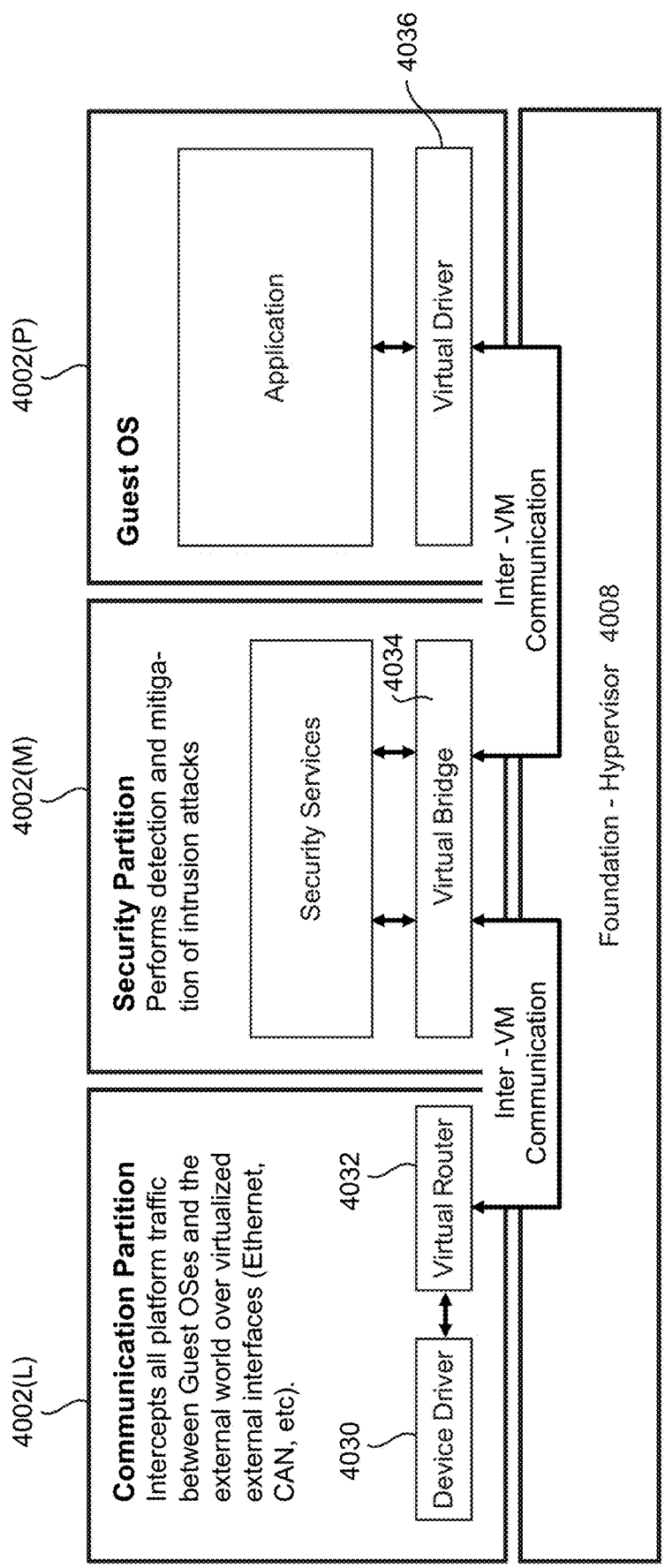

FIG. 32 depicts an example communication and security system architecture in an autonomous driving system, in accordance with embodiments of the present technology.

Figure 33:
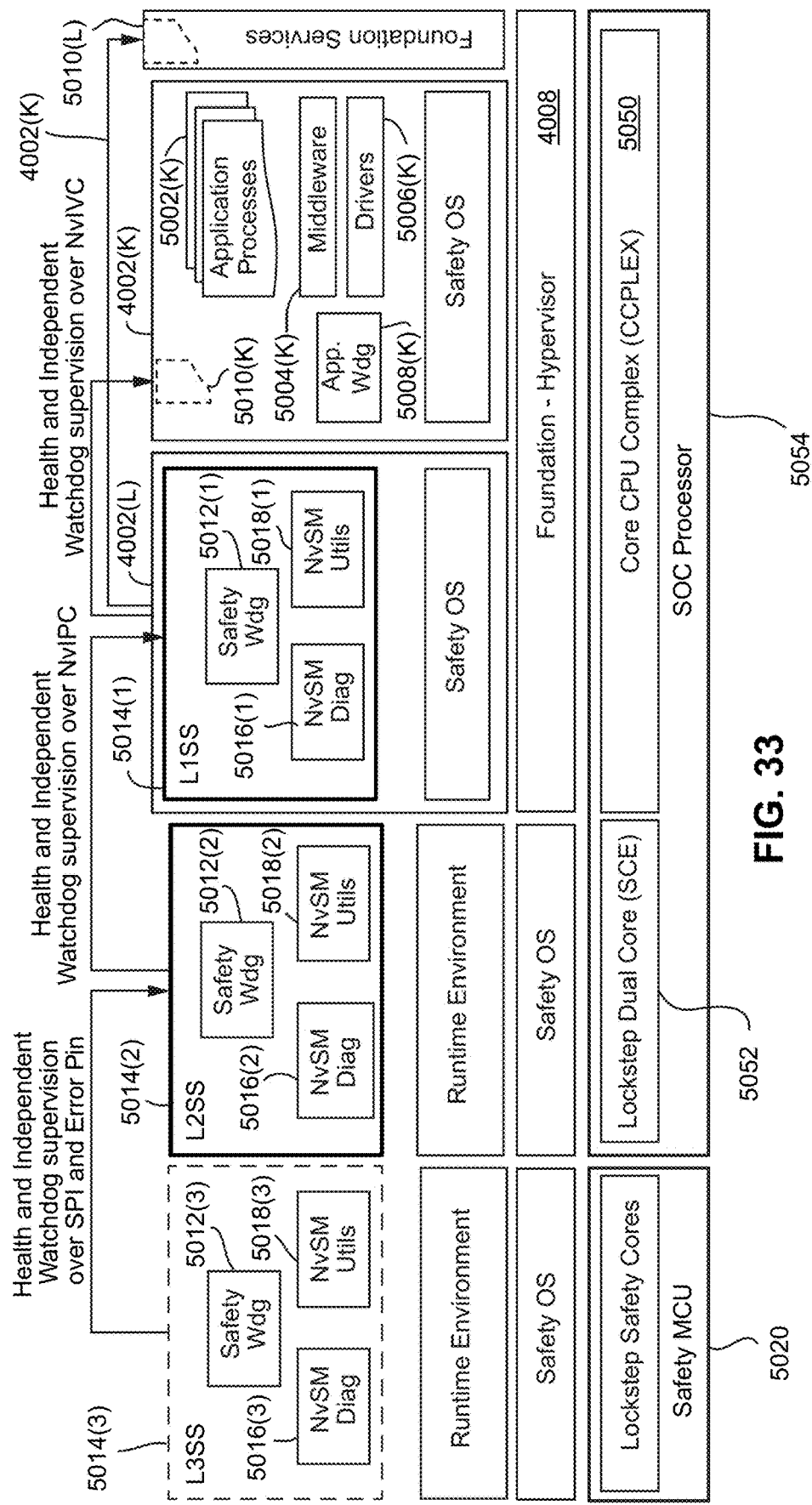

FIG. 33 depicts an example software stack corresponding to a hardware infrastructure in an autonomous driving system, in accordance with embodiments of the present technology.

Figure 34:
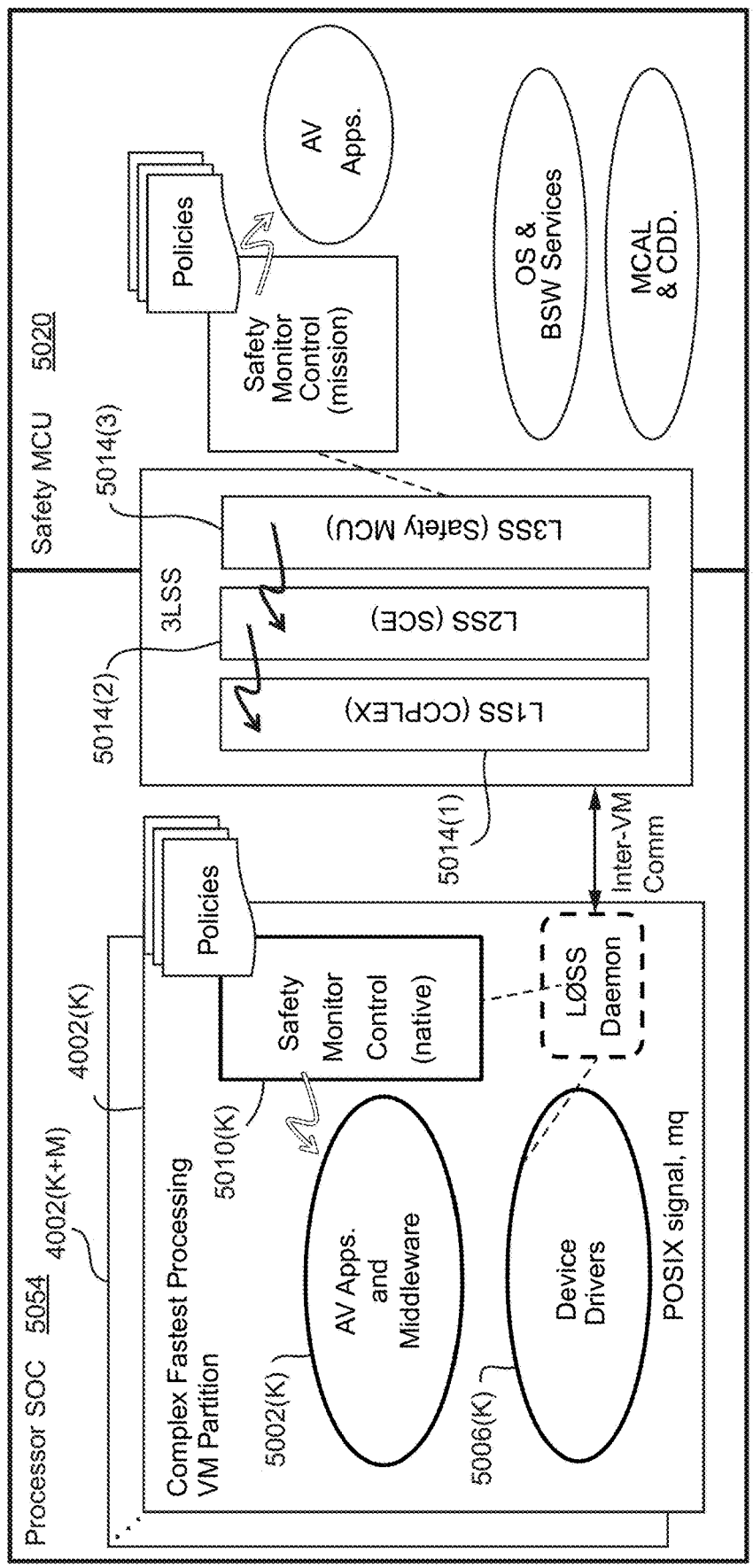

FIG. 34 depicts an example configuration with functional safety features in an autonomous driving system, in accordance with embodiments of the present technology.

Figure 35:
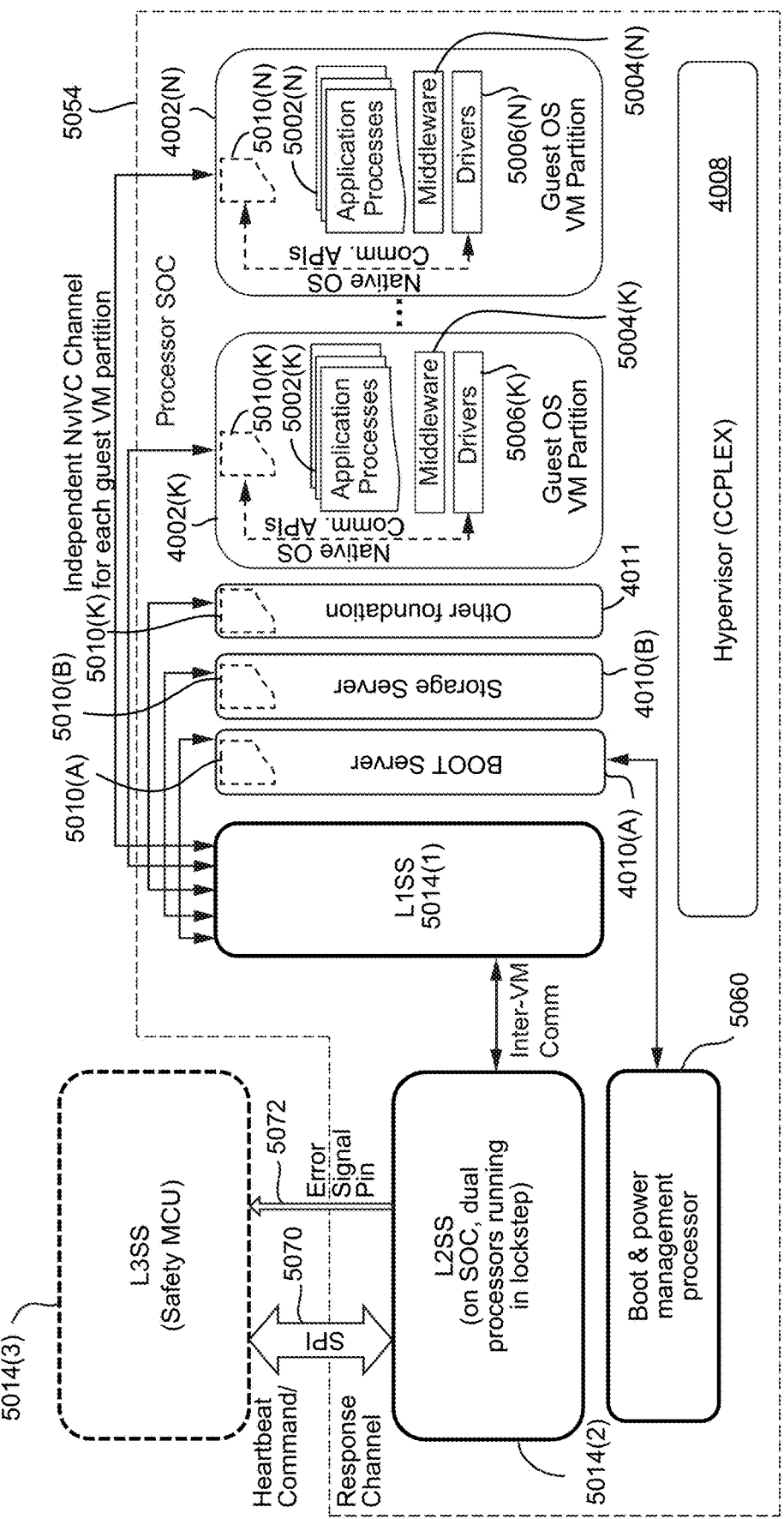

FIG. 35 depicts an example interaction topology for virtual machine applications in an autonomous driving system, in accordance with embodiments of the present technology.

Figure 36:
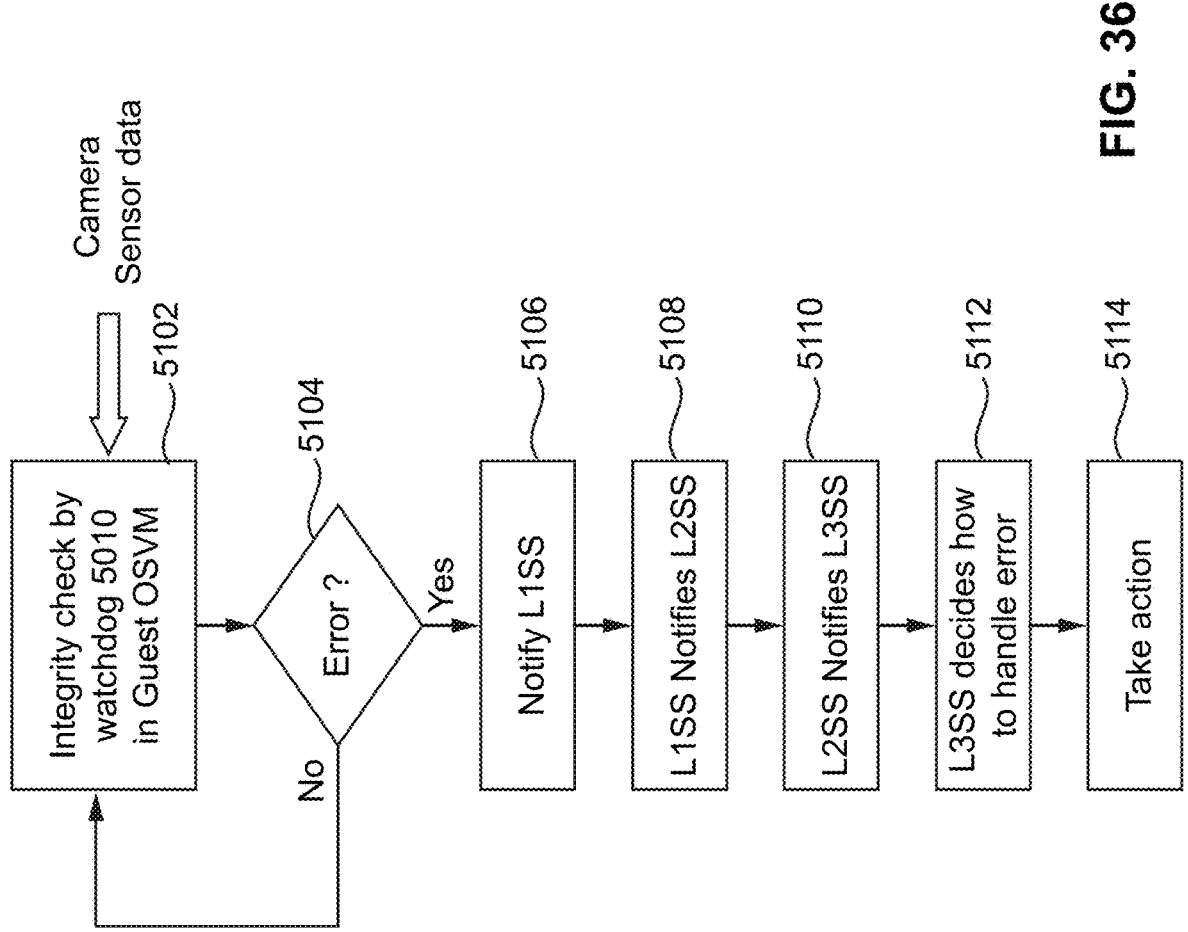

FIG. 36 is a flowchart for monitoring errors in a Guest Operating system executing in a virtual machine in an autonomous driving system, in accordance with embodiments of the present technology.

Figure 37:
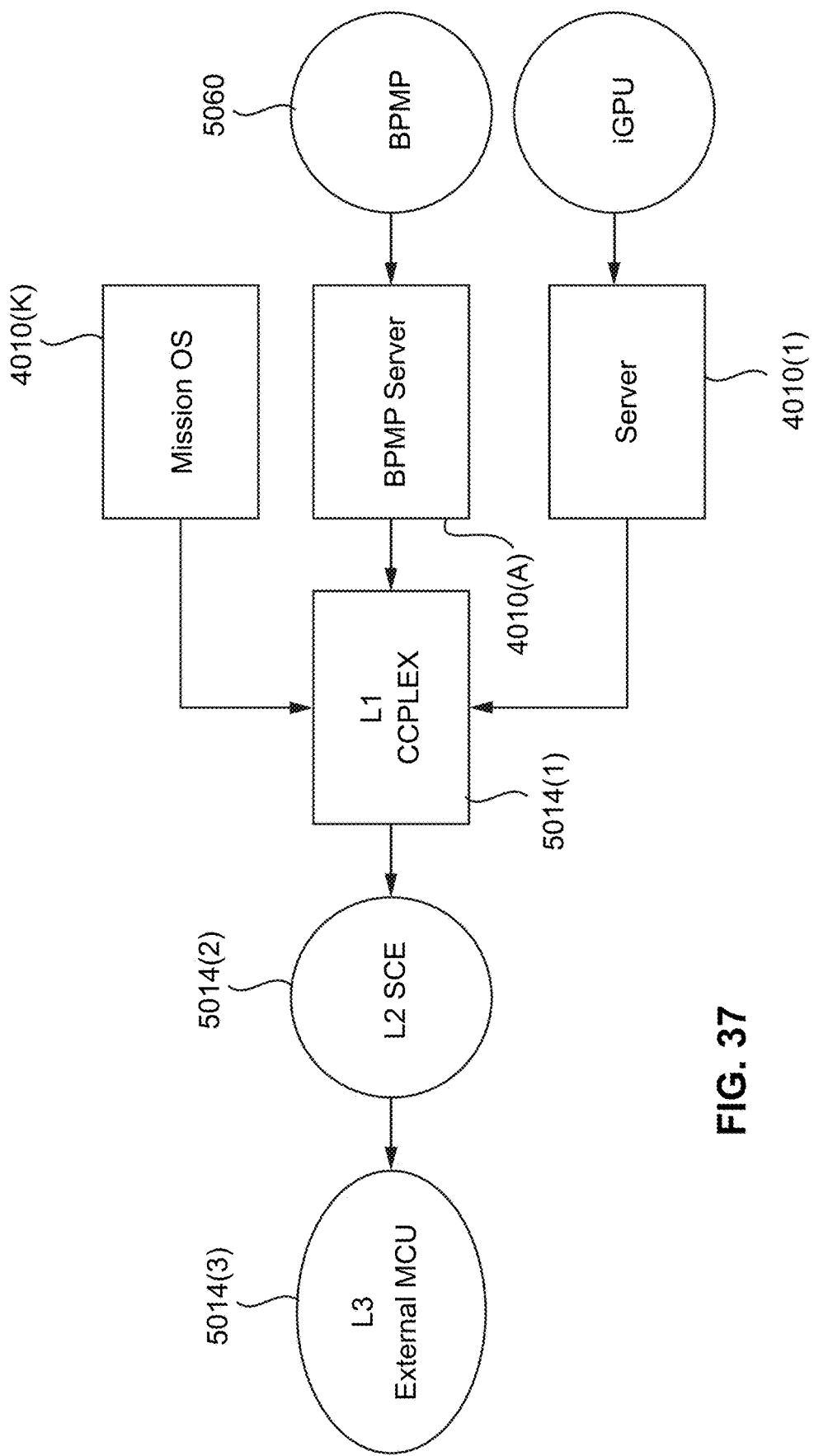

FIG. 37 depicts an example error reporting procedure in a safety framework for errors detected in system components, in accordance with embodiments of the present technology.

Figure 38:
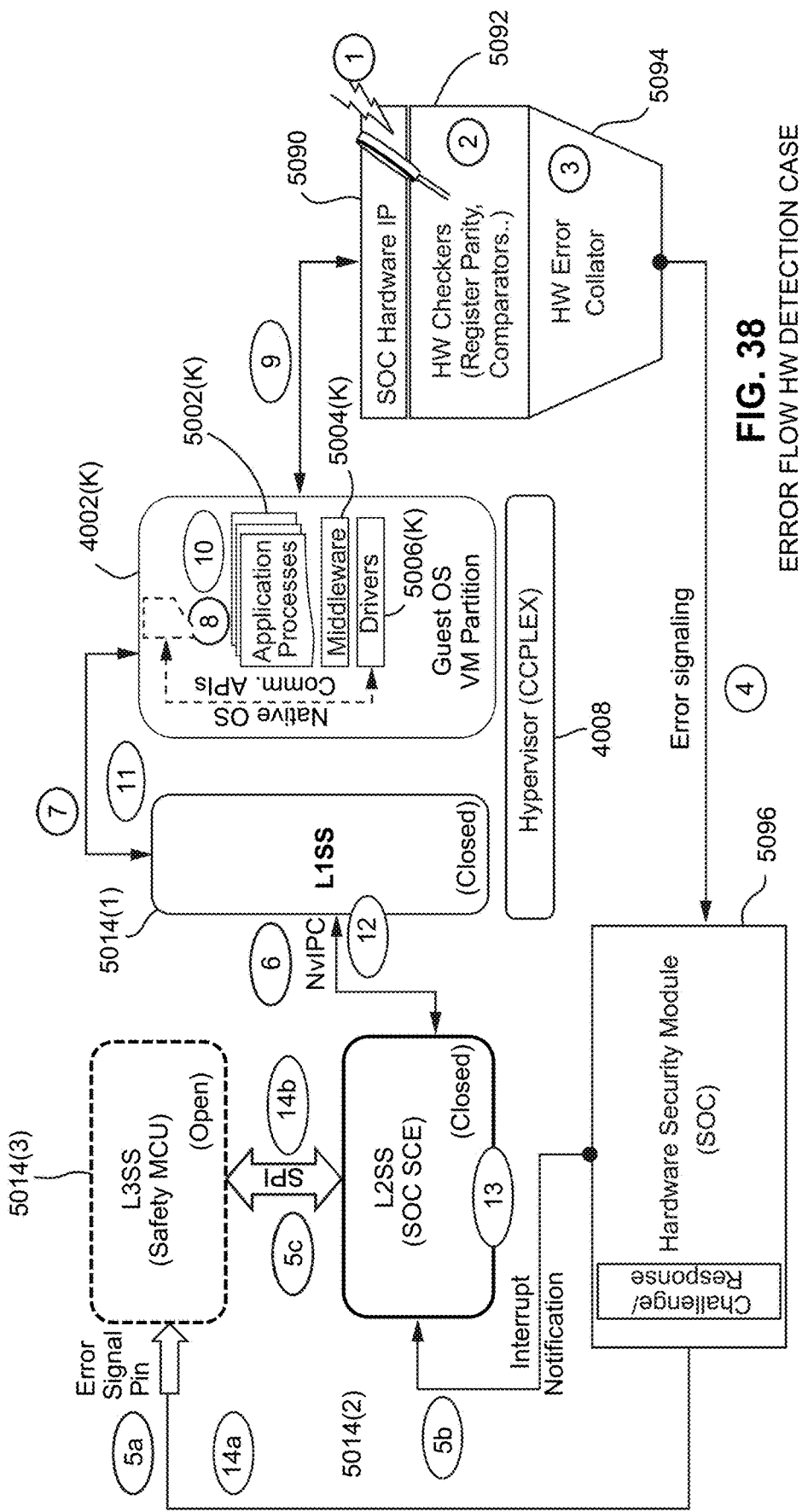

FIG. 38 is an example flow diagram for error handling during a hardware detection case, in accordance with embodiments of the present technology.

Figure 39:
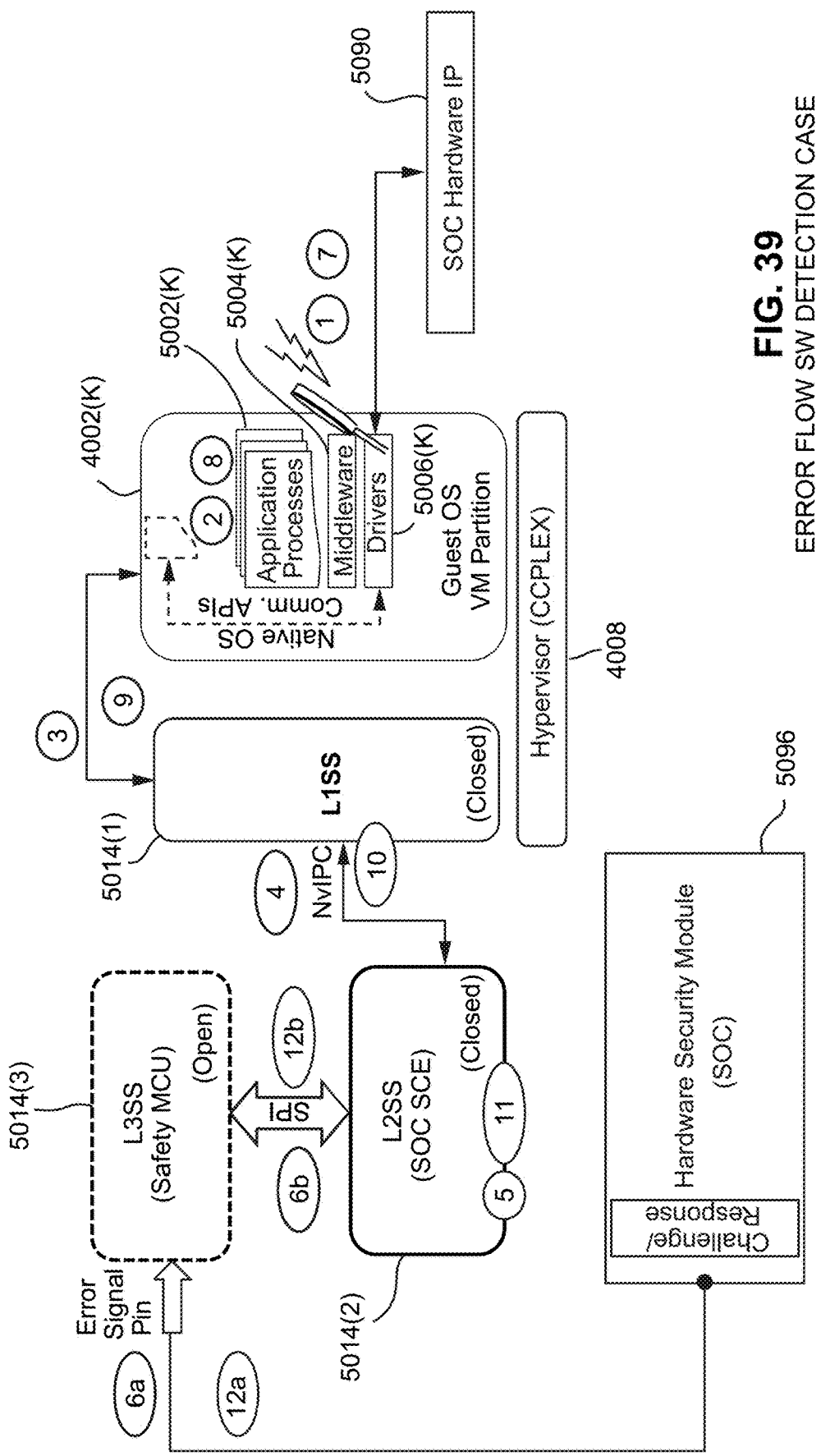

FIG. 39 is an example flow diagram for error handling during a software detection case, in accordance with embodiments of the present technology.

Figure 40:
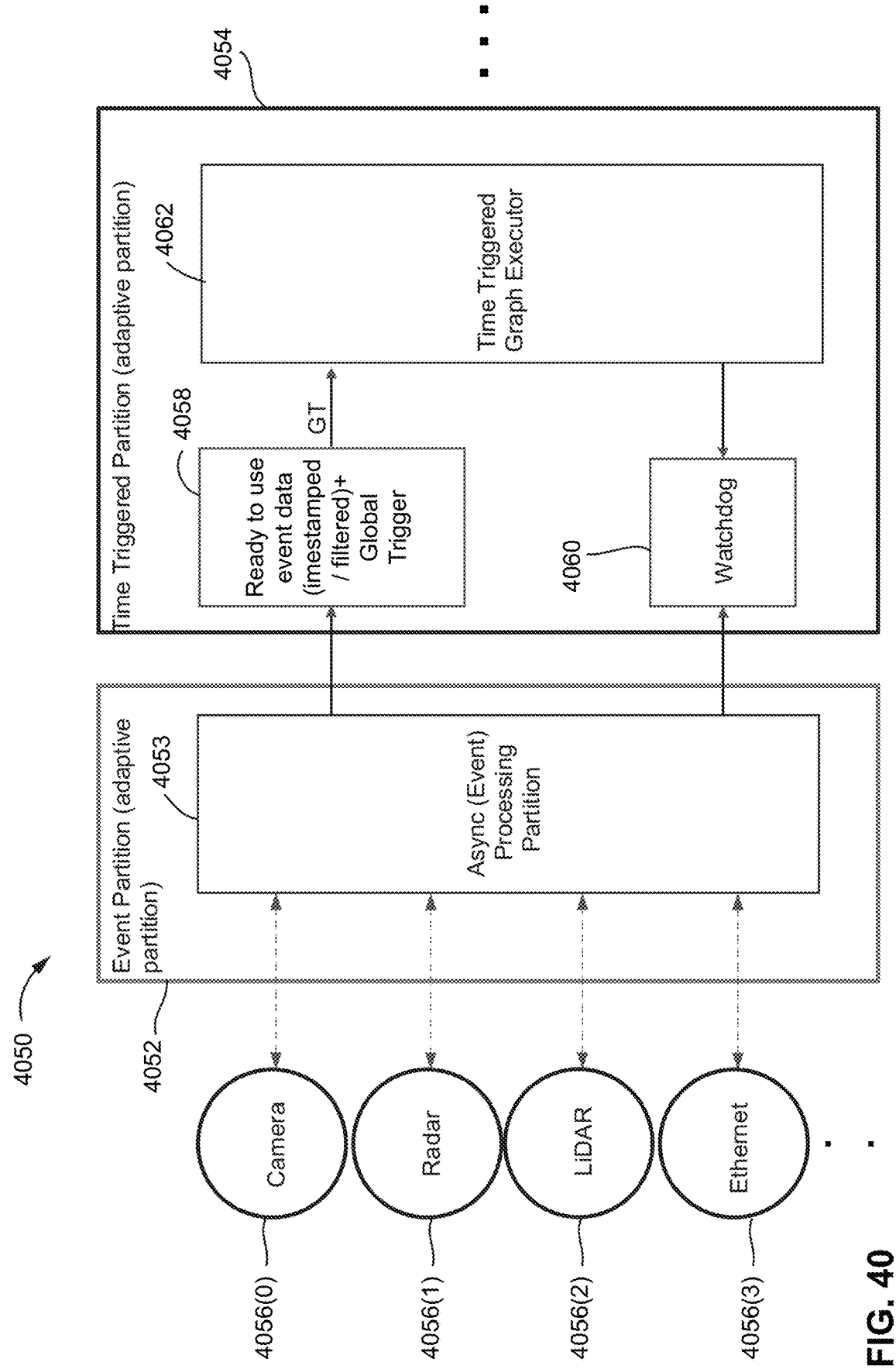

FIG. 40 depicts an example configuration of partitions corresponding to peripheral components, in accordance with embodiments of the present technology.

Figure 41:
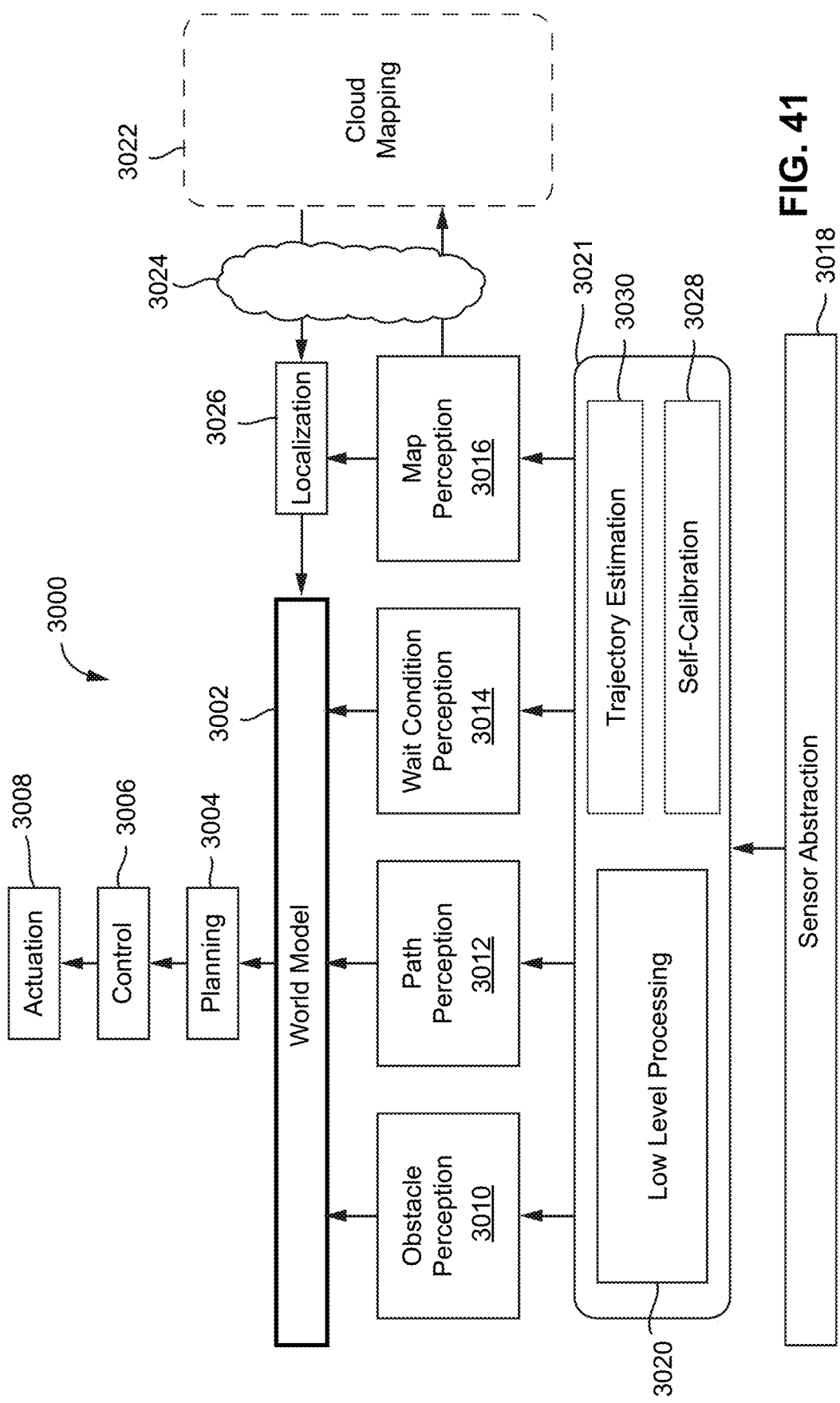

FIG. 41 is an example software system diagram for autonomous driving, in accordance with embodiments of the present technology.

FIG. 42 is another example software system diagram for autonomous driving, in accordance with embodiments of the present technology.

Figure 43:
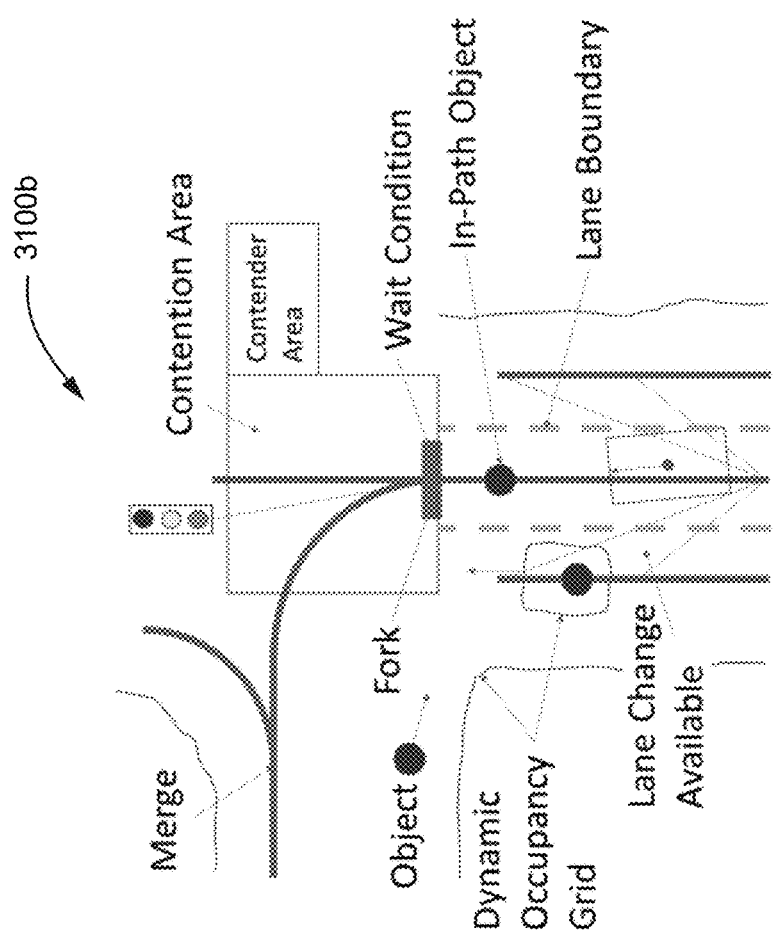

FIG. 43 depicts an example tracked lane graph, in accordance with embodiments of the present technology.

Figure 44:
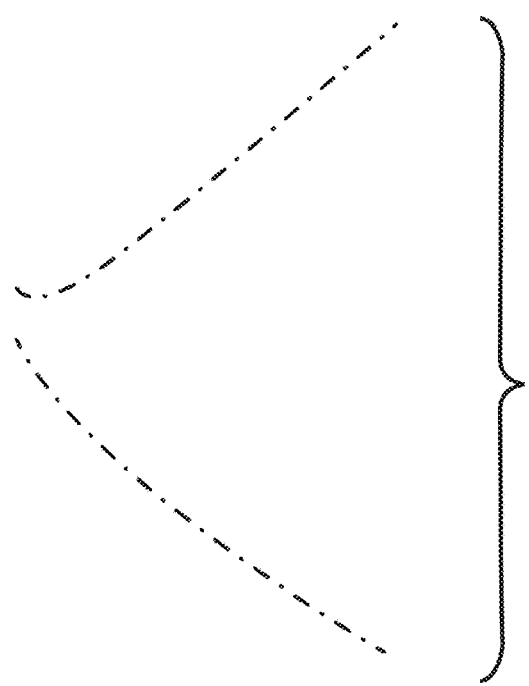

FIG. 44 depicts an example annotation of valid path as input for training a neural network to perform lane detection, in accordance with embodiments of the present technology.

Figure 45:
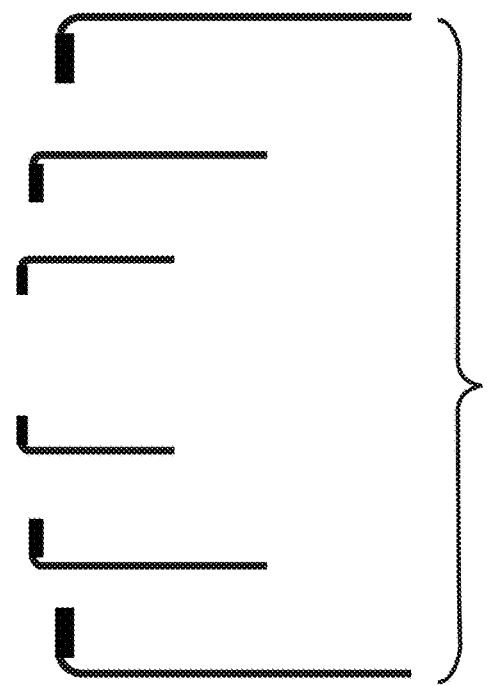

FIG. 45 depicts an example output from detecting virtual landmarks for performing sensor calibration, in accordance with embodiments of the present technology.

Figure 46:
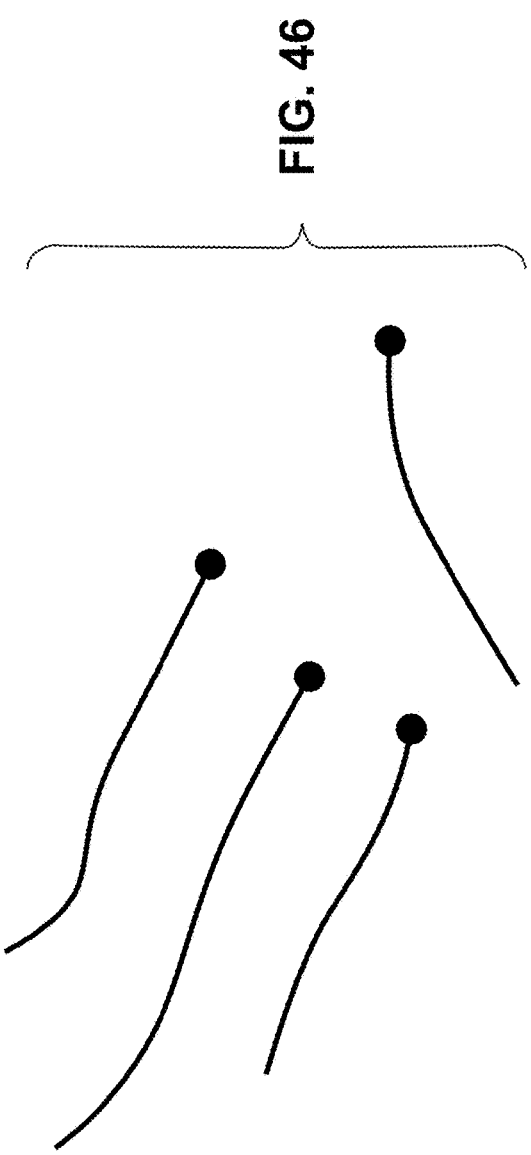

FIG. 46 depicts in an example output from a point detector for tracking features over multiple images produced from sensors, in accordance with embodiments of the present technology.

Figure 47:
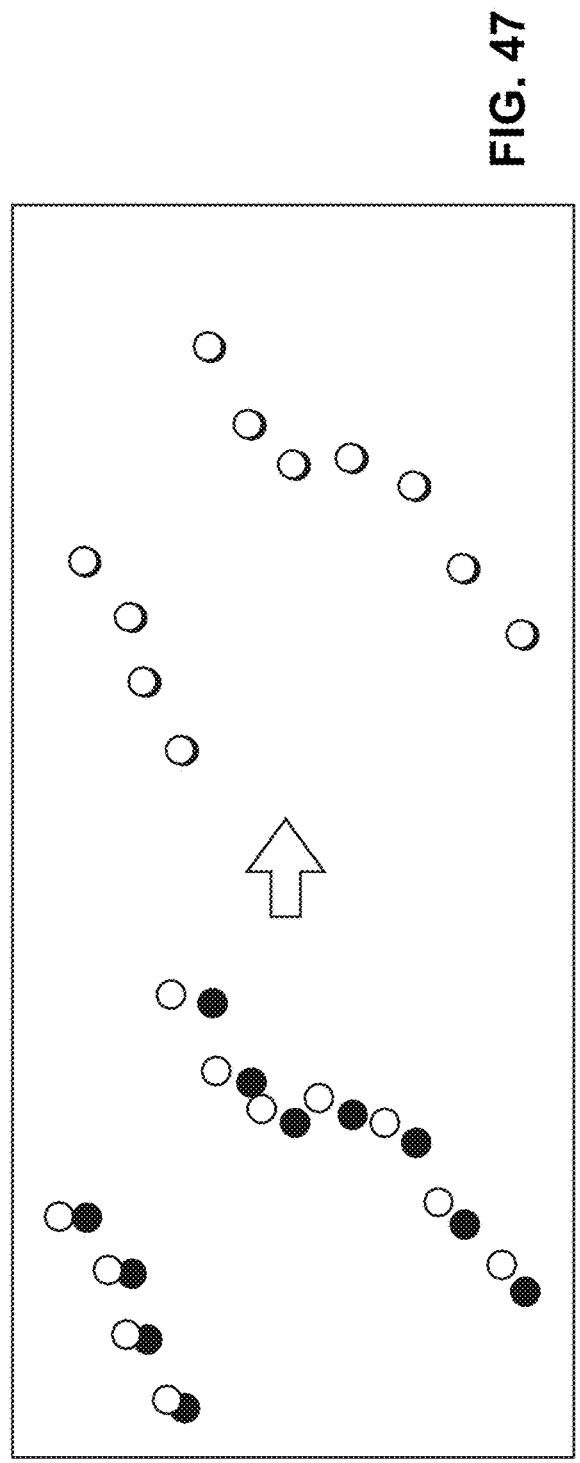

FIG. 47 depicts an example output from performing iterative closest point alignment between frames with spatial separation generated by a LIDAR sensor, in accordance with embodiments of the present technology.

Figure 48:
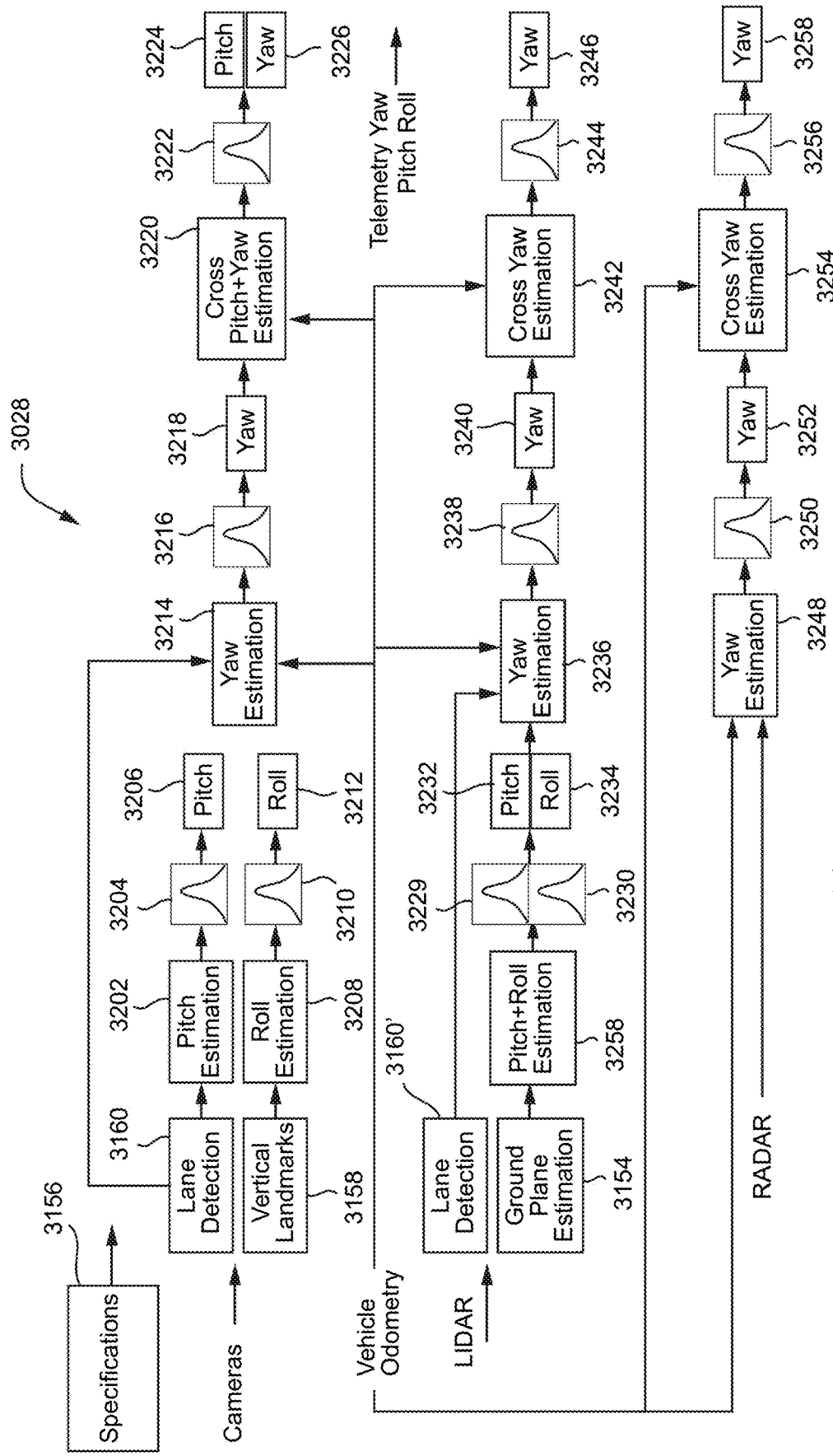

FIG. 48 is a block diagram of an example automated self-calibrator, in accordance with embodiments of the present technology.

Figure 49:
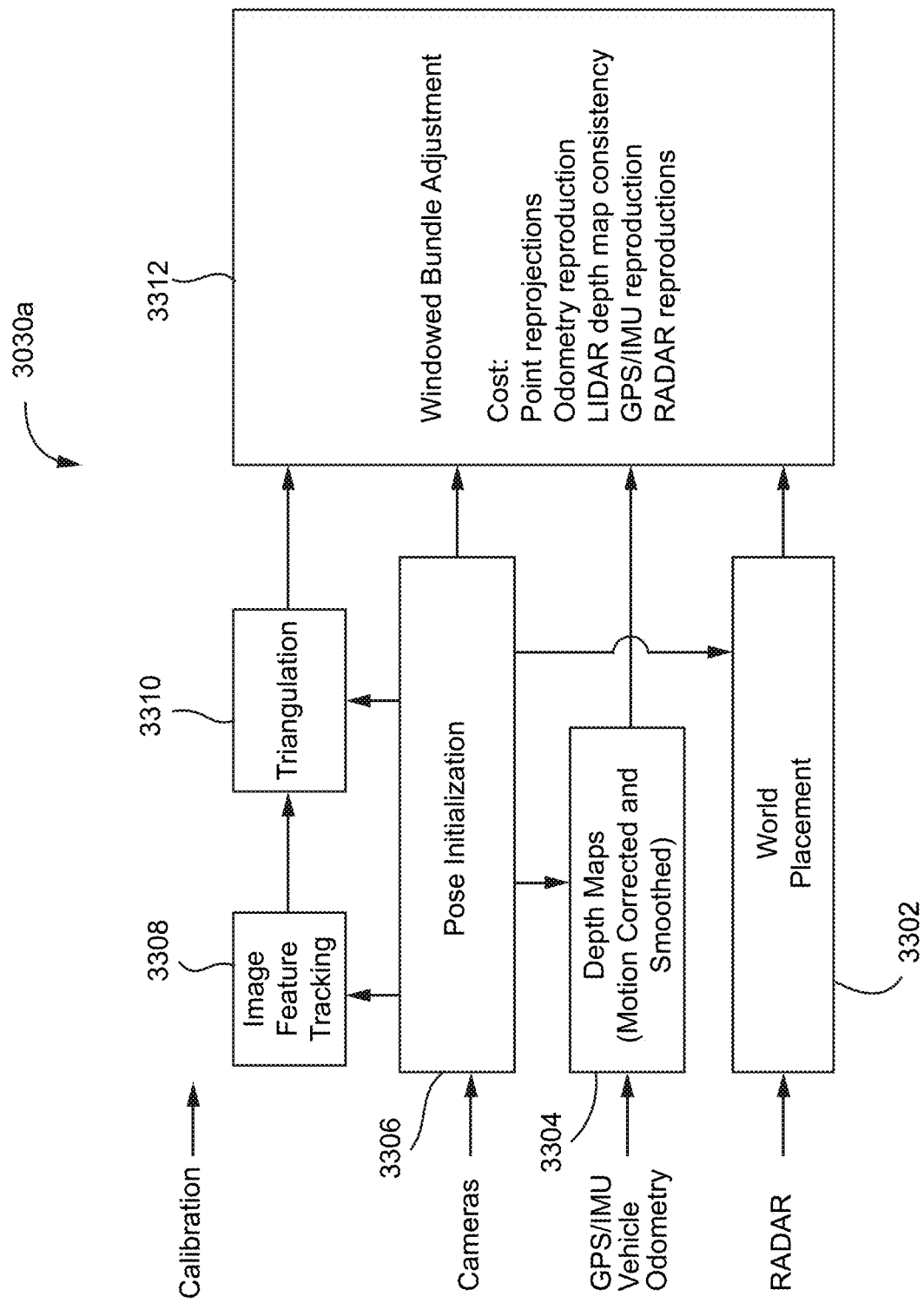

FIG. 49 is a block diagram of an example trajectory estimator, in accordance with embodiments of the present technology.

Figure 50:
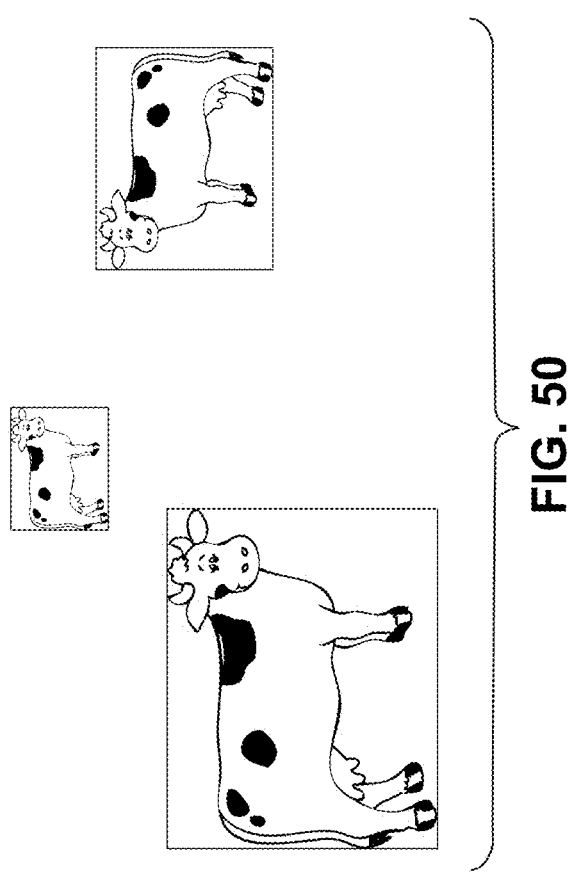

FIG. 50 depicts example pixel-wise class output images and bounding boxes, in accordance with embodiments of the present technology.

Figure 51:
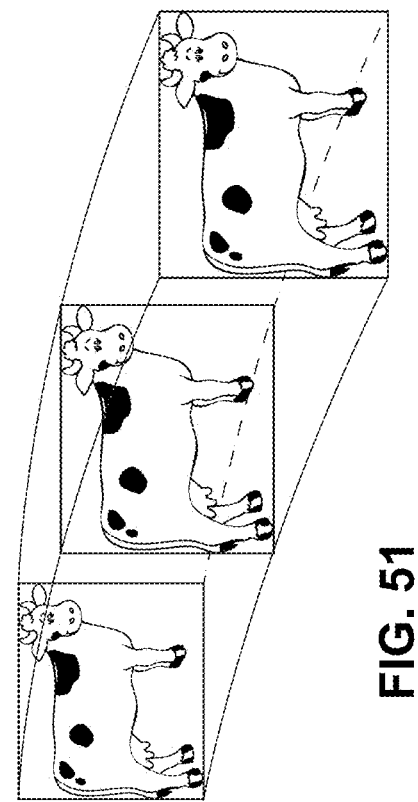

FIG. 51 depicts example output from object tracking, in accordance with embodiments of the present technology.

Figure 52:
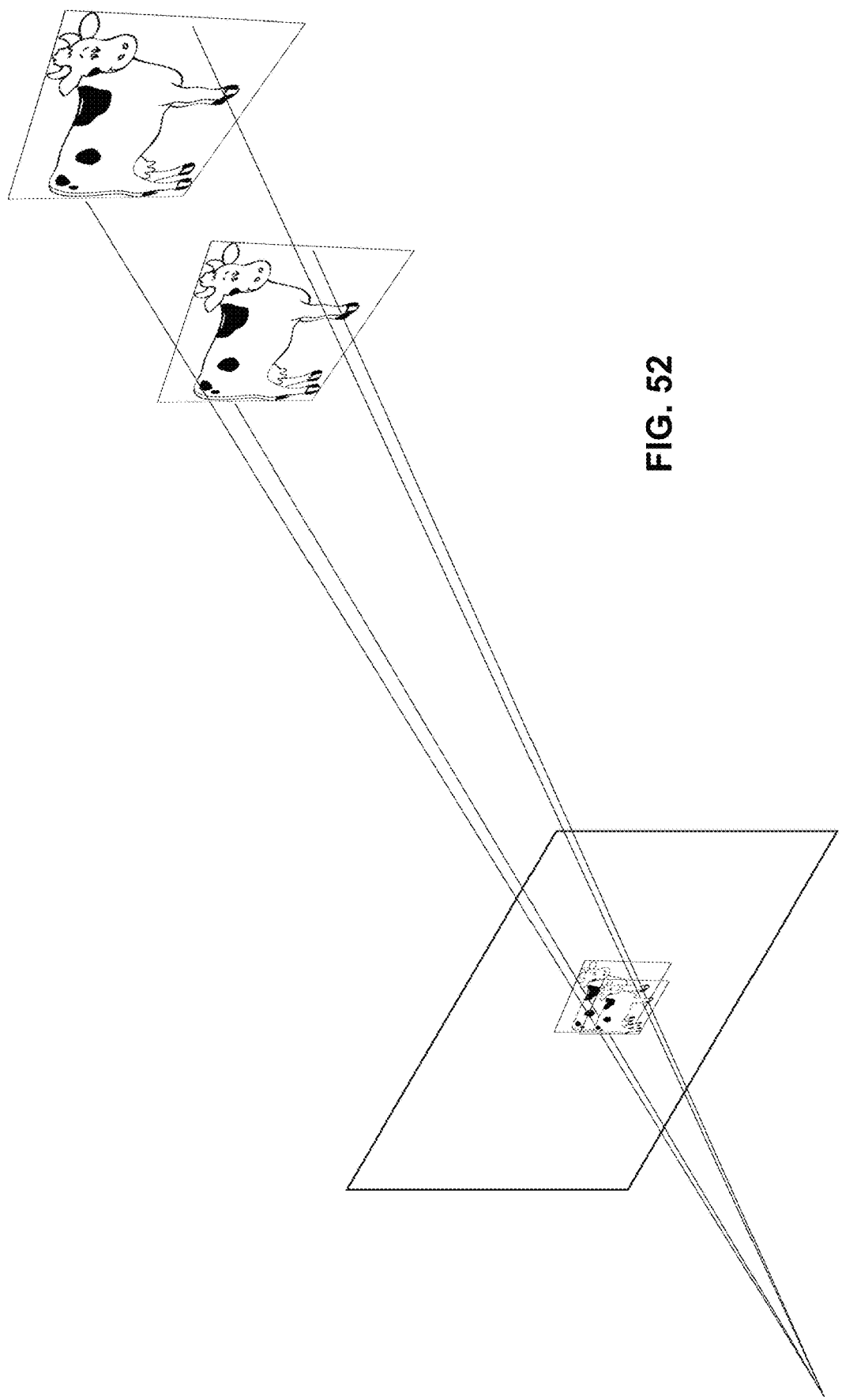

FIG. 52 depicts an example output from performing a process for determining a temporal baseline based on a range of relative motion, in accordance with embodiments of the present technology.

Figure 53:
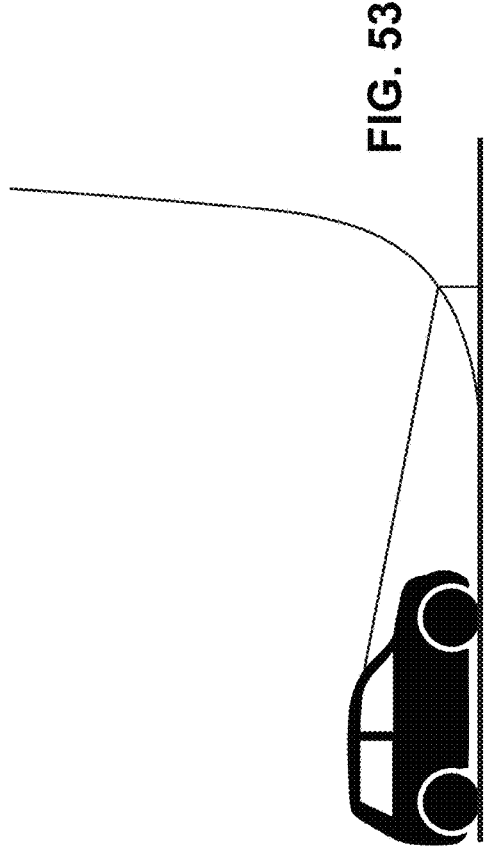

FIG. 53 depicts an example output from performing a process for heuristically redefining the ground plane, in accordance with embodiments of the present technology.

Figure 54:
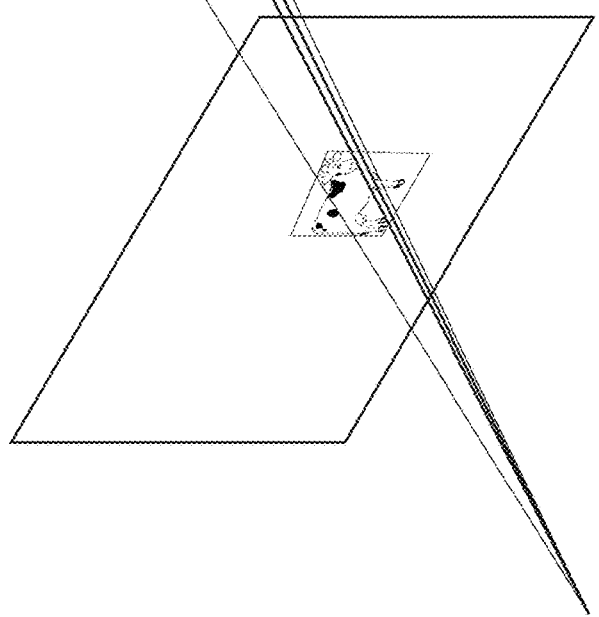

FIG. 54 depicts an example output from performing mapping on RADAR and vision tracks, in accordance with embodiments of the present technology.

Figure 55:
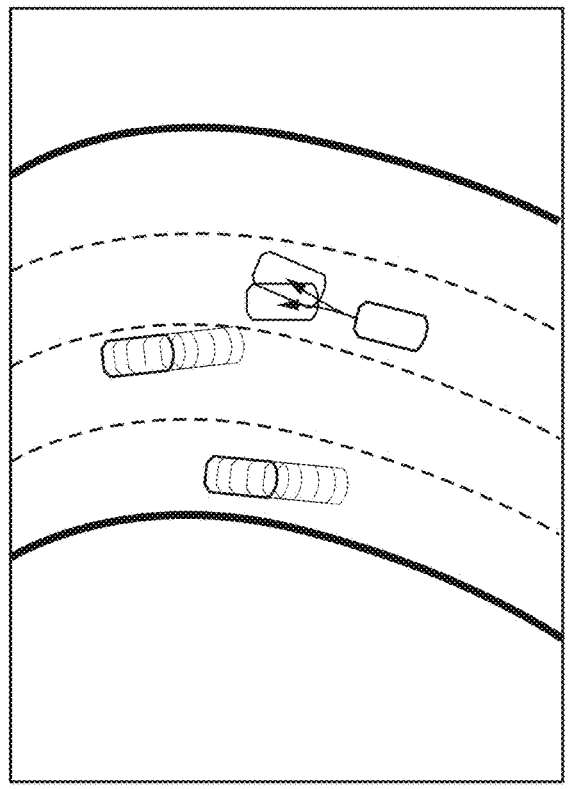

FIG. 55 depicts an example dynamic occupancy grid, in accordance with embodiments of the present technology.

Figure 56:
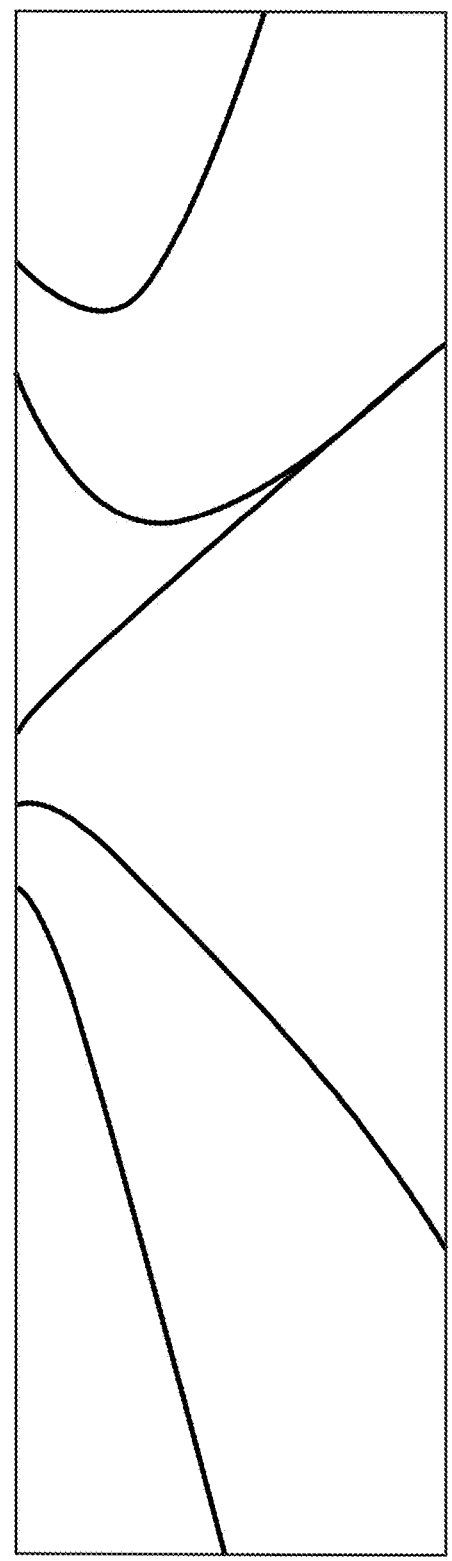

FIG. 56 depicts an example path perception scenario, in accordance with embodiments of the present technology.

Figure 57:
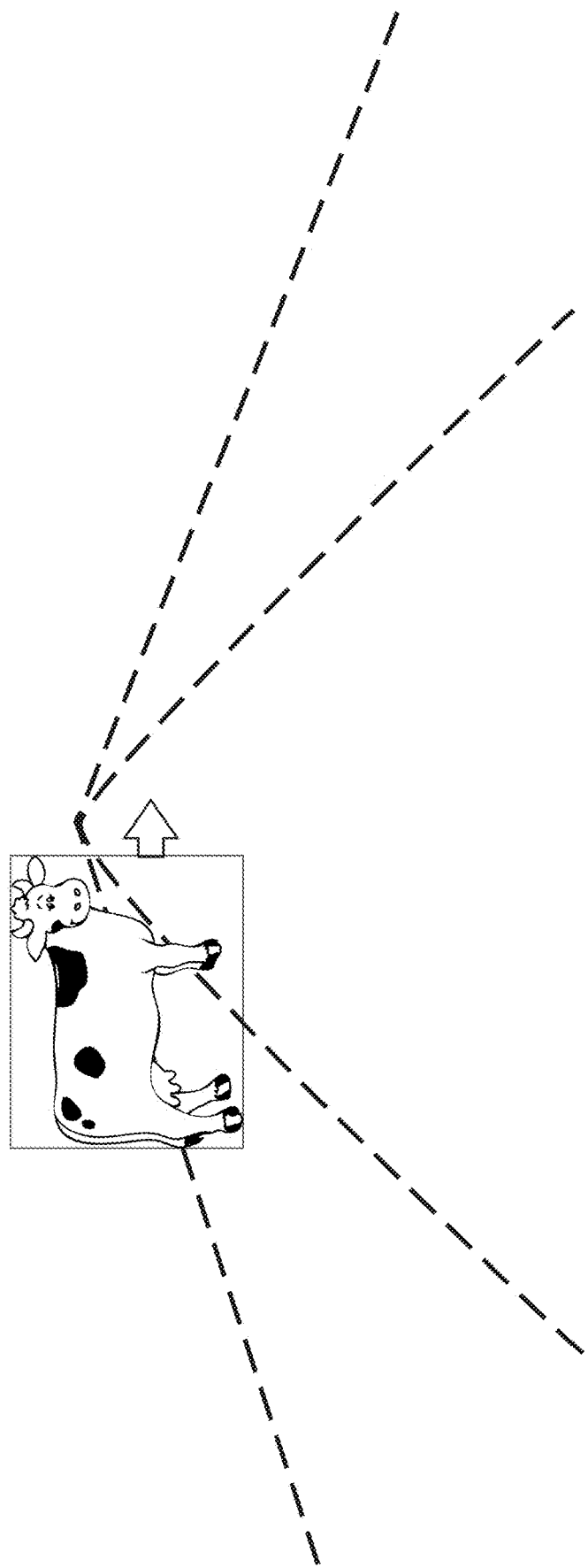

FIG. 57 depicts an example scenario for performing in-path determination, in accordance with embodiments of the present technology.

Figure 58:
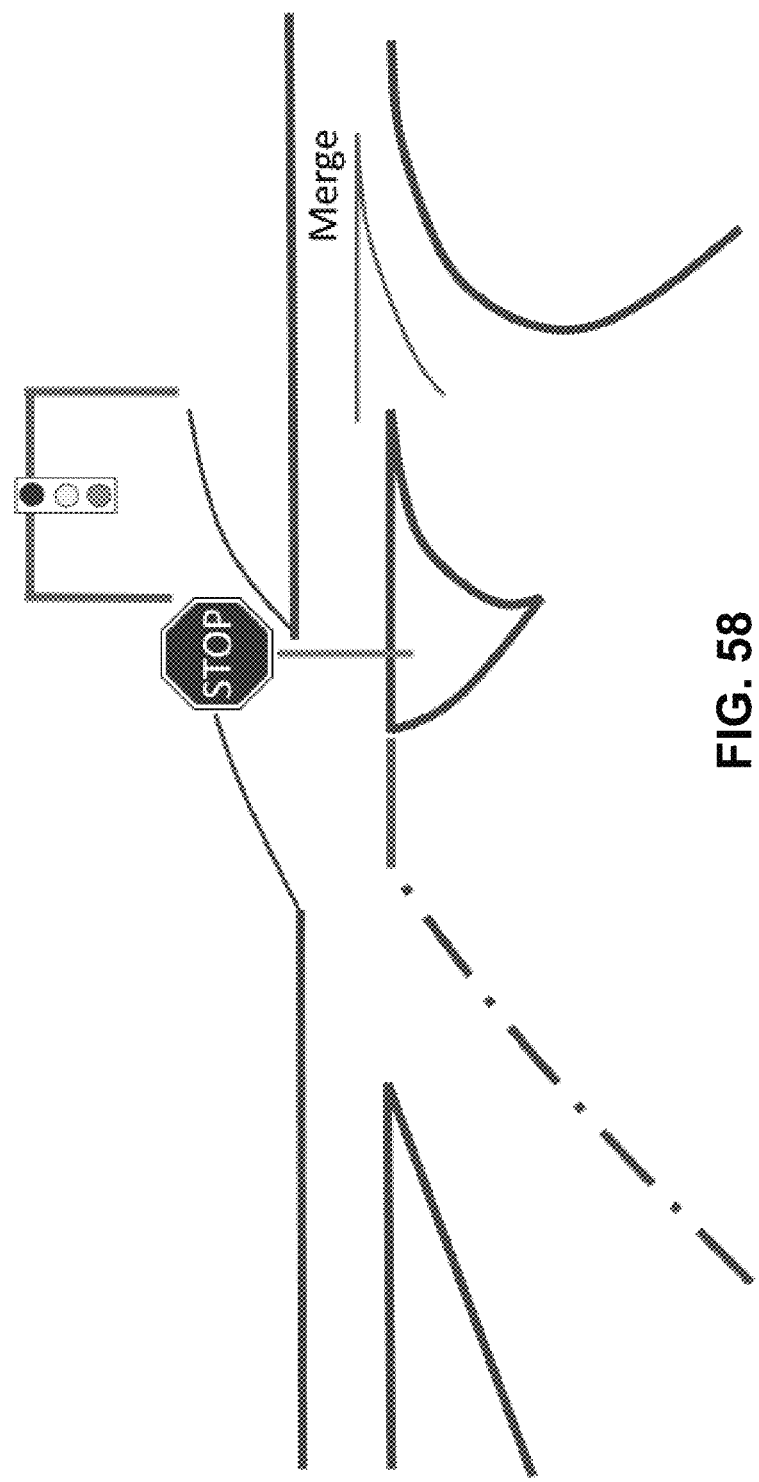

FIG. 58 depicts an example wait condition scenario, in accordance with embodiments of the present technology.

Figure 59:
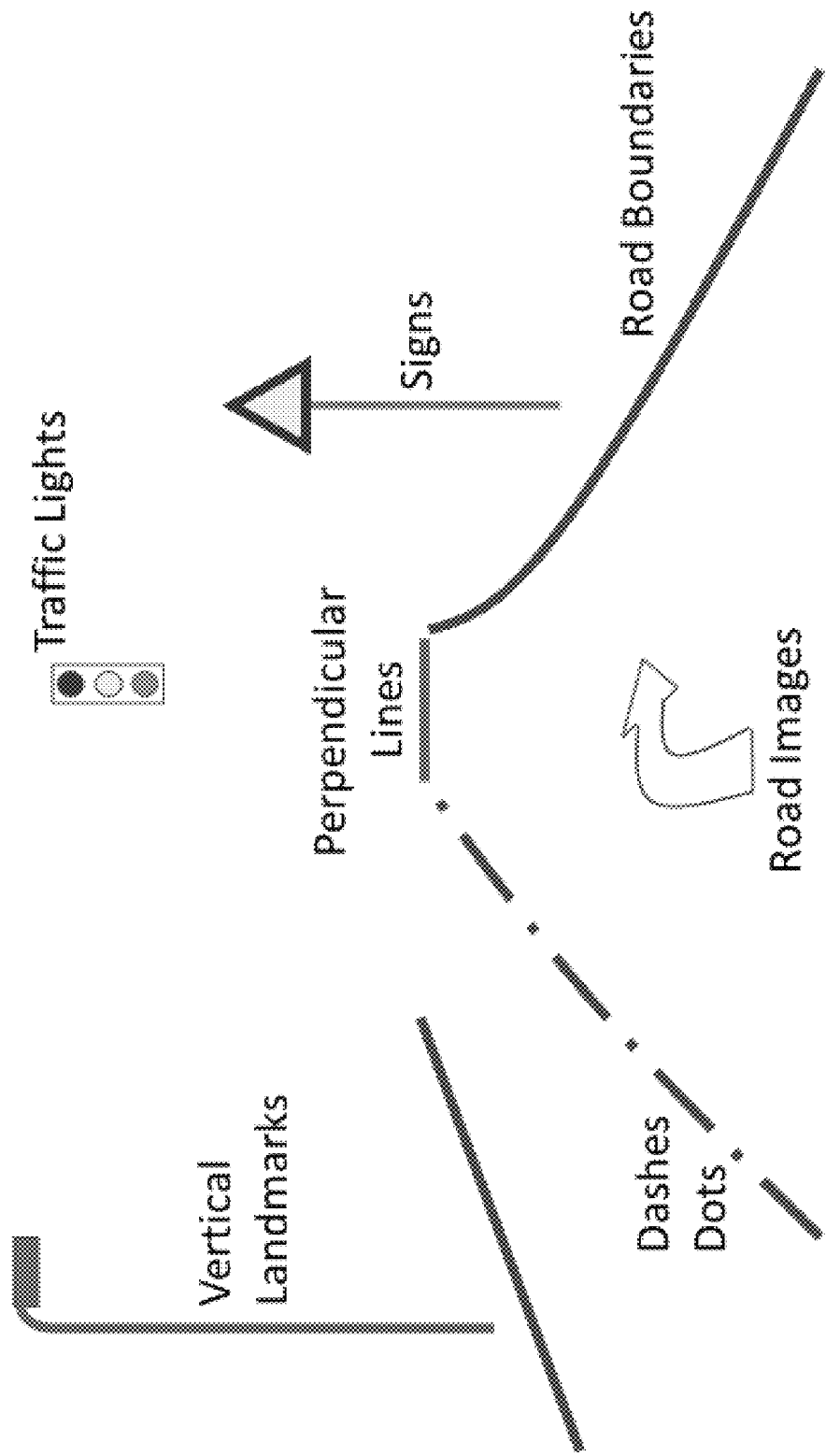

FIG. 59 depicts an example map perception scenario, in accordance with embodiments of the present technology.

Figure 60:
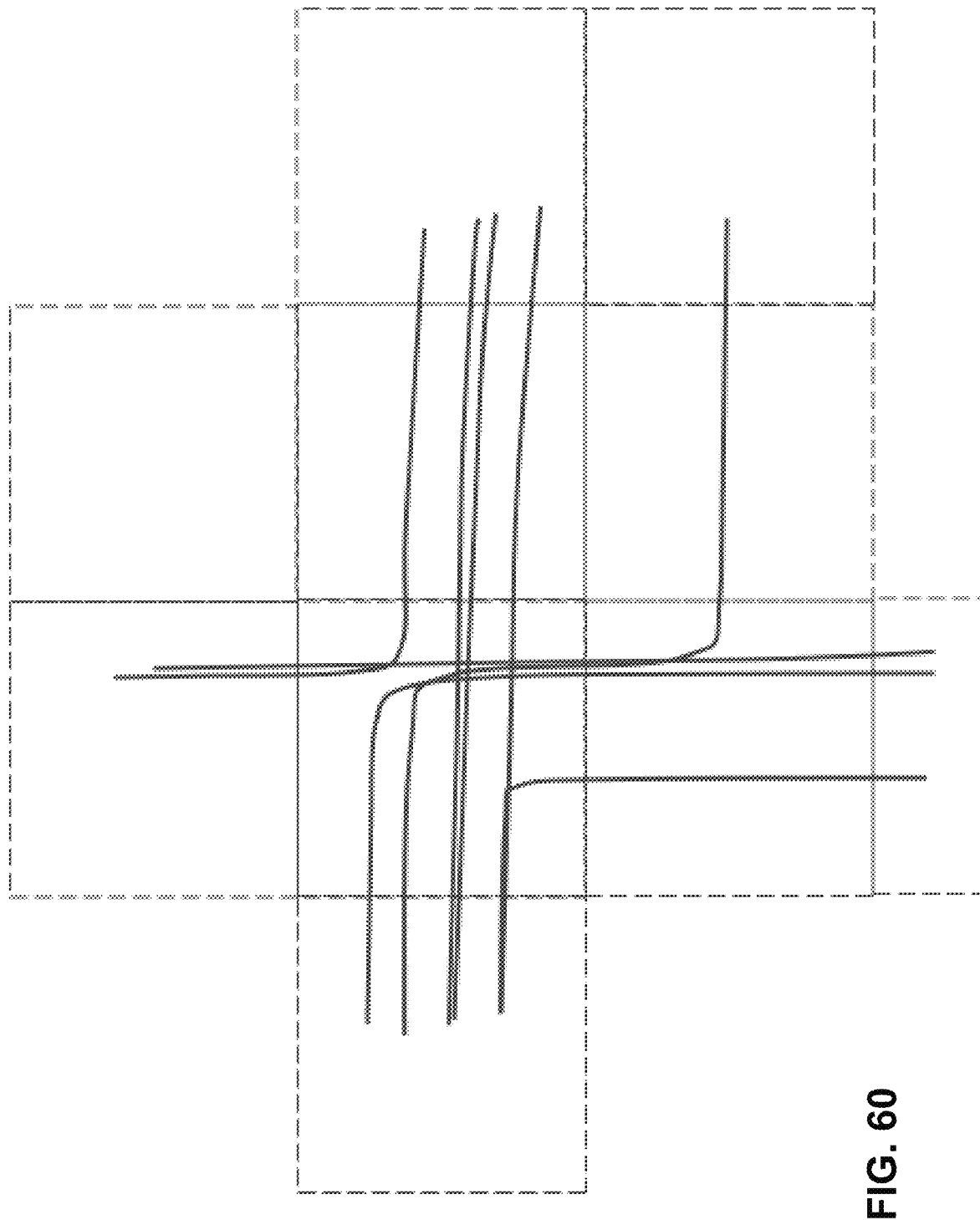

FIG. 60 depicts an example directed graph with points and tangents at each node, in accordance with embodiments of the present technology.

Figure 61:
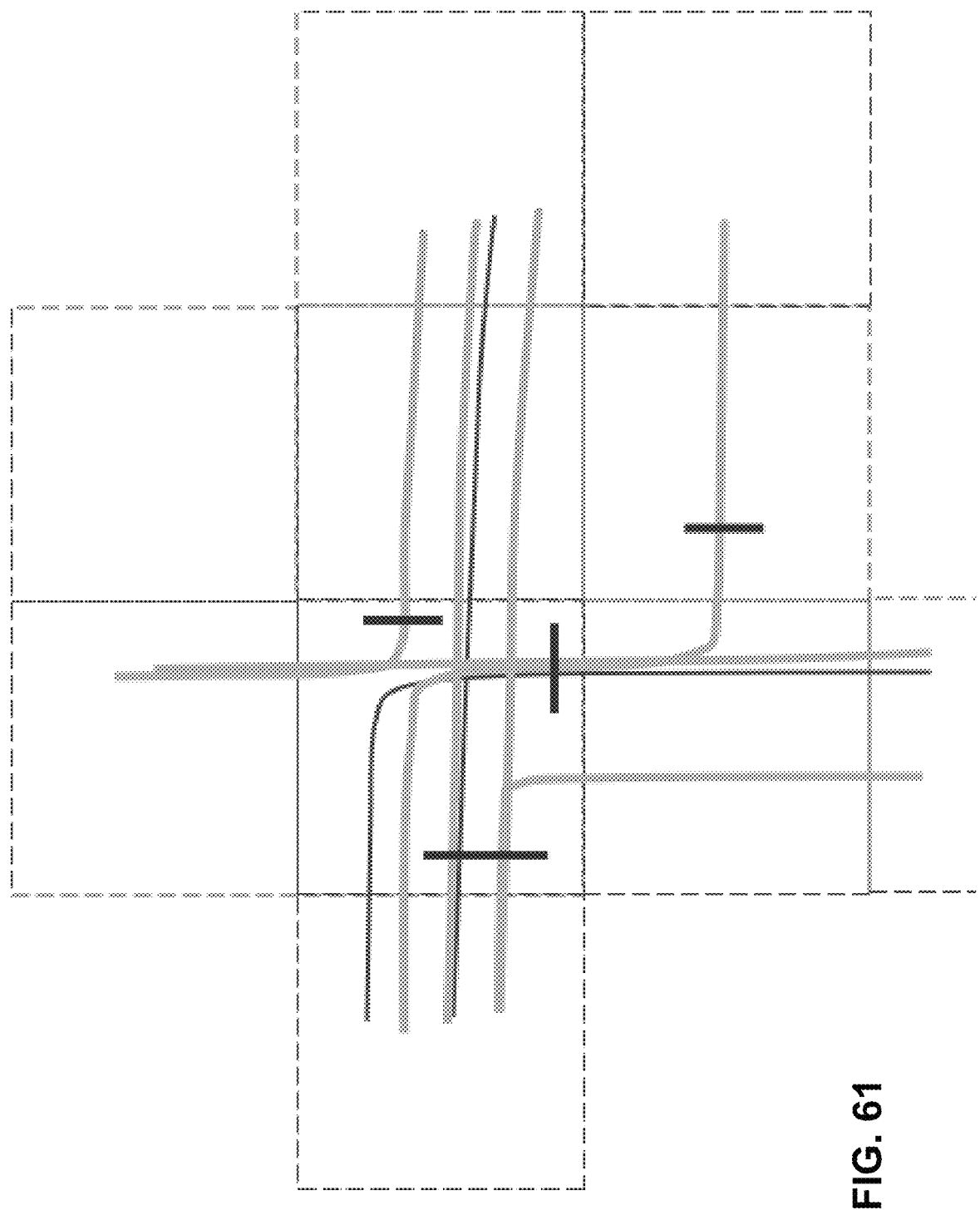

FIG. 61 depicts an example directed graph with wait conditions, in accordance with embodiments of the present technology.

Figure 62:
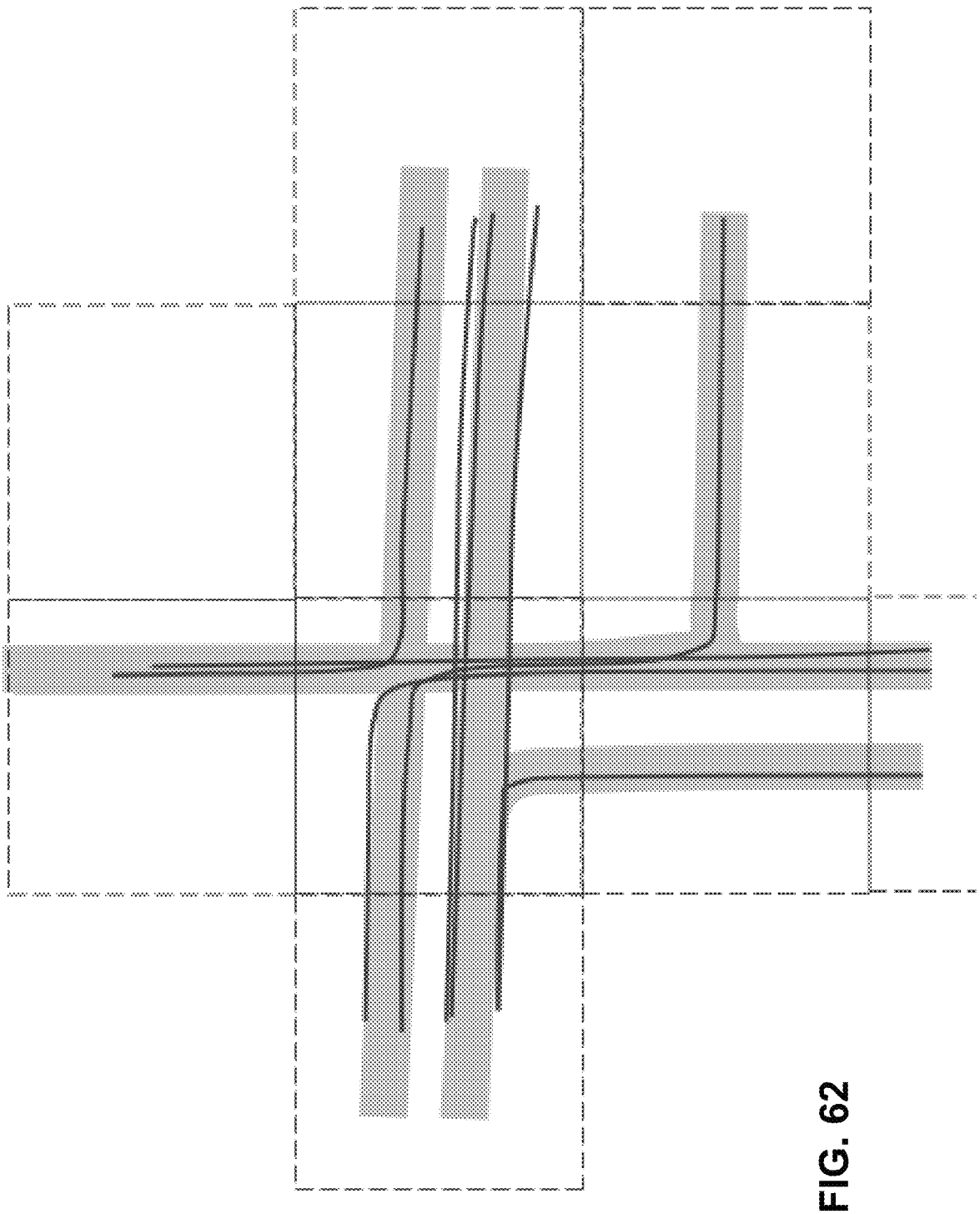

FIG. 62 depicts an example representational view of a schematic for displaying additional definitional information in a directed graph, in accordance with embodiments of the present technology.

Figure 63:
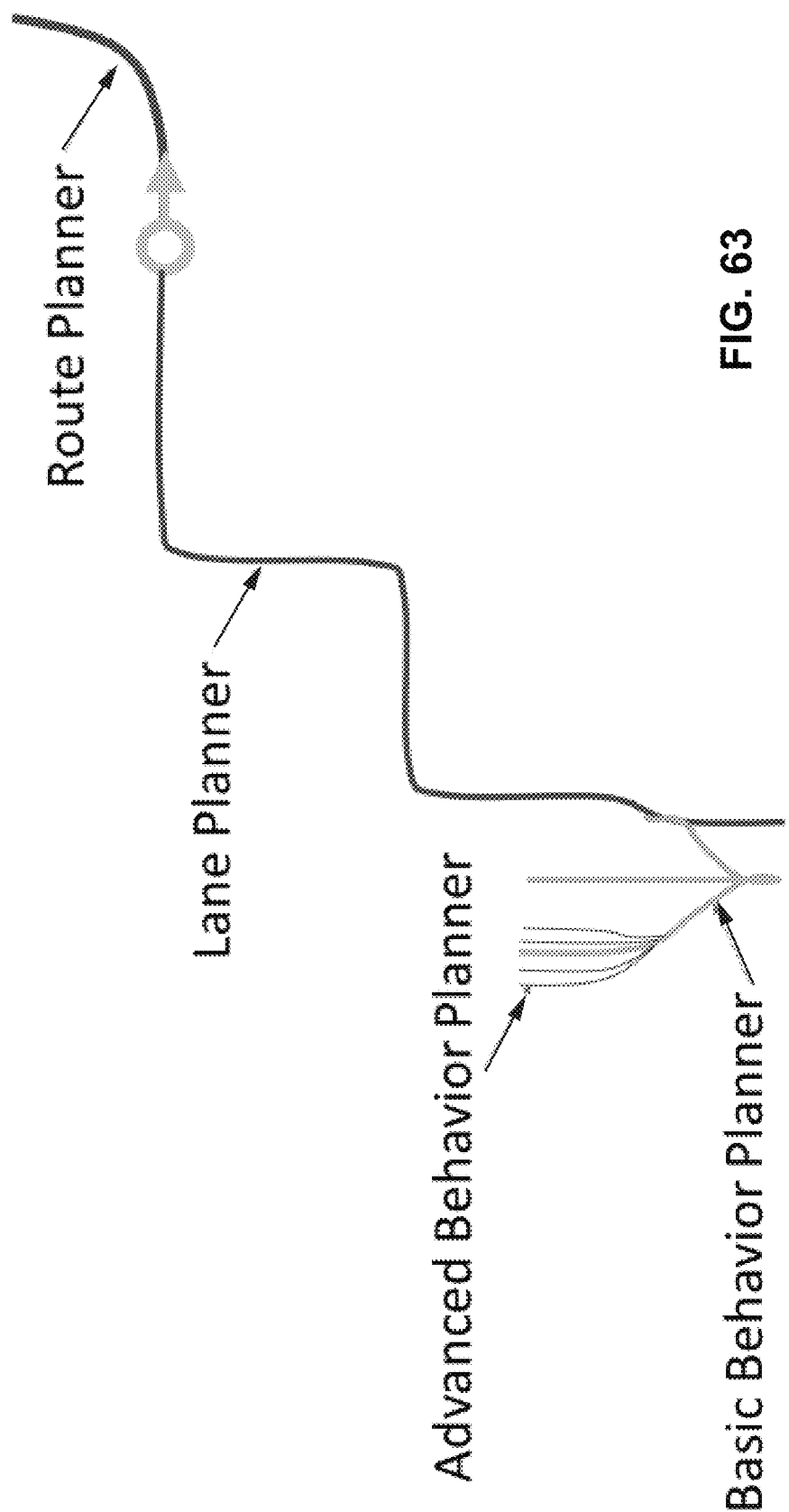

FIG. 63 depicts an example planning hierarchy, in accordance with embodiments of the present technology.

Figure 64:
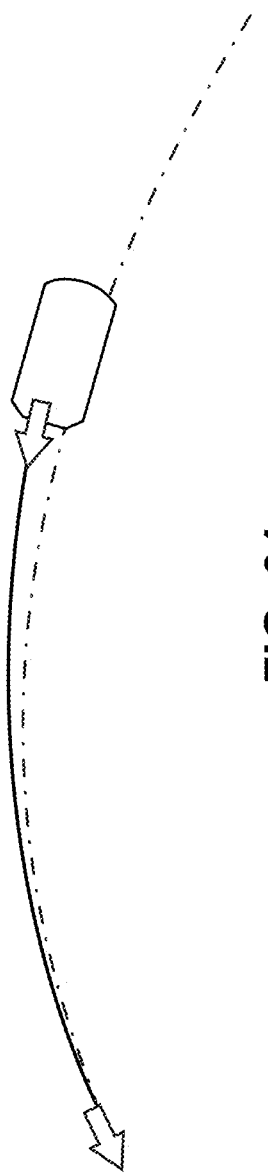

FIG. 64 depicts an example output from mapping a planned trajectory from a forward prediction model to a trajectory achieved by a controller module, in accordance with embodiments of the present technology.

Figure 65:
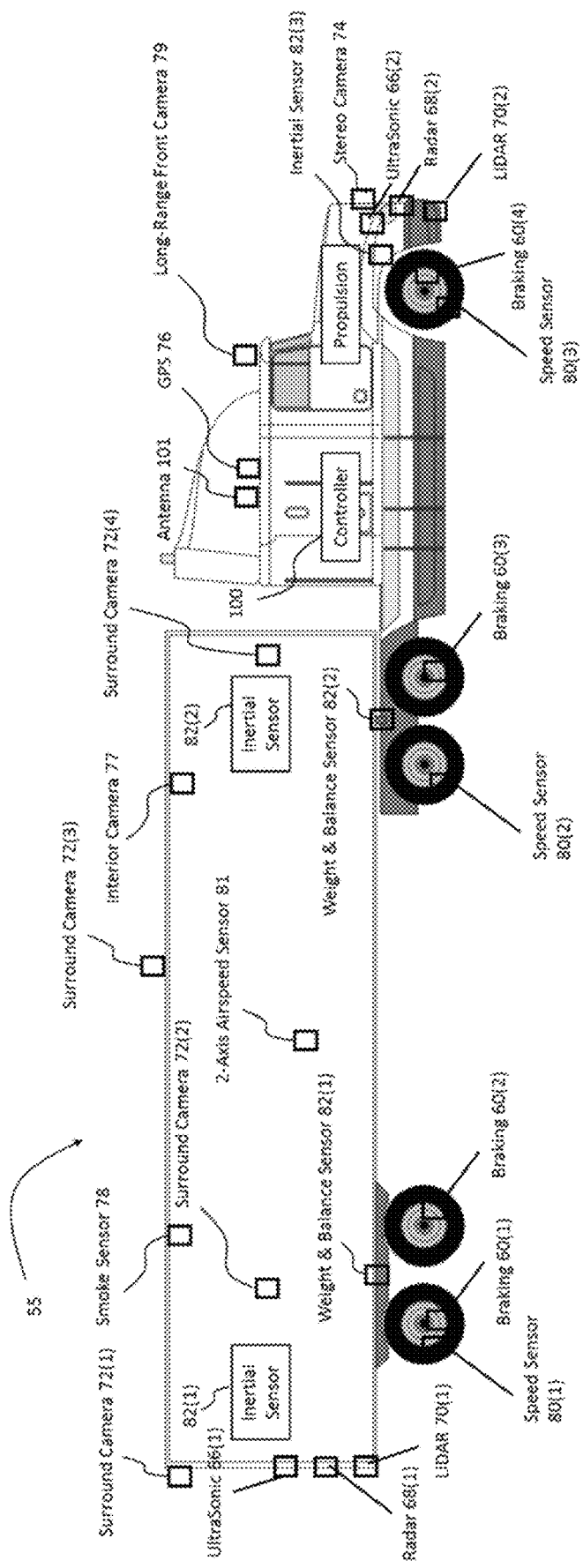

FIG. 65 depicts an example truck capable of autonomous driving, in accordance with embodiments of the present technology.

Figure 66:
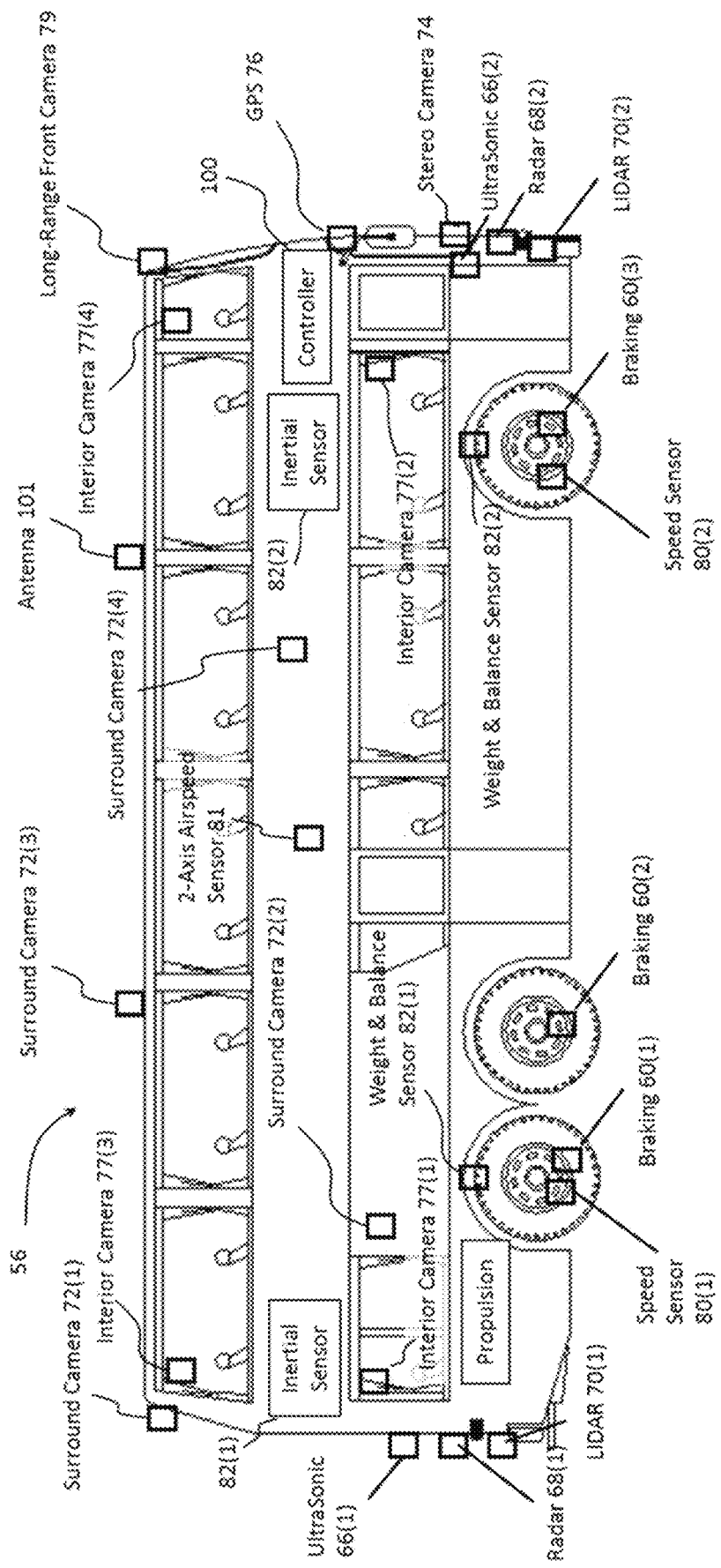

FIG. 66 depicts an example two-level bus capable of autonomous driving, in accordance with embodiments of the present technology.

Figure 67:
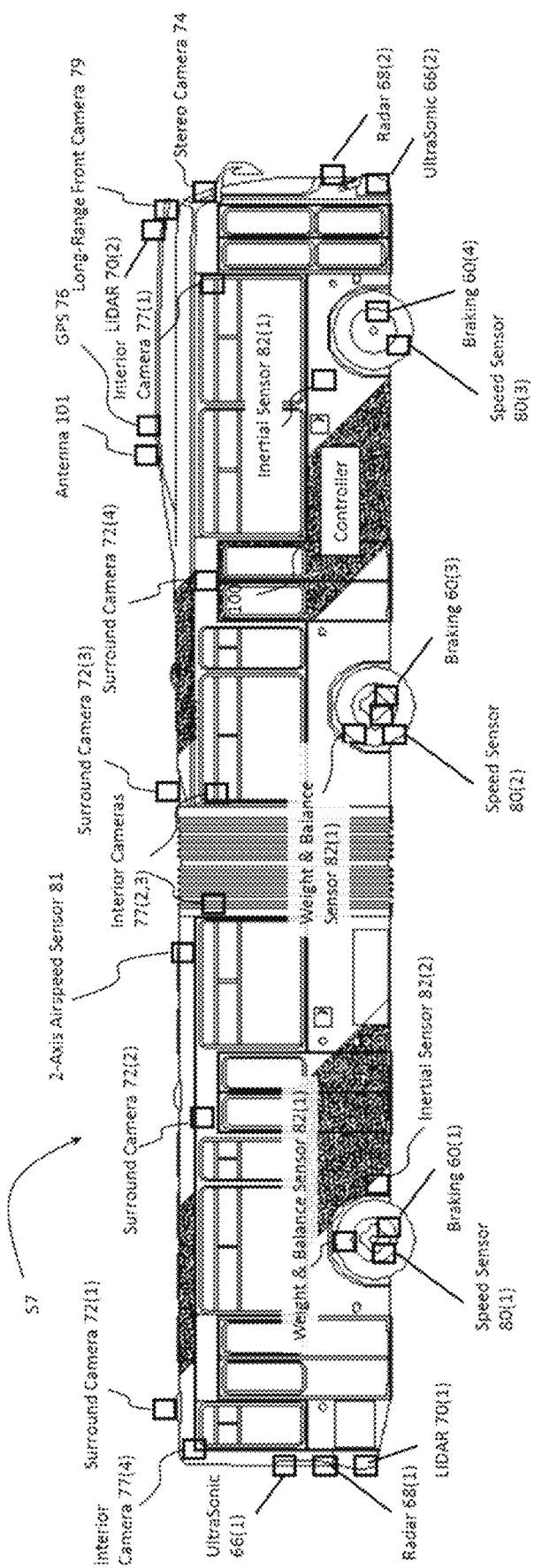

FIG. 67 depicts an example articulated bus capable of autonomous driving, in accordance with embodiments of the present technology.

Figure 68:
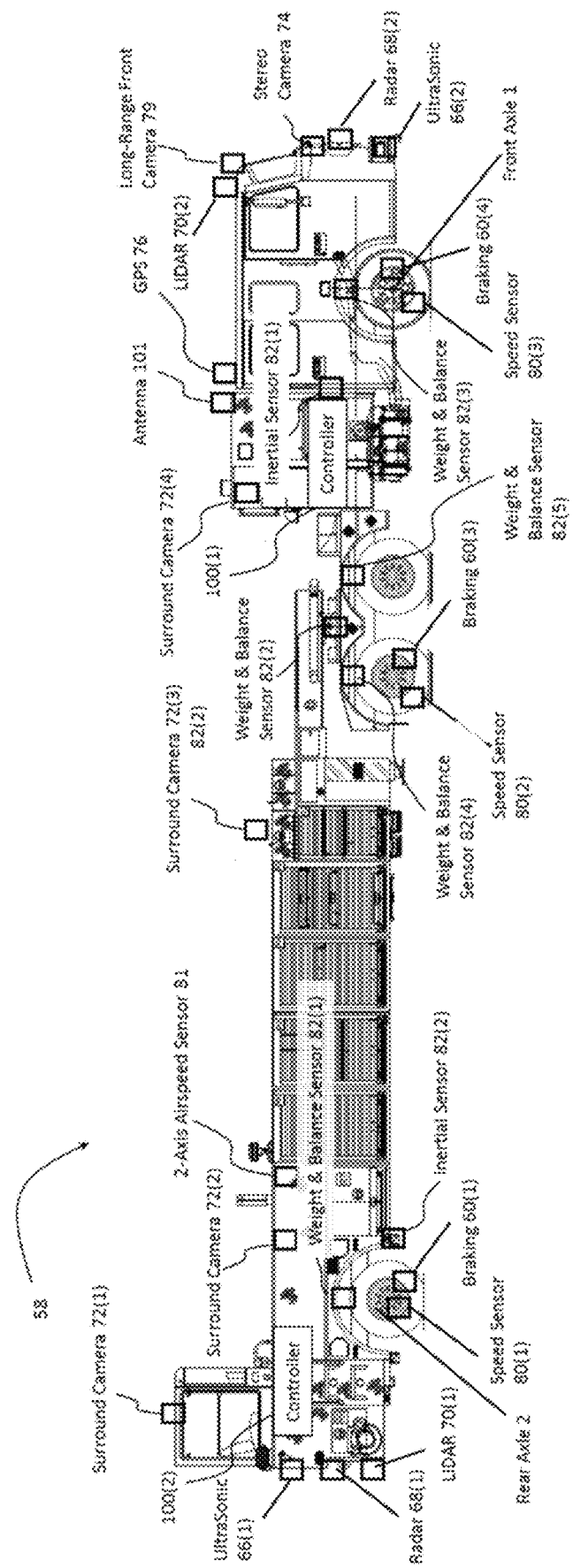

FIG. 68 depicts an example tiller truck capable of autonomous driving, in accordance with embodiments of the present technology.

IX. DETAILED DESCRIPTION OF THE EMBODIMENTS OF THE TECHNOLOGY

A. Example Autonomous Vehicle.

Figure 1:
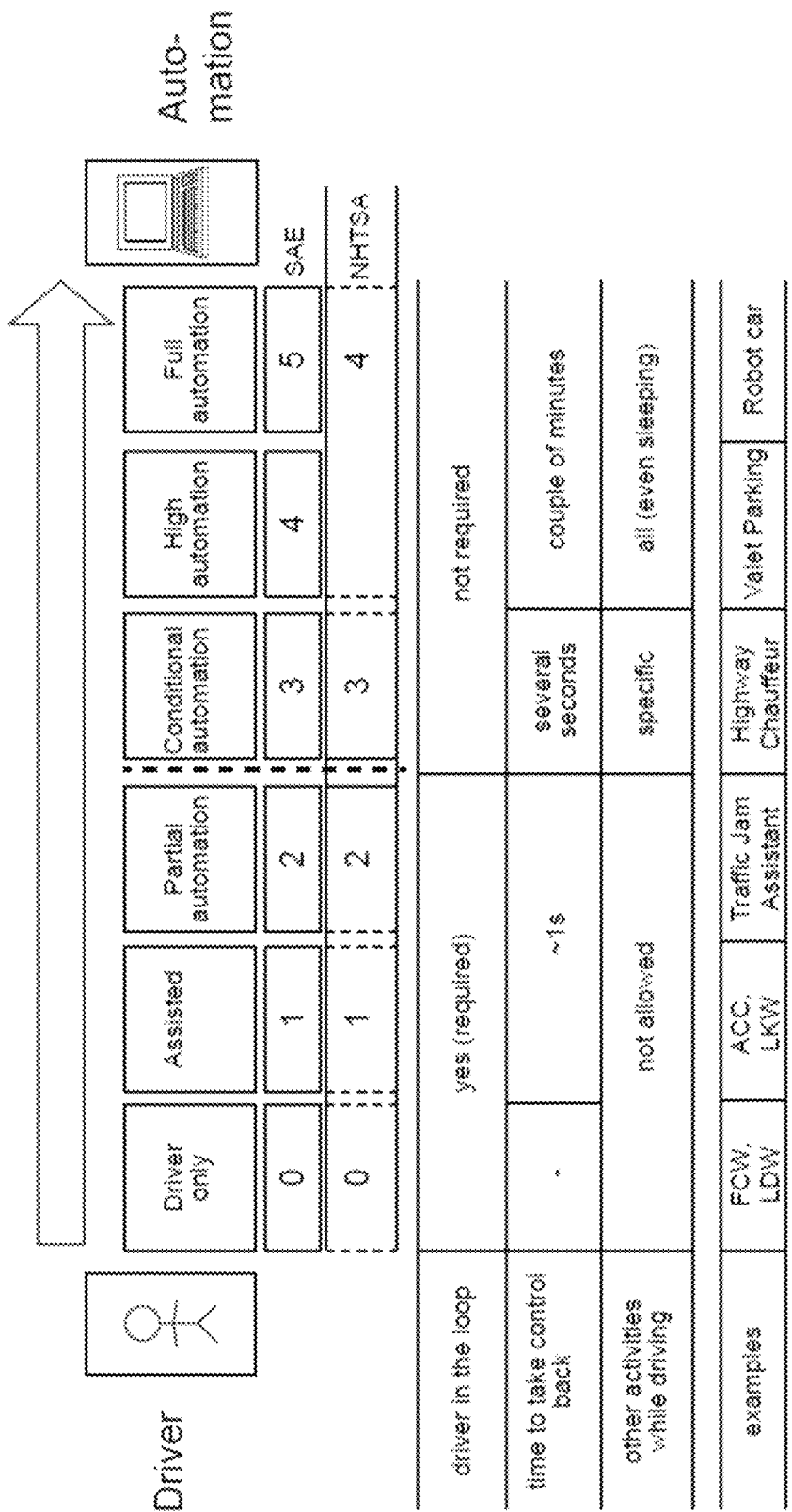
Figure 3:
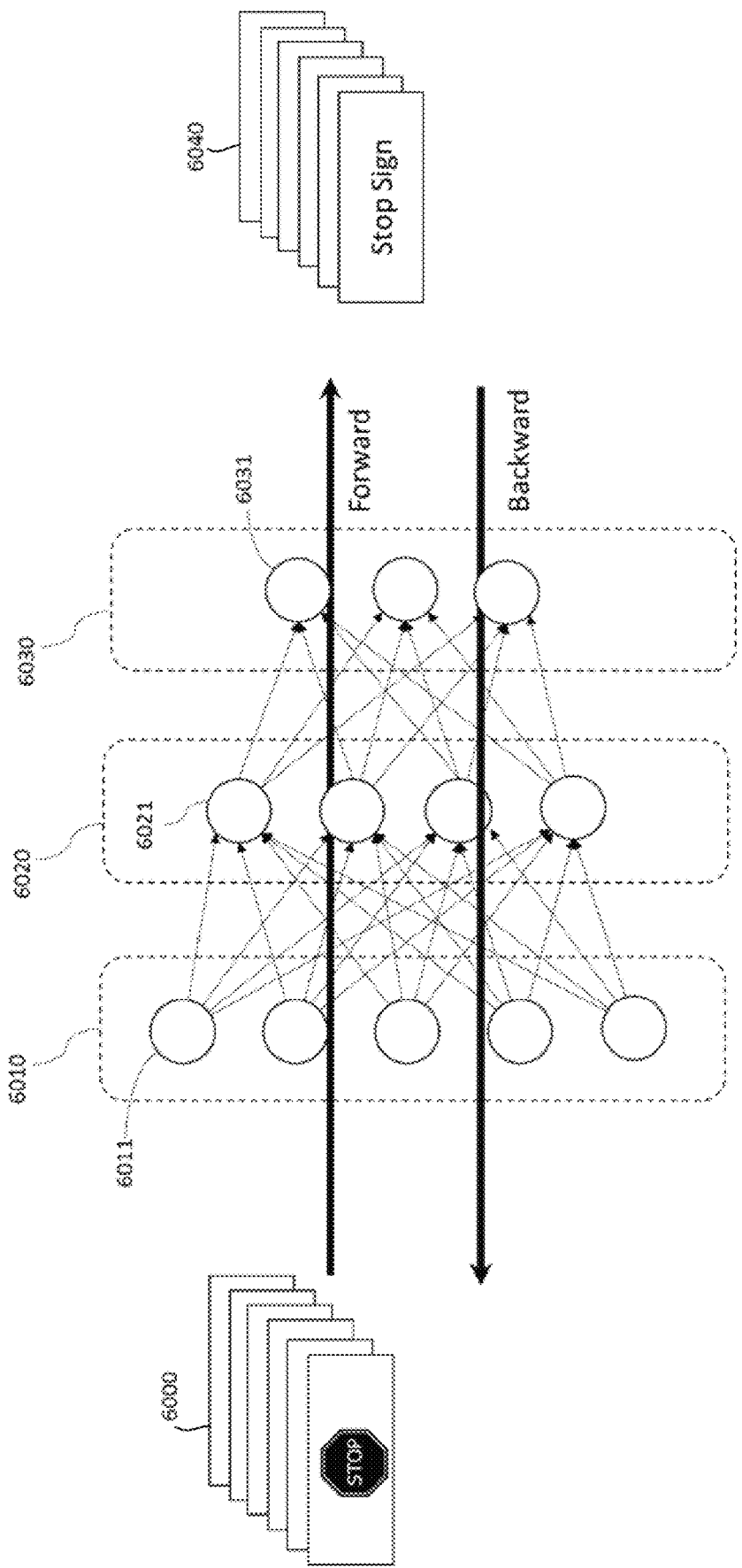
FIG. 3 is a diagram of an example data flow for training neural networks to recognize objects, in accordance with embodiments of the present technology.
Figure 4:
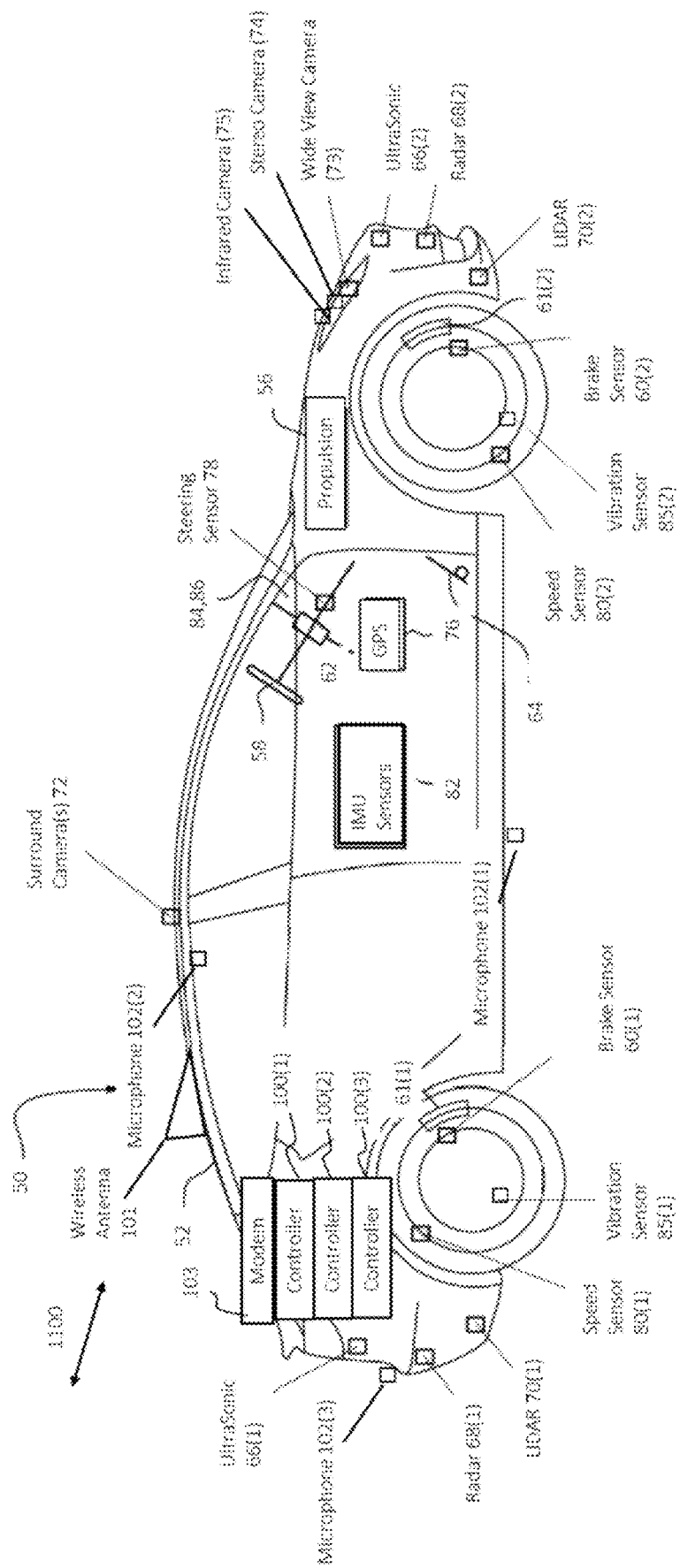
FIG. 4 is a diagram of an example autonomous vehicle, in accordance with embodiments of the present technology.

FIG. 4 shows an example self-driving vehicle (50). Vehicle (50) in the example shown comprises a passenger vehicle such as a car or truck that can accommodate a human driver and/or human passengers. Vehicle (50) includes a vehicle body (52) suspended on a chassis, in this example comprised of four wheels (54) and associated axles. A propulsion system (56) such as an internal combustion engine, hybrid electric power plant, or even all-electric engine is connected to drive some or all of the wheels (54) via a drive train, which may include a transmission (not shown). A steering wheel (58) may be used to steer some or all of the wheels (54) to direct vehicle (50) along a desired path when the propulsion system (56) is operating and engaged to propel the vehicle. Steering wheel (58) or the like is optional for Level 5 embodiments. One or more Controllers (100(1)-100(3)) provide autonomous self-driving capabilities in response to signals continuously provided in real-time from an array of sensors, as described more fully below.

Each controller is essentially one or more onboard supercomputers that can operate in real-time to process sensor signals, and output autonomous operation commands to self-drive vehicle (50) and/or assist the human vehicle driver in driving. Each vehicle may have any number of distinct controllers for functional safety and additional features. For example, Controller (100(1)) may serve as the primary computer for autonomous driving functions, Controller (100(2)) may serve as a secondary computer for functional safety functions, Controller (100(3)) may provide artificial intelligence functionality for in-camera sensors, and Controller (100(4)) (not shown) may provide infotainment functionality and provide additional redundancy for emergency situations.

Controller (100) sends command signals to operate vehicle brakes (60) via one or more braking actuators (61), operate steering mechanism (58) via a steering actuator (62), and operate propulsion unit (56) which also receives an accelerator/throttle actuation signal (64). Actuation is performed by methods known to persons of ordinary skill in the art, with signals typically sent via the Controller Area Network data interface ("CAN bus")—a network inside modern cars used to control brakes, acceleration, steering, windshield wipers, etc. The CAN bus can be configured to have dozens of nodes, each with its own unique identifier (CAN ID). In a preferred embodiment, the CAN network can comprise more than a hundred different CAN node IDs. The bus can be read to find steering wheel angle, ground speed, engine RPM, button positions, and other vehicle status indicators. The functional safety level for a CAN bus interface is typically ASIL B. Other protocols may be used for communicating within a vehicle, including FlexRay and Ethernet.

For embodiments using vehicle models, an actuation controller may be obtained with dedicated hardware and software, allowing control of throttle, brake, steering, and shifting. The hardware provides a bridge between the vehicle's CAN bus and the controller (100), forwarding vehicle data to controller (100) including the turn signal, wheel speed, acceleration, pitch, roll, yaw, Global Positioning System ("GPS") data, tire pressure, fuel level, sonar, brake torque, and others. Similar actuation controllers may be configured for any other make and type of vehicle, including special-purpose patrol and security cars, robo-taxis, long-haul trucks including tractor-trailer configurations, tiller trucks, agricultural vehicles, industrial vehicles, and buses, including but not limited to articulated buses.

Controller (100) provides autonomous driving outputs in response to an array of sensor inputs including, for example: one or more ultrasonic sensors (66), one or more RADAR sensors (68), one or more Light Detection and Ranging ("LIDAR") sensors (70), one or more surround cameras (72) (typically such cameras are located at various places on vehicle body (52) to image areas all around the vehicle body), one or more stereo cameras (74) (in preferred embodiments, at least one such stereo camera faces forward to provide depth-perception for object detection and object recognition in the vehicle path), one or more infrared cameras (75), GPS unit (76) that provides location coordinates, a steering sensor (78) that detects the steering angle, speed sensors (80) (one for each of the wheels (54)), an inertial sensor or inertial measurement unit ("IMU") (82) that monitors movement of vehicle body (52) (this sensor can be for example an accelerometer(s) and/or a gyro-sensor(s) and/or a magnetic compass(es)), tire vibration sensors (85), and microphones (102) placed around and inside the vehicle. Other sensors may be used, as is known to persons of ordinary skill in the art.

Controller (100) also receives inputs from an instrument cluster (84) and can provide human-perceptible outputs to a human operator via human-machine interface ("HMI") display(s) (86), an audible annunciator, a loudspeaker and/or other means. In addition to traditional information such as velocity, time, and other well-known information, HMI display may provide the vehicle occupants with information regarding maps and vehicle's location, the location of other vehicles (including an occupancy grid) and even the Controller's identification of objects and status. For example, HMI display (86) may alert the passenger when the controller has identified the presence of a stop sign, caution sign, or changing traffic light and is taking appropriate action, giving the vehicle occupants peace of mind that the controller is functioning as intended.

Instrument cluster (84) may include a separate controller/supercomputer, configured to perform deep learning and artificial intelligence functionality, including the Advanced System-on-a-Chip described below, in a section titled "AI Supercomputer Platform For Performing the Technology" and following.

Vehicle (50) collects data that is preferably used to help train and refine the neural networks used for self-driving. The vehicle includes modem (103), preferably a system-on-a-chip that provides modulation and demodulation functionality and allows the controller (100) to communicate over the wireless network (1100). Modem (103) may include an RF front-end for up-conversion from baseband to RF, and down-conversion from RF to baseband, as is known in the art. Frequency conversion may be achieved either through known direct-conversion processes (direct from baseband to RF and vice-versa) or through super-heterodyne processes, as is known in the art. Alternatively, such RF front-end functionality may be provided by a separate chip. Modem (103) preferably includes wireless functionality substantially compliant with one or more wireless protocols such as, without limitation: LTE, WCDMA, UMTS, GSM, CDMA2000, or other known and widely-used wireless protocols.

1. Cameras

Compared to sonar and RADAR, cameras generate a richer set of features at a fraction of the cost. Thus, self-driving vehicle (50) includes a plurality of cameras (72, 73, 74, 75, 76), capturing images around the entire periphery of the vehicle. Camera type and lens selection depends on the nature and type of function. The vehicle preferably has a mix of camera types and lenses to provide complete coverage around the vehicle; in general, narrow lenses do not have a wide field of view, but can see farther. In a preferred embodiment, the vehicle includes 12 cameras, although a greater or lesser number may be used. All camera locations on the vehicle preferably support interfaces such as Gigabit Multimedia Serial link (GMSL) and Gigabit Ethernet.

Figure 5:
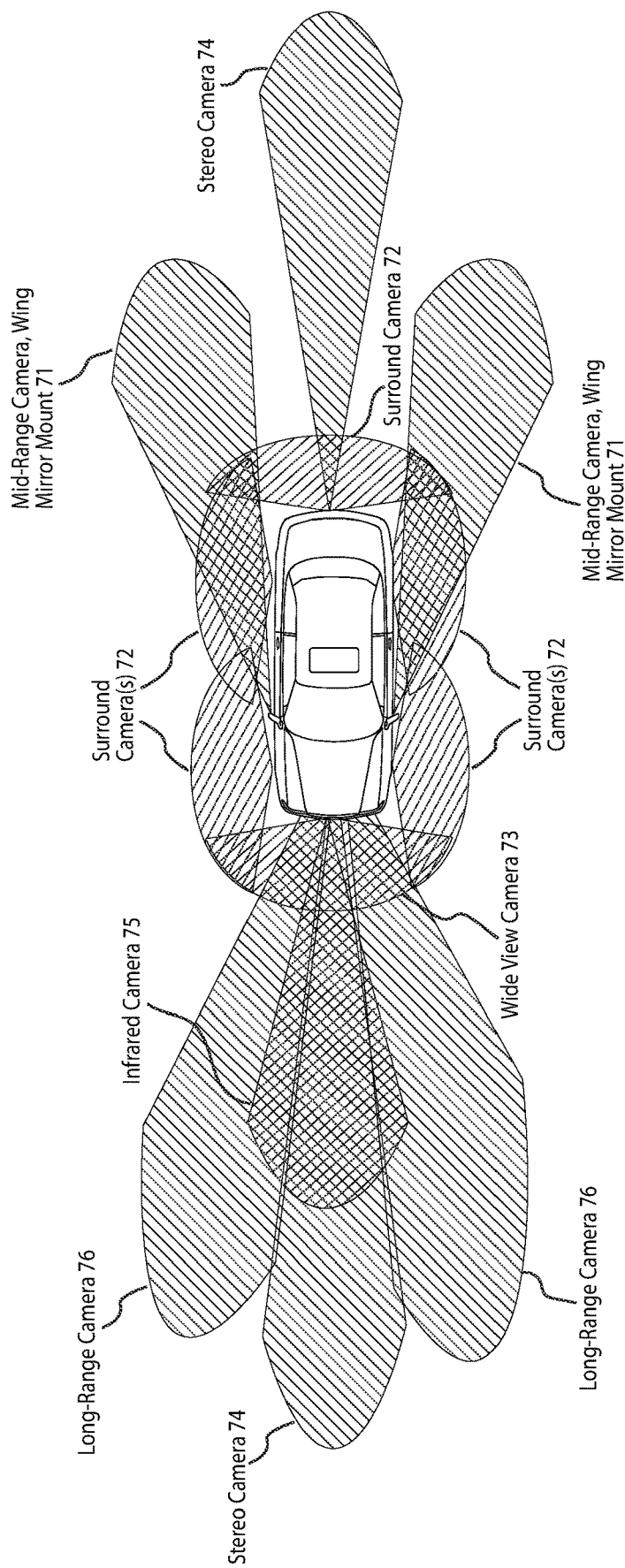
FIG. 5 is diagram of example camera types and locations on a vehicle, in accordance with embodiments of the present technology.

FIG. 5 illustrates one example of camera types and locations, with 12 cameras (72, 73, 74, 76), and one infrared camera (75).

Front-facing cameras help identify forward facing paths and obstacles, and provide information critical to making an occupancy grid and determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), and Autonomous Cruise Control ("ACC"), and other functions such as traffic sign recognition.

A variety of cameras may be used in a front-facing configuration, including, for example, a monocular camera platform that includes a CMOS (complementary metal oxide semiconductor) color imager and one or more data communication interfaces such as CAN, FlexRay, and Ethernet.

Front-facing wide-view cameras (73) may be used to perceive objects coming into view from the periphery (e.g., pedestrians, crossing traffic or bicycles). Other wide-view cameras and lenses may be used, as is known by persons of ordinary skill in the art.

In preferred embodiments, a long-view stereo camera pair (74) can be used for depth-based object detection, especially for objects for which a neural network has not yet been trained. Long-view stereo cameras (74) may also be used for object detection and classification, as well as basic object tracking. Stereo cameras for automotive applications may include an integrated control unit comprising one scalable processing unit, which provides a programmable logic ("FPGA") and a multi-core micro-processor with an integrated CAN or Ethernet interface on a single chip. The unit generates a precise 3-D map of the vehicle's environment, including a distance estimate for all the points in the image.

Similarly, the suitable alternatives include compact stereo vision sensors comprised of two camera lenses (one each on the left and right) and an image processing chip that can be configured to measure the distance from the vehicle to the target object, and is designed to activate the autonomous emergency braking and lane departure warning functions. Other stereo cameras may be used to practice the technology, as is known to persons of ordinary skill in the art.

Side cameras (72) may be used for Surround View, providing information used to create and update the occupancy grid; as well as side impact collision warnings. In a preferred embodiment, four wide/fisheye view cameras are used, positioned on the vehicle's front, rear, and sides. Alternatively, the vehicle may use three physical surround-only cameras (72) (Surround Left, Right, Rear) and leverage the physical Front Wide camera (73) as a logical fourth surround view camera. Wing-mirror assemblies, when used, are typically custom 3-D printed so that the camera mounting plate matches the shape of the wing mirror (71). An example design integrates a camera into a traditional mirror and provides a larger field of view. Side cameras may also be placed in the four pillars at each corner of the cabin.

Rear cameras may be used for park assistance, surround view, rear collision warnings, and creating and updating the occupancy grid. A wide variety of cameras may be used, including, cameras that are also suitable as a front-facing camera. Rear camera may also be a stereo camera (74) of the type discussed above.

The camera types provided herein are examples provided without limitation. Almost any type of digital camera may be adapted for use with the technology. Alternate cameras can be any available type including (without limitation) 60 fps and global shutter. Preferably, the color filter pattern is RCCB, and Clear Pixel cameras are used to increase sensitivity. The technology can also include cameras installed to perform known ADAS functions as part of a redundant or fail-safe design, as discussed below. For example, a Multi-Function Mono Camera may be installed to provide functions including lane departure warning, traffic sign assist and intelligent headlamp control.

In a preferred embodiment, all cameras record and provide video information simultaneously. All cameras are preferably mounted in custom designed (3-D printed) assemblies to cut out not only stray light but also reflections from within the car, which may interfere with the camera's data capture (since reflections from the dashboard reflected in the windshield mirrors is a major concern). Typical camera functional safety levels are ASIL B.

2. LIDAR

Self-driving vehicle (50) preferably includes one or more LIDAR sensors (70), which are often used for object and pedestrian detection, emergency braking, and collision avoidance. LIDAR sensors measure distances by measuring the Time of Flight ("ToF") that it takes a short laser pulse to travel from the sensor to an object and back, calculating the distance from the known speed of light. LIDAR detects smaller objects and is effective at detecting distance under relatively clear atmospheric conditions. However, LIDAR does not work well in adverse weather conditions, and is not particularly effective at detecting non-reflective objects, such as muddy or dusty objects. Thus, unlike RADAR, LIDAR sensors typically must have a clear unobstructed line of sight—the sensors cannot be obscured by dirt, dust, or other obstruction.

In a preferred embodiment, vehicle (50) has six surround LIDAR sensors that are pre-wired for Ethernet, providing data to a Gigabit Ethernet switch, although a greater or lesser number of LIDAR sensors may be used.

May different types of LIDAR technologies may be used with the technology. In one embodiment, the LIDAR sensor used is capable of providing a list of objects and their distances for a 360-degree field of view. In an alternative embodiment, a LIDAR sensor that provides 360 degrees horizontal field of view. Commercially available LIDAR sensors can have an advertised range of approximately 100 m, with an accuracy of 2-3 cm, with support for (e.g.,) a 100 Mbps Ethernet connection.

In yet another embodiment, one or more non-protruding LIDAR sensors may be used. These embodiments include a sensor implemented as a small device that may be embedded into the front, sides, and corners of vehicles, and is advertised as providing up to a 120-degree horizontal and 35-degree vertical field-of-view, with a 200-meter range even for low-reflectivity objects, with an automotive integrity safety level rating of ASIL B. In general, front-mounted LIDAR is preferably configured for a horizontal field of view between 45 and 135 degrees.

In another embodiment, newer LIDAR technologies, such as 3D Flash LIDAR, may also be used. 3D Flash LIDAR uses a flash of a laser as a transmission source, to illuminate vehicle surroundings approximately 200 m. A Flash LIDAR unit includes a receptor, which records the laser pulse transit time and the reflected light on each pixel, which in turn corresponds to the range from the vehicle to the objects. Flash LIDAR allows highly accurate and distortion-free images of the surroundings to be generated with every laser flash. In a preferred embodiment, four Flash LIDARs are deployed, one at each side of the autonomous vehicle. Available 3D Flash LIDAR systems include a solid-state 3D staring array LIDAR camera with no moving parts other than a fan—in other words, it is not a scanning LIDAR device. In one non-limiting example, the Flash LIDAR device uses a 5 nanosecond Class I (eye-safe) laser pulse per frame and captures the reflected laser light in the form of 3D range point clouds and co-registered intensity data. Because Flash LIDAR is a solid-state device, with no moving parts, it is less susceptible to motion blur, vibration, and shock. LIDAR functional safety levels are typically ASIL B.

3. Ultrasonic Sensors.

Self-driving vehicle (50) preferably includes one or more ultrasonic sensors (66). Ultrasonic sensors, positioned at the front, back, and even the sides, are most often used for park assist and to create and update an occupancy grid. However, the utility of sonar is both compromised at high speeds and, even at slow speeds, is limited to a working distance of about 2 meters. A wide variety of ultrasonic sensors may be used. Suitable ultrasonic sensors include can be designed for different ranges of detection (e.g., 2.5 m, 4 m). Typical ultrasonic sensor functional safety levels are ASIL B.

4. Infrared (Thermal) Sensors

In certain embodiments, self-driving vehicle (50) preferably includes one or more infrared or thermal cameras (75) to enhance the vehicle's ability to detect, classify and identify objects, especially in the dark, and through fog. The technology can include either an active infrared system or a passive infrared system. An active system uses an infrared light source to illuminate the area surrounding the vehicle with infrared light, using either a gated or non-gated approach. A gated active system uses a pulsed infrared light source and a synchronized infrared camera. Because an active system uses an infrared light source, it does not perform as well in detecting living objects such as pedestrians, bicyclists, and animals.

Passive infrared systems detect thermal radiation emitted by objects, using a thermographic camera. Passive infrared systems perform well at detecting living objects, but do not perform as well in especially warm weather. Passive infrared systems generally provide images at less resolution than active infrared systems. Because infrared systems detect heat, they particularly enhance the vehicle's ability to detect people and animals, making the vehicle more reliable and enhancing safety.

A wide variety of infrared sensors may be used with the technology. Suitable infrared systems include, without limitation, a compact thermal imaging camera that creates (in example implementations) a 320×240 pixel image with a 36 degree field of view, and an effective range of 300 m for people, and approximately twice that for larger, heat-emitting objects such as automobiles. For applications that require additional variations, including a zoom capability, the longwave infrared ("LWIR") thermal camera cores may be used. Alternatively, especially for development vehicles, infrared sensors can be equipped with thermal data ports that provide analytics over a standard USB connection, or through any suitable data communication standard. Typical infrared camera functional safety levels are ASIL B.

5. RADAR

Self-driving vehicle (50) preferably includes one or more RADAR sensors (68). RADAR is well-suited to long-range vehicle detection, while nearby car detection can be solved with sonar. In general, RADAR detects distance accurately, so it works under darkness and severe weather conditions. However, RADAR is subject to false positives, including manhole covers, large cans, drainage grates, and other metallic objects. In addition, RADAR does not provide any meaningful information regarding orientation, and is often inaccurate in lateral positions—a problem for curved highways and sharp turns.

A wide variety of RADAR sensors may be used with the technology. The RADAR sensors preferably use CAN for control and to access the object tracking data, with optional Ethernet to access the raw data. The car (50) preferably also has side RADAR sensors and data from the RADAR sensors are provided via the CAN bus.

Suitable sensors include, without limitation RADAR sensors which may be used for both front and rear RADAR coverage. Other suitable sensors can include a Pulse Doppler RADAR, which can have multiple configurations: one with a longer range and a narrower field of view, and one with a shorter range but a wider field of view. Fewer, more, or alternate configurations are also possible according to particular configurations. In other embodiments, a RADAR sensor can be used to provide shorter range side coverage. When used for side coverage, the sensor can be used to provide object tracking and lane assignment functions.

Long-Range RADAR is often used for ACC functionality; short and medium-range RADAR is often used for cross-traffic alerts (for front-facing RADAR), blind spot detection, and rear collision warnings. Suitable long-range RADAR systems include, without limitation, RADAR systems that provide a broad field of view realized by two independent scans, with approximately 250 m range. Example embodiments can include sensors that distinguish between static and moving objects, and can be used in conventional ADAS for Emergency Brake Assist or Forward Collision Warning.

Other suitable long-range RADAR systems include, without limitation, a monostatic multimodal RADAR with multiple (e.g., six or more) fixed RADAR antennae and a high-speed CAN and FlexRay interface. The central four antennae create a focused beam pattern, designed to record the vehicle's surroundings at higher speeds, with minimal interference from traffic in adjacent lanes. The outer two antennae expand the field of view, making it possible to quickly detect vehicles entering or leaving the vehicle's lane.

Mid-range RADAR systems have a range of up to 160 m (front) or 80 m (rear) and a field of view of up to 42 degrees (front) or 150 degrees (rear). Suitable short-range RADAR systems include, without limitation, RADAR sensors designed to be installed at both ends of the rear bumper. When installed at both ends of the rear bumper, such a RADAR sensor systems creates two beams that constantly monitor the blind spot in the rear and next to the vehicle. Example short-range RADAR systems can be used in a conventional ADAS system for Blind Spot Detection or Lane Change Assist. Typical RADAR functional safety levels are ASIL B.

6. GPS

Self-driving vehicle (50) preferably includes GPS sensors (76), including GPS and/or assisted GPS ("aGPS"), to assist in mapping, perception, Occupancy grid, and path planning functions. Any number of different GPS sensors and connectors may be used, including without limitation, a GPS using a USB connector with an Ethernet to Serial (RS-232) Bridge.

7. Inertial Measurement Units (IMU).

Self-driving vehicle (50) preferably includes inertial measurement unit sensors (IMU) (82) such as accelerometers, gyroscopes, as well as magnetometers. IMU (82) is preferably located at the center of the vehicle's (50) rear axle.

A variety of different IMU sensors may be used, without limiting the technology. For example, embodiments may include six-axis applications (accelerometers and gyroscopes) and nine-axis applications (accelerometers, gyroscopes, and magnetometers). Alternatively, rather than use magnetometers, the IMU (82) may be implemented as a miniature, high performance GPS-Aided Inertial Navigation System (GPS/INS) that combines MEMS inertial sensors, a high-sensitivity GPS receiver, and advanced Kalman filtering algorithms to provide optimal estimates of position, velocity, and attitude. Example implementations are capable of estimating heading without requiring input from a magnetic sensor by directly observing and correlating the changes in velocity from the GPS to the inertial sensors. Alternatively, IMU (82) and GPS (76) may be combined in a single integrated unit.

8. Wireless Connectivity and Network Access.

Level 3-5 functionality requires vehicles to learn continuously as they drive; ideally, the Level 3-5 vehicles learn not only from their own experiences, but from the experiences of other vehicles on the road. Thus, self-driving vehicle (50) preferably includes a wireless modem (103) and antenna (101) for wireless connectivity to outside networks and other vehicles.

The data collected by each Level 3-5 vehicle should be transferred via the cellular or other terrestrial network—such as LTE, where available, WCDMA, UMTS, CDMA2000, HSPA+, GSM or a satellite radio network—to a cloud-based infrastructure that includes deep-learning supercomputers. Alternatively, data may be transferred to the cloud via wireless hotspots with WiFi, including in parking lots, service stations, and/or even stop lights. For smaller packets, paging network infrastructure may also be used. Data provided by the vehicle (50) to the network may include, without limitation, camera images, LIDAR data, ultrasonic sensor data, and RADAR data.

In a preferred embodiment, the cloud-based, deep learning infrastructure uses artificial intelligence to analyze data received from vehicles and incorporate it into up-to-date, real-time neural networks for real-time intelligent inferencing. In a preferred embodiment, the network infrastructure uses a datacenter with GPUs for deep learning as illustrated in FIG. 6.

Figure 6:
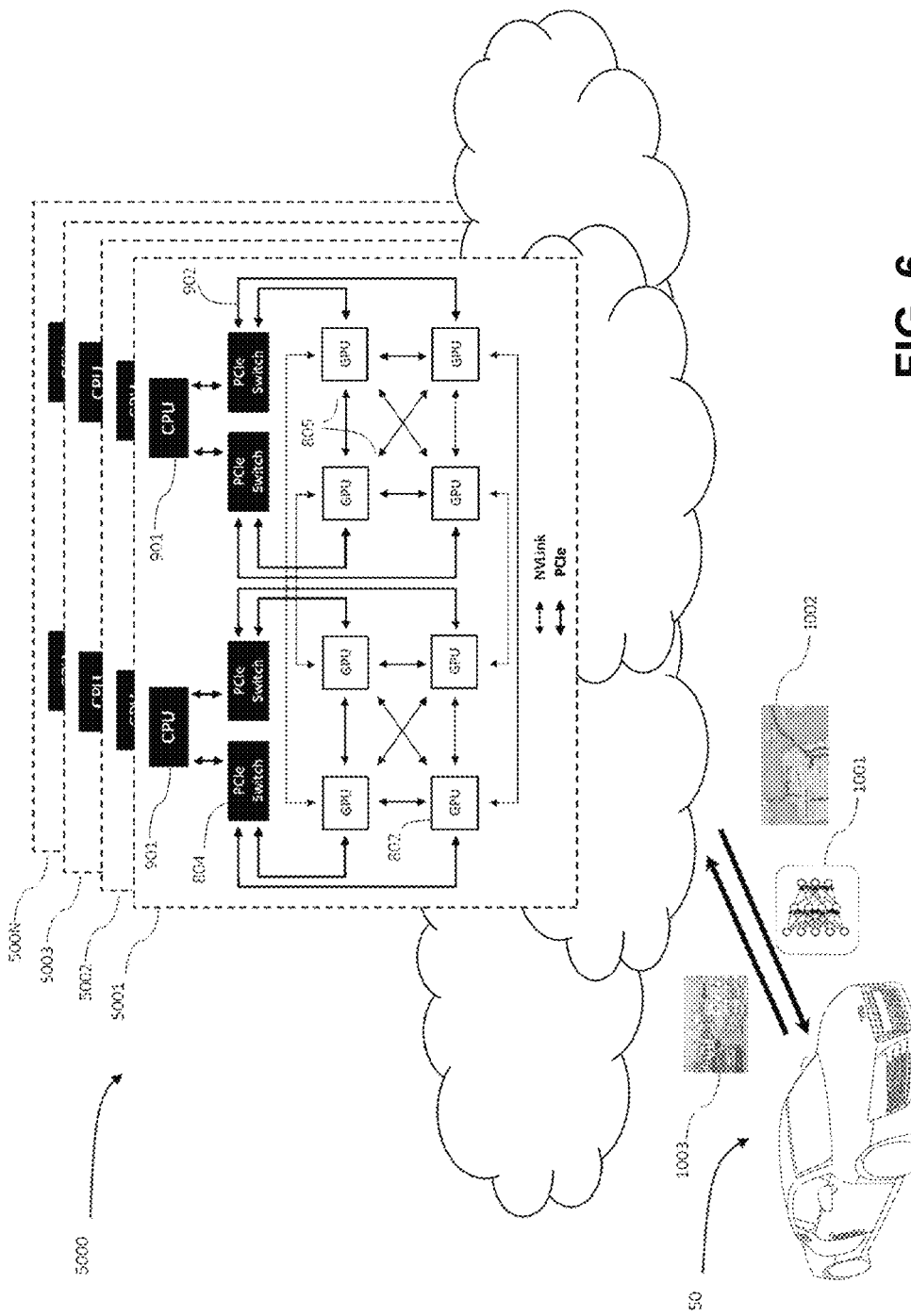
FIG. 6 is an illustration of an example data flow process for communication between a cloud-based datacenter and an autonomous vehicle, in accordance with embodiments of the present technology.

The cloud-based, deep-learning infrastructure provides updates to self-driving vehicle (50) through the wireless network uplink (1101) and downlink (1102), as illustrated in FIG. 6. Updates provided to vehicle (50) may include updates to high-definition or HD maps (1002), and revisions to one or more neural networks (1001) loaded in memory in the Controller (100), which may include updates resulting from new training and experiences received from other vehicles in the field, or training performed in the network datacenters. Map updates (1002) may further include updated HD map information, which may include information regarding construction sites, potholes, detours, flooding, and other obstructions.

The data collected by each Level 3-5 vehicle should be transferred via a cellular or other wireless network—such as LTE, where available—to a cloud-based infrastructure that includes deep-learning supercomputer servers. The deep learning infrastructure uses artificial intelligence to analyze the data and incorporate it into up-to-date, real-time neural networks for real-time intelligent inferencing.

The deep-learning infrastructure preferably includes GPU technology. The deep-learning supercomputers preferably include servers powered by GPUs and/or dedicated AI computers, such as the DGX and DGX Station machines developed by NVIDIA Corporation. Alternatively, the technology may also be practiced with deep learning infrastructure that uses only CPU-powered datacenters.

The deep-learning infrastructure is capable of fast, real-time inferencing, and may use that capability to evaluate and verify the health of the processors, software, and associated hardware in Vehicle (50). For example, deep-learning infrastructure preferably receives periodic updates from Vehicle (50) including a sequence of images and the objects that the Vehicle (50) located (via computer vision or other machine learning object classification techniques) in that sequence of images. Deep-learning infrastructure runs its own neural network to identify the objects and compare them with the objects identified by Vehicle (50); if the results do not match and the infrastructure concludes that the AI in the Vehicle (50) is malfunctioning, it can send a signal to Vehicle (50) instructing the fail-safe computer to assume control, notify the passengers, and complete a safe parking maneuver.

For inferencing, the infrastructure preferably includes servers powered by GPUs and one or more programmable inference accelerators, such as NVIDIA's TensorRT 3. The combination of GPU-powered servers and inference acceleration makes real-time responsiveness possible. Alternatively, when performance is less critical, servers powered by CPUs, FPGAs, and other processors may be used for inferencing, though they are disfavored as their performance falls short of that provided by the GPU/TensorRT 3 solution.

FIG. 6 illustrates one embodiment wherein Vehicle (50) provides and receives information via wireless network. Cloud-based infrastructure (5000) includes a plurality of GPU powered servers (5001, 5002, . . . 500N). In the preferred embodiment shown in FIG. 6, each GPU-powered server comprises a plurality of GPUs (802), PCIe switches (804), and CPUs (901), interconnected with high-speed interconnects (805) (such as, without limitation, the NVLink interface developed by NVIDIA, and PCIe connections (902). In other embodiments each server could comprise multiple (e.g., sixteen, thirty-two, or more) GPUs, connected with a high-speed interconnect such as NVLink and/or an NVSwitch SoC. On the wireless uplink (1101) vehicle (50) uploads images showing unexpected or changed road conditions (1003), such as recently commenced road-work. On the wireless downlink (1102) vehicle downloads updated neural networks (1001) and map information (1002), including information regarding traffic and road conditions.

9. Additional Sensors and Systems.

In addition to the sensors described above, the autonomous vehicles may include other sensors, ADAS systems, and warning systems. Such systems include, without limitation, systems that automatically detect when the pressure decreases in a vehicle's tires. The Deflation Warning System uses simple sensors to measure the angular velocity of a tire (80), which increase as the tire deflates and gets smaller. The Deflation Warning System also measures the tire's vibration frequencies (85), which change as a tire's pressure decreases.

The vehicle (50) may incorporate other available systems for slippery road detection that use differences in drive shaft speed (80) and tire vibrations (85) to determine the presence of slippery roads. Available systems include a slippery road detection system. Example slippery road detection systems may be used to estimate the difference in the speeds of the drive shaft and freely rotating axles in various driving situations, which enables the level of friction to be deduced, to identify icy or slippery roads. Similarly, alternative solutions compare data collected on a non-slippery road such as on a dry asphalt road with data collected on a slippery road. The sensors compare the rotation speed and vibration frequency with those measured for a dry asphalt road, and identifies icy or slippery roads.

A number of software products may be used with the technology, including software systems that continuously monitor the road friction in real-time using signals from existing automotive grade sensors, such as the wheel speed, to determine the road friction and roughness, detect speed bumps, and make a damage assessment of a possible pothole impact. Other systems include Tire Pressure Indicator ("TPI"), and indirect tire-pressure monitoring systems ("TPMS") capable of detecting underinflation using both relative rolling radius information as well as wheel oscillation measurement. Example TPI and TPMS systems estimate tire pressure mainly from the signals of the wheel speed sensors that are part of the anti-lock braking system ("ABS") (60) and electronic stability control system ("ESC"). TPI uses signals already available in the vehicle, and detects if one or more tires are under-deflated. The computations are based on vehicle models and numerous advanced signal processing and sensor fusion algorithms. A Loose Wheel Indicator ("LWI") can be included to detect when the wheel bolts/nuts have come loose on a wheel position, using information from the ABS and ESC systems and the Tire Grip Indicator ("TGI") constantly estimates the available friction between the road and the tires.

The technology may also be used with other safety systems, including sensors and/orn systems for detecting slippery road conditions. The Road eye measures the road reflectivity at a few infrared laser wavelengths, which are absorbed differently in ice and water.

These examples are only a few of the possible sensors and systems that may be used to achieve full Level 3-5 performance at ASIL D safety levels. An autonomous driving system must be able to process huge amount of data from cameras, RADAR, LIDAR, ultrasonic, infrared, GPS, IMUS, and/or HD-Maps in real-time, and generate commands to control the car safely, reliably, and comfortably. An autonomous driving system must ensure that the vehicle reacts correctly in a fraction of a second to changing circumstances. This challenging task requires a new supercomputer platform, that provides for advanced AI functionality, multiple neural networks, and advanced CPU, GPU, and hardware accelerator functionality, as described more fully below in for example Sections entitled "System Architecture and Hardware for Autonomous Vehicles" and "Additional Examples of Self-Driving Vehicles Using the Technology".

B. System Architecture and Hardware for Autonomous Vehicles.

1. AI Supercomputer Platform for Performing the Technology

As self-driving functionality requires a supercomputer able to perform numerous distinct functions rapidly, accurately, safely, and efficiently, no single processor can provide Level 3-5 autonomous vehicle functionality. Rather, an Advanced Platform and SoC for performing the technology preferably has multiple types of processors, providing the "right tool for the job" as well as processing diversity for functional safety. For example, GPUs are well-suited to higher precision tasks. Hardware accelerators, on the other hand, can be optimized to perform a more specific set of functions. By providing a blend of multiple processors, an Advanced Platform and SoC includes a complete set of tools able to perform the complex functions associated with Level 3-5 autonomous vehicles quickly, reliably, and efficiently.

Figure 7:
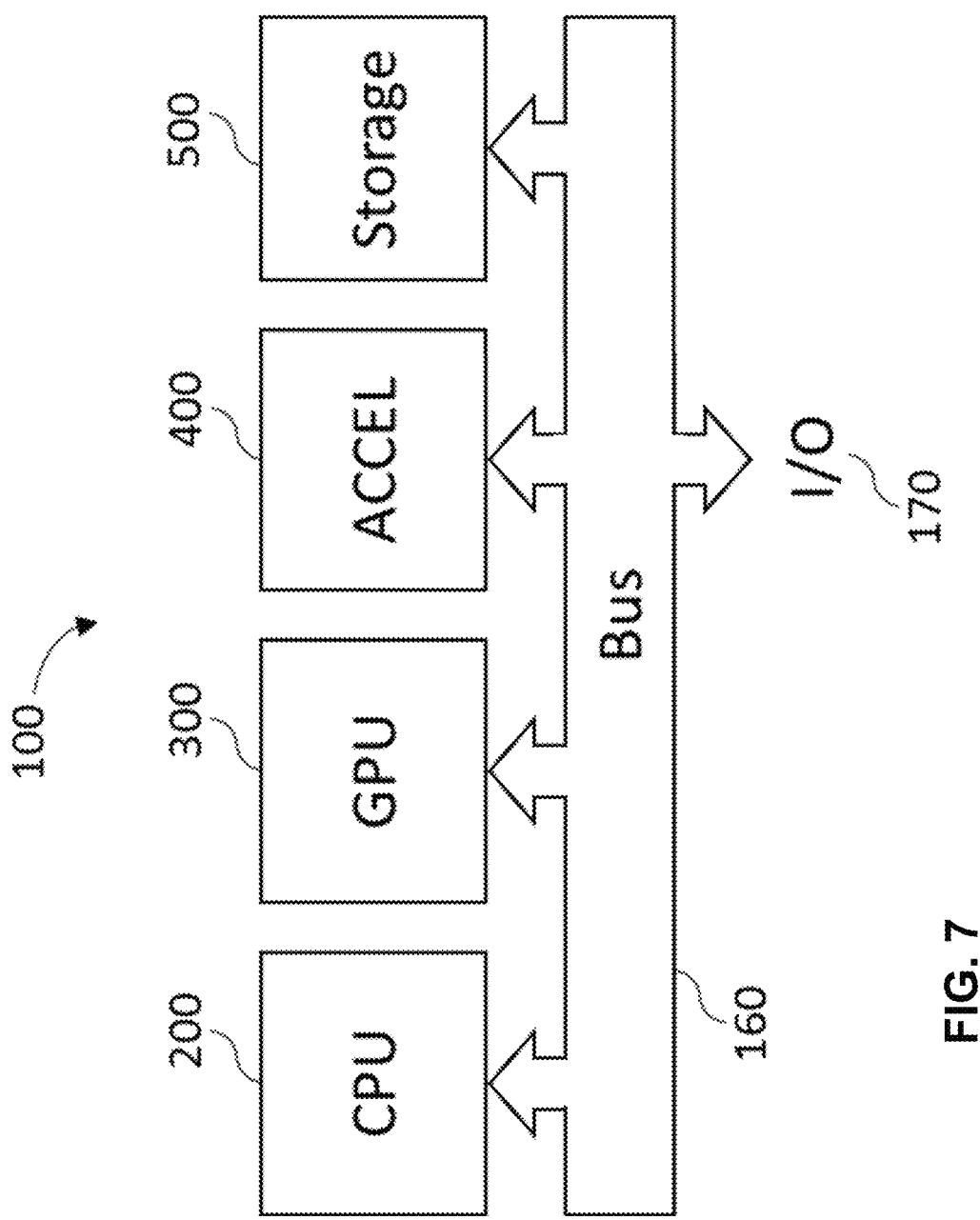
FIG. 7 is a block diagram illustrating an example autonomous driving hardware platform, in accordance with embodiments of the present technology.

FIG. 7 is an exemplary high-level diagram of an Advanced Platform (100) that provides the computing processing capabilities necessary for autonomous and semi-autonomous systems.

Platform (100) can be implemented using separate discrete components for one or more of the components (200-500) shown in FIG. 7. Preferably, platform (100) is implemented with the components (200-500) being implemented on a single die, in a small, powerful, efficient SoC. Platform (100) and SoC can also include other components not shown in FIG. 7, as discussed more fully below.

At a high-level, CPU (200) can be one or more general purpose central processing units (CPUs), each comprising one or more CPU cores. GPU (300) can be one or more graphics processing units (GPUs), each comprising thousands of GPU cores. Each GPU can be used for any advanced processing task, especially complex tasks that benefit from massively parallel processing. Each GPU typically exhibits better performance per watt for such computer graphics and parallel processing than each CPU.

Platform (100) includes an Acceleration Cluster (400) that can consist of a variety of different hardware accelerators, each optimized for a different function or category of functions.

For example, in certain non-limiting embodiments, Acceleration Cluster (400) may include a module for performing computer vision algorithms, for lane detection as well as redundant object detection at moderate distances. The module can include one or more embedded programmable vision accelerators ("PVAs"), which can be optimized for perception tasks from sensor data (e.g., data from cameras, RADAR, LIDAR) received from one or more sensors (e.g., cameras, RADAR, LIDAR) via I/O (170). Each PVA typically exhibits better performance per watt for such perception data processing than each CPU or GPU. Acceleration Cluster (400) may also include one or more deep learning accelerators ("DLAs"). Each DLA may be designed to run a specific neural network with better performance per watt performance than the same network would have if executed on a general-purpose CPU, GPU, or FPGA. For example, one or more DLA can be designed specifically to process a convolutional neural network ("CNN") to detect features in perception data (e.g., data from cameras, RADAR, LIDAR) received from one or more sensors (e.g., cameras, RADAR, LIDAR) via I/O (170).

Platform (100) further includes Storage (500) which may be comprised of one or more storage elements including RAM, SRAM, DRAM, VRAM, Flash, hard disks, and other components and devices that can store at least one bit of data. Storage (500) preferably includes on-chip storage, and may be comprise L2 or L3 caches for use with the CPU (200) and/or the GPU (300).

Input/Output (170) can be one or more input/output (I/O) interfaces (and/or components that implement such interfaces) for communicating data (e.g., commands, responses, info) to one or more input and/or output devices including displays, sensors, keyboard, and user interface devices.

Bus (160) can be one or more links that allow components (200-500) to exchange data (e.g., commands, responses, info) with each other as well as with input and/or output devices via I/O (170). Bus (160) can comprise one or more bus standards, switches, and networks, including but not limited to Ethernet, CAN, I2C buses, or PC Express buses.

2. Advanced System-on-a-Chip for Performing the Technology

In a preferred embodiment, Platform (100) comprises an Advanced SoC. The Advanced SoC of the present technology is purpose built for self-driving cars; not a mobile chip or a desktop repurposed for automotive. Rather, the SoC is an AI supercomputer, designed for use in self-driving cars with specific features optimized for L3-5 functionality. The SoC preferably is designed to be meet critical automotive standards, such as the ISO 26262 functional safety specification. In a preferred embodiment, the Advanced SoC has at least an ASIL C functional safety level.

Figure 8:
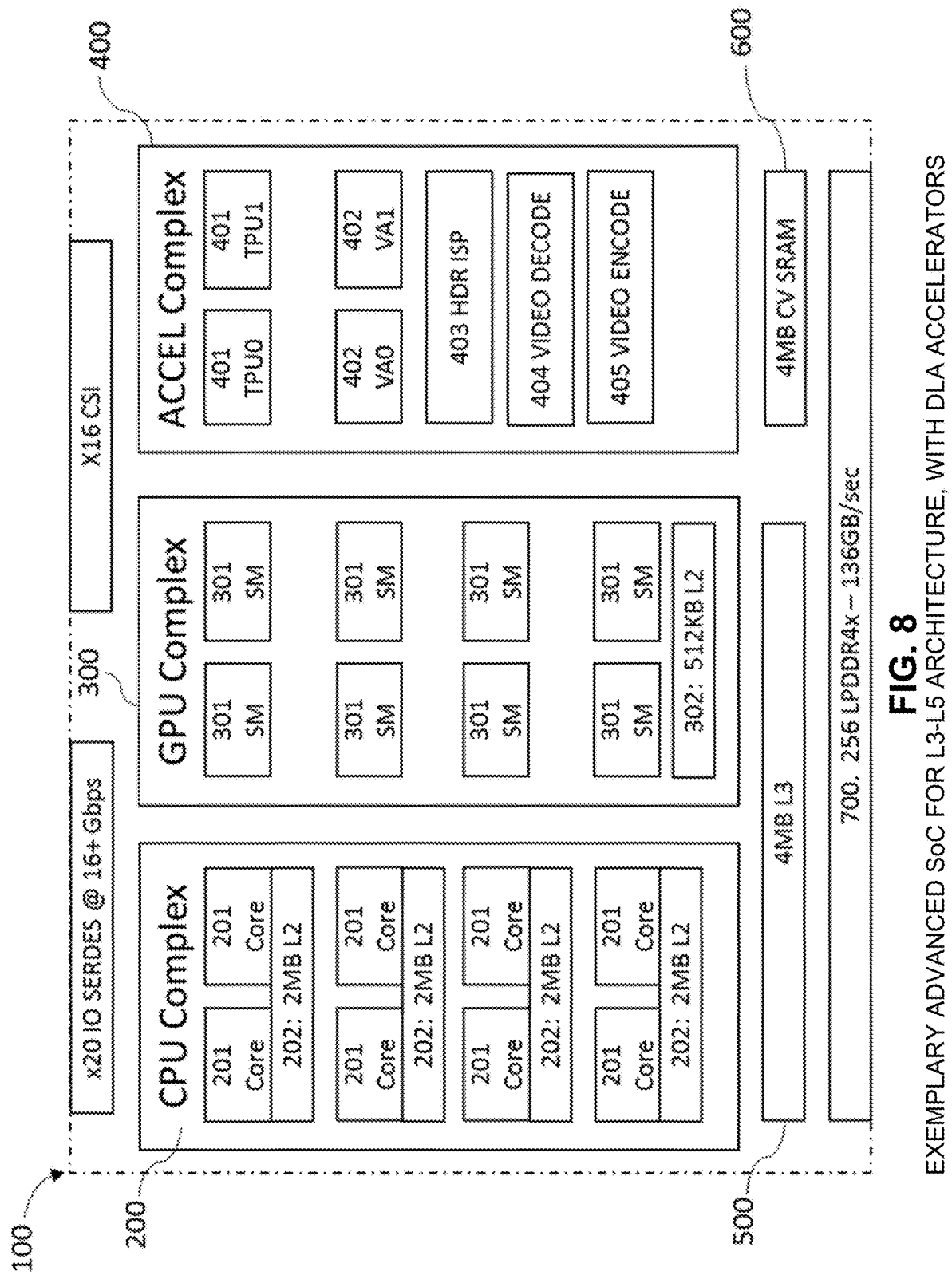
FIG. 8 is a block diagram illustrating an example processing architecture for an advanced System-on-a-Chip (SoC) in an autonomous vehicle, in accordance with embodiments of the present technology.
Figure 9:
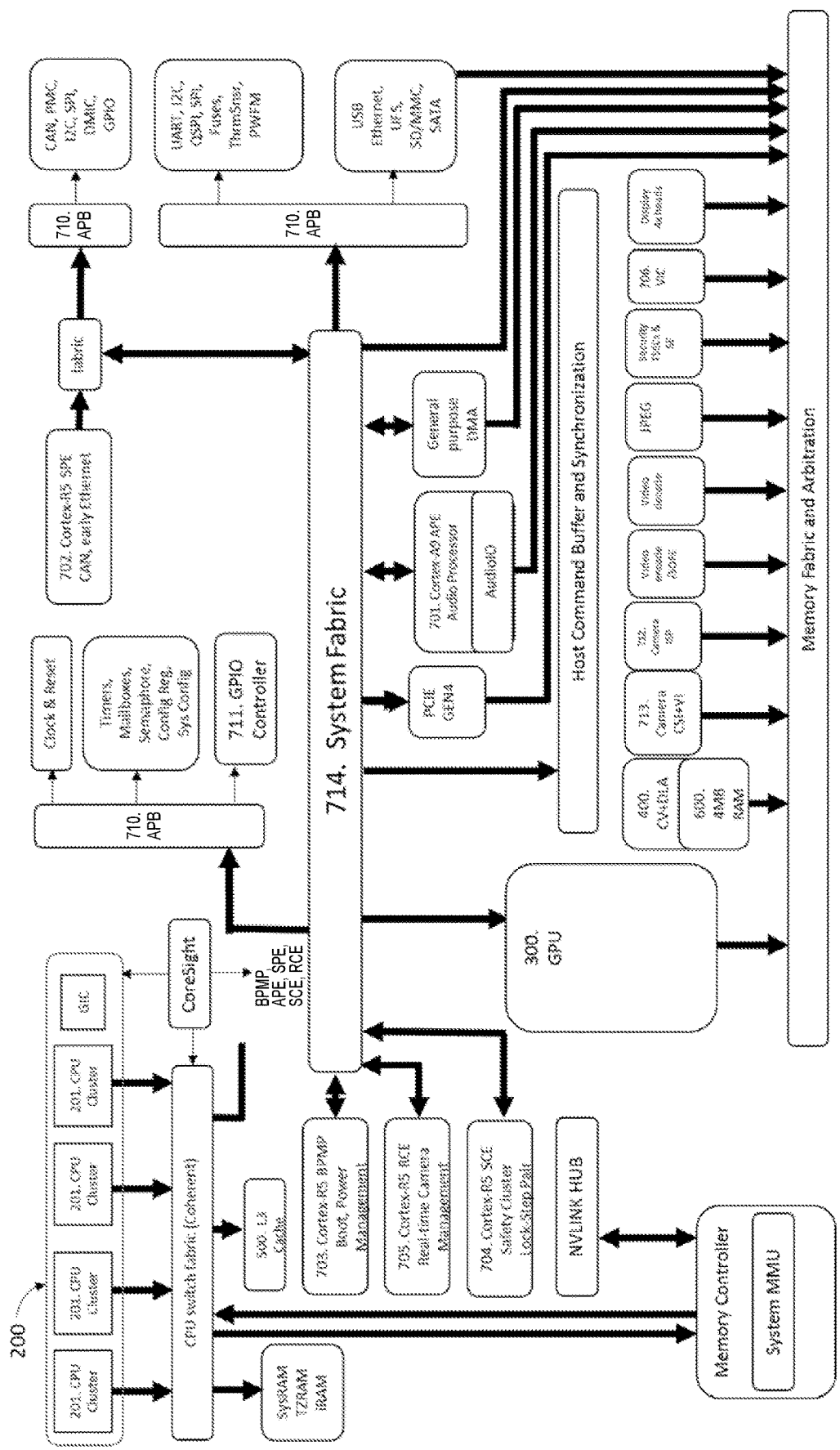
FIG. 9 Is a component diagram of an example advanced SoC in an autonomous vehicle, in accordance with embodiments of the present technology.

FIG. 8 and FIG. 9 are a high-level diagram of an Advanced SoC (100) for preferred embodiments for performing the technology.

a) CPU Complex.

As illustrated in FIG. 8 and FIG. 9, the SoC includes a fast CPU cluster or CPU Complex (200), referred to herein as "CPU" or "CCPLEX". The CCPLEX is generally responsible for performing serial work, including multiple CPU cores (201) and associated L2 Caches (202). In one embodiment, the CCPLEX includes eight CPU cores (201) in a coherent multi-processor configuration (200). CCPLEX supports simultaneous cluster operation meaning that any combination of the clusters can be active at any given time.

In one embodiment, the CPU cores are organized as four dual-core clusters, where each cluster has a dedicated 2 MB Level 2 (L2) unified cache (202). In addition, a high-speed coherency fabric preferably connects these processor complexes and allows heterogeneous multi-processing with all eight cores if required.

The CCPLEX (200) preferably implements aggressive power management capabilities, including one or more of the following features: (1) individual hardware blocks may be clock-gated automatically when idle to save dynamic power, (2) each core clock can be gated when the core is not actively executing instructions due to execution of WFI/WFE instructions, (3) each core can be independently power-gated, (4) each core cluster can be independently clock-gated when all cores are clock-gated or power-gated, and/or (5) Each core cluster can be independently power-gated when all cores are power-gated. The CCPLEX (200) preferably implements an enhanced algorithm for managing power states, where allowed power states and expected wakeup times are specified, and the hardware/microcode determines the best power state to enter for the core, cluster, and CCPLEX. The processing cores support simplified power state entry sequences in software with the work offloaded to microcode.

b) GPU Complex.

As illustrated in FIG. 8 and FIG. 9, the SoC includes at least one GPU complex (300), which may also be referred to as an integrated GPU or "iGPU." GPUs are programmable and efficient for parallel workloads, and preferably use an enhanced tensor instruction set. The GPU architecture preferably includes at least eight streaming multiprocessors ("SM") (301), each with at least a 96 KB L1 cache (not shown), and sharing at least a 512 KB L2 cache (302). The GPU preferably uses extensive compute APIs and libraries including CUDA.

The GPU is preferably power-optimized for best performance in automotive and embedded use cases. In one embodiment, GPU (300) is fabricated on a FinFET high-performance manufacturing process, though other semiconductor manufacturing processes may be used. Each SM (301) preferably incorporates a number of mixed-precision processing cores (for example and without limitation, 64 FP32 cores and 32 FP64 cores) partitioned into multiple (e.g., four) processing blocks. In the example implementation described, each of the four processing blocks may be allocated 16 FP32 Cores, 8 FP64 Cores, 16 INT32 Cores, two mixed-precision Tensor Cores for deep learning matrix arithmetic, a L0 instruction cache, one warp scheduler, one dispatch unit, and a 64 KB Register File. In a preferred embodiment, SMs (301) include independent parallel integer and floating-point data paths, providing for efficient execution of workloads with a mix of computation and addressing calculations. GPU's SM preferably includes independent thread scheduling capability, enabling finer-grain synchronization and cooperation between parallel threads. Furthermore, SMs (301) preferably include a combined L1 data cache and shared memory unit, significantly improves performance while also simplifying programming.

GPU (300) preferably includes either High Bandwidth Memory ("HBM") or a 16 GB HBM2 memory subsystem, providing 900 GB/sec peak memory bandwidth. HBM HBM2 memory can be obtained from a variety of vendors. Alternatively, GDDR5 memory may be used.

In a preferred embodiment, GPU (300) includes unified memory technology, with access counters to allow more accurate migration of memory pages to the processor that accesses them most frequently, improving efficiency for memory ranges shared between processors. In one example embodiment, Address Translation Services ("ATS") support allows the GPU to access the CPU's page tables directly. When the GPU Memory Management Unit ("MMU") experiences a miss, the controller makes an Address Translation Request ("ATR") to the CPU, which looks in its page tables for the virtual-to-physical mapping for that address and supplies the translation back to the GPU. Unified memory allows a single unified virtual address space for CPU and GPU memory, simplifying GPU programming and porting of applications to GPUs.

In a preferred embodiment, an Access Counter keeps track of the frequency of access that a GPU makes to memory located on other processors. Access Counters help ensure memory pages are moved to the physical memory of the processor that is accessing the pages most frequently. The Access Counters feature can work in either NVLink- or PCIe-connected GPU-CPU or GPU-GPU architectures, and can work with different CPUs including Power 9, x86, and others.

In a preferred embodiment, the SoC includes a Level 3 cache (500), which is available to both the CPU and the GPU. The L3 cache is preferably a write-back cache which can keep track of lines in MEI states. Ideally, the L3 cache (500) is 4 MB or more, although smaller or larger cache sizes may be used. The Advanced SoC includes components that are designed for specific functionality, allowing the SoC to be faster and more power and space efficient.

In some embodiments, GPU 300 includes real time ray tracing hardware-based acceleration such as described for example in U.S. patent application Ser. No. 16/101,232 filed Aug. 10, 2018. Such tray tracing hardware acceleration can be used for example to rapidly and efficiently determine the positions and extents of objects within for example a world model as described below, real time visualization simulations, RADAR signal interpretation, sound propagation synthesis/analysis, simulation of sonar systems, general wave propagation simulation, comparison to LIDAR data for purposes e.g., of vehicle localization and other functions.

c) Hardware Acceleration Cluster.

In the preferred embodiment shown in FIG. 8 and FIG. 9, the Advanced SoC includes a Hardware Acceleration Cluster (400), which includes optimized hardware accelerators and a large on-chip memory. The large on-chip memory—in a preferred embodiment, 4 MB SRAM—allows the Hardware Acceleration Cluster (400) to accelerate neural networks and other calculations. The Hardware Acceleration Cluster (400) is available to complement the GPU and off-load some tasks from it. For example, the accelerator works for targeted workloads (perception, CNNs) that are stable enough to be amenable to acceleration and API, vs programmable. It can offload GPU to free up more GPU cycles for other work.

(1) Deep Learning Accelerator.

In a preferred embodiment, the Hardware Acceleration Cluster (400) includes one or more Tensor Processing Units ("TPUs") (401) (TPU0 and TPU1) providing an additional 10 Trillion Operations Per Second ("TOPs") for Deep Learning applications and inferencing. The TPUs (401) are preferably based on NVIDIA's NVDLA Deep Learning Accelerator design. The TPUs (401) are accelerators to perform the image processing functions (CNN or RCNN networks); they are optimized for those tasks but may not be as efficient for other Deep Learning ("DL") functions (e.g. recurrent neural network ("RNN") for audio). DLA is optimized for a specific set of networks and floating-point operations. In addition, DLA is designed and optimized for inferencing. Thus, the design provides more performance per millimeter than a general-purpose GPU, and vastly exceeds the performance of a CPU. The TPUs (401) preferably perform several functions, including a single-instance convolution function (single instance), supporting INT8/INT16/FP16 data type for both features and weights, and a post-processor function.

DLA can quickly and efficiently execute neural networks, especially CNNs, on processed or unprocessed data for any of a variety of functions, including, without limitation: (1) a CNN for object identification and detection using data from camera sensors, (2) a CNN for distance estimation using data from camera sensors (72, 74), (3) a CNN for emergency vehicle detection and identification and detection using data from microphones (102), (4) a CNN for facial recognition and vehicle owner identification using data from camera sensors (72), and (5) a CNN for security and/or safety related events, as discussed more fully below in a section "Additional Examples of Self-Driving Vehicles Using The Technology", in the discussion of self-driving buses and self-driving patrol cars. As used herein and in the claims, the term "CNN" includes all types of CNNs, including region-based convolutional neural networks, (R-CNNs) and Fast R-CNNs, which may be used for object detection.

However, the DLA (401) can perform any function that the GPU (300); using an inference accelerator, the designer can target either the DLA (401) or GPU (300) for any function. As a practical matter, the DLA is limited in what it can run—it is optimized for CNNs and floating-point operations.

(2) Programmable Vision Accelerator.

Figure 10:
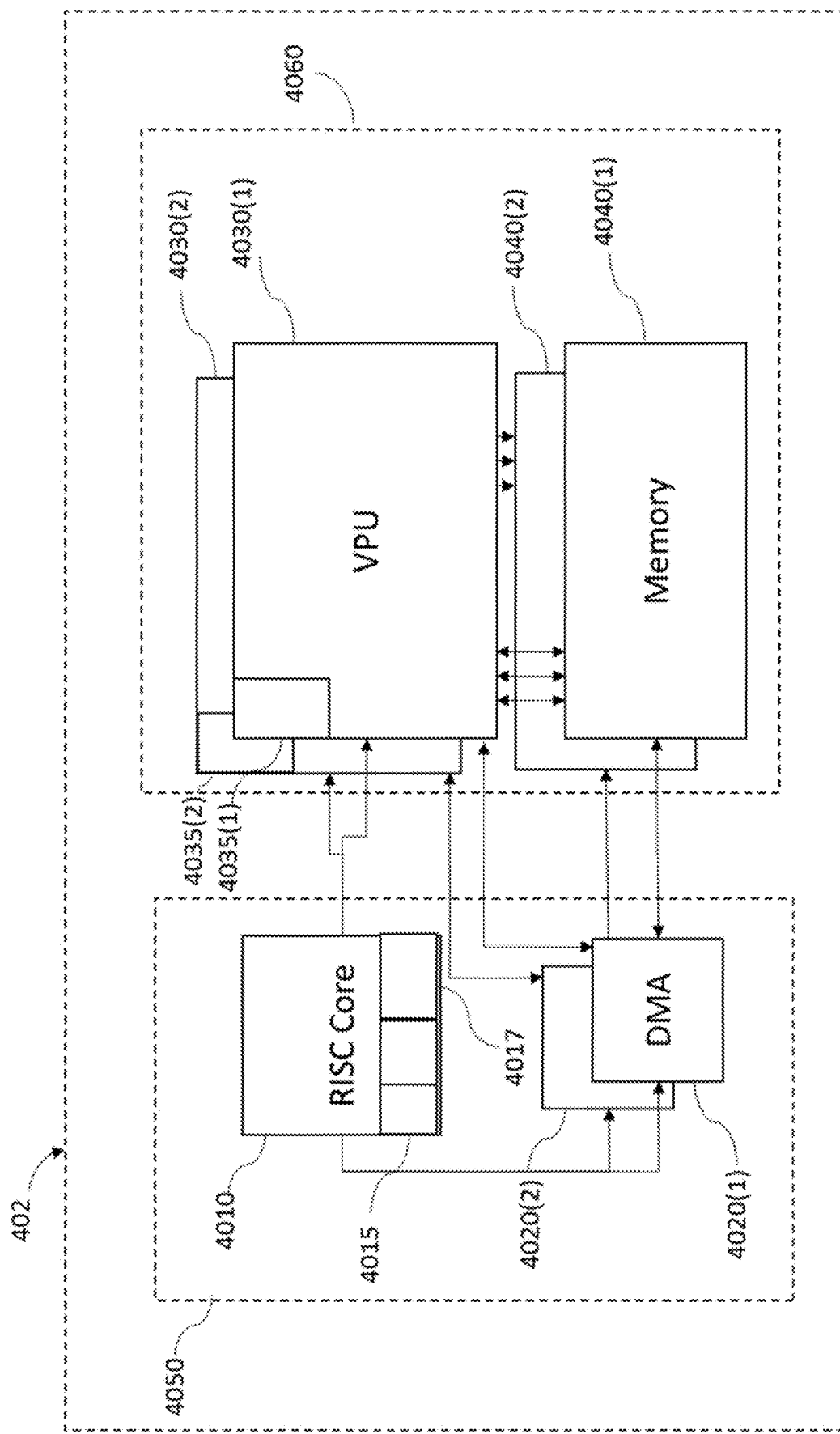
FIG. 10 is a block diagram of an example Programmable Vision Accelerator (PVA), in accordance with embodiments of the present technology.

Although the technology uses neural networks, computer vision also plays a role, for example in lane detection as well as redundant object detection at moderate distances. Thus, the SoC design preferably includes Computer Vision Accelerators (402) (VA0, VA1). The Computer Vision Accelerators (402) preferably use NVIDIA Programmable Vision Accelerator ("PVA"). The PVA is designed to accelerate computer vision ("CV") algorithms for Advanced Driver Assistance System ("ADAS"), autonomous driving, and AR/VR applications. An exemplary PVA block diagram is shown in FIG. 10.

In general, the PVAs (402) are designed to provide an optimized balance between performance and flexibility. Each of the PVAs (402) include, without limitation, any number of reduced instruction set computer ("RISC") cores (4010), a direct memory access (DMA) (4020), and any number of vector processors (4030). In some embodiments, the RISC cores (4010) also interact with image sensors, image signal processor(s), and the like. Each of the RISC cores (4010) includes, without limitation, any amount and type of memory (4017). The RISC cores (4010) may operate in any technically feasible fashion using any protocols as known in the art. For example, in some embodiments, the RISC cores (4010) execute a real-time operating system ("RTOS"). The RISC cores (4010) may be implemented using one or more integrated circuit devices, application specific integrated circuits (ASICs), or memory devices, or in any other technically feasible fashion. In one preferred embodiment, the RISC cores may equipped with instruction cache (4015) and tightly coupled RAM (4017).

The DMA (4020) enables components included in the PVA system (402) to access the system memory independently of the CPU Complex (200). The DMA (4020) may include any number of other features that further optimize the performance of the PVA (402). In various embodiments, the DMA (4020) supports multi-dimensional addressing and/or circular addressing. More specifically, in some embodiments, the DMA (4020) supports as many as six dimensions of addressing. The six dimensions may include, for example, block width, block height, block depth, horizontal block stepping, vertical block stepping, and depth stepping.

The vector processors (4030) are programmable processors that are designed to efficiently and flexibly execute programming common computer vision algorithms and provide generic signal processing capabilities. In a preferred embodiment, the PVA includes a PVA core ("PVAC") (4050) and two Vector Processing Subsystem ("VPS") partitions (4060). PVAC (4050) preferably includes a processor subsystem (4010), two DMA engines (4020), and other peripherals. VPS (4060) is the main processing engine in PVA, and includes Vector Processing Unit ("VPU") (4030), its instruction cache (I-cache) (4035), and vector memory ("VMEM") (4040). The VPU core (4030) is preferably a DSP, such as, for example, a Single Instruction, Multiple Data ("SIMD") Very Long Instruction Word ("VLIW") Digital Signal Processor ("DSP") optimized for computer vision. The combination of SIMD and VLIW architecture enhances throughput and speed.

Each of the vector processors (4030) is preferably provided with an instruction cache (4035) and is coupled to dedicated memory (4040). Consequently, in some embodiments, each of the vector processors, e.g., (4030(1)) may be configured to execute independently of the other vector processors (4040(1)). In other embodiments, the vector processors (4030) that are included in a particular PVA (402), may be configured to employ data parallelism. For example, in some embodiments, the plurality of vector processors (4030) included in a single PVA (402) may execute the same computer vision algorithm, but on different regions of an image. In other embodiments, the vector processors (4030) included in a particular PVA (402) may simultaneously execute different computer vision algorithms, on the same image, or even execute different algorithms on sequential images or portions of an image. Among other things, any number of PVAs (402) may be included in the Hardware Acceleration Cluster (400), and any number of vector processors (4030) may be included in each of the PVAs (402). In addition, the PVA preferably includes additional ECC, to enhance overall system safety.

(3) Memory.

Figure 11:
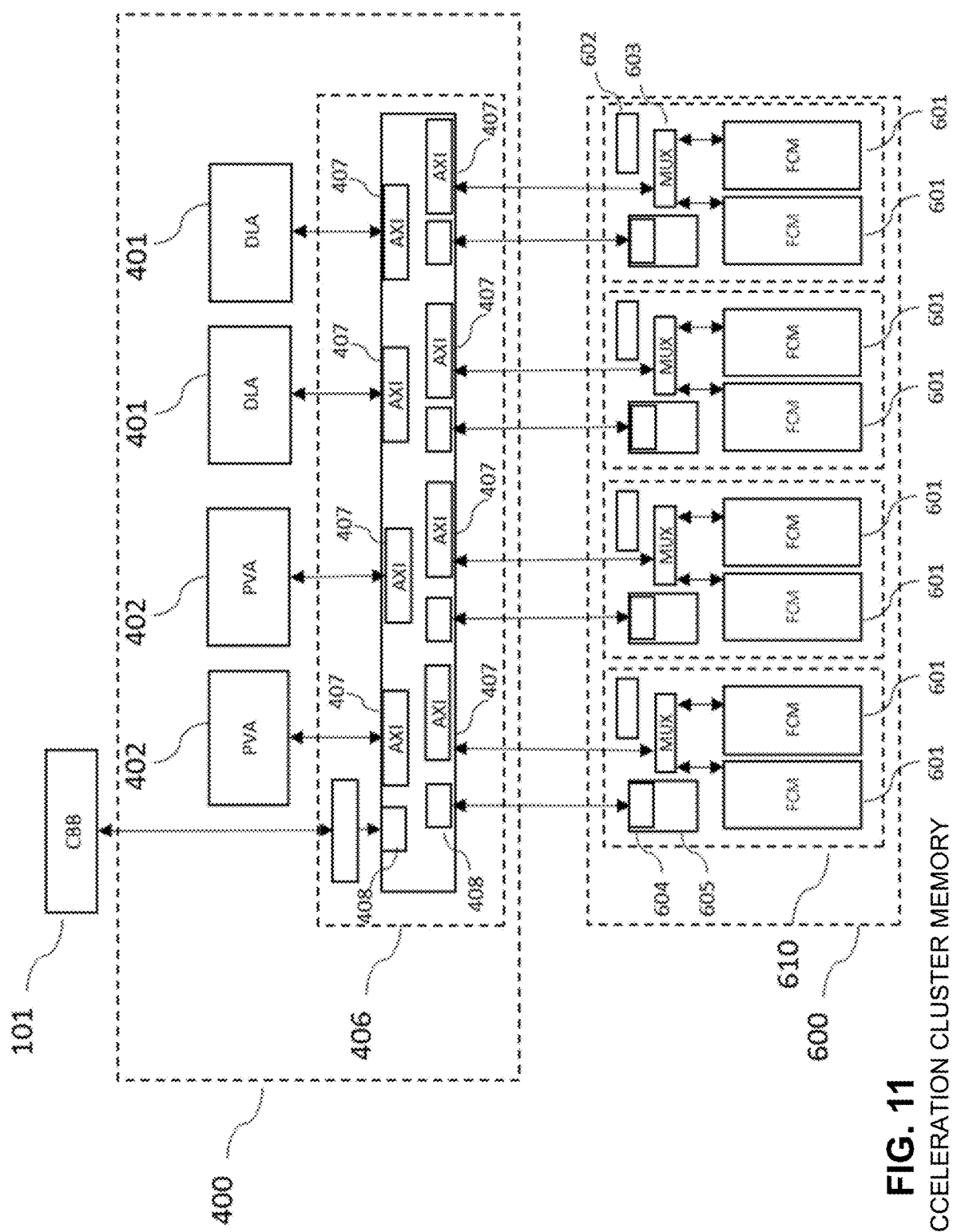
FIG. 11 is a diagram of an example Hardware Acceleration Cluster Memory architecture, in accordance with embodiments of the present technology.

The Hardware Acceleration Cluster preferably includes both the PVA and DLA, which are masters with high memory bandwidth demand. As shown in FIG. 11, the Advanced SoC preferably includes a Computer Vision Network-on-Chip and SRAM ("CVNAS"), for providing a high-bandwidth, low-latency SRAM for the Hardware Acceleration Cluster. In a preferred embodiment, the on-chip memory comprises at least 4 MB SRAM, consisting of (for example and without limitation) eight Field-Configurable Memory ("FCM") blocks (601), accessible by both the PLA and DLA.

Each pair of memory blocks preferably includes an Advanced Peripheral Bus ("APB") interface (604), configuration circuitry (605), Controller (602), and MUX (603). Any type of memory may suffice. The PVA and DLA masters preferably access the memory through a backbone (406) that provides the masters with reliable, high-speed access to memory. In one embodiment, the backbone is a Computer Vision Network-on-Chip ("CVNOC"), that interconnects masters to the memory. The CVNOC preferably uses APB (408) to connect the CVSRAM (600) to the PVA (402) and DLA (401) masters.

The CVNOC also preferably an interface that provides that before transmission of any control signal/address/data, both master (either the PVA or DLA) and slave (CVSRAM) must provide via ready and valid signals. Such an interface provides for separate phases and separate channels for transmitting control signal/address and data, as well as burst-type communications for continuous data transfer. Example implementations incorporate reliability and functional safety features required to meet automotive ISO 26262 or IEC 61508 standards; other interconnect standards and protocols may also be used.

(4) Exemplary Uses of Hardware Accelerator.

The hardware accelerator (400) and associated memory (600) have a wide array of uses for autonomous driving. As set forth above and stated broadly, the PVA (402) is a programmable vision accelerator that can be used for key processing stages in ADAS and autonomous vehicles. The PVA's capabilities are a good match for algorithmic domains needing predictable processing, at low power and low latency. Stated differently, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform Computer Stereo Vision. Semi-global matching ("SGM")-based algorithm may be used, along with other approaches known to persons of skill in the field. Many applications for Level 3-5 autonomous driving require motion estimation/stereo matching on-the-fly, for example SFM (structure from motion), pedestrian recognition, lane detection. The PVA may perform Computer Stereo Vision function on inputs from two monocular cameras.

According to another embodiment of the technology, the PVA is used to perform Dense Optical Flow. According to another embodiment of the technology, the PVA is used to process Raw RADAR data, using for example a 4D Fast Fourier Transform ("FFT"), to provide Processed RADAR.

According to another embodiment of the technology, the PVA is used for Time of Flight ("ToF") Depth Processing, by processing Raw ToF data to provide Processed ToF data, for example. ToF systems have been used in RADAR and LIDAR applications and are known to persons of ordinary skill in the field. A typical ToF system sends a signal and measures a property of the signal returned from the target. The measurement is used to determine the time of flight, and the distance is obtained by multiplying the velocity of the signal by the time of flight. For example, a ToF sensor may comprise a laser light source, and an array of pixels, each capable of detecting the phase of the incoming light. The transmitter modulates the light, and the distance is measured by determining the phase of the modulation envelop of the reflected light.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system can set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA can run a neural network for regressing the confidence value. The neural network can take as its input at least some subset of parameters, such as (1) bounding box dimensions, (2) ground plane estimate obtained e.g. from another subsystem, (3) inertial measurement unit (IMU) output that correlates with the ego-vehicle orientation, (4) distance or 3D location estimates of the object obtained from the neural network and/or other sensors, such as LIDAR or RADAR, among others.

One implementation could be a multi-layer perceptron ("MLP") comprising one or more hidden layers. During training, false positives are assigned a label '0' while true positives are assigned a label '1' for the confidence. This way, the network output can be compared against the ground truth labels, an error term can be computed, and the back-propagation algorithm can be used to adjust the weights of the network. The training is typically performed offline during the design phase of the object detector. When the detector is deployed and used, only the forward pass is run. In example non-limiting embodiments, the clustered bounding boxes are first computed. Then, the network inputs are computed based on the clustered bounding boxes and other inputs. Example inputs can be, without limitation, related to the inertial measurement unit, distance estimation, statistics computed on the input pixels within the object detection, etc. The inputs are fed into the network which is now loaded with the weights obtained during the training phase. During the forward pass, the network computes the confidence output using the pre-trained network using pre-loaded weights.

The PVA design shown in FIG. 10 is not limiting, and a variety of other designs may be used for the PVA to achieve many of the objects of the technology. For example, the Computer Vision Accelerators (402) may be implemented as described in "PROGRAMMABLE VISION ACCELERATOR", U.S. patent application Ser. No. 15/141,703 filed Apr. 28, 2016, incorporated fully by reference herein.

d) System Coherency Fabric and On-Chip Memory.

As illustrated in FIG. 8, the platform includes dedicated memory for each processor subsystem, reducing pressure on DDR, and requiring lower power. Advanced SoC includes on-chip memory (500) and (600), which in a preferred embodiment stores the neural networks executed on the GPU (300) and DLA (400), respectively. In a preferred embodiment, memory (500) and (600) are large enough to store multiple instances of the neural networks, to ensure safety and redundancy.

In a further preferred embodiment, the Advanced SoC is configured to receive and store an updated neural network through the wireless antenna and modem (101), even while self-driving vehicle (50) is in operation. For example, the deep learning infrastructure may update a neural network for improved recognition of traffic signs or other obstructions and transmit the updated network (1001) to the vehicle (50) over a wireless link, as illustrated in FIG. 6. Even though vehicle (50) is in active operation, the technology allows the updated neural network to be received, downloaded, and verified by the Advanced SoC, ensuring that safety-critical updates are received as quickly as possible in over-the-air ("OTA") updates. When the updated neural network has been downloaded fully and verified, the Advanced SoC transitions and uses the updated version of the neural network.

The System Coherency Fabric ("SCF") (714) connects the coherent clients, namely the CPU clusters (201) and additional embedded processors ((702)-(705)), to DRAM and MMIO space. The SCF also implements a coherency-cache-flush engine which facilitates software-based coherency with the non-coherent clients in the system. There are two variants of flushes—one which cleans all L2 and L3 caches in the system and writes back dirty data to memory and another which invalidates all cache lines resident in the CPU L2+L3 caches before the flush was initiated. The CPUs do not have to be quiesced while the flush is in progress.

The Advanced SoC's system fabric preferably uses a Peripheral Bus (710), such as a defined simple 32-bit single master bus for peripheral devices.

e) Additional Embedded Processors.

(1) Boot and Power Management.

The Advanced SoC preferably includes a Boot and Power Management Processor ("BPMP") (703). The BPMP preferably is a dedicated processor and subsystem to handle boot and power management functions and related security enforcement. BPMP (703) is part of SoC boot sequence. provides runtime power management services. The BPMP runs after initial boot—i.e., after the boot ROM and bootloader have finished. At a high level, the main services provided by the BPMP (703) are: (1) SoC clock and voltage programming, (2) Assist in system low power state transitions (SC states, including Deep Sleep (SC7) entry and exit), (3) manage SoC thermals and temperature sensors, and (4) manage SoC power states. The BPMP runtime firmware is operating system, platform, board, and boot loader agnostic.

(2) Temperature Sensor and Control.

In a preferred embodiment, each temperature sensor can be implemented as a ring-oscillator whose output frequency is proportional to temperature. The Advanced SoC preferably includes ring-oscillators to detect CPU group temperature, GPU group temperature, and Acceleration cluster temperature, and report to BPMP. If BPMP detects that the temperature of CPU, GPU, or Acceleration cluster exceeds a threshold for safe operation, the BPMP executes a temperature fault routine, in which the Advanced SoC first seeks to enter into a lower power state if possible, and, if necessary, enters into "Chauffeur to Safe Stop" mode.

(3) Audio Processing Engine.

The Advanced SoC preferably includes a set of embedded processors, including Audio Processing Engine ("APE") (701). The APE is an audio subsystem that enables full hardware support for multi-channel audio over multiple interfaces, and a broad and flexible range of audio I/O interfaces. The APE is preferably a dedicated processor core with a digital signal processor ("DSP") with dedicated RAM.

(4) Always-On Sensor Processing Engine.

The Advanced SoC preferably includes an Always-On Sensor Processing Engine ("AON"/"SPE") (702). The AON Engine (702) provides all the necessary hardware features to support low power sensor management and wake use cases. The Engine (702) preferably consists of a processor core with a tightly coupled RAM, supporting peripherals (such as timers and an interrupt controller), various I/O controller peripherals, and routing logic. The processor in the AON block is also referred to as the Sensor Processing Engine ("SPE"). It is a low active power processor in an always-on power domain. Although it is referred to as an "always on" engine, it can be placed in a complete shutdown mode, though in normal use, the engine will remain in a low active power, always-on state.

(5) Safety Cluster Engine and Real-time Camera Engine.

The SoC preferably includes a Safety Cluster Engine ("SCE") (704), a dedicated processor subsystem to handle safety management for automotive applications. In a preferred embodiment, SCE (704) consists of two or more processor cores with a tightly coupled RAM, support peripherals (e.g., timers, an interrupt controller), and routing logic. In safety mode, the two cores operate in lockstep mode and function as a single core with comparison logic to detect any differences between their operations. In certain embodiments, the SoC preferably includes a Real-time Camera Engine ("RCE") (705). In a preferred embodiment, the RCE comprises a dedicated processor subsystem to handle real-time camera management.

(6) High-Dynamic Range Image Signal Processor.

As illustrated in FIG. 8, the Advanced SoC preferably includes a High-Dynamic Range Image Signal Processor ("HDR ISP") 403. The Advanced SoC further preferably includes Image Signal Processor (712), a hardware engine that is part of the camera processing pipeline.

(7) Video Image Compositor.

The Advanced SoC preferably includes a Video Image Compositor ("VIC") (706), a block that implements video post-processing functions needed by a video playback application to produce the final image for the player window. In a preferred embodiment, the VIC performs lens distortion correction ("LDC") on fisheye and wide-view camera sensors (201)-(205) and also on optional In-cabin monitoring camera sensor. In-cabin monitoring camera sensor is preferably monitored by a neural network running on another instance of the Advanced SoC, configured to identify in cabin events and respond accordingly. The in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The VIC preferably also includes Enhanced Temporal Noise Reduction ("TNR"). Noise reduction typically includes both spatial and temporal noise reduction. Where motion occurs in a video, the noise reduction weights spatial information appropriately, decreasing the weight of information provided by adjacent frames. Where an image or portion of an image does not include motion, the temporal noise reduction performed by the VIC uses information from the previous image to reduce noise in the current image.

The VIC is also able to perform stereo rectification on input stereo lens frames, such as sensor pairs 1-2, 8-9, and 10-11. In addition, the VIC can be used for UI composition when the operating system desktop is in use, and the GPU is not required to continuously render new surfaces. Even when the GPU is powered on and active doing 3D rendering, VIC can be used to offload the GPU to improve performance and responsiveness. The VIC (706) is preferably implemented using a Microcontroller.

(8) Input/Output.

The Advanced SoC receives input from cameras and video through the MIPI Camera Serial Interface (713), a standard high-speed serial interface, and the Video Input block (VI) (713), the block used for camera and related pixel input functions. The Advanced SoC preferably includes General Purpose Input/Output Controller (711), for an I/O signal uncommitted to a specific role and controlled by software.

In preferred embodiments, the Advanced SoC has a broad range of peripheral interfaces to enable communication with peripherals, audio codecs, power management, and other devices. The SoC may be used to process data from cameras (connected over Gigabit Multimedia Serial Link ("GMSL") and Ethernet ("GbE"), sensors (LIDAR, RADAR connected over Ethernet), data from CAN interfaces (such as speed of car, steering wheel position), data from GPS (connected over Ethernet or CAN). Dedicated high-performance mass storage controllers, with their own DMA engines, can be used to free the CPU Complex (200) from routine data management tasks.

f) Some Example Non-Limiting Advantages of the Advanced System-on-a-Chip Over Other Systems and Methods.

The Advanced-System-on-a-Chip enables an end-to-end platform with one flexible architecture that spans Level 3-5—a comprehensive functional safety architecture that leverages and makes efficient use of computer vision and ADAS techniques for diversity and redundancy, provides a platform for a flexible, reliable driving software stack, along with deep learning tools. The Advanced SoC is faster, more reliable, and even more energy-efficient and space-efficient than prior art systems and methods. For example, the Hardware Acceleration Cluster, when combined with the CPU Complex, GPU Complex, and memory, provides for a fast, efficient platform for Level 3-5 autonomous vehicles. The technology thus provides capabilities and functionality that cannot be achieved by prior art methods and systems. For example, CV algorithms can be executed on CPUs, which can be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

By providing a CPU Complex, GPU Complex, and Hardware Acceleration Cluster, the technology allows for multiple neural networks to be performed simultaneously or sequentially, and for the results to be combined together to enable Level 3-5 autonomous driving functionality. For example, in a preferred embodiment, the CNN executing on DLA or dGPU may include a text and word recognition, allowing the supercomputer to read and understand traffic signs, including signs for which the neural network has not been specifically trained. For example, a sign may include the following information: "NO Parking, 4 PM-7 PM, MON thru FRI" with an arrow indicating the area in which parking is prohibited. The DLA may include a neural network that is able to identify, interpret, and provides semantic understanding of the sign, and passes that semantic understanding to the path planning modules running on the CPU Complex.

Figure 12:
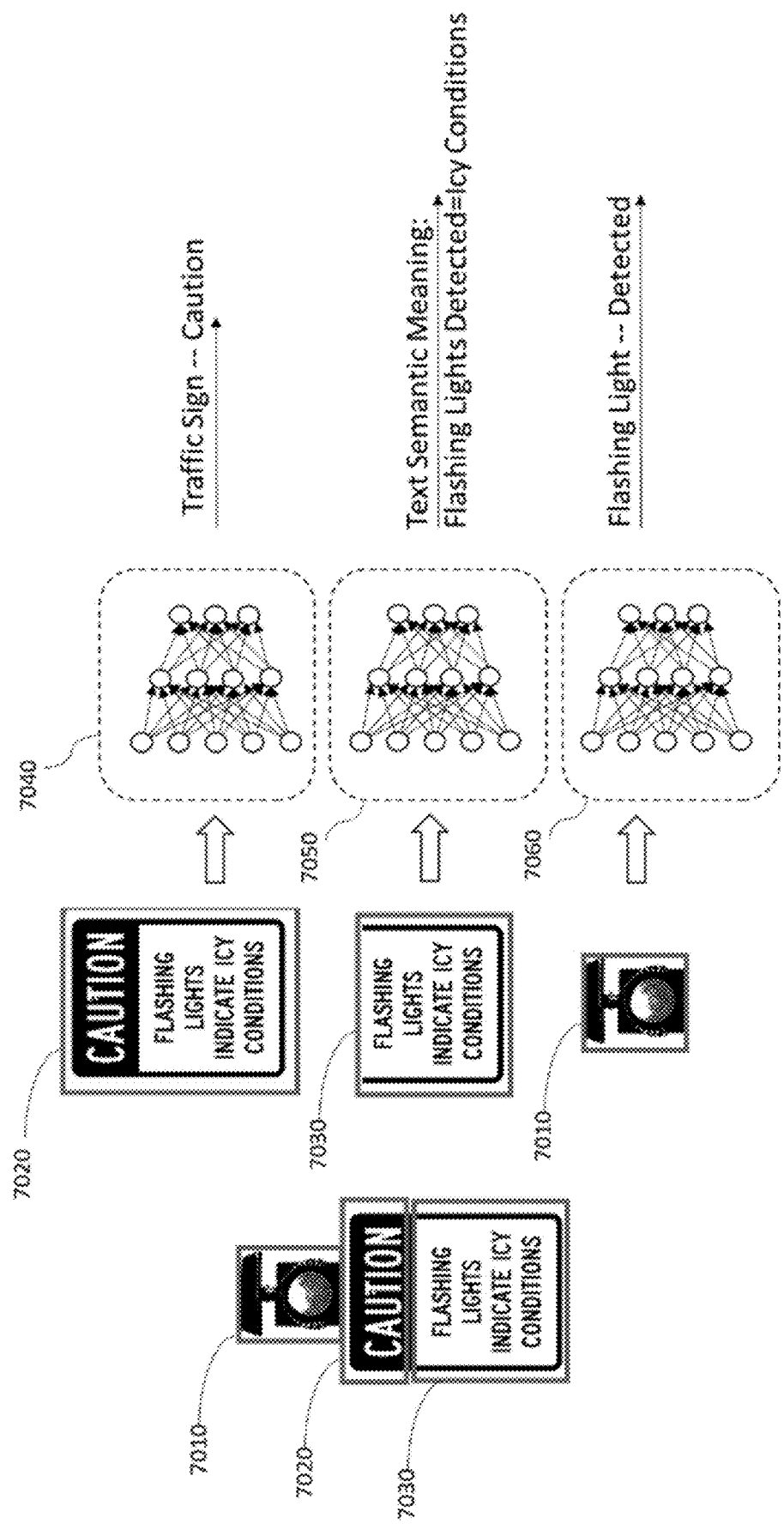
FIG. 12 is a diagram depicting an example configuration of multiple Neural Networks running on a Deep Learning Accelerator (DLA) to interpret traffic signals, in accordance with embodiments of the present technology.

The technology provides a platform for an autonomous vehicle to run multiple neural networks, as is required for Level 3, 4, or 5 driving. For example, a warning sign consisting of "CAUTION Flashing lights indicate icy conditions", along with an electric light, may be independently or collectively interpreted by several neural networks, as illustrated in FIG. 12. The sign itself (7020) may be identified as a traffic sign by a first trained neural network (7040). The text "Flashing lights indicate icy conditions" (7030) may be interpreted by a second neural network (7050), which informs the vehicle's path planning software (preferably executing on the CPU Complex) that when flashing lights are detected, icy conditions exist. The flashing light (7010) may be identified by operating a third neural network (7060) over multiple frames, informing the vehicle's path-planning software of the presence (or absence) of flashing lights. All three neural networks may run within the DLA (400), or some of the networks may run on the GPU (300).

In a preferred embodiment, the CNN for facial recognition and vehicle owner identification using data from camera sensors is used to identify the presence of an authorized driver and/or owner of the vehicle (50). The System-on-a-Chip's Always-On Sensor Processing Engine ("AON"/"SPE") (702) may be used to unlock the vehicle when the owner approaches the driver door and turn on the lights, and, in security mode, to disable the vehicle when the owner leaves the vehicle. In this way, the CNN and AON/SPE provide for security against theft and/or carjacking.

In another preferred embodiment, a CNN for emergency vehicle detection and identification and detection using data from microphones detects and identifies emergency vehicle sirens. In the prior art, environmental sounds such as sirens are often detected using general classifiers and manually extracting features. The preferred embodiment exploits the ability of a CNN to be used for classifying environmental and urban sounds, as well as classifying visual data. In a preferred embodiment, the CNN running on the DLA is trained to identify the relative closing speed of the emergency vehicle, taking advantage of the Doppler effect. The CNN can also be trained to identify emergency vehicles specific to the local area in which the vehicle is operating, as identified by GPS sensor, (76). Thus, for example, when operating in Europe the CNN will seek to detect European sirens, and when in the United States the CNN will seek to identify only North American sirens. In a preferred embodiment, CNN identifies the presence of emergency siren and the relative closing speed, taking advantage of the Doppler effect, and provides a signal to a control program running on CPU (200). Control program then executes an emergency vehicle safety routine, slowing the vehicle (50), pulling over to the side of the road, parking the vehicle, and idling the vehicle, with the assistance of ultrasonic sensors (66) until the emergency vehicle(s) passes.

3. First Embodiment Using an Advanced SoC

Figure 13:
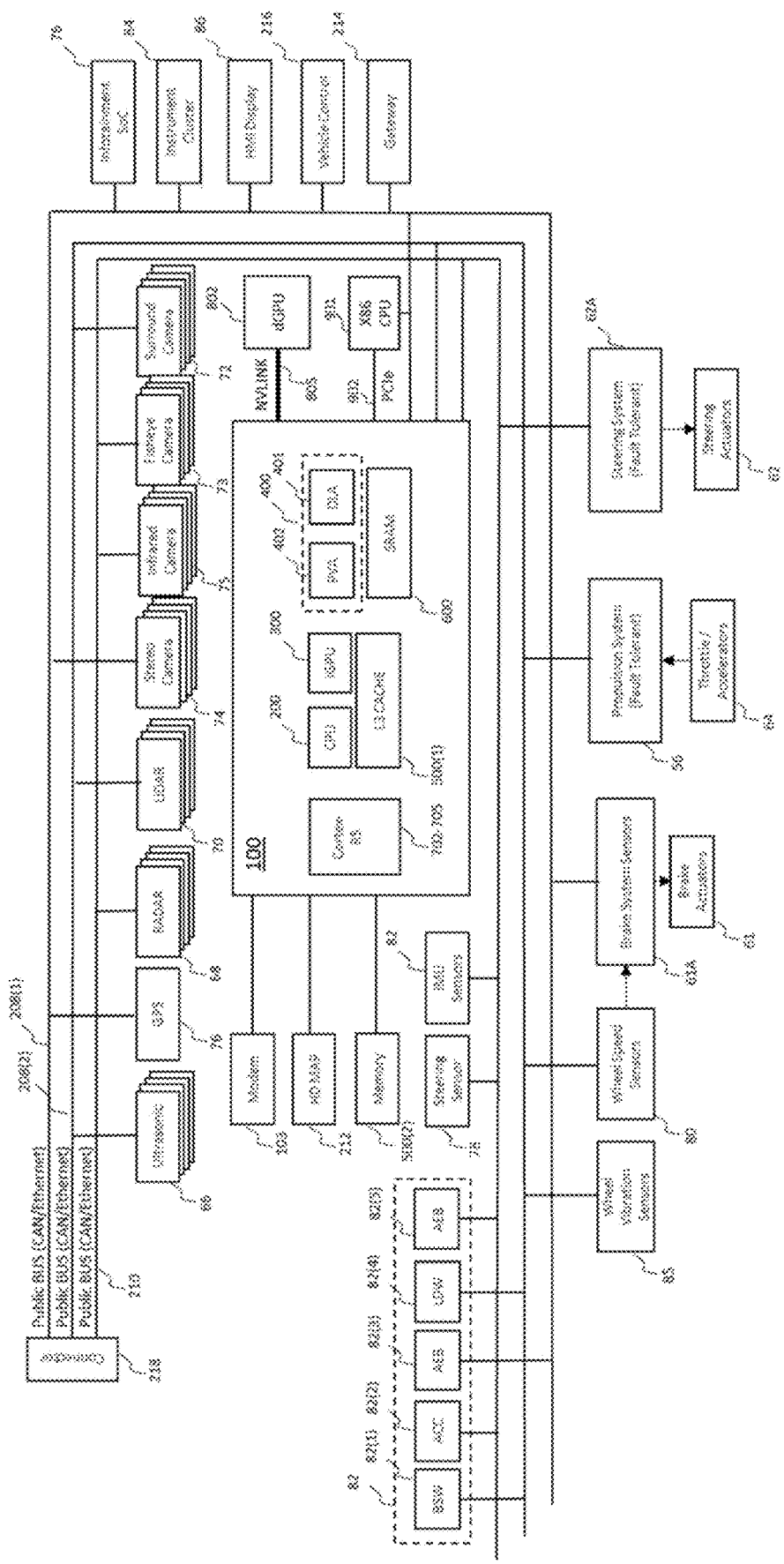
FIG. 13 is a system diagram of an example advanced SoC architecture for controlling an autonomous vehicle, in accordance with embodiments of the present technology.

One or more Advanced SoC (100) can be used to control an autonomous vehicle in a variety of platforms and systems. In a first exemplary embodiment, shown in FIG. 13, one or more Advanced SoC (100) is combined in a system with HD Map system (212) which may obtain map refreshes/updates from the cloud via gateway (214) or modem (103) and e.g., a wireless transceiver of the type described above in the section above entitled "Wireless Connectivity and Network Access".

Vehicle control (216) (e.g., turn on/off headlights, turn on/off windshield wipers, etc.) as well as other functions may also be provided by actuator controllers known in the art, including those described above in the section above entitled "Example Autonomous Vehicle. Connectors (218) provide access by other equipment for expansion and/or debugging.

The system includes one or more of the sensors described inthe section above entitled "Example Autonomous Vehicle, including ultrasonic sensors (66), GPS (76), RADAR (68), LIDAR (70), stereo cameras (74), fisheye or wide-view cameras (73), infrared cameras (75), and surround cameras (72), positioned to provide 360-degree coverage around the vehicle.

The system further includes both on-chip storage (500(1)) and off-chip storage (500(2)), which may be comprised of one or more storage elements including RAM, SRAM, DRAM, VRAM, Flash, hard disks, and other components and devices that can store at least one bit of data. On-chip storage (500(1)), may be comprise L2 or L3 caches for use with the CPU (200) and/or the GPU (300).

Advanced SoC (100) preferably includes the components described in more detail in connection with FIG. 9, including CPU complex (200), GPU complex (300), L3 Cache connected to CPU and GPU complex, Hardware Acceleration Complex (400) including a PVA (402) and DLA (401), and Additional Embedded Processors, including one or more of processors (702)-(705) as described above. The Advanced SoC (100) is connected to the various sensors and sub-systems (e.g., a fault operable/fault-tolerant braking system (61A) and a fault-operable/fault-tolerant steering system (62A)).

In one embodiment, Advanced SoC's CCPLEX (200) and one or more of the GPU complex (300), or hardware accelerators (401), (402) independently perform somewhat or entirely redundant processing. In the example non-limiting embodiments, the "redundant" functionality provided by the different processors encompasses the same overall functions, but is not exactly-identical. Rather, algorithms and software that perform the same or equivalent functions are designed and implemented differently to provide intentionally non-identical processing, while still performing essentially the same task to provide, when the system is operating correctly, essentially the same result. For example, GPU complex (300) may execute a neural network to perform object detection functionality, while hardware accelerator PVA (402) may execute a computer vision algorithm to identify the same objects. Furthermore, the inputs to the different processors may differ—in the example above, GPU complex (300) may execute a neural network to perform object detection functionality using input information from a stereo camera, while hardware accelerator PVA (402) may execute a computer vision algorithm to identify the same objects from a monocular camera or infrared camera. The system may also include one or more ADAS sub-systems (82), providing redundancy and enhancing functional safety, including BSW, ACC, AEB, LDW, and AEB systems. The system may optionally include a discrete GPU, dGPU (802), coupled to the Advanced SoC through a high-speed interconnect such as, without limitation NVLINK (805). dGPU (802) can provide additional AI functionality, execute redundant or different neural networks, and even train and/or update neural networks based on input from the system's sensors. The system may also optionally include a discrete CPU (901), such as an X86 processor, connected to the Advanced SoC (100) through a high-speed interconnect such as, without limitation, PCIe (902). Discrete CPU (901) may be used to perform a variety of functions, including arbitrating potentially inconsistent results between ADAS sensors (82) and Advanced SoC (100), and/or monitoring the status and health of vehicle control (216) and infotainment system (76).

Performing the same object detection function in different and independent ways, in different and independent hardware components, enhances the ASIL safety rating of the system using the Advanced SoC and is called "ASIL Decomposition." As shown in FIG. 14, ASIL Decomposition lowers the ASIL requirement for a specific element, by providing for redundant elements in the architecture. Thus, a single function that requires ASIL D functional safety can be implemented by two redundant, independent components, for example one at ASIL C and the backup at ASIL A. The combination of the two redundant components provides each with an ASIL level less than ASIL D, provides an overall functional safety level at ASIL D. Thus, the ASIL D functional safety would be achieved by "ASIL C(D)+ASIL A(D)." ASIL Decomposition per ISO 26262, Part 9 provides the following ASIL decomposition methods:

TABLE

| ASIL before Decomposition | ASIL after Decomposition |
|---|---|
| ASIL D Requirement | ASIL C (D) Requirement + ASIL A (D) Requirement or ASIL B (D) Requirement + ASIL B (D) Requirement or ASIL D (D) Requirement + QM (D) Requirement |
| ASIL C Requirement | ASIL B (C) Requirement + ASIL A (C) Requirement or ASIL C (C) Requirement + QM (C) Requirement |
| ASIL B Requirement | ASIL A (B) Requirement + ASIL A (B) Requirement or ASIL B (B) Requirement + QM (B) Requirement |
| ASIL A Requirement | ASIL A (A) Requirement + QM (A) Requirement |

In the context of the example discussed above, if the neural network executing on the SoC's GPU (300) is rated ASIL B, and the same function performed on the PVA (402) is also rated ASIL B, the redundancy provides ASIL D safety for that function. The tasks/functions performed by accelerators (401) and (402) may, standing alone, be rated at a lower safety standard (ASIL B) whereas the processes performed by the GPU complex (300) would meet with a higher level of functional safety (e.g., ASIL C). By providing two independent paths, the Advanced SoC achieves the desired ASIL D safety standard rating, due to the redundancy that the accelerators (401) and (402) provide.

In other words, the accelerators (401), (402) together perform functions (e.g., detection of imminent collision, lane departure warning, pedestrian detection) that when combined with the autonomous driving functions performed by GPU complex (300), together provides to provide ASIL D level functional safety. Furthermore, in the event of a failure of one of the accelerators (401) or (402), combination of the functioning accelerator and the GPU complex (300) together ensures safe operation. In the event of the failure of both accelerator (401) and (402), the system returns a fault message that service is required, notifies the driver, and executes a transition routine that returns control to the driver.

As discussed above, GPU complex (300) and DLA accelerator (401) may use neural networks, including CNNs, to perform some, or all, of the high-level functions shown. The GPU complex (300) and DLA accelerator (401) may use deep neural networks and CNNs to process information from vehicle motion sensors such as the inertial sensing system and possibly other input from vehicular semi-autonomous systems (SAS) (82) or ADAS systems. PVA accelerator (402) is optimized to execute computer vision algorithms, and therefore is designed to process information received from SAS systems (82).

FIG. 15 illustrates the diverse, redundant processing that the SoC of the technology provides to enhance functional safety. First, as shown in FIG. 15, Hardware Acceleration Cluster (400) can perform redundant, diverse processing in both PVA (402) and DLA (401). PVA (402) may perform preprocessing (150), a computer vision algorithm (152), post-processing, to provide a classic computer vision function (156) such as collision detection, sign detection, object detection, lane detection, or any other computer-vision function. The Advanced SoC may offload some, or all, of these tasks to the CPU complex (200), preferably including the pre-processing function (150). Pre-processing tasks may include sensor fusion, which may be used to combine the outputs of different sensors such as by using Kalman filtering, artificial intelligence, or the like in order to learn more from a combination of sensors than is possible from any individual sensor and to increase performance (e.g., when an optical sensor is ineffective due to poor light conditions, a RADAR sensor may be used instead, or fused with the information from the optical sensor; and when the RADAR sensor is less effective due to metal drainage grates, large metal panels and/or manhole covers in the roadway, LIDAR or ultrasonics may be used instead or in addition). Such sensor fusion in this example includes diversification methods such as diversified sensor fusion software, changing the order/sequence of type of sensor data usage in fusion, and reordering/resequencing of order of execution of the runnables/sub-functions where possible. Such intentional diversification methods provide improved fault tolerance.

Second, as shown in FIG. 15, deep-learning hardware accelerator (DLA) (401) may perform preprocessing (160), inferencing on a trained neural network (162), and post-processing (164) to provide any function (166) that can be performed by a trained neural network, such as collision detection, sign detection, object detection, lane detection, or other function. DLA (401) is preferably optimized to run CNNs, but may also be used to run other neural networks. The Advanced SoC may offload some, or all, of these tasks to the CPU complex (200), preferably including the preprocessing function (150).

Third, as shown in FIG. 15, the GPU complex (300) is preferably configured to execute any number of trained neural networks, including CNNs, DNNs, and any other type of network, to perform the necessary functions for autonomous driving, including object detection, free space detection. GPU complex (300) is further configured to run trained neural networks to perform any AI function desired for vehicle control, vehicle management, or safety, including the functions of perception, planning and control. The perception function uses sensor input to produce a world model preferably comprising an occupancy grid, planning takes the world model and produces the best plan, and control takes the plan and implements it. These steps are continuously iterated.

To perform the perception and planning functions, GPU complex (300) preferably also is configured to maintain an occupancy grid (162), which tracks the autonomous vehicle (50) and or (55) and objects within a given range of autonomous vehicle, including moving objects. GPU complex (300) preferably is configured to determine a predicted occupancy grid, which predicts where objects will be, to enable the SoC (100) to determine the preferred or desired path. The Advanced SoC may offload some, or all, of these tasks to the CPU complex (200), preferably including pre-processing functions. The CPU complex may receive the results from the DLA (401), PVA (402), and iGPU (300), compare and evaluate the results, and control the vehicle accordingly.

According to one or more embodiments, the Advanced SoC (100) may perform more than three diverse, redundant processing tasks to ensure functional safety, and may use information from a variety of sensors, including ADAS systems, in controlling the vehicle. For example, in a preferred embodiment, DLA (401) may run a neural network trained to identify the presence of road conditions including rain, snow, ice, or black ice. When such road condition is identified, the DLA (401) notifies the CPLEX, GPU, and/or safety cluster engine of the condition, so that the path-planning and control routines may take the condition into account. In addition, CPU complex (200) may execute a known algorithm for determining slippery roads, as discussed above for example in the section herein entitled "Additional Sensors and Systems". In such an embodiment, CPU Complex (200) receives the a first angular velocity of at least one power-driven axle, and a second angular velocity of at least one freely rotating axle from wheel speed sensors (80). CPU Complex compares the first angular velocity and second angular velocity to determine the level of friction on the road surface—the more slippery the road, the greater the difference between the angular velocities. A sudden change in the relative angular velocities indicates that the vehicle has encountered a slippery surface, such as ice or oil. CPU Complex may further receive information regarding the vibrations of the axles from vibration sensors (85). A difference in vibration between the power-driven axle and a freely rotating axle indicates slippage at the road surface; sudden changes in the relative vibrations indicate that the road surface has changed. The results of the slippery road detection may be used to train and/or enhance a neural network that is designed to detect slippery road conditions.

In certain embodiments, Advanced SoC executes a software stack from NVIDIA, which provides functions including perception, planning, and control.

4. Embodiments Using Multiple Computers

FIG. 15 illustrates an embodiment with a single Advanced SoC (100). Of course, vehicle (50) typically includes additional processors, ASICs, and SoCs controlling other essential and desired functions (e.g., brake actuation, electronic ignition, climate control, infotainment system, GPS, RADAR and LIDAR processing, etc.). The vehicle's functional safety may be enhanced by using a monitor/actuator architecture and redundancy. A monitor/actuator architecture would perform the primary function using one module (the actuator) monitor that actuator with an independent monitoring module. If the actuator malfunctions, the monitor module enters a fail-safe mode, overriding the actuator.

In another embodiment, the Advanced SoC may be integrated in a platform with a previous generation SoC, to provide redundant and fail-safe functionality, as shown in FIG. 16. In this example, Platform (1100) includes an Advanced SoC (100) which preferably includes the components described in more detail in connection with FIG. 9, including CPU complex (200), GPU complex (300), L3 Cache connected to CPU and GPU complex, accelerators (400) including a PVA (402) and DLA (401), and Cortex R5 processors (702)-(705) as described above. Platform (1100) also includes SoC (200). Advanced SoC (100) and SoC (200) may be connected to a discrete graphics processing unit (dGPU) (802), respectively (e.g., NVIDIA's Pascal, Volta, or later generation GPU).

In the example shown in FIG. 16, the third SoC (803) may comprise a microprocessor, including a Lock-Step ("LS") Tricore (324) and two non-LS TriCores (325). The third SoC (803) may include a safety management unit ("SMU") (318), and bus interfaces (320), (322). As is well known, lockstep systems are fault-tolerant computer systems that run the same set of operations at the same time in parallel; the redundancy allows error detection and error correction since the output from lockstep operations can be compared to determine if there has been a fault and potentially corrected with error correction techniques.

Each of SoCs (100), (200), and (803) may be connected to power management integrated circuits ("PMIC") (326) to provide independent power management. In an example non-limiting embodiment, each one of the SoCs (100), (200), and (803) can be provided with independent power supplies and associated mechanisms. The different power providing mechanisms for the different processors could be differently designed to provide additional coverage on a systematic level. In some embodiments, there will be three independent power supplies—one for each of the three independently-functioning processors. In other embodiments, there will be at least two independent power supplies, with power supplied for one processor being different that the power supplied for the other two processors.

In a preferred embodiment, a plurality of the Advanced SoCs shown in FIG. 8 and FIG. 9 are included in an overall system platform (800) for autonomous vehicles, shown in schematic form in FIG. 17. FIG. 17 shows two Advanced SoCs (100) connected by a high-speed interconnect (805) to discrete GPUs. The high-speed interconnect (805) is preferably NVIDIA's NVLINK technology.

As illustrated in FIG. 17, the Advanced SoCs (100) are each connected to a Microcontroller ("MCU") (803). MCU may comprise an SoC, stand-alone ASIC, or other processor. Commercially-available MCUs include microcontrollers. In a typical embodiment, the MCU is designed for an ASIL D functional safety level.

The MCU (803) operates as a master controller for the system. It can reset the two Advanced SoCs (100), switch the display between the two Advanced SoCs, and control the camera power. The MCU and the Advanced SoCs are connected through a PCIE Switch (804).

As illustrated in FIG. 17, the Advanced SoCs (100) are capable of Chip-to-Chip ("C2C") communication. Such communication may be either through PCIE Switch (804) or direct, through a secure message layer connecting two distinct Advanced SoCs. The Advanced SoCs may be paired with each other directly through the high-speed NVLINK. When configured for C2C communication, the system of two Advanced SoCs functions to some extent as if it were a single unified system. When configured for C2C communication, each Advanced SoC can address the other Advanced SoC's DRAM and SysRAM.

In addition, in the preferred embodiment illustrated in FIG. 17, each of the Advanced SoCs (100) are paired with a discrete GPU (dGPU) (802). The system is thus able to use a single computer for an autonomous self-driving system, with redundancy provided through the independence of redundant computation on the plurality of Advanced SoCs. In example non-limiting embodiments, much of the functionality required to provide autonomous operation is duplicated in software or firmware between the different processors. Thus, in some implementations, similar algorithms are run in both Advanced SoCs, or even in all four processors, including the SoCs and dGPUs. In either case, all relevant inputs gathered by sensors are fed into each of the processors. Each of the processors may independently process the sensor data, and independently provides actuation information and/or control signals that may be used to control the vehicle actuators. MCU (803) receives the actuation information and/or control signals from the processors and evaluates them for consistency. In a typical embodiment, the dGPU has an ASIL B functional safety level.

If one of the Advanced SoCs fails for any reason, the other Advanced SoC(s) continues to operate. Because the Advanced SoCs are performing operations that are redundant to the operations that would have been performed by the failed Advanced SoC, autonomy and its associated critical functions can still be maintained when any one of the processors fails.

In some example non-limiting implementations, both Advanced SoCs receive the same inputs or at least have access to the same inputs. For example, both Advanced SoCs may be connected to a common bus such as the CAN bus (or an arrangement of multiple redundant buses) and are thereby able to access the same information. On the other hand, due to the independent processing performed by the three different processors, there is no requirement that each of the Advanced SoCs must use the same inputs that the other processor(s) are using to calculate a result. For example, in one possible implementation, a first Advanced SoC may make decisions based on RADAR input only, whereas another Advanced SoC may make similar decisions based on a fusion of both RADAR and LIDAR, or based on input from a stereo camera. In another possible implementation, the Advanced SoCs may each receive RADAR and LIDAR information.

The Advanced SoCs (100) and dGPUs (802) may use deep neural networks to perform some, or all, of the high-level functions necessary for autonomous vehicle control. As noted above, the GPU complex (300) in each Advanced SoC is preferably configured to execute any number of trained neural networks, including CNNs, DNNs, and any other type of network, to perform the necessary functions for autonomous driving, including (for example and without limitation) lane detection, object detection, and/or free space detection. GPU complex (300) is further configured to run trained neural networks to perform any AI function desired for vehicle control, vehicle management, or safety, including the functions of perception, planning and control. The perception function uses sensor input to produce a world model preferably comprising an occupancy grid, planning takes the world model and produces the best plan, and control takes the plan and implements it. These steps are continuously iterated.

Each Advanced SoC may offload some, or all, of these tasks to the discrete GPUs (802). The dGPUs (802) may perform redundant operation of one or more networks running on the GPU clusters on the Advanced SoCs, enhancing functional safety. Alternatively, the dGPUs (802) may run additional neural networks to perform any AI function desired for vehicle control, vehicle management, or safety. In a preferred embodiment, dGPU (802) may be used to train a network, or to run a shadow network different from the network run on GPU cluster (300), providing further functional safety.

In the example shown, components (100), (802), (803), are mounted to a common printed circuit board and disposed within the same enclosure or housing, thus providing a "one-box" controller solution. The one-box computer solution preferably includes a system for efficiently cooling the processors and circuit board. In one embodiment, the cooling system includes an active hybrid heat transport module adapted to be integrated with a fansink. In this embodiment, fansink includes, without limitation, one or more fans, walls, and a bottom plate. In one embodiment, system also includes a heat sink lid, which, among other things, prevents particles and other contaminants from entering the fan, and air blown from the fan from escaping the system. The Heat sink lid, together with walls and the bottom plate of fansink, define a plurality of air channels. The hybrid heat transport module comprises both a fluid channel and an air channel adapted for transporting heat. The hybrid heat transport module and the fansink may be used alone or in combination to dissipate heat from the processor.

FIG. 18 illustrates a further embodiment of the platform architecture, (900). The embodiment is identical to the embodiment shown in FIG. 17, with the addition of an X86 CPU (901), connected to the PCIE Switch (804) through a PCIE x8 Bus, (902).

FIG. 19 illustrates another embodiment of the platform architecture, (900). The embodiment is identical to the embodiment shown in FIG. 18, with the addition of a second PCIE Switch (804) that allows the X86 CPU (901) to communicate with the GPUs (802) through a PCIE x8 Bus, (902).

C. Communications Architecture

FIG. 20 shows another example system architecture 2000 that includes any number of cooperating and interconnected systems-on-a-chip (SOCs) 2002(1), 2002(2), . . . , 2002(N). In the particular, non-limiting example shown, there are one or more SOCs 2002(1), 2002(2), each of which includes a computer having a processor, cache memory, memory management circuitry, communications and interfacing circuits and other computing structures such as deep learning accelerators (DLAs). While the SOC 2002 example shown provides all such structures of a given SOC 2002 on the same substrate within the same integrated circuit packaging, other implementations are also possible. For example, each computer could be distributed across multiple integrated circuit (IC) packages and/or multiple substrates within the same package (e.g., multi-chip module or MCM).

In the particular embodiments shown, the two SOCs 2002(1), 2002(2) may be identical to one another in some applications, or different from one another in other applications. Using identical SOCs 2002 may provide programming convenience and decreased cost. Using different architectures for different SOCs 2002 may provide increased fault tolerance since it is less likely that diverse hardware will exhibit the same faults, unexpected behaviors and detailed behavioral features. In any given implementation, one set of plural SOCs 2002 could be partially or entirely identical to one another and another set of plural SOCs could be partially or entirely different from one another.

In the example shown, each SOC 2002 has an associated memory system 2004. In the example shown, SOC 2002(1) accesses a respective memory system 2004(1), and SOC 2002(2) accesses a respective memory system 2004(2). In the example shown, the memory systems 2004(1), 2004(2) are separate and independent from one another so that a fault, bottleneck, or other behavior occurring in one memory system 2004 does not impact the operation of the other memory system. In the example embodiment shown, the memory systems 2004(1), 2004(2) do not communicate with one another to provide independence, but in other embodiments they may have some communication or interaction with one another or some or all of the memory systems could be shared between the SOCs 2002.

Each memory system 2004 may comprise random access memory such as DRAM, read only memory, read/write flash memory and/or other semiconductor or other memory types. Some of the memory partitions that are part of memory system 2004 can be secure memory that stores information securely. The memory systems 2004 at least in part constitute non-transitory memory that store program instructions the associated SOC 2002 executes to perform tasks. Each memory system 2004 also stores data to be processed by the associated SOC 2002 and data produced by the SOC.

In the example shown, each SOC 2002 is interconnected with and interacts with at least one associated graphics processing unit (GPU) 2006. Thus, SOC 2002(1) is interconnected with and interacts with associated GPU 2006(1), and SOC 2002(2) is interconnected with and interacts with associated GPU 2006(2). Such arrangement provides redundancy and scalability. GPUs 2006 in one embodiment provide massively parallel streaming multiprocessor hardware computation and acceleration support for SOCs 2002. Such interconnections may be via high speed dedicated communications links 2007. Some applications may provide an SOC 2002 with no GPU, and other applications may provide an SOC 2002 with more than one GPU or with a GPU that is shared between SOCs. The plural GPUs 2006 may be partly or entirely identical to one other in some embodiments and partly or entirely different from one another in other embodiments.

In the example shown, each GPU 2006 accesses its own associated respective memory 2008. Thus, GPU 2006(1) accesses respective memory 2008(1), and GPU 2006(2) accesses respective memory 2008(2). Each GPU memory 2008 may comprise random access memory such as DRAM, read only memory, flash memory and/or other memory types. In the example shown, each GPU memory 2008 at least in part constitutes non-transitory memory that stores instructions, commands and/or configuration formats that direct or otherwise define the associated GPU 2006 to perform specified tasks. The GPU memory 2008 stores data to be processed by the associated GPU 2006 and data produced by the GPU. In the examples shown, GPU memory 2008 is separate and independent from SOC memory 2004, to provide additional fault tolerance and memory bandwidth. In other embodiments, GPUs 2006 may share some or all of their respective memory(ies) with other GPUs, SOCs 2002 and/or other components or systems.

In the example shown, SOCs 2002 communicate and interact with one or more microcontroller units (MCUs) 2003. In non-limiting examples, MCUs 2003 may comprise processors and associated memories that store instructions those processors execute. In the example shown, there may be plural microcontroller units 2003(a), 2003(b), with one or more units providing a fallback or redundancy for another or other units in case of failure. Microcontroller units 2003 in the example architecture may be used for particular purpose(s) such as e.g., fault monitoring, communications, etc.

In the example shown, some or all of GPUs 2006 may communicate with one or more additional processors 2010 in addition to an associated SOC 2002. Such additional processor(s) 2010 could be internal or external of a particular physical point location/installation of system 2000. For example, processor(s) 2010 could in some implementations be located in the cloud and communicate with GPUs 2006 via a network or other communications link. In other implementations, processor(s) 2010 may be co-located on the same board, backplane, or other structure as SOCs 2002.

Processor(s) 2010 in some example embodiments have a different architecture, instruction set and functionality than SOCs 2002, providing alternative computation platforms for applications to execute on. As one example, processor(s) 2010 may provide a first instruction set and associated architecture to provide compatibility with applications developed for that first instruction set and associated architecture, whereas SOCs 2002 may provide a second instruction set and associated architecture (different from the first instruction set and associated architecture) to provide compatibility with applications developed for that second instruction set and associated architecture—and each type of application is thus enabled to access the massively parallel multiprocessing and acceleration hardware support capabilities offered by GPUs 2006. In such implementations, different processor architectures provided by blocks 2002, 2010 can each interact with GPUs 2006.

In the example shown, SOCs 2002 communicate with one another via a switch, bus, or non-transparent bridge 2012. In the example shown, switch or bus 2012 may have its own storage(s) 2016 and may interconnect with one or more expansion connectors 2018. In the example shown, bus or switch 2012 provides communications between SOC 2002

(1) and SOC 2002(2). In the example shown, each SOC 2002 can act as a bus master. In some example embodiments, the same bus or switch 2012 also allows either or both of SOCs 2002 to communicate with one or more other devices via a port 2014 and/or expansion connector(s) 2018. For example, to provide scalability, one embodiment provides expansion of the structure shown to additional SOCs 2002 via expansion connector 2018 such that some or all of the SOCs can communicate with one another via expansion connector. Switch or bus 2012 may also interface with one or more external communications connections such as, in one particular non-limiting example, a ten (10) Gbps or other communications port 2014. In other embodiments, separate, independent, non-shared, high-speed communications links can be used to enable each of SOCs 2002 to communicate with other devices.

In one particular example, switch or bus 2012 may comprise a PCIe (PCI Express or Peripheral Component Interconnect Express) switch, although other high-speed serial, parallel, or other computer expansion bus standards such as PCI, PCI-X or AGP bus standards or future enhancements, alternatives or replacements of PCIe such as (but without limitation) NVLink, the wire-based communications protocols implemented as a serial, multi-lane, near-range communication link developed by NVIDIA Corporation, could be used instead of or in addition to.

In the example shown, SOCs 2002 can also communicate with other devices (and in some embodiments with one another) via one or more multiport switches 2020. For example, multiport switch 2020 can provide capability (e.g., through replication) to interface with any number of other devices via an Ethernet(s) 2020 or other communications link(s) or network(s). Such communications can be used for example to allow SOCs 2002 to receive data and signals from data sources like WLAN, Modem, and other communication data sources, as well from a wide range of any number of sensors on or in the vehicle such as camera sensors, LIDARs, RADARs, inertial measurement units (IMUs) and other sensors.

In the example shown, SOCs 2002 can also communicate with other devices via a further high speed or other communications link and one or more serializers, deserializers, or serializer/deserializer pairs (SerDes) 2024. SerDes pairs 2024 provide efficient conversion between parallel and serial data formats. For example, SerDes pair 2024 can be used to receive multiple high-resolution serialized video data streams from cameras, LIDARs, RADARs or other sensing systems, convert the serialized data streams to parallelized data formats, and provide the parallelized data formats to the SOCs 2002 for storage and/or processing. For example, 24 or more serial-interface cameras could be supported via SerDes pairs 2024. In some embodiments, the same parallelized streams can be provided redundantly to both of plural SOCs 2002. In other implementations, different parallelized streams can be provided to different SOCs 2002.

SOCs 2002 may also communicate with a vehicle bus 2032 via interfaces 2028 and vehicle connector 2030. In the example shown, the MCUs 2003 can also communicate directly with the vehicle bus 2032 via the interfaces 2028. Vehicle bus 2032 in one example embodiment may comprise a vehicle Controller Area Network (CAN) multi-master, message broadcast system bus 2032 such as found in many or most modern vehicles. Such a vehicle bus 2032 in some embodiments complies with the Bosch CAN standard and ISO-11898: 2003, or future versions, replacements and/or alternatives of same. Interfaces 2028 includes transceivers to communicate via such a vehicle bus 2032. Other vehicle interfaces 2028 may be employed such as RS-232, Flexray, PTP, GPIO, LIN, UART, and other.

In such architectures, the SOCs 2002 comprise an additional controller on the vehicle bus 2032, and can communicate with other controllers or actuators connected to the vehicle bus. In this way, the SOCs 2002 can—via the vehicle bus 2030—read vehicle sensor and control outputs and states, communicate with other vehicle controllers (e.g., engine control modules), and send command signals to vehicle actuators including but not limited to braking actuators, steering actuators, engine throttle actuator, other engine control actuators, transmission control actuators and other types of vehicle actuators. In the example shown, the MCUs 2003 can also communicate with the vehicle bus 2032 via the interfaces 2028.

FIG. 21 illustrates an embodiment in which multiple Advanced SoCs (100(1) and 100(2)), in a platform as illustrated in FIG. 17, FIG. 18, or FIG. 19, control an autonomous vehicle. As discussed above, the Advanced SoCs (100) and dGPUs (802) may use deep neural networks to perform some, or all, of the high-level functions necessary for autonomous vehicle control. As noted above, the GPU complex (300) in each Advanced SoC is preferably configured to execute any number of trained neural networks, including CNNs, DNNs, and any other type of network, to perform the necessary functions for autonomous driving, including object detection, free space detection. MCU (803) arbitrates in the event of inconsistent results from any of the Advanced SoCs (100(1) and 100(2)) and ADAS systems and functions (82). The system illustrated in FIG. 21 is presented without limitation; different numbers and combinations of sensors may be used within the spirit of the technology. Furthermore, the ADAS systems (82) are optional; all, some, or none of the ADAS systems and sensors may be used as part of a system for Level 3-5 autonomous driving.

FIG. 22 illustrates a further embodiment of the technology, including a complex platform intended for autonomous driving capabilities, with up to eight Advanced SoCs (100) paired with eight dGPUs (802), using another NVIDIA off-chip SoC called NVSwitch (1001).

The NVSwitch (1001) configuration uses a PCIe link (1003) from one of the Advanced SoCs (100). The eight Advanced SoCs (100) may be paired with eight dGPUs (802) through eight PCIe links (902), though alternatively, NVLINK may be used. The eight Advanced SoCs (100) and the eight dGPUs (802) are connected to NVSwitch (1001) using NVLINK connections (805). In addition, the eight Advanced SoCs (100) communicate directly with each other using the 12C bus (1002). Alternatively, the Advanced SoCs (100) may be paired with each other directly through the high-speed NVLINK. Each Advanced SoC can address the other Advanced SoC's DRAM and SysRAM.

NVSwitch (1001) is a network switch that provides point-to-point communications between various Advanced SoCs (100) and dGPUs (802) using NV Link. NV Link is a point-to-point communications protocol that provides data transfer rates greater than 20 Gbit/s. In an alternative embodiment, NV Switch (1001) may be substituted with or supplemented with one or more other switches, hubs, or other networking devices that utilize one or more communications protocols to allow communications to occur between the various Advanced SoCs (100) and dGPUs (802).

In operation, the eight Advanced SoCs may each have networks trained and focused on specific tasks like pedestrian detection, sign detection, distance estimation, lane detection, collision avoidance, current occupancy grids, predicted occupancy grid, and steering control. Alternatively, the technology allows for joint training of a single network to handle multiple tasks, such as object detection, lane detection, freespace, distance estimation.

Although the previous examples illustrate one discrete GPU (802) for each Advanced SoC (100), the SoC is designed and configured to work with any number of discrete GPUs, connected through PCIe links (902) and through NVLINK (805) and NVSWITCH SoC (1001), as illustrated in FIG. 23.

1. Additional Embodiments for Enhancing Functional Safety

FIG. 8 illustrates one embodiment of an Advanced SoC for performing the technology, and FIG. 17, FIG. 18, FIG. 19 and FIG. 19 illustrate platforms incorporating the Advanced SoC for performing the technology. Each platform may comprise a board for autonomous driving, with components (100), (802), (803) being mounted to a common printed circuit board and disposed within the same enclosure or housing, thus providing a "one-box" controller or supercomputer solution. As noted above, the supercomputer solution preferably includes a system for efficiently cooling the processors and circuit board. In one embodiment, cooling system includes an active hybrid heat transport module adapted to be integrated with a fansink. The hybrid heat transport module comprises both a fluid channel and an air channel adapted for transporting heat. The hybrid heat transport module and the fansink may be used alone or in combination to dissipate heat from the processors.

An autonomous vehicle may have a plurality of distinct supercomputers, ensuring system safety, reliability, and redundancy. For example, FIG. 24 illustrates an architecture with a plurality of computers according to one embodiment of the technology.

The system may include one or more LIDAR sensors, (300), as well as a plurality of other sensors, (400), including RADAR, Cameras, Ultrasonic, and other sensors. The LIDAR sensors, (300), and the other sensors, (400), provide inputs to the Primary Computer (On-Board Computer) (100). The plurality of other sensors, (400), also provide input to the Backup Computer (On-Board Computer) (200).

The Primary Computer (On-Board Computer) (100) and the Backup Computer (On-Board Computer) (200) may each be configured according to FIG. 17, FIG. 18, or FIG. 19. Alternatively, the Primary Computer (On-Board Computer) (100) may include one more Advanced SoCs as in FIG. 17, FIG. 18, or FIG. 19, and the Backup Computer (On-Board Computer) (200) may use an older generation of processor, or another type of processor altogether. For example, as noted above, the Backup Computer (200) may comprise a previous-generation platform.

Alternatively, the technology provides for a Secondary Computer designed and manufactured by a separate and independent entity, further enhancing diversity and functional safety. For example, in one embodiment of the technology, the Backup Computer (200) may comprise one or more ADAS systems. In such embodiments, Secondary Computer (200) may include a plurality of discrete ADAS systems, including Autonomous/adaptive/automatic cruise control ("ACC"), Forward Crash Warning ("FCW"), Auto Emergency Braking ("AEB"), Lane Departure Warning ("LDW"), Blind Spot Warning ("BSW"), Rear Cross-Traffic Warning ("RCTW"), and Slippery Road Detection, among others. In these embodiments, Secondary Computer (200) need not be in a single box and the plurality of ADAS systems comprising the computer need not be in direct communication with each other, as their function is to provide redundant execution for functional safety. Similarly, in embodiments the plurality of discrete ADAS system comprising Secondary Computer (200) may rely on different discrete sensors and processors, including CPUs, FPGAs, SoCs, and ASICs from various ADAS suppliers and/or semiconductor manufacturers. In such embodiments, the technology provides greater ASIL functional safety by combining redundant and independent subsystems of lower ASIL, such as two ASIL B subsystems, or one ASIL C subsystem and a second subsystem of ASIL A, B, or C.

In some embodiments the primary and secondary computers are not identical. Such diverse implementation and intentional asymmetry makes the overall system more fault-tolerant to faults caused by software (or software-hardware interface) functionality. For example, if there is a software bug or error in the software running on primary computer (100), and non-identical software code running on secondary computer (200) provides the same overall result but is designed and implemented differently, the system can have greater confidence that the overall result is correct and that the bug is not causing material error. Such an intentionally-divergent design reduces the chance of a single point of failure based upon a software design flaw or bug. In an alternative embodiment, the same algorithm could be used on each of the computers (100), (200) to reduce software development cost and complexity, and additional testing and verification could be used to reduce the risk that a software flaw could cause computers (100) and (200) all to fail. Intentionally-divergent software provides a corresponding hardware reduction and associated complexity management, thereby effecting increased reliability and reduced failure rates.

FIG. 26 is a further illustration of the system according to one embodiment of the technology. As shown in FIG. 26, the system includes a Primary Computer (On-Board Computer) (100) and a Secondary or Backup Computer (On-Board Computer) (200). The Primary Computer (100) receives sensor inputs from a plurality of sensors (700), which may include engine sensors (701), door and/or trunk sensors (702), weight and balance sensors (703), tire sensors and tire vibration sensors (704), brake sensors (705), steering sensors (706). Other well-known sensors may be used according to the technology to provide input to the Primary Computer (100).

Weight and balance sensors (703) can be implemented by using commercial grade, low-g acceleration sensors that precisely record the dynamics of the chassis and body. Suitable sensors include single-axis sensors. Such sensors are particularly useful for autonomous trucks and buses, discussed more fully in the section below entitled "Additional Examples of Self-Driving Vehicles Using the Technology".

The key vehicle operational status parameters under observation of the plurality of sensors (700) include: (1) forward vehicle speed, (2) vehicle heading, (3) throttle position, (4) brake activation, (5) steering angle and rates, (6) steering torque applied, (7) transmission drive-gear selection, (8) active stability control involvement (on/off), and (9) automatic emergency braking involvement (on/off), among others.

The Primary Computer (100) contains mission/primary control functions. In certain preferred embodiments, the Primary Computer (100) executes an autonomous driving software stack from NVIDIA, which provides functions including perception, planning, and control. As discussed above, Perception Module (101), takes sensor input and produces a world model, or occupancy grid, predicts the behavior of objects in that world model, produces the best plan for the driving situation, and formulates actuator commands to implement that plan. In preferred embodiments, the Perception Module (201) instructs a Rationality Module (202) regarding a rational course of action. The Perception Module (101) instructs a Driving Module (102) to perform a dynamic driving task.

In preferred embodiments, especially when Secondary Computer (200) comprises the same or similar hardware as Primary Computer (100), Secondary Computer (200) runs redundant diverse software to detect faults in perception and dynamic driving task. It also includes a Perception Module (201), which takes sensor input and produces a world model and produces the best plan for the driving situation and implements it. In embodiments where the Secondary Computer (200) comprises a plurality of ADAS systems, the Secondary Computer independently operates the plurality of ADAS systems and provides output comprises of potential warnings regarding lane departures, approaching objects, objects in blind spots, approaching rear cross-traffic, among others.

The system includes a Supervisory MCU (600), which receives input from the Primary Computer (100) the Secondary Computer (200). The Supervisory MCU (600) evaluates the input, arbitrates any conflicts, and passes commands to the actuators. The key parameters under the Supervisory MCU's control include the (1) throttle, (2) brake, (3) applied steering torque, and (4) transmission drive-gear selection.

The Supervisory MCU (600) monitors shared resources and compares results at multiple stages in pipeline; it compares the input from the Primary Computer (100) the Secondary Computer (200) to determine whether the two computers are sufficiently aligned, such that the command from the primary computer should be obeyed. The Supervisory MCU (600) executes a Safety Module, which provides a series of system limiters. The Supervisory MCU (600) provides tables and curves to limit items such as steering angle and torque as a function of speed. These curves enforce a safety relationship as a last stop gatekeeper before CAN commands are passed forward to vehicle controller.

When the results provided by the first computer and second computer different, the Supervisory MCU (600) must arbitrate between them, for example, as illustrated in FIG. 25.

Because example non-limiting embodiments provide independent processing by similar but non-identical algorithms, the actuation control results from the different processors may result in different decisions. As an example, when vehicle cameras indicate that a vehicle ahead is slowing down so that braking needs to be applied, two independent computers (100), (200) and/or processes independently processing the incoming sensor data may each determine that braking should be applied, but they may differ in the amount in their respective determinations of the amount of braking that should be applied. The two independent computers and/or processes each provide a braking command and the two independent commands are arbitrated by the peripheral braking controller (700) that is connected to receive both commands. If each of the two independently-operating computers (100), (200) or processes generate the same command (e.g., apply braking at 0.5 g), the arbitration required is simple and the braking controller will simply follow the instruction to apply braking at 0.5 g. On the other hand, if the braking controller (700) receives two different commands to provide braking, but the amount of braking differs (e.g., one controller commands 0.5 g braking, the other controller commands 0.3 g braking), the braking controller needs to arbitrate between these two different commands.

One way to arbitrate would be to apply braking at the lowest value (0.3 g for example). In another scenario, assume there is a braking threshold of 0.5 g, and one processor/process commands to apply brake and the other one does not. In one scenario, the braking module (700) may not apply any braking. In another scenario, the braking module (700) might apply braking but apply a lighter braking than was commanded by the processor that requested braking at 0.5 g (e.g., 0.3 g of braking). Another possibility is to follow the command to apply braking at the specified force of 0.5 g, but to notify the operator (see "Warning" output of FIG. 25) that the autonomous system is not at full confidence and give the driver the opportunity to take over with manual driving.

In example non-limiting embodiments, synchronization between the different processors/processes is not required. Rather, the independent operation of the different processors means that the processing and associated output generation will be only loosely synchronized. The arbitration decisions performed by the peripheral devices (700) takes this lack-of-synchronization into account when it arbitrates between different commands received from different computers or processors.

In addition, the communication buses used to communicate the commands from the processors to the peripherals may also be non-deterministically asynchronous (e.g., due to contentions and other mechanisms on the bus), which is an additional timing factor the arbitration on the peripheral devices takes into account. As an example, when a braking controller (700) receives a command from one processor, it may define a certain timing window (see FIG. 25) during which it waits to see if another processor provides a similar command before making an arbitration decision. Such a tolerance is built in to ensure that the peripheral modules are responsive to commands issued by multiple independent processors. Such time windows in the range of 10-25 milliseconds may be acceptable to account for the only loose synchronization between the different computers (100), (200) or processes. However, the timing window should be short enough that the peripheral devices (700) can still detect a timeout. If a second message arrives after the timeout period, then the peripheral device (700) detects this with its plausibility check (702) and may ignore the second command or the first command. In some embodiments, the braking module (700) could provide feedback or notification back to SoC (100) if the plausibility check indicates that one or the other of the independent control signals is the result of a fault.

In general, it is preferable that the peripheral device (700) receives redundant commands so it can arbitrate the results between two different independent processors, but the peripheral devices are also capable of actuating based only on commands from a single processor.

When both computers (100) and (200) fail, MCU provides a warning signal to driver as above. In this case, the example system does not have confidence to continue autonomous operation, so it executes a "Chauffeur to Safe Stop" command to braking module (700), steering module (62), and propulsion module (56) or requests the driver to take over. Even with two computers (100) and (200) failing, the architecture maintains redundancy by executing redundant functions in both the Lock-Step (LS) and non-LS cores of MCU. Thus, the system is able to maintain safety levels, despite the faults.

As was the case in the embodiments with multiple computers discussed above in the section entitled "Embodiments Using Multiple Computers", both computers preferably have access to the same inputs, and are preferably connected to a common bus, such as the CAN bus (or an arrangement of multiple redundant buses) and are thereby able to access the same information. Furthermore, as was the case in the embodiments with multiple computers discussed above in "Embodiments Using Multiple Computers, the Primary Computer and Secondary Computer may receive and process information from different sensors, providing further redundancy and safety.

FIG. 27, illustrates an embodiment where the backup or secondary computer (200) is comprised in whole or in part of one or more ADAS system, including a Visual Computing ADAS system.

A suitable ADAS SoC is designed to be used for Lane Departure Warning ("LDW"), alerting the driver of unintended/unindicated lane departure; Forward Collision Warning ("FCW"), indicating that under the current dynamics relative to the vehicle ahead, a collision is imminent, Automatic Emergency Braking ("AEB") identifying imminent collision, Adaptive Cruise Control ("ACC"), Lane Keeping Assist ("LKA"), and Lane Centering ("LC").

When used as part of a Backup Computer (200) according to the technology, a suitable ADAS SoC (201) provides perception information to the Backup Computer Rationality Module (202). The Rationality Module (202) runs redundant diverse software on hardware components to detect faults in perception and dynamic driving task. Thereafter, the system provides the outputs from the SoC to the Supervisory MCU (600).

Thus, ASIL-D may be achieved by using the Advanced SoC of the present technology with a DRIVE PX software stack from NVIDIA for primary functionality, and a mobile processor providing redundant, fail-safe, functionality.

When the outputs from the primary computer (100) and secondary computer (200) conflict, the MCU must determine how to reconcile those outputs to ensure safe operation. As noted previously, commercial ADAS systems are prone to false positive results. When a human is driving the car, false positives may be annoying and distracting but typically not catastrophic, as ADAS alerts the human who can decide whether a safety condition truly exists and act accordingly.

In a self-driving car (50), the vehicle itself must, in the case of conflicting results, decide whether to heed the result from the primary computer (100) or the secondary computer (200). The MCU (600) in a self-driving car (50) could be configured to take the most conservative approach—i.e., to take corrective action if either the primary computer (100) or the secondary computer (200) indicated a dangerous condition. But in embodiments in which the secondary computer is an ADAS system, the conservative approach will result in false positives, which would lead to unacceptable performance and even create dangerous conditions, for example, if the vehicle brakes suddenly on a freeway or swerves to avoid an object that is not, in fact, a hazard, such as a drainage grate or manhole cover that triggers an alarm from a RADAR-based ADAS system.

In some preferred embodiments, the primary computer (100) is configured to provide the MCU with a confidence score, indicating the primary computer's confidence in the chosen result. If the confidence score exceeds a threshold, the MCU will follow the primary computer's direction, regardless of whether the secondary computer provides a conflicting or inconsistent result. Where the confidence score does not meet the threshold, and where the primary and secondary computer indicate different results, the MCU arbitrates between the computers to determine the appropriate outcome.

In preferred embodiments, the MCU (600) is configured to run a neural network that is trained and configured to determine, based on outputs from said primary computer and said secondary computer, conditions under which said secondary computer provides false alarms. Thus, in a preferred embodiment, the neural network in MCU (600) learns when the secondary computer's output can be trusted, and when it cannot. For example, when secondary computer (200) is a RADAR-based FCW ADAS system, a neural network in MCU (600) can learn when the RADAR-based ADAS system is identifying metallic objects that are not, in fact, hazards, such as a drainage grate or manhole cover that triggers an alarm from a RADAR-based ADAS system. Similarly, when secondary computer (200) is a camera-based LDW ADAS system, neural network in MCU (600) can learn to override the LDW when bicylists or pedestrians are present and a lane departure is, in fact, the safest maneuver. In embodiments that include a neural network running on the MCU, the MCU (600) preferably includes at least one of a DLA or GPU suitable for running the network with associated memory. In preferred embodiments, the MCU can comprise the Advanced System-on-a-Chip described above in the section "AI Supercomputer Platform For Performing the Technology."

In other embodiments, as FIG. 27 illustrates, secondary computer (200) may be one or more advanced ADAS systems, including for example, an ADAS system that performs ADAS functionality using traditional rules of computer vision. Where secondary computer (200) uses classic computer vision rules (if-then), the presences of a neural network in MCU (600) improves reliability, safety and performance. In this embodiment, the diverse implementation and intentional non-identity makes the overall system more fault-tolerant to faults caused by software (or software-hardware interface) functionality. For example, if there is a software bug or error in the software running on primary computer (100), and the non-identical software code running on secondary computer (200) with an ADAS SoC (201) provides the same overall result, the Supervisory MCU (600) can have greater confidence that the overall result is correct, and the bug in software or hardware on primary computer (100) is not causing material error.

As FIG. 27 illustrates, the output from Advanced ADAS systems (201) may be fed into the Primary Computer's Perception Block (101(1)) and/or the primary computer's Dynamic Driving Task Block (102(1)). For example, if the Advanced ADAS System (201) indicates a forward crash warning due to an object immediately ahead, Perception Block (101(1)) may use this information when identifying objects.

In other embodiments, secondary computer (200) has its own neural network which is trained and thus reduces the risk of false positives, in the manner discussed above.

In a further embodiment, the Vehicle (50) may include an infotainment system, including GPU functionality, as provided by NVIDIA in numerous production vehicles. For example, in the embodiment illustrated in FIG. 4, the vehicle (50) may include primary controller (100(1)), secondary controller (100(2)), and infotainment controller (100(3)), wherein each controller is powered by one or more GPUs and/or Advanced SoCs, such as the advanced SoC described in the section "Advanced System-on-a-Chip for Performing the Technology." When the infotainment system is coupled to the Supervisory MCU (600), the GPU in the infotainment system can be provisioned to perform limited self-driving functions in the event that the primary computer (100) and backup computer (200) both fail. In this embodiment, the infotainment system would be configured to execute a "Chauffeur to Safe Stop" command to braking module (700), steering module (62), and propulsion module (56) or requests the driver to take over.

Functional safety also requires the system to detect and respond safely to sensor malfunctions. For example, when a camera is blocked by dirt or raindrops, the system for controlling autonomous vehicles must still be able to work reliably. Autonomous driving generally involves multiple sensors and it is crucial to detect sensor system blockage because the system requires reliable information. When camera is blocked, the image generally contains a blurred region with low amount of details. Generally-speaking, sensor blockage detection can be considered as a pattern recognition problem, and a neural network may be trained to detect sensor failure by seeking to identify a blurred region.

Based on the sensor output, a neural network may classify the sensor in one of the two states: normal or abnormal status (sensor being blocked or obstructed). The system divides up the system into two stages, feature extraction and detection/classification.

In a preferred embodiment, edge detection and Shannon entropy are used to detect a camera blockage from muddy water, oil, paint, thick fog, or other similar obstruction. The method relies on the assumption that when a camera is blocked by such obstruction, the image taken by the blocked camera does not contain much edge information, as edges are obscured by it. In one method, gradient information in each image is computed and only strong edges whose intensities are above a threshold are used. Strong edges are accumulated through time and stable edges are enhanced through the accumulation process. The accumulated edge image is divided into blocks. For each block, the amount of information in the block is measured by Shannon entropy. A change in entropy indicates the possibility of the corresponding block has been obscured due to camera blockage.

In another embodiment, front-facing fog detection routine assumes that the intersection of the sky and road drops below the vanishing point when fog appears. In this embodiment, detected vanishing point and road/sky height are used to estimate the visibility distance.

In addition, detection algorithms may be based on the current frame only, or based on a (e.g., recent) sequence of frames. Where a sequence of frames is used, the current frame is compared with a learned background model to detect abnormal changes, and blockage detection is based on the comparison between the input and the background model. Preferably, when the system detects a blockage detection primary computer (100) executes a routine to clear the blockage, if the vehicle is equipped with a blockage clearing system. A blockage clearing system may be as simple as wipers, and may also include a nozzle for providing a stream of compressed air over the lens in an effort to clear the lens. The blockage clearing system may also preferably include a defroster or a defogging system, designed to heat the lens and mitigate or eliminate ice, frost, or other condensation.

D. Virtualization and Functional Safety

Autonomous driving control systems are complex. They are often considered a system of systems. A significant challenge is how to make such a large system safe. Physically separate computing hardware can be used to reduce risks in autonomous vehicle operation. Such physically separate hardware can provide fault tolerance and security by providing an air gap between computing devices, so that problems or attacks against one hardware component do not affect other hardware components. However, it turns out that different computational tasks performed for autonomous vehicles control often need many of the same computational resources but at different times.

Because so much computational power is needed to perform intensive work such as recognizing images on the road in real-time and determining what the vehicle should do, it may not be cost effective in some applications, contexts and particular implementations to provide completely separate but redundant, relatively expensive hardware resources for different parts of the system. Rather, in some applications and contexts, it is or may be desirable to use a smaller number of powerful computation devices and re-use the same computation hardware over time for different purposes and aspects of self-driving vehicle control. In other words, to provide cost efficiency in contexts where cost is often an important factor, it may be desirable to multiplex hardware between different functions.

In some non-limiting embodiments, providing such sharing or multiplexing of hardware between different autonomous vehicle functions can be accomplished safely by abstracting and virtualizing the computing structure to provide redundancy, independence, partitioning, and mitigation of security threats through, for example, defense in depth (DiD) and freedom from interference. Such a virtualized safety and security architecture may be informed for example by the complexity of autonomous vehicles and safety and security risks associated with autonomous vehicle operation (e.g., including safety failures and malfunctions as well as cyberattacks).

As one example, the computing structures can be structured to accept over-the-air (OTA) programming, data and/or other updates. However, it may be desirable in some contexts to ensure that such over-the-air updates do not flow directly into any virtual machine(s) or other components that directly make decisions about how to drive the vehicle. This avoids the risk of unauthorized actors using the external Internet or other network having direct access to the virtual machine(s) that is/are running the vehicle control software and prevents an attacker from compromising or otherwise using the OTA process as part of an attack.

The architecture can also be virtualized so that portion(s) of the computing structure and/or associated software most important to safety are isolated from one another and other portions of the computing structure and/or associated software. For example, communications code execution can be isolated and partitioned from other functions by executing it in a separate virtual machine. Virtualization can be beneficial to provide safe consolidation and partitioning of different programs onto the same computation resources even in contexts where an ASIL-D certified real-time operating system(s) (RTOS) designed with safety in mind is being used. Additionally, to increase security, a limited or no trust model may provide that peers never trust each other, parents do not trust children, and children have limited trust in parents, and an audit trail may provide accountability for authorized actions.

In some example embodiments, a communication partition may be used to intercept all platform traffic between Guest operating systems and the external world over virtualized external interfaces (e.g., Ethernet, CAN, etc.), and a security partition may be used to perform detection and mitigation of intrusion attacks. In some example non-limiting embodiments, communications are thus isolated in a separate virtual machine, and additional prevention and detection functions are provided to identify suspicious activity and behavior and take proactive and preventive measures to ensure security of the embedded system. Deep packet inspection may also be used to scan packet contents for malicious payloads.

FIG. 28 shows an example non-limiting virtualized autonomous vehicle control computing platform 4000. Virtualized platform 4000 includes any number of virtual machines 4002 executing on any number of virtualized CPUs 4004. The virtualized CPUs 4004 execute on any number of hardware CPU cores 4006. A hypervisor or virtual machine manager (VMM) priority scheduler 4008 schedules execution of tasks of the different virtualized CPUs 4004 on the different hardware CPU cores 4006 while providing isolation between the different virtual machines and guaranteeing quality of service for all applications attempting to share common resources. See for example commonly-assigned U.S. Pat. No. 9,742,869 and US Patent Publication No. 20150067672 for more information concerning hypervisors.

As one non-limiting illustrative example, there may be one, two, or any N-number of virtual machine(s) 4002(0), . . . 4002(N). Platform 4000 provides isolation between the different virtual machines 4002. One or more applications run as guests in each host virtual machine 4002. Virtual machines 4002(0), . . . 4002(N) can execute on any number of virtual CPUs such as VCPU0 4004(0), 4004(1), 4004(2), . . . 4004(9), . . . 4004(K). The virtual CPUs 4004 may run on the same or different hardware CPU cores. For example:

VCPU 4004(0) may execute on core 4006(0);
VCPU 4004(1) may run on core 4006(1);
VCPU 4004(2) may execute on core 4006(2);
VCPU 4004(3) may execute on core 4006(3);
VCPUs 4004(4) and 4004(9) may run on core 4006(4);
VCPU 4004(5) may run on core 4006(5);
VCPUs 4004(6) and 4004(8) may run on core 4006(6); and
VCPU 4004(7) may run on core 4006(7).

There may in some cases be a one-to-one correspondence between virtualized CPUs 4004 and hardware CPU cores 4006. In other cases, more than one virtualized CPU 4004 may execute on a given hardware CPU core 4006. There could also be situations where a virtualized CPU 4004 is supported by multiple hardware CPU cores 4006. In some example implementations, the virtual CPUs 4004 are statically assigned to physical CPU cores 4006 with a mapping that is defined in a partition configuration table. In other example implementations, hypervisor 4008 can dynamically change allocations of CPU cores 4006 to virtualized CPUs 4004 depending on a variety of factors including priority, load balancing, and other considerations. Hypervisor 4008 may use a priority scheduler to timeshare virtual CPUs 4004 on the physical CPU cores 4006.

Virtualized platform 4000 may further include any number of virtual servers such as a resource manager (RM) server 4010(1), communications server 4010(2), and other servers 4010(3) . . . 4010(L). Such servers may comprise virtualized hardware without direct hardware support, to support any or all of virtual machines 4002. For example, the resource manager server 4010(1) may comprise server software that exercises control over some hardware or other resource (e.g., one or more GPUs and/or media engines such as encoders, decoders and/or compositors), and multiplexes use of the hardware or other resource among plural clients so clients can share the physical computing resource without conflict. Other example servers 4010 may include by way of non-limiting example:

a camera video streaming server 4010(3) for managing camera input;
a storage server 4010(4) for managing storage devices (and for example allocating each virtual machine 4002 its own virtual memory address space and preventing any guest from overwhelming the physical storage with too many accesses to enforce quality of service guarantees);
a bus server 4010(5) for managing use of certain communication buses such as I2C;
an audio server 4010(6) for managing audio hardware resources;
a display server 4010(7) for managing display resources;
a security server 4010(8) for managing the security engine;
a debug server 4010(9) for use in debugging;
a safety monitor (watchdog) server 4010(10) that monitors all of the other functions running on the CPU cores 4006 and reports status to on-chip hardware or other resources; and/or
other.

Servers 4010 are also virtualized in the example implementation, execute on one or more virtualized CPUs 4004, and have their executions priority-scheduled by hypervisor 4008. In some example embodiments, the virtualized servers 4010 provide services that could otherwise be provided by hypervisor 4008 (and which commonly are provided by hypervisors in other systems) but are isolated in this architecture from the hypervisor to keep the hypervisor minimalist, simple, straightforward and certifiable.

In the example embodiments, the virtual machines 4002 may or may not present the illusion of standard or uniform hardware configurations to the autonomous vehicle applications running on them. While it is possible to provide, within the context of virtual machines 4002, software to emulate hardware capabilities, in a real-time autonomous vehicle system such emulation may be too expensive in terms of run time performance. Accordingly, guest autonomous vehicle applications executing on the host virtual machines 4002 are not necessarily designed and structured to expect or rely on any standardized virtual hardware configuration. By minimizing and/or eliminating any emulation software middleware, the guest autonomous vehicle application (while still being confined within the "sandbox" of the host virtual machine 4002 it is executing on) can directly access and run on the hardware capabilities of cores 4006 and other hardware components such as the GPU, hardware engines, etc. The hardware cores 4006 and other hardware meanwhile may be designed to support virtualization, minimize the burden on hypervisor 4008, and to maximize runtime performance by giving guests direct access to functionality. For example, in some implementations the guests can be given direct access to each of multiple engines provided by platform 4000 and are permitted to submit work directly to those engines. The engines meanwhile are designed so that all memory accesses the engines perform in the service of a guest are done in the context of that guest's assigned/accessible virtual memory to prevent conflicts, avoid unintended communication between guests, and prevent any guest from corrupting the state(s) of other guests. The various guests are thus kept spatially isolated even though they are sharing the same engine(s) and other resources.

While the architecture thus provides partitioning, isolation and separation between the different virtual machines sharing the same underlying resources such as engines, scheduling issues arise when multiple guests wish to use the same resources at the same time. The RM server 4010(1) in the example implementation resolves such scheduling conflicts. The RM server 4010(1) performs multiplexing tasks such as managing contexts and protecting memory between guests. In some implementations, there is no need for guests to communicate with the RM server 4010(1) at run time in the common or normal case. The RM server 4010(1) may in such implementation manage resources on an exception basis, when a conflict arises or something else goes wrong. For example, if a virtual machine 4002 and/or a guest autonomous vehicle application begins using a resource and then won't release it, the RM server 4010(1) may force the virtual machine 4002 to release the resource and guarantee forward progress.

In the example shown, hypervisor 4008 is the foundation for accomplishing the safety and security goals the platform 4000 is to meet. So it can be safety tested and certified, hypervisor 4008 in example implementations is designed and structured to be as simple as it can be and to run directly on the hardware, in order to fulfill its function of supporting running multiple virtual machines 4002 simultaneously on a multicore SOC or other computing device. Hypervisor 4008 in example embodiments is structured to be stateless or mostly stateless, providing high quality of service levels by minimizing resource locking by competing applications. Because there is little or no state to maintain, the hypervisor 4008 in such embodiments does not need to lock resources to maintain such state. Delivering services such as storage access from a storage server 4010(B) separate from hypervisor 4008 facilitates such stateless operation of the hypervisor. The hypervisor 4008 may still perform priority scheduling for the various services provided by servers 4010 to provide temporal isolation to ensure the servers don't conflict with one another by performing operations on the same resources at the same time.

In the example non-limiting embodiment, the hypervisor 4008 is held to a very high standard (e.g., higher than the operating system kernels). Certification may or may not include mathematical proof of correctness. Safe and secure testing may also be performed to prove correctness. Hypervisor 4008 can be trusted with a high degree of assurance to keep the different parts of the system separated from one another. In the example shown, there is no software between the hypervisor 4008 and the hardware it executes on—it is a "bare metal" hypervisor that runs directly on the processor hardware. Other embodiments could provide different hypervisor deployments.

FIG. 29 shows another view of platform 4000. In this view, virtual machines 4002 are supported by channels 4012 that provide communication between the virtual machines and resources needed for computation. Any number of channels 4012 can be assigned to any given virtual machine 4002. For example:

virtual machine 4002(0) may be assigned channels 4012(0), . . . 4012(N);
virtual machine 4002(1) may be assigned channels 4012(N+1), . . . 4012(M);
virtual machine 4002(2) may be assigned channels 4012(M+1), . . . 4012(P);
and so on.

Hardware and/or software support for assigning different sets of channels 4012 for enabling different virtual machines 4002 to communicate with a shared resource provides per process and per virtualized machine isolation. Additionally, use of a shared hardware resource such as a GPU can be load balanced among different virtual machines 4002 through channel assignment. Host autonomous vehicle applications on virtual machines 4002 may be assigned their own channels to minimize software management of contexts and memory protection. Additionally, as mentioned above, the RM server 4010(1) and/or other server(s) such as storage server 4010(4) may be charged with protecting memory. Priority scheduling and compute instruction level preemption may be used to enable meeting quality of service requirements.

FIG. 30 shows an example fine-grained compute instruction level preemption. In this diagram, a command push buffer provides commands that are dispatched to workgroups, which are eventually assigned to threads executing on processors. Compute instructions may provide preemption. In other real-time autonomous vehicle embodiments however, use of preemption is minimized or avoided to prevent non-deterministic execution results. Avoiding preemption except when necessary to correct or prevent faults reduces instances in which applications are interrupted at variable, unpredictable execution points and then are commanded to resume at those unpredictable points.

Channel reset capabilities may be used to prevent autonomous vehicle applications (or imposters of the same) from intentionally or unintentionally consuming or occupying a disproportionate amount of resources and/or crashing the GPU or other resources. For example, when a guest ties up or causes a fault to occur in a shared resource, it is possible to fall over to a degraded operating mode in which the resource and the channels used to communicate with it can be forced to automatically reset and return to a known, properly functioning operating state(s). Such a structure and functionality supported within a partition provide real-time, safe and secure communications capabilities with and between safety-critical processes, as detailed below.

Communications are also supported with external devices such as a cloud server providing e.g., mapping capabilities, downloadable maps and other information. Any external network interface of the autonomous vehicle platform should be considered a hostile environment even if it is secure, encrypted and authenticated. In particular, there is a risk that an attacker will break through all other defenses and access an Ethernet or other input/output interface to an SOC or other processing device executing autonomous vehicle control. There is also a risk that the attacker will have direct access to the network stack and have the ability to control the incoming and/or outgoing packets on the network interface. If the attacker is able to exploit a flaw or weakness in the network stack, the attacker may be able to take control of the network stack. If the network stack is run in the same virtual machine 4002 that is also doing safety critical work, this creates a risk that the attacker can corrupt or otherwise impact the safety critical work. The attacker would have a foothold in the operating system instance of the virtual machine 4002 performing the safety critical work, which the attacker could use to cause harm. For example, the attacker might generate malicious map data e.g., by exploiting a flaw in the operating system kernel. Once the network stack is compromised, the attack could cascade into exploiting a bug or weakness of the operating system kernel to take control of the kernel. Preferred embodiments use virtual machine partitioning and other structures and security techniques to protect against such attacks.

FIG. 31 and FIG. 32 show an example non-limiting implementation that addresses the security risks presented above. In this example, the communications network interface is located in a virtual machine/partition 4002(L) separate from virtual machines/partitions 4002(P) that are performing drive safety critical processing. The communications partition 4002(L) supports a network interface service and associated stack 4002, and may act as a resource manager for the communications network interface process. The communications partition 4002(L) for example may also support network address translation 4040 to provide additional security. The communications partition 4002(L) manages the communications hardware associated with an embedded system. Such an embedded system may include, but is not limited to, a System-on-a-chip (SoC) used for autonomous vehicle operation.

According to preferred embodiments, the communications partition 4002(L) can be implemented as a virtual machine running (for example) an embedded, secure operating system. In preferred embodiments, the communication partition 4002(L) can include a virtualized router that performs inter-virtual machine communication, and intercepts platform traffic between Guest Operating Systems and external networks or applications over virtualized interfaces (e.g., Ethernet, CAN, etc.).

Example Communication partition features and functions may thus include:
Ethernet Virtualization
Firewall
Network Address Translation (NAT)
CAN Virtualization for Xavier CAN Bus
CAN Virtualization for External MCU CAN Bus
Interface DDoS Countermeasures
Virtualization of Other Car Networks (FlexRay, MOST, LIN)
Other In preferred embodiments, the communications partition 4002(L) provides support for multiple virtual machines. According to such deployments, the communications partition 4002(L) is able to submit and receive fully formed Ethernet frames (formed by upper layers) to the network (e.g., Ethernet) infrastructure in the vehicle used by the embedded system. The communications partition 4002(L) also enforces bandwidth and latency guarantees needed by upper level protocols at the virtual machines, with each VM being responsible for submitting frames from a virtualized Ethernet driver. In preferred embodiments, the communications partition 4002(L) provides network perimeter security features, such as (without limitation): distributed denial-of-server (DDOS) resistance, traffic filtering, stateless firewall, and restricted cone connection management. The communications partition 4002(L) can also be implemented with infrastructure programming features, for example and without limitation: switch configuration, traffic shaping, traffic class arbiter programming, and VLAN filtering.

In one example embodiment, the communications partition 4020(L) also interacts with a security partition 4002(M). Example security partition 4002(M) features may include:
IP Stateful and Stateless Firewall (including NAT)
CAN Firewall
SSL Proxy
Security Audit and Events Logging with Log Upload to Remote Audit Server
Encryption Manager—Security Log and Configuration Files Encryption
DDoS countermeasures
Machine Learning for Deep Packet Inspection (DPI) on Ethernet and CAN
Virtual Machine and File Integrity Check
Security and Communication Virtual Machines OTA Services and Backup Management
Security for Other Car Network Protocols (FlexRay, MOST, LIN)

Like the communications partition 4020(L), the security partition 4002(M) can be implemented as a virtual machine executing a secure, embedded system-specific operating system. In preferred embodiments, the security partition 4002(M) may access, and/or maintain a configuration file (encrypted and signed) that configures the detection and policies for the traffic. Once an attack is detected, the security partition 4002(M) will be responsible for enacting the configured policy for that attack. Each guest VM has a security policy associated with each communications interface. These security policies may be independent of each other. Accordingly, the virtual machines for two Guest OSes can have different security policies for the same physical interface.

In one example, non-limiting embodiment, the security partition may be logically disposed between the communication partition and one or more additional VMs 4002(P). Inter-VM communication and communication between an application executing in a Guest OS and an external communication interface may be routed through the security partition for inspection and intrusion detection. Inter-virtual machine communication between the communication partition 4002(L), security partition 4002(M), and a Guest OS running in a further partition 4002(P) may be performed, in one or more example embodiments, by a virtual router 4032 implemented in communications partition 4002(L), a virtual bridge 4034 implemented in the security partition 4002(M), and a virtual driver 4036 in the Guest OS executing on the additional virtual machine 4002(P) (see FIG. 32). Security features that may be performed in the security partition may include one or more of: firewalls for one or more communication interfaces (e.g., IP, CAN), a secure socket layer (SSL) Proxy, Distribute Denial of Service (DDOS) countermeasures, integrity checks for VMs and files, and backup management for OTA services.

According to example embodiments, the security partition 4002(M) also provides a deep machine learning neural network 4046 that deeply inspects network packets (deep packet inspection) received and/or transmitted by the communications partition 2002(L), and generates information that stops the network communications (e.g., via disablement of one or more features and/or data processing or routing components) if the network communications begin to look suspicious. Such deep packet inspection may include scanning packet contents for malicious payloads as well as to detect anomalies that have not been previously detected, and has the necessary authority to discontinue the communications partition operations when it detects something suspicious. The security partition 4002(M) can also provide secure event logging/audit trails 4044 that cannot be destroyed by an attacker (such logs and audit trails are useful for obtaining a common criteria certification). While the example embodiments show direct communications between the partitions 4002 for illustrative purposes, commonly known techniques for communicating securely between virtual machines/partitions would preferably be used in example implementations.

E. Example Virtualization Safety Framework

The example non-limiting platform further includes a safety framework that continually monitors the operation of software and/or hardware functions that control driving and other system or mission critical tasks. The safety framework collects information on how the driving control functions are operating, can run diagnostic processes to ensure system components are operating properly, and reports exceptions to separate safety dedicated hardware (e.g., one or more safety microcontroller(s)) that may take corrective action such as automatically ending/rebooting/restarting processes as needed.

The safety framework operates independently of the driving control functions it is monitoring such that failure of driving control hardware/software functions does not cause the safety framework to also fail. The example non-limiting embodiments answer the age-old question "who watches the watchmen?" by providing a resilient multilevel/multilayered safety framework structure in which some safety framework components watch and monitor other safety framework components executing on different hardware. By providing multiple hardware-independent levels of watching/monitoring, the multilevel/multilayered safety framework structure distributes monitoring functions throughout multiple layers and multiple hardware processors so failure of some part(s) of the safety framework itself does not disable the overall safety framework from operating, and no part of the safety framework is overloaded or overwhelmed by the demands of watching high performance processes in real-time.

For example, an application watchdog monitoring function running within the virtual machine/partition of high-performance drive application processors may be responsible for monitoring intricate details of the operation of those application processes. The application watchdog monitoring function in turn reports succinct monitoring results to a higher level(s) of the safety framework that may be operating in a different virtual machine/partition and/or in different hardware. Such safety framework higher level(s) do not themselves need to become involved in the intricate details of the application processes the application watchdog monitors; they only need to process the succinct results that the application watchdog monitoring function reports. These high level(s) thus receive information from the lower level(s) on the more detailed operations of the computation structures being monitored, while also monitoring to ensure the lower levels of the safety framework are themselves operating correctly. In this way, the multilevel safety framework is capable of providing high levels of resiliency and redundancy while also providing processing capabilities to timely and effectively monitor many complicated high-performance real-time drive control (and other) control functions through a complicated system without becoming overwhelmed.

In some example embodiments, the safety framework provides features that streamline collection/dispatch for structured handling of safety relevant hardware and software errors. An autonomous driving operating system layered over a safety supervision framework designed for ASIL-D systematics provides strong isolation/foreign function interface (FFI) for safety. In this instance, FFI is a mechanism by which a program written in one programming language or to one application programming interface (API) can call routines or make use of services written in another programming language and/or for another API.

In some embodiments, the multilevel safety framework is separated from supervised entities and itself provides multiple levels or layers of functionality that operate independently but supervise one another. For example, in some implementations, the safety framework provides monitoring components that monitor the health of high-performance application software. These safety components in turn are monitored/watched by other independent layers of safety framework monitoring, which in turn is watched by yet other independent layers of safety framework monitoring, and so on. Any number of such monitoring layers may be provided, although a three-layer safety framework architecture is provided in some example embodiments. The safety framework in some example non-limiting embodiments manages efficient execution of software safety diagnostic test functions ("SDTF"), and provides communications via a protected channel(s) between the layers for safety relevant query/response.

FIG. 33 shows exemplary details of an example non-limiting platform relating to additional safety features. In the example shown, a virtual machine/partition $4002(k)$ executing application processes 5002 and including middleware 5004, drivers 5006 and a safety operating system 5008, also executes safety watchdog monitoring software 5010 that performs safety proxying and monitoring of the high-performance application processes 5002. The safety watchdog monitor 5010 may for example watch and monitor the health of application processes 5002. The safety watchdog monitor 5010 is structured for example to ensure that sequencing is going correctly, deadlines are being met, and execution time is not taking longer than expected. As an example, the safety watchdog monitor 5010 might perform a sensor data integrity check in the case of application processes 5002 that are processing sensor data from cameras, RADAR, LIDAR, etc. If the safety watchdog monitor 5010 detects an error or fault, it may propagate an error notification up to a higher level in the safety framework—just as an inspector on a factory floor would tell her supervisor that some observed process on the floor is going awry to prevent defective parts from being manufactured by the defective process.

In the example shown, the safety watchdog monitor 5010 reports to a first level ("L1SS") safety supervisor 5012(1) operating within its own independent virtual machine/partition 5014 on the same processor 5050 (core CPU complex or CCPLEX) that executes the application process virtual machine/partition. This first safety level L1SS safety supervisor 5012(1) may further include its own testing capabilities such as diagnostics 5016 and utilities 5018 to perform its own testing. Such diagnostics 5016 can be used for example to test hardware functionality. In some example embodiments, the L1SS safety supervisor 5012(1) also has the ability to request virtual machines/partitions 4002 to run a particular diagnostic and report results back, and to make sure that diagnostics that should be run are in fact being run. The diagnostics 5016 may be run at an appropriate rate to ensure testing is performed at sufficient frequency to guarantee that the safety supervisor 5012(1) is able to detect improper operation(s) in a timely manner. Diagnostics can be implemented by a combination of hardware and software to provide desired coverage. The diagnostics and monitoring are structured to detect any kind of failure within a fault time tolerance interval (e.g., every 100 ms). There are several different kinds of diagnostics supported by example non-limiting embodiments, for example:

Diagnostics Startup—Diagnostics that are executed and verified before a system can enter mission mode, e.g., hardware security module (HSM) Configuration;

Periodic Diagnostics—Diagnostics that are executed on a regular basis (usually within a Diagnostic-test Time Interval, e.g., checking critical device-configuration against golden-reference/checksums);

On Demand Diagnostics—Diagnostics that will be requested dynamically in response to event occurrence, e.g., memory diagnostic after single bit error reporting exceeds a pre-set threshold, a certain number of frames are dropped in a certain amount of time, etc.;

Shutdown Diagnostics—Diagnostics that will be run at shutdown. Note some of these may be run after the safety framework is shutdown so results are made available upon next boot;

Runtime Diagnostics—Diagnostics that are executed as part of normal software flow; these are not necessarily independently invoked by the safety framework although some may be, according to embodiments. Runtime diagnostics are invoked opportunistically or by need according to the software driver, and their result/status can be notified using standard error-flows in the safety framework. Examples of runtime diagnostics include:

Software register-readback verification after write,

Software idle-task doing checksum verification of safety-critical configuration data, Software doing plausibility checks on computed signal values, Redundant execute and compare under software control, and Domain-specific end-around challenge/response issued over the safety framework pathways.

Temporal monitoring may also be applied. Software applications needing Temporal Isolation/FFI may map their Supervised-Entities (e.g., Runnables) onto distinct OS Task objects. Supervised-Entities may announce checkpoints (CP) reached during program-flow. Dedicated watchdogs may monitor execution for compliance to pre-specified schedule status—Aliveness, Arrival-Rate, or Deadline and Execution-Sequence. Failure may be detected as an artifact due to lack of (or implausible) notification. Failure status is aggregated and reflected in counters/flags and published via Heartbeat to the higher levels of the safety framework. Actions are performed via registered handlers.

The overall safety framework is structured to be guaranteed to detect and react to detected failures in a timely way, i.e., before the failure causes an unsafe condition to arise. However, in the example non-limiting embodiment, the L1SS safety supervisor 5012(1) is a reusable component that does not have much domain specific knowledge. Accordingly, the L1SS safety supervisor 5012(1) acts as a proxy or router to correctly propagate information concerning errors discovered at lower levels of the safety framework to the next higher level of the safety framework.

The first safety level L1SS safety supervisor 5014(1) in turn communicates with and reports detected errors and faults to a second level L2SS safety supervisor 5014(2) executing in a different virtual machine/partition 5014(2) and/or executing on a different processor 5052, such as dual core RISC processors in the same SOC package 5054 on the same or different silicon die, the dual cores running in lockstep. Thus, the second level safety supervisor 5104(2) (which may or may not be virtualized) operates independently of hypervisor 4008 and its associated hardware according to particular embodiments. The different processor 5052 on which the second level L255 safety supervisor 5014(2) executes in some implementations may be a lower performing processor than the processor(s) executing the high-performance application(s) 5002.

The second level L255 safety supervisor 5014(2) includes a further safety watchdog monitor 5012(2), diagnostics 5012(2), and utilities 5012(2). It communicates with and directs first-level safety supervisor L1SS 5012(1) and receives results the first level safety supervisor collects. Hardware support may allow the L2SS safety supervisor 5014(2) to also protect surrounding hardware logic to detect transient or non-transient faults.

The SOC hardware is designed and structured to isolate L2SS safety supervisor 5014(2) and its associated processor 5052 so that most faults occurring in other parts of the SOC 5054 hardware and software will not also cause faults of the L2SS safety supervisor 5014(2). The system is thus designed and structured so that L2SS safety supervisor 5014(2) executes on a safety "island" and is isolated from being affected by faults that may occur on other parts of the SOC 5054, i.e., the SOC "mainland", while still being able to see and monitor all of the processes being performed on the SOC mainland.

Although the FIG. 33 diagram shows the second safety level L2SS safety supervisor interacting with only one safety application watchdog 5010 in one additional partition/virtual machine 5014(1), it may interact with any number of safety application watchdogs in any number of partitions/virtual machines, consistent with throughput, bandwidth and performance criteria (see FIG. 35). Depending on the complexity and extent of the overall system, there may be any number of second levels L2SS safety supervisors, each monitoring one or more application watchdog monitors in any number of application virtual machines/partitions or other virtualized or non-virtualized processing components. Typically however, in some architectures there may be at least one second level L2SS safety supervisor per SOC 5054.

In some instances, the L2SS safety supervisor 5014(2) may be directly notified by hardware that a fault has occurred. In such instances, the L2SS safety supervisor 5014(2) may inform the L1SS safety supervisor 5014(1) of the detected error so the L1SS safety supervisor can inform the virtual machines 4002 and associated application processes 5002. Additionally, the second level(s) L2SS safety supervisor 5014(2) may perform some filtering and processing on the error/failure reports it receives from the L1SS safety supervisor 5014(1), and may take corrective action itself in certain limited instances (e.g., certain kinds of local memory resets). In general however, the L2SS safety supervisor 5014(2) in the example embodiment acts as an error router by communicating with and reporting detected errors/failures to a third safety level L3SS 5014(3) safety supervisor executing in a different partition existing on a different processor on different silicon in a different package—in this case a safety microcontroller 5020.

The third level L3SS safety supervisor 5014(3) in this example includes a further safety watchdog 5012(3), diagnostics 5012(3), and utilities 5012(3). This third safety level L3SS safety supervisor 5014(3) executing on safety MCU 5020 communicates with the safety components executing on SOC 5054, directing second-level safety watchdog(s) 5012(2) and receiving results the second level safety watchdog(s) collects. Just as with the second safety level, the third safety level L3SS safety supervisor may interact with and monitor any number of second safety level L2SS safety supervisor components executing on any number of other processors/SOCs, and in some implementations there may be multiple third safety level L3SS safety supervisor instances. For example, in some embodiments, the L3SS safety supervisor 5014(3) can interact with plural L2SS safety supervisors 5014(2) on respective SOCs 5054 and can thus monitor multiple SOCs 5054 each supporting multiple virtual machines/partitions 4002 running many respective applications 5002.

The safety architecture is expandable/scalable to a four-level L4SS, a fifth level L5SS and so on. However, for some applications, three levels as shown in FIG. 33 is sufficient. In the example non-limiting embodiments, the highest safety framework level (in this case L3SS safety supervisor) executes on a separate, hardware-independent (different silicon and package) safety MCU 5020 (which may also have a redundant backup, as described elsewhere herein) that is empowered to shut down, restart, reboot and otherwise control the application processes 5002 and associated virtual machines/partitions 4002(k) as well as any or all of the safety framework watchdogs 5012 and virtual machines/partitions 5014. The hardware independence of the safety MCU 5020 from the processor SOC(s) executing the application processes 5002 minimizes the risk that hardware faults affecting the processor SOC 5054 will also affect the safety MCU. For example, in some implementations the MCU 5020 receives separate power or battery backup so that power faults affecting the processor SOC executing the application processes 5002 will not affect the safety MCU 5020.

The multilevel monitoring thus provides local, intermediate and global safety monitors some of which may execute in different hardware components from one another. The global safety monitor monitors intermediate safety monitors, which in turn monitor local monitors. In the example shown, the safety MCU (microcontroller) 5020 performs a global monitoring function and receives inputs from various intermediate safety monitors functions operating on different hardware, which in turn receive inputs from various local safety monitors. The multiple instances of safety watchdogs on different levels (and hardware) of the safety framework allow the safety MCU 5020 to monitor many high-performance software processes running in various partitions 4002 on different processor SOCs without becoming a bottleneck. In particular, L1SS in this case is a safety monitor that monitors a high-performance virtual machine and associated processes 4002(k). If the high-performance virtual machine were monitored directly by the L2SS safety supervisor, the LS22 might become overloaded. However, the L2SS safety supervisor does not need to monitor every safety aspect of the application processes 5002 because such detailed monitoring is instead performed by application safety watchdog monitor 5010. The L2SS safety supervisor therefore does not become overwhelmed but instead remains an effective real-time monitor of the application watchdog monitor 5010 as well as potentially other application watchdog monitors operating in additional application virtual machines/partitions. Similarly, the L3SS safety supervisor safety monitoring level operating on the safety MCU 5020 does not become overwhelmed by the safety monitoring tasks performed by any number of second level L2SS safety supervisors. See FIG. 34.

FIG. 35 shows an example interaction topology. This schematic block diagram shows that the L1SS 5014(1) can monitor any number of virtual machine partitions 4002(K), . . . 4002(N) each including its own respective safety watchdog 5010 that runs natively within the respective virtual machine partitions under the native guest operating system(s) and communicates with the drivers 5006. L1SS 5014(1) can also monitor various servers 4010(A), 4010(6), . . . executing on the SOC, each server including its own respective safety watchdog software component 5010. The L1SS safety supervisor 5014(1) can communicate with additional safety watchdog monitors 5010 that are busy monitoring other foundational processes running on the SOC 5054 (for example GPU support) and potentially also aspects of the hypervisor 4008 hardware and/or software. The L1SS(1) safety monitor 5014(1) can play roles during initialization of such processes. For example and without limitation, in the case of GPU support, protected communications directly with the hardware to allocate memory to the GPU and creation of channels into the GPU—which may be separate from commanding the GPU to perform functions as the application processes 5002 may have direct access to the GPU command buffers.

In the example shown, L1SS safety supervisor 5014(1) also communicates with a boot and power management processor 5060 via a boot server 4010(A), and monitors the operation of the boot server using an associated watchdog 5010(A). The boot and power management processor 5060 controls resets and clocks. While the L2SSsafety supervisor 5014(2) could in some embodiments communicate directly with the boot and power management processor 5060, in the embodiment shown the L2SSsafety supervisor communicates with SOC 5054 only via the L1SS safety supervisor 5014(1) and the Boot server 4010(A). Interaction between L2SS security supervisor 5014(2) and other processors not shown in FIG. 35 but nevertheless included on SOC 5054 may follow a similar strategy. Such avoidance of direct interaction between the L2SS safety supervisor 5014(2) and the boot processor 5060 and other processors reduces the complexity (and thus increases the verifiability) of the communications.

Under direction of the L3SS security supervisor 5014(3), the L2SS security supervisor 5014(2) can command the boot processor 5060 to perform a secure trusted boot of the SOC 5054 in the following example stages:

| NAME | DESCRIPTION | FUNCTION(S) |
|------|-------------|-------------|
| BootROM | Instruction ROM (Boot ROM) | Establish root keys<br>Authenticate & Load Boot Configuration Table (BCT)<br>Authenticate and execute Boot Loader Stage 1 |
| MB1 | Stage 1 Boot Loader | Authenticate & Load Trusted OS<br>Authenticate & Load Quick Boot<br>Initialize CPU complex for TrustedOS<br>Bring CPU out of reset |
| MB2 | Stage 2 Boot Loader | get storage partition information |
| TOS | Trusted OS | Initialize and start TrustedOS<br>CPU exits secure mode |
| QB | Quick Boot CPU Bootloader | Initialize SOC<br>Copy Hypervisor to SDRAM<br>Verify and jump to Hypervisor |
| HYP | Hypervisor | Initialize and start Hypervisor<br>Copy RichOS to SDRAM<br>Verify and Start RichOS |
| ROS | Rich OS | Initialize and start RichOS |

The boot and power management processor 5060 can also be controlled to adjust clock speeds and power supplied to the SOC 5054, e.g., to avoid faults due to overheating.

In the example non-limiting embodiment, the L1SS safety supervisor 5014(1) communicates with each virtual machine safety watchdog monitor 5010 over a separate independent inter-virtual machine communication (IVC) channel for each guest virtual machine participant. Hypervisor 4008 is architected to permit and support such high-performance communications by avoiding locking and other dependencies that would otherwise inhibit timely high-performance communications between virtual machines/partitions. The hypervisor 4008 is thus structured to allow L1SS safety supervisor 5014(1) to meet failure and safety reporting guarantees necessary for system safety certification (e.g., errors and failures will be detected and corrected in a certain safety time interval, certain CPU run time, maximum latency, etc.). The L1SS safety supervisor 5014(1) in turn communicates with the L2SS safety supervisor 5014(2)

operating in this case on a separate processor within the same SOC 5054. Communications between L2SS safety supervisor 5014(2) and L3SS safety supervisor 5014(3) (which in one example embodiment is not on the same SOC 5054 but rather is running on a different processor on a different silicon die in a different hardware package) can be performed via an SPI or other communications bus 5070 providing a heartbeat command/response channel, and potentially also via a separate error signal line 5072 that can signal errors independently of the data communicated over the SPI bus 5070. The error pin signal 5072 may be a unidirectional error flag signal that is handed by a hardware safety monitor infrastructure that tells the safety MCU 5020 that something is going wrong, an error condition exists, and/or the system may not be operating safely.

Periodically, the L3SS safety supervisor process 5014(3) running on the separate safety MCU 5020 requests L2SS safety supervisor 5014(2) running on a processor 5052 within the SOC 5054 to provide a message updating L3SS safety supervisor (and also indicating that L2SS safety supervisor is alive and aware). If L2SS safety supervisor 5014(2) does not respond to the request from L3SS safety supervisor 5014(3), L3SS safety supervisor will consider that L2SS safety supervisor has failed and will take corrective action. In some embodiments, the safety system is designed so that if a failed process or component cannot be successfully recovered within a certain safety time interval (e.g., 100 ms), the failed process or component is taken offline and disconnected from the vehicle bus so it cannot cause an unsafe condition.

In addition to the pathways shown in FIG. 35, it would also be possible to provide an additional communications pathway(s) from the virtual machines 4002 to the L3SS safety supervisor 5014(3). Such communications pathway(s) could for example comprise an ethernet and/or PCIE link that communicates redundant and/or different information to the L3SS safety supervisor 5014(3) and would function even in the event the SPI bus 5070 fails.

FIG. 36 is a flowchart showing one example of how detected errors may propagate through the safety framework. In the example shown, suppose camera sensor data is arriving into a guest OS partition and associated virtual machine 4002 to be processed by image processing applications 5002, including for example neural networks. The software-based watchdog 5010 within the partition monitors the arriving data, perform integrity checks (block 5102) and detects (e.g., based on a frame counter that detects when frames are dropped) occurrence of integrity errors (block 5104). As one non-limiting example, the frame counter not increasing would indicate some kind of error, e.g., a stuck frame condition in which the same image is being sent over and over again. The local watchdog 5010 would in such instance notify the L1SS safety supervisor 5014(1) that such an error condition has been detected (block 5104, 5106). The L1SS safety supervisor 5014(1) receives the error notification and in turn sends an error notification to the L2SS 5014(2) (block 5108), which in turn sends an error notification to the L3SS safety supervisor 5014(3) (block 5110). The L3SS safety supervisor 5014(3) decides (block 5112) how to handle the error, i.e., whether to take action, and what action to take. For example, the L3SS safety supervisor 5014(3) could decide that one missed frame should be ignored but that it will take corrective action (block 5114, e.g., reboot the system) if x failed frames occur in y amount of time.

Similar error reporting up the chain of the safety framework may be performed for errors detected in other system components. See FIG. 37.

FIG. 38 and FIG. 39 show example error handling sequences for hardware and software error detection, respectively. The FIG. 38 hardware error handling sequence begins with the SOC 5054 hardware generating a fault ("1"). This hardware fault is detected by conventional SOC hardware checkers (e.g., registers, parity checkers, etc.) ("2"). A hardware error collator collates the detected error(s) with other hardware error detections ("3") and signals the error(s) to a hardware security module (HSM) on the SOC ("4"). The HSM is able to directly signal the hardware error to the L3SS safety supervisor 5014(3) via the error signal pin 5072, and provides an interrupt notification to the L2SSsafety supervisor 5014(2) ("5b"), which in turn also communicates the error status to the L3SS safety supervisor 5014(3) via the SPI bus 5070 ("5c"). In the example shown, the L2SS safety supervisor 5014(2) informs the L1SS safety supervisor 5014(1) of the hardware error ("6"), which in turn notifies the safety watchdog monitors 5010 running on the virtual machines/partitions 4002 ("7"). The safety watchdog monitors 5010 notify the application processes 5002 of the hardware fault ("8"). When the hardware fault is resolved, the SOC hardware can directly notify the application processes 5002 of the resolution (or at least correct or reinitialized operation) via the drivers ("9"). The safety watchdog monitors 5010 running in the virtual machines/partitions 4002 learn of the resolution from the drivers 5006 ("10") and notify the L1SS safety supervisor 5014(1) ("11"). The L1SS safety supervisor 5014(1) in turn notifies the L2SS safety supervisor 5014(2) ("12"). Meanwhile, the L3SS safety supervisor 5014(3) may use a challenge/response protocol to ask the hardware security module whether the hardware fault is resolved ("13"). The L2SS safety supervisor 5014(2) can report the error resolution to the L3SS safety supervisor 5014(3) via the SPI bus 5070("14a") and/or the L3SS safety supervisor can learn the error resolution directly from the hardware security module via the error signal pin ("14a").

FIG. 39 shows another example error detection and reporting scenario in the case of a software fault. In this case, a software fault occurs in the application processes 5002 ("1"). The local safety watchdog monitor 5010 detects the fault ("2") and reports it to the L1SS safety supervisor 5014(1) ("3"), which in turn reports the fault to the L2SS safety supervisor 5014(2) ("4"). The L2SS safety supervisor 5014(2) may analyze the fault ("5"), and report the fault to the L3SS safety supervisor 5014(3) via both the error signal pin ("6a") and the SPI bus ("6b"). Upon resolution of the fault, such as by a hardware reboot/restart ("7"), the local safety watchdog monitor 5010 detects the fault has been resolved ("8") and reports same to the L1SS safety supervisor 5014(1) ("9"), which in turn reports the error resolution to the L2SS safety supervisor 5014(2) ("10"). Meanwhile, the L3SS safety supervisor 5014(3) can issue a challenge or request to the SOC hardware security module asking for error status ("11"). The SOC can communicate error status to the L3SS safety supervisor 5014(3) via the error signal pin ("12a") in response to the challenge/response and/or by communication between the L2SS and L3SS safety supervisors 5014(2), 5014(3) via the SPI bus 5070 ("12b").

FIG. 40 shows another example implementation providing plural partitions:
one or more event participation adaptive partition(s) 4052;
one or more time triggered adaptive partition(s) 4054; and other partition(s).

In this particular example, the event partition(s) 4052 may be connected to inputs and outputs such as a camera data stream channel(s) 4056(0), a RADAR data stream channel(s) 4056(1), a LIDAR data stream channel 4056(2), and an Ethernet data stream channel 4056(3). The event partition(s) 4052 asynchronously processes these real-time inputs and outputs with an event processing partition(s) 4053 and provides processed results to time triggered partition(s) 4054. The time triggered partition(s) 4054 include buffer 4058, a watchdog or other monitor(s) 4060, and a time triggered graph executor(s) 4062. The buffer 4058 stores incoming, ready-to-use event data (which may be time stamped and/or filtered) along with global triggering information for providing to the time triggered event executor 4062. The watchdog 4060 monitors the same or different outputs or other state information of the event processing partition(s) 4053 as well as the time triggered graph executor(s) 4062, and alters other system components such as a monitoring microcontroller when a fault or other problem is detected.

One example non-limiting implementation of a communications partition or server 4010(2) provides a uniform, efficient, and optimized communications interface that can work between different parts of the system at varying levels of abstraction and/or division. For example, such a communications interface can be used for communications between:

different SOCs and/or
different virtual machines running on the same SOC, and/or
different programs in the same virtual machine, and/or
different threads of the same program.

In example embodiments, the interface is uniform with respect to messages, and can also be used to support communications between streaming buffers for GPU and/or media use cases. The same programming interface can be used regardless of how close or distant the different communicating nodes are. The communications interface can however be optimized for the distance over which communications is actually being conducted.

F. Autonomous Driving Software System
Example Autonomous Driving Platform

Example non-limiting embodiments provide an autonomous driving platform that perceives properties of the world that are directly actionable for driving. Those actionable properties, which may be referred to as affordances, can include the following overall categories:

Obstacles
Paths
Wait conditions (e.g., traffic lights, four-way stops, etc.)
Other.

Autonomous driving becomes possible when the defined affordances of driving are clear from sensor input and are sufficiently actionable to drive on.

Example non-limiting embodiments use the affordances to define an unambiguous world model, which provides factoring of the problem and is strong and robust enough for autonomous driving. Example implementations define the world model in terms of affordances for obstacles, paths, and wait conditions that can be perceived live in real-time. The example non-limiting embodiments use mapping and localization to bring affordance estimates from previous drives to bear upon the current drive. Example non-limiting embodiments take action based on the world model through planning, control and ultimately actuation.

In more detail, FIG. 41 shows an example non-limiting overall block diagram of an autonomous driving platform and associated architecture 3000. The example non-limiting architecture 3000 provides a world model 3002 that is continually updated based on newly gathered inputs including:

Obstacle perception 3010
Path perception 3012
Wait condition perception 3014
Map perception 3016
Other (not shown)

These various perceptors 3010, 3012, 3014, 3016 are informed by sensors 3018 and associated low level processing 3020, such as (without limitation) camera feature tracking and LIDAR point cloud alignment. In example embodiments, perceptors 3010, 3012, 3014, 3016 are for example supported by a further support layer(s) 3021 including for example self-calibration 3028 and trajectory estimation 3030.

The perceptors 3010, 3012, 3014, 3016 are used to generate and update the world model 3002. The world model 3002 is used for planning 3004, control 3006 and vehicle actuation 3008.

In example non-limiting embodiments, aspects of map perception 3016 are provided to a cloud mapping application 3022 that may be remotely located from the ego-vehicle and accessible via a network 3024. In this context, "ego-vehicle" refers to the perspective and/or instance of a vehicle that uses the FIG. 41 platform (to actuate its own steering, braking, navigation, decision-making) in combination with other systems to accomplish autonomous driving. Perception for mapping 3016 and localization 3026 is communicated through the cloud 3024 between drives of the ego-vehicle to bring affordance estimates from previous drives of the ego-vehicle into the present. Perception for mapping 3016 and localization 3026 may also communicate through the cloud 3024 to bring affordance estimates for past and present drives of vehicles other than the ego-vehicle. Cloud mapping 3022 may receive inputs from a number of different contemporaneously and/or previously operating autonomous vehicles and other information sources, for example. The cloud mapping 3022 provides mapping outputs which are localized by localization 3026 based e.g., upon the particular location of the ego-vehicle, with the localized output used to help generate and/or update the world model 3002. The world model 3002 so developed and maintained in real-time is used for autonomous vehicle planning 3004, control 3006 and actuation 3008.

The following briefly describes affordances and the roles they play in example non-limiting embodiments. More detail is presented below in connection with FIG. 42.

Obstacle Perception 3010

Obstacle perception revolves around an estimation of where the vehicle can drive and how fast it can drive without literally hitting an obstacle (e.g., an object, structure, entity) that is being directly sensed. Avoiding collisions with obstacles is generally necessary for safe autonomous driving, but it is not sufficient. There are many behaviors of vehicles that successfully avoid obstacles but which nevertheless may be deemed unsafe or undesirable.

Path Perception 3012

In the example non-limiting embodiment, path perception is used to perceive nominal paths that are available in a particular situation. An additional dimension of paths affordance is the availability of one or more lane changes. Some example embodiments represent the paths affordance with a representation called a lane graph. The lane graph may be as simple as the single path on a highway on-ramp. Other lane graph representations may provide paths to a desired lane and indicate available lane changes down the highway. A more complex or fuller lane graph may indicate nearby lanes, lane changes, forks, turns, cloverleaf interchanges, and merges.

Making paths explicit is not necessarily the same as the fully integral approach of estimating the steering wheel position or turning radius of the vehicle. However, paths affordance enables mixing of the path estimate with other information. It also allows effective use of the path information in interaction with longitudinal control. Paths affordance also allows consideration of different controllers 3006 for different vehicle types without retraining. Additionally, more geometric self-calibration 3028 may assist in freeing the world model 3002 up from interaction with particulars of each individual ego-vehicle.

In some cases, such as in an open area, there may not be a discrete set of nominal paths. Such situations may be referred to as "Zone Driving." In example non-limiting embodiments, the estimated paths affordance in this case is to identify this area as a zone, and to indicate to planning 3004 and control 3006 to rely only on basic obstacles (obstacle perception 3010) to achieve the driving goal. This for example might apply in the case of an autonomous boat in open water or an autonomous 4WD truck in the backcountry.

Wait Condition Perception 3014

The example non-limiting embodiments may also be constrained longitudinally by a set of rules, conventions and/or practical considerations. One example convention is traffic lights. A traffic light rule insists that the ego-vehicle stop and wait at a certain point until a certain condition becomes true (i.e., the traffic light turns green). These rules, conventions, and practical considerations may be referred to as wait conditions affordance and are handled by wait condition perception 3014 in example non-limiting embodiments.

Some example non-limiting embodiments represent a wait condition as any situation that constrains the vehicle longitudinally and requires the vehicle to wait or slow down until some condition is true, except for speed limit and clear and obvious obstacles. Wait conditions may include, for example:
traffic light intersections,
multi-way stops,
yields,
merges,
toll booths,
gates,
police or road workers directing traffic,
stopped school buses,
one-way bridge arbitrations
ferry entrances
other.

Wait conditions often arise from potential obstacles, such as crossing traffic in an intersection. However, the crossing traffic may not be perceivable from direct sensing, so example non-limiting embodiments provide autonomous situational awareness by resolving the danger of obstacles that are not always immediately perceivable through rules and conventions that can be perceived or learned.

Map Perception 3016

In example non-limiting embodiments, mapping is not an affordance by itself. Rather it is a mechanism by which behaviors are discerned, and in particular to determine specific examples of what conventions are applied at a particular locale. Some examples include:

in Rhode Island, the first car waiting to make a left turn at a traffic light breaks the law by turning before oncoming traffic when the light turns green;
traffic lights that gate different roads but are hardly offset from each other;
No U-turn on Thursdays between 4 and 6 PM'; and
electronic signs that change the directionality of lanes depending on time of day.

Mapping thus provides a way to transfer affordance estimates from previous drives into the current one.

Affordance estimates are easier to get from previous drives because they can be produced after the fact (i.e., after an action has been chosen). While mapping often does not bear upon moving obstacles, it often gives suggestions for stationary infrastructure obstacles. Mapping may also provide very specific information regarding paths and wait conditions. For example, it is possible to observe statistics of which light has to be green for a vehicle to take a particular path.

More Detailed Example Architecture

FIG. 42 shows a more detailed breakdown of an example platform 3000. In FIG. 42, blocks with darker lines indicate data structures (typically stored in non-transitory memory) and the other boxes indicate processing modules or functions (typically implemented by one or more processors executing instructions that may include—for example and without limitation—deployments of one or more trained neural networks).

The example non-limiting platform of FIG. 42 includes the processing functional blocks shown in FIG. 41, and also shows additional detail concerning interconnections between those functional blocks. For example, trajectory estimation 3030 has been expanded to include basic trajectory estimation 3030 and advanced trajectory estimation 3030a. Similarly, planning 3004 has been expanded to include a basic behavior planner 3004a, an advanced behavior planners 3004b, a lane planner 3004c, a route planner 3004e, and a behavior selector 3004d. Low level processing 3018 is shown as including for example basic lane detection 3160, vertical landmark detection 3158, LIDAR ground plane detection 3154, LIDAR ICP 3152, feature tracking 3150, freespace tracking 3162, object tracking 3164, and a dynamic occupancy grid 3102. Self-calibration 3028 is shown as receiving specification information 3156 as an input and communicating with cloud system 3022 via calibrating telemetry 3157. Specification information 3156 can include for example reference information or 3rd party reference information, and in particular example embodiments mechanical drawing information, technical specification data, user manual data, etc. Path perception 3012 is expanded to include tracked lane graphs 3100 with various capabilities as well as in-path determination 3120; wait conditions perception 3014 is shown as using wait conditions 3106; and map perception 3016 is expanded to include precise map 3105 and route map 3104. Localization 3026 is broken out into basic localization 3026a and advanced localization 3026b. Cloud system 3022 is shown as detailed to include an HD map reader 3022a, a cloud wait condition 3022b, a cloud lane graph 3022c, and drive matching and tiling 3022d.

World Model 3002

Example non-limiting world model 3002 data structures are sufficiently rich to accommodate data that may come from a map, and support intermediate range planning 3004 such as planning a turn or two ahead. They also may accommodate driving based only on relatively minimal affordances from live perception. For basic highway autopilot, an initial world model 3004 may be as simple as a single lane graph edge 3100b with in-path objects determined 3120. In other example embodiments and contexts, the world model 3002 may be advanced with lane change availabilities and objects in adjacent lanes, plus route mapped (3104) for overall route planning at a longer range more detailed map (3105). Further additions may include wait conditions 3106, lane boundaries and dynamic occupancy grid 3102. In some cases, such as zone driving, only the objects in the dynamic occupancy grid 3102 may be available, whereas in other embodiments wait conditions 3106 is also available. Different capabilities can be added depending on the context, capabilities, and requirements of the drive system.

Lane Graph 3100

In one example non-limiting embodiment and context, the world model 3002 comprises a single tracked lane graph 3100b. In this context, "tracked" means that when the lane graph is communicated, correspondence to a previous lane graph delivery(ies) is included. In one example embodiment as shown in FIG. 43, a tracked lane graph 3100b; may provide:

a spline of drivable edges,
lane change existence and availabilities,
lane boundaries,
wait condition(s) 3106 (in this case a fork),
in-path object(s),
other object(s) 3120,
a dynamic occupancy grid(s) 3102,
a basic route map 3104,
vehicle state,
contention area(s),
other.

The lane graph(s) 3100 and the dynamic occupancy grid 3102 are typically delivered to planning 3004 in the vehicle coordinate system, which means entities move from delivery to delivery. It is also useful for a planner 3004 that works on the data to be able to link more explicitly to its previous plan to avoid glitches. The example non-limiting embodiments may thus build this functionality into the communications interface.

In the example non-limiting embodiment, a lane graph can be described as the center paths or lanes or as the dual, lane boundaries. A "spline" may consist of a directed graph, where the edges contain an oriented curve that represents the coordinates of the center path of a lane. The implication is that a vehicle can drive along a directed edge into a node and leave through any of the directed edges that leave it. Thus, all curves into or out of a node may have the same point and tangent at the node. An example parameterization is to have a 3D point and tangent direction at each node and use a cubic spline for the curve corresponding to each edge. Then the spline is uniquely determined by the coordinate and tangent constraint at its end points, and parameters are shared between edges that share nodes.

In addition, there is a set of connections from an edge to other edges that indicate that those edges are approximately parallel and that a lane change is allowed into them. These lengths come from two scalar distances indicating how far along the path the lane change target is. The first is an earliest point the lane change can realistically be expected to be completed (this is the target point used while planning). The second is a distance ahead from this point within which the lane change must be completed. This does not necessarily mean that the lane change is available right now.

In example embodiments, there is also a left and right lane boundary with each edge in the lane graph, which may also be represented by a cubic spline with its own end points and tangents. For simplicity, the data for lane boundaries need not be shared between lane graph edges in some exemplary embodiments, so there is nothing in the representation explicitly enforcing that boundaries are continuous between edges or that they match up between neighboring lanes. This approach simplifies indexing, and limits the graph structure to the graph of drivable segments. The lane graph may also include data structure placeholders for in-path objects and wait conditions (see below).

In-Path Objects

In example non-limiting embodiments, in-path objects are like beads snapped onto the drivable lines of the lane graph. They represent how objects obstruct progress along the lane graph segments. They come as a list for each lane graph segment. They contain information about the object, which includes a distance along the cubic spline segment from its beginning to its first object point. They also include a velocity along the cubic spline segment. There may also be a Boolean flag or other data element for each lane change that is used by live perception to indicate whether a lane change is available (a simpler form of indicating object obstruction).

Wait Conditions

In example non-limiting embodiments, wait conditions come as in-path and free form (much like objects may also come as in-path and free form). In-path wait conditions are coded similarly to in-path objects, as points of progress along one of the drivable edges in the lane graph. In-path wait conditions could have velocity. An example of a wait condition in motion would be something like a school bus with blinking lights in the process of stopping, generating a limit for progress that is further behind the bus. Wait conditions in example non-limiting embodiments come with a type (stop/yield/merge/feature extensions), an indication of state (e.g., green/yellow/red) as well as a recommended velocity when the wait condition is red. Wait conditions may also come with a spatial length, encoding the longitudinal extent of the condition after the onset point that the condition should be considered. In non-limiting embodiments, green means the wait condition is not present or active, red means that the wait condition forbids motion from the ego-vehicle through its interval at higher than the recommended speed (which could be zero), while yellow means the ego-vehicle should lower the speed before the onset of the interval but only if it is possible to do so comfortably and safely.

In the example non-limiting embodiments, traffic light intersections may be implemented by encoding the type "stop" at the appropriate wait line, followed by an extent of a certain distance (e.g., one meter) that sets the state according to the light, and a recommended velocity of zero. A four-way stop could be implemented with a similar encoding but perception modulating the state of the condition to red until the vehicle has stopped and the conditioned checked to be green. A yield is similar except that the recommended velocity is not exactly zero, but perhaps a crawl speed. A merge can be processed like a yield, except that it is an explicit suggestion to look for contention from other vehicles/objects in a corresponding lane because of an upcoming merge point in the lane graph. It also comes with a recommended velocity over a given interval along the lane graph, which is not to be exceeded even if no objects are yet perceived. Example non-limiting embodiments are thus able to implement things such as crawl behaviors that allow perception to have a chance to "see" the required contending traffic. Traffic light wait conditions often coincide with the fork shown in the example lane graph, for which the different forks correspond to different traffic lights. Example non-limiting embodiments can implement this by putting the wait condition with zero progress along the edges that leave the fork rather than the edge that enters it. This allows multiple wait conditions with different states.

Example non-limiting embodiments also implement free form wait conditions for communicating cases such as a traffic light seen while zone driving. The free form wait conditions may thus not be tied to a particular direction of travel but may instead be represented as basic distances forward, but are otherwise the same in some non-limiting embodiments.

In some example non-limiting embodiments, perception and mapping will handle most of the complexity of wait conditions. Some internal workings of wait conditions do not have to be put explicitly into wait conditions, but may still be part of what perception and mapping work with internally. For example, live perception may find traffic lights and their angles, and mapping may represent the position of the traffic lights in 3D and perform matching between mapped and live perceived traffic lights. Similarly, the contention area of an intersection may be estimated either live and/or through mapping, as well as contention areas (see FIG. 43) that have to be checked for other traffic before proceeding through a multi-way stop. Thus, such things may be in the map but not pushed into the world model used by planning 3004 and control 3006. This does not preclude the planner 3004 negotiating with other vehicles through suggestive driving during merges or multi-way stops, but may prompt requests for more information in the world model 3002.

Objects

In example non-limiting embodiments, objects as shown in FIG. 43 consist of or comprise a 3D point and 3D velocity in the ego-vehicle coordinate system. Objects may be handled through in-path determination 3120 and the dynamic occupancy grid 3102.

Vehicle State

In example non-limiting embodiments, (ego) vehicle state can be encoded based on a longitudinal velocity, longitudinal acceleration and a lateral curvature of the (ego) vehicle. Vehicle state may also include a GPS (geolocation) position and compass direction, which may be useful with route map 3104. Planning 3004 and control 3006 is also enabled to carry the basic trajectory estimation 3030 interface for fast estimates of recent relative motion and the CAN (actuation) interface for the sensing and control of the ego-vehicle.

Dynamic Occupancy Grid 3102

The dynamic occupancy grid 3102 shown in FIG. 43 consists in the example non-limiting embodiments of a volumetric array where two dimensions are spatial and one is temporal. As one particular non-limiting example, the grid 3102 may comprise a 100 m×100 m grid around the vehicle and in increments of 10 cm, rendered at one tenth of a second intervals for the next five seconds, resulting in a 1000×1000×50 array of grids.

Route Map 3104

The route map 3104 in some embodiments is a large-scale map graph where the nodes are GPS waypoints and the edges link waypoints and indicate an expected time to traverse. The route map 3104 may exist at multiple scales, such as separate scales for country, state, city, neighborhood, etc.

Sensor Abstraction 3108

In the context of the lane graph 3100, the sensor abstraction 3158 provides a uniform format for all sensors of the same type so they can all be used with the common representation of the lane graph. That is, in example non-limiting embodiments, one internal format may be used for RADAR data, LIDAR data, camera data, etc. A similar uniform format may be used for cases to apply control back to sensors such as setting frame rate or performing gain control. The sensor abstraction 3108 in some embodiments also provides the timestamps for each sensor packet.

Basic Lane Detection 3160

In example embodiments, lane detection estimates that paths are valid as directly as possible. Basic lane detection in example non-limiting embodiments is shown broken out from path perception in FIG. 42 since it supports self-calibration.

The example non-limiting embodiments may perform basic lane detection 3160 using one or more neural networks trained on manually labeled datasets. Auto-labeled datasets generated by driving could substitute for the center path, which provides data for self-calibration and for path following but manual labeling may assist in lane width recognition. A labeling procedure may be used that is directed towards path affordance. That is, when labeling, it is possible to label valid paths in an image. This can be done for example by annotating each valid path with two polylines indicating the parallel sides of a path (see FIG. 44). The intent is to keep the polylines smooth so that the area between the two polylines has a path with that direction. It is possible to train a neural network to provide data about this in an image, such as the directionality of the paths at each point, and whether a point is on a lane edge. It is also possible to define a periodic function that goes from one in the center of a path down to zero at edges between the paths. In cases of forks and intersections, there may be multiple paths, providing some additional encoding complexity. One example design handles different angular sectors of travel separately. Another example explicitly identifies such areas (e.g., an intersection) and uses some more freeform path estimation for those areas or to explicitly estimate the fork path of a fork (e.g., regardless of whether it is visually well supported by explicit markings). Another example non-limiting approach is to have a few different networks that have different preferences (e.g., left leaning, forward and right-leaning networks), which is somewhat similar to the sector technique. Yet another example implementation defines the network such that it is queried with an intended path (e.g., suggested by GPS) and returns the closest valid option.

For purposes of self-calibration, the example non-limiting embodiment provides basic lane edge detection 3160 that works when markings are reasonably clear, so that the vehicle can determine or refine a calibration from some manual or automatic highway driving. Energy minimization can be used on top of the network output, where the problem in ideal form is to find the curve from some family of curves that has the strongest support in (e.g., most corroboration with) the neural network output. One non-limiting example of a practical way to accomplish the search is to use dynamic programming where the intermediate states are the x-coordinates along a row and the image, or x-coordinates plus angle of the edge line, progressing upwards or downwards to complete a search that yields the best supported curves that start in each column (or each column at each angle). If the example non-limiting embodiment uses only x-coordinates, only continuity is enforced. The use of angle provides the additional capability of enforcing continuity of the angle.

For self-calibration of yaw, some example non-limiting embodiments use a form of basic tracking. Such basic tracking may be provided by doing basic left/right assignment after geometric fitting and using that classification for purposes of self-calibration (although temporal tracking to provide association may be more resilient for changing lanes). Example non-limiting embodiments can perform the same procedure using LIDAR by using the brightness information in the LIDAR as a direct cue for lane edge support. A neural network may also be trained for this purpose.

Virtual Landmarks 3158

The example non-limiting embodiment provides virtual landmark detection 3158 (see FIG. 45) for use in self-calibrating roll and in mapping. Vertical landmarks are one kind of example non-limiting landmark that may be detected. Vertical landmark detection 3158 may be broken out from map perception 3016 because vertical landmark detection in some embodiments supports self-calibration.

In example non-limiting embodiments, landmarks are detected with the amount of roll that is desirable to correct for in self-calibration 3028. Roll should usually be not more than a degree or two, but it can be higher, so accounting for range of + or −five degrees of roll may be desirable in some embodiments. This can be accomplished by varied training data or roll augmentation of the training data. In some example embodiments, a neural network is trained to put out a pixelwise semantic segmentation of the vertical landmarks, and basic post-processing produces a line represented by two end points (for which height is not so important). Such example non-limiting embodiments can correct for radial distortion when performing the geometric extraction.

Feature Tracking 3150

An image feature tracker 3150 is always running in some example non-limiting embodiments. The image feature tracker 3150 supports both advanced trajectory estimation 3030a as well as object tracking 3010, and is therefore broken out as a separate module in FIG. 42. Feature tracker 3150 can operate on LIDAR images, optical images, RADAR images, and/or other sensed perceptions.

A corner point detector can be used to produce promising features to track (see FIG. 46), which starts the process of replenishing tracks. The distribution of points is performed in the example non-limiting embodiment by balancing the need to spread points out across all regions to cover much of the view for trajectory estimation 3030 and to cover all objects with enough points (although a separate tracking mechanism may also be forced onto objects). In one example embodiment, each track is progressed into the next frame through a relatively standard KLT image patch alignment mechanism in a hierarchical pyramid. A reference patch (e.g., 16×16 and perhaps hierarchical scales of some) is abstracted in the first image of the track.

After the alignment is performed, the correlation between the aligned region in the new image and the reference path is checked. If it is too low, the feature track is removed. If it is acceptable, but still below a threshold indicating danger of soon failing, the track is accepted but the reference patch is updated. This procedure provides a tradeoff between wanting to keep the reference patch for as long as possible to suppress drift introduced by updating it but at the same time wanting to update it often enough to adapt and not fail in the tracking. The feature tracks are stored in a track table data structure in the example non-limiting embodiment. This track table data structure is implemented in some embodiments as rolling buffer where the rows are feature tracks and columns are image frames. The table holds the maximum number of rows, and each track that is alive can occupy a row. As soon as a track fails, it is removed and frees up a row in the table.

Iterative Closest Point Alignment (LIDAR ICP) 3152

When a LIDAR sensor is present, example non-limiting embodiments also perform iterative closest point alignment between frames of some spatial separation. See FIG. 47, FIG. 48. This is done in some embodiments by tracking the first frame (the reference) as a depth map 3304 and the second as a 3D point cloud. Example non-limiting embodiments initialize the relative pose 3306 based on the motion given by the basic trajectory estimation module 3030, and also pre-correct the LIDAR scans for motion using that data. Example non-limiting embodiments then pre-calculate the derivative images of a smoothed version of the depth map 3304. The 3D points from the new frame are projected into the reference depth map (e.g., through parallel computation) and the best matching depth in a very small region in the depth map is found (if the distance differs a lot, then the point is rejected for robustness). In some embodiments, the derivatives are used to accumulate to an expression such as for example a 6×6 3D pose update equation. The procedure is iterated. In some non-limiting embodiments, this function supports both advanced trajectory estimation 3030a and obstacle detection 3010 using LIDAR. LIDAR Ground Plane 3154

For the LIDAR ground plane 3154, one example non-limiting estimation process is to perform a brute force search that tests every possible ground plane pose against all the close points in the depth map. Other embodiments may use a slightly less computationally heavy approach of performing a least squares patch fit to each block of pixels in the depth map near the vehicle, and then do a two-dimensional search for a line from the ground plane emanating from the vehicle up each column of blocks in the depth map near the vehicle. Some example embodiments then run a random sample consensus (RANSAC) procedure using the set of lines as input data, each pair of lines providing a hypothesis and the lines themselves used as a consensus test. Example non-limiting embodiments can use the same code that performs Iterative Closest Point Alignment (ICPA), but using a plane as the reference depth map.

Self-Calibration 3028

In order to perform any form of registration, whether it be between moments of the same drive or between moments of different drives, example non-limiting embodiments typically want to have accurate registration between the different sensors on a vehicle. This is usually called calibration and is split into intrinsic calibration and extrinsic calibration. Intrinsic calibration may involve the mapping that a sensor performs from world angles to image angles, given a canonical pose of the sensor. Extrinsic calibration may involve the pose of the sensor with respect to the world or some reference coordinate system on the vehicle. Different sources of such registration include specification information 3156, nominal design values (such as for the distortion effects of lenses), calibration at the factory or a service center, and self-calibration where self-calibration refers to determining the parameters of calibration using (only) the sensor data collected during normal operation (for example, using one or more sensors to calibrate one or more other sensors).

Self-calibration is a powerful tool, because it brings flexibility, operational simplicity and the potential for high levels of automation. In practice, factory calibration procedures, while attractive since they can be designed to simplify the estimation task at hand using specifically designed markers or rigid metallic 3D constellations, have practical challenges due to real world issues such as lost calibration files, bugs in software, procedure or calibration environment that cannot be recovered after the vehicles leave the factory, and/or changes in calibration occurring due to mechanical forces on the sensors. However, it should be said that factory calibration is often helpful in some embodiments to control the process variation and to avoid vehicles being built out of specification.

Once specification information 3156 and nominal values for optical distortion are taken into account, the largest remaining variability is typically due to the rotational pose of the sensors. The mounting position of cameras, RADARs and LIDARs should in some embodiments be reproduced to centimeter (or even millimeter) precision, which means the remaining translational effect on sensor data is minimal. Intrinsic calibration can have a significant effect, but for the above-mentioned reasons, it may be preferable in some embodiments to control the variation carefully around known nominal values, and only if necessary apply a specific intrinsic calibration per sensor. This leaves the variations of roll, pitch and yaw of the sensors (cameras, RADARs, LIDARs) in their mounting position.

FIG. 48 shows an example non-limiting completely automated self-calibrator 3028 that uses very high levels of redundancy. Calibration is generally stable over long periods of time (if it is not, then this should often be handled at a mechanical level). This means that example non-limiting embodiments can gather self-calibration evidence from many independent moments over a period of time such as for example a few hours. Example non-limiting embodiments can then look for a clear consensus from these independent data points, accept the result only if it is clear and unambiguous and reject it otherwise. Rejection can lead to waiting for more data before allowing automatic operation or data collection, the use of a last known good value, or ultimately if too much time has expired, the flagging of the vehicle for service. Using high levels of redundancy this way is essentially an application of cross-validation, a long-standing approach in statistics and machine learning, here applied to the more geometrical problem of self-calibration. In example embodiments specification information 3156 may also include telemetry information 3156 of self-calibration statistics, which is sent back to a central monitoring function in the cloud 3022 (see FIG. 42).

FIG. 48 shows an example non-limiting self-calibrator 3028 that self-calibrates optical cameras, LIDAR detectors and RADAR detectors based in part on vehicle odometry. Cameras are self-calibrated for pitch 3206, roll 3212 and yaw 3218; LIDAR sensors are self-calibrated for pitch 3232, roll 3234 and yaw 3240; and RADAR is self-calibrated for yaw 3252. Cross estimation between sensors (e.g., for pitch and yaw 3220 between cameras and LIDAR) is also performed.

The example non-limiting embodiment of FIG. 48 can manage the redundancy by performing calibration on one parameter at a time and for each parameter using a small snippet of data that by itself in principle determines the parameter, and allowing that snippet of data to vote into a histogram of votes for that parameter. Success or failure can then be determined over time by considering how close the histogram is to the ideal single peak that would result if each snippet alone indicated the correct calibration value. Example embodiments consider a long but finite window of time since calibration values may change occasionally. This can either be accomplished for example by an explicit rolling buffer of votes or a slowly decaying histogram of votes with a decay set to target a desired half-life.

Some effects can change the pose values for sensors much faster than a reasonable self-calibration time window. For example, applying the brakes usually pitches the vehicle forward slightly. However, such effects usually apply to the vehicle as a whole rather than to the relative pose between sensors, and are therefore better handled as part of trajectory estimation 3030, considered in a section below.

Roll of Camera

Example non-limiting embodiments determine the rotation of the sensors relative to the ground plane. This gives a reference for the roll 3212 and the pitch 3206 of the sensors (but not for the yaw 3218). In principle, roll and pitch are interdependent, joining to form the 'up vector', meaning the normal vector to the ground plane as observed in the sensor.

The determination of roll 3212 is not, in some contexts, absolutely critical for driving purposes as a result of roll variation being relatively controllable mechanically and the effect of slight roll being less immediate. However, roll is often or even typically not negligible, especially for mapping purposes and for joining sensors around the car.

To self-calibrate for roll, some example embodiments use vertical landmarks 3158 as shown in FIG. 45. If roll is not egregious, a neural network based detector can find the vertical landmarks in the scene. The outcome of that, potentially after some form of post-processing and correction for radial distortion and intrinsic parameters, is in some example embodiments a set of lines in the intrinsically calibrated coordinate system of the camera. The neural network should be trained to reflect the expected roll variations in practice. In some example embodiments, two or more different lines pinpoint the up vector as their intersection point in the projective coordinate system. Alternatively, example non-limiting embodiments can assume that pitch 3206 is known (which is usually at least approximately true). That provides a line near the line at infinity in the image, leaving only roll 3212 to be determined by the intersection with a single additional line from a vertical landmark. This allows example embodiments to histogram vote for the roll angle over time.

Pitch of Front Camera

To determine pitch, example non-limiting embodiments assume that roll calibration and correction is done. One way to self-calibrate a front facing camera for pitch 3206 is to leverage road lane lines via lane detection 3160. This gives a direct link to what matters for driving, and over a long period of time, almost any car will encounter sufficient amounts of lane line observations to support pitch calibration. A neural network-based detection of lane lines 3160 with potential post processing can be employed in some embodiments and outputs connected curves or point lists. If example non-limiting embodiments take a pair of points from one of those connected curves, one near the bottom of the image and one slightly higher up, they can most of the time be used to form a line parallel with the lane line along the ground plane near the car. By using two such lines and intersecting them (for example using a cross product in homogeneous coordinates), example non-limiting embodiments get an intersection point in the image. That point should ideally be on the horizontal line in the image that is the vanishing line of the local ground plane around the car. Thus, example non-limiting embodiments can use the vertical coordinate of the intersection point in the image to vote for a horizontal vanishing line.

Yaw of Front Camera

The yaw 3218 of a sensor is different in the sense that there is nothing as canonical as the ground to refer it to in the world. On the other hand, the ground plane could simply be thought of as the plane joining the bottom touch points of the wheels of the vehicle. Similarly, the yaw could be defined relative to pose in a mechanical drawing from specification information 3156 that has several sensor positions. However, for driving purposes, at least for a front facing camera, it is helpful to know the yaw 3218 of the camera relative to the forward direction of driving, and in particular relative to the control that example non-limiting embodiments get when commanding a steering angle of zero. Ideally, this should also result in the vehicle driving in a straight line.

To the extent possible, some example embodiments consider yaw calibration a task for self-calibration of the steering rack. In any case, example non-limiting embodiments can use the vehicle odometry to determine how far the vehicle has driven and how much it may have turned. Example non-limiting embodiments can then use points on any of the lane lines (see block 3160) to project forward from one point in time to another and require that the points line up with the corresponding lane line at a second moment in time. This involves inverse projection through the unknown yaw of the camera, onto the ground and back through the unknown yaw of the camera at the second moment in time. This allows solving for the yaw of a camera in a way that is very closely tied to the control loop of the vehicle. The effect of yaw on the image of a point that the vehicle has travelled closer to is different due to the distance change. For example, if the distance has shrunk to half, the force-applying lever arms differ by a factor of two, resulting in yaw moving the image point differently by a factor of two.

Pitch and Yaw of Other Cameras

As shown in FIG. 48, roll can be solved the same way for all cameras, although for high precision purposes such as stereo, some embodiments solve for relative roll using standard image matching techniques, matching the roll of one camera to the other. Pitch and yaw is similar in that a relative technique is often best. For example, imagine that example non-limiting embodiments have computed the roll 3212, pitch 3206 and yaw 3218 of one of the front cameras. Then, for any observation of a lane line in both the already calibrated camera and the camera to be calibrated, example non-limiting embodiments get a proposal for the pitch 3224 and yaw 3226 of the not-yet-calibrated camera. In example non-limiting embodiments, the pitch and yaw that makes the two projections of the lane line onto the ground line up. Such example non-limiting embodiments are able to solve for the height of the vehicle (due to air pressure, suspension and loading). Since the roll, pitch and yaw of each camera is in principle solvable by itself, the right height is then the height that lines up projections from different cameras on the ground plane, which results in a unique height if there is a baseline between cameras. This procedure can be continued to other cameras that do not have instantaneous overlap with the initial cameras, by using vehicle odometry to predict the movement of road lines and other content while driving. For example, the pitch of side cameras will be well constrained by observation of lane lines that were previously observed in the front cameras.

If example non-limiting embodiments have many correspondences, they can solve for the epipolar geometry between two cameras with known intrinsic calibration. The epipoles of the epipolar geometry indicates the baseline direction between the two sensors (which is a line known in the specification information 3156). The epipolar geometry also gives the relative rotation between cameras around that baseline. The only remaining ambiguity is a joint rotation around the baseline, which can be determined the same way as the pitch of one camera. More generally, the joint geometry and the projection centers of the cameras can be determined from correspondences, and if the cameras are not collinear, they have a unique 3D pose alignment with the projection centers in, e.g., a mechanical drawing referenced in specification information 3156. Then the pose of the vehicle frame (mechanical drawing) with respect to the ground plane is determined by the multi-stereo triangulated points in the ground plane, except for the overall yaw rotation, which can be determined by the direction of driving.

Roll and Pitch of LIDAR

Example embodiments determine the roll 3234 and pitch 3232 of any LIDAR sensors using the assumption that points near the vehicle should have a frequent mode corresponding to the ground plane and that the structure of those points should be level in both directions. For example, example non-limiting embodiments can look for a robust planar fit of the ground plane (3154) near the vehicle in each frame and use it to produce separate votes for roll and pitch. The height is then also observed in the LIDAR distances. Relative positions between multiple LIDARs can be estimated well using iterative closest point algorithms.

Yaw of LIDAR

Lane lines can be observed in LIDAR intensity data as well as in cameras, since lane lines (see 3160') are typically reflective and result in stronger reflections of the LIDAR active light. For this reason, example non-limiting embodiments can use essentially the same technique for calibrating the yaw 3240 of a LIDAR sensor relative to the driving direction as for a camera.

As with a camera, example non-limiting embodiments could also use general motion estimation and compare it to the motion expected based on odometry. Using lane lines can be seen as a special case of this, but seems more direct since it is done in the region that matters most for driving and based on a feature that changes strongly with yaw angle.

RADAR

Since automotive RADARs are mostly useful for distance, relative velocity and bearing angle, the main thing to calibrate is a yaw angle 3252. Interestingly, example non-limiting embodiments can use a similar algorithm as for cameras. Since the RADAR returns point targets and also a determination of whether they are stationary, example non-limiting embodiments can use each stationary target trajectory and look for the yaw of the RADAR sensor that results in the target trajectory closest to a point after it has been compensated for the present vehicle motion. For targets in a forward pointing RADAR, the sideways variation is the one connected most strongly with the yaw angle, and the cue is the same as what is being used for camera yaw angle calibration (and similar for backwards pointing RADARs).

Trajectory Estimation 3030

Example non-limiting embodiments may have sensors that, as long as they function and are communicated correctly to the main estimation process, can provide an approximate trajectory estimate that is less prone to complete failure. Wheel "ticks" (e.g., sensed rotational angle changes) together with steering wheel angle (e.g. from a steering wheel angle sensor) already provide a basic planar trajectory. Some example non-limiting embodiments add an inertial measurement unit (IMU) with gyro-sensors to provide an accurate relative rotation. This means that example non-limiting embodiments can treat trajectory estimation as a nonlinear optimization problem starting at an approximate estimate built with those sensors, and not worry much about maintaining multiple alternative solutions.

Basic Trajectory Estimation 3030

Basic trajectory estimation 3030 is an approximate but fast and convenient estimate. It is helpful for the controller 3006 and for forward prediction inside all the perception tasks, obstacles, paths, wait conditions as well as for mapping. For these tasks, example non-limiting embodiments do not depend on GPS and should have access to a consistently smooth path. Therefore, the interface for basic trajectory estimation 3030 is one where a query can be placed for the relative motion between two different times. The implementation is a light and fast extended Kalman filter that takes the vehicle odometry and IMU as input and keeps a rolling buffer with the result in order to serve queries.

Basic Localization 3026a

Some other tasks such as finding a starting point for present vehicle location in a map are better served with a GPS pose (in this context, GPS pose means full six degrees of freedom, not just a latitude/longitude or northing/easting). This is served in some embodiments by the basic localization module 3026a, which works with GPS, vehicle odometry and IMU and performs similar filtering as the basic trajectory estimation, but in the GPS coordinate system.

Advanced Trajectory Estimation 3030a

FIG. 49 shows a block diagram of an example non-limiting trajectory estimator 3030a. For the advanced trajectory estimation 3030a, the task is to provide a very accurate relative trajectory based on well registered camera or LIDAR sensor readings, to support detailed visual triangulation of visual landmarks or LIDAR mapping.

In example embodiments, trajectory estimation is a cornerstone for registration. It may be argued that example non-limiting embodiments could localize all moments of a drive to a map and that would give an estimate of the trajectory. However, example non-limiting embodiments should consider the practical conditions that make certain registration tasks hard or easy. For calibration between sensors, the task is helpful but made easier by having many redundant observations of the same geometry, and for each moment via an environment that is from the same or close to the same moment in time.

For trajectory estimation 3030a, some example non-limiting embodiments have one set of observations, although with some redundancy since example non-limiting embodiments can use vehicle odometry, visual odometry, LIDAR point cloud registration and RADAR trajectories to estimate the trajectory. Example non-limiting embodiments also have smoothness and motion models simplifying the problem. Since all those measurements are taken very closely in time as the trajectory is driven, it is much easier to track visual features, and to trust that surfaces generating point clouds have not changed. For these reasons, the constraints between moments of a drive are stronger in practice than those between drives (or equivalently, from a drive to a map). Therefore, example non-limiting embodiments estimate drive trajectories so they can lift the problem of registering moments between drives to registering drive trajectories (which lowers the estimated degrees of freedom from very many to mostly three as discussed later).

For mapping, example non-limiting embodiments estimate a drive trajectory so they can register between drives, which in turn allows bringing information from previous drives into the current. One of the consequences of this is that example non-limiting embodiments only need the trajectory estimated for some window of time as a 'relative shape' and not globally drift free or in a GPS coordinate system. Example non-limiting embodiments only need a long enough window to make sure that sufficiently many sparse landmarks are seen over the segment and that their relative positions are not too distorted for segments of different drives to be aligned.

Some example non-limiting embodiments use a so-called 'sliding window' filter 3312 where the trajectory is estimated over a temporal window by nonlinear refinement with the likelihood contributions of all sensors, then sliding that temporal window forward and repeating the estimation. For real-time purposes, the advanced estimation may be performed in some embodiments on a background thread, while the fast filter in the basic trajectory estimation may be run in a foreground thread to forward the estimate to the head of the highest frequency IMU/vehicle odometry measurements. Inter-drive estimation or drive-to-map estimates can also happen in the background thread, so the fast filter is just used to correct for the latest present vehicle movement data for real-time purposes.

The windowed trajectory estimation problem is parameterized as a sequence of poses of the vehicle (as discussed above, the sensor calibration can be used to determine the sequences of sensor poses in a common coordinate system). Example constraints are as follows. Wheel ticks provide expected distances between poses. Steering wheel angle provides expected local planar curvature of the trajectory. An IMU gives local relative pose constraints, and optionally, gravity vector constraints. Visual feature tracks 3308 are triangulated 3310 and included in bundle adjustment 3312 providing relative pose constraints (these in particular become very strong if cameras cover all around the vehicle as high field of view is well known to improve reliability and accuracy of visual odometry). Results of iterative closest point between subsequent LIDAR point cloud segments provide relative pose constraints. Stationary RADAR targets can be used in a similar way as visually tracked points and provide distance and bearing observations that constrain relative poses. GPS could in principle also be used, although if the window is long enough that GPS helps by suppressing drift, the distortion of relative positions already reaches a higher magnitude of error than the alignment precision example non-limiting embodiments are aiming for. A reasonable expectation of drift of a well-designed example embodiment is perhaps one percent, which means that the window may be corresponding to e.g., 30-50 m, with a maximum of e.g., 100 m. Some embodiments emphasize the more recent parts of the window when performing inter-alignment.

Obstacle Perception 3010

Example non-limiting obstacle modeling produces object tracks 3164, freespace 3162, and a dynamic occupancy grid 3102.

Object Detection

Example embodiments use deep learning in individual camera frames (see FIG. 50) to produce pixel-wise class output images and pixel-wise regressor output. To produce objects, a pixel-wise class image is combined with plural four leg scalar regressor images. The pixel-wise class map returns object cores, where an object core pixel is a pixel where the regressor is valid. The regressor produces votes for bounding boxes. This output is post-processed into detection bounding boxes. Separate class maps may determine the sub-classes of objects. A similar process can be used on LIDAR data used to represent a cylindrical depth map (taking one sweep and representing it as a depth image). Other embodiments perform motion-based detection in two subsequent aligned LIDAR scans after taking out the effects of ego-motion.

Object Tracking 3164

Example embodiments perform object tracking 3164 for several reasons. Object tracking 3164 can provide stickier detection by bridging frames where detection is weak (see FIG. 51). Object tracking 3164 can provide performance gains by bridging between frames where detection is skipped, since it is lighter processing than a modern neural net. Object tracking 3164 is also used to provide careful understanding of the motion, as it can be more precise between temporal frames than comparison of two independent detections.

The embodiment's process of matching a frame for which a template was provided a fraction of a second ago is easier than matching a frame of a particular object to a general model of an object acquired through training across a wide variety of objects. Additionally, example embodiments associate object detections across time to do some simple forward motion prediction (for example for in-path determination) that is better done by tracking. Motion tracks of objects across time is also used for associating vision tracks to RADAR tracks or LIDAR.

Some example embodiments store the bounding box tracks in a rolling buffer table much like the feature tracks, along with information relevant for RADAR association and other processing.

For each bounding box in an earlier frame, example non-limiting embodiments use the feature tracks within its bounds. First, example non-limiting embodiments estimate the scale change in a way that is robust to outliers as the median of the scale change indicated by all pairs of feature points. Then, example non-limiting embodiments estimate the two translation scalars as the median of the translations in that dimension by all the feature points after the scaling has been adjusted for. This gives a frame-to-frame translation and scaling of each bounding box into the new frame. Then example non-limiting embodiments reconcile the forward-tracked bounding boxes with the new detections of bounding boxes (if detection is run for the new frame). Finally, in order to maximize the accuracy of time-of-arrival measurements, for each bounding box, some example non-limiting embodiments run the feature track analysis from the current frame backwards in time to an earlier frame with the appropriate temporal baseline depending on the size of each bounding box. This processing is done based on the feature track table provided by feature tracking.

Time of Arrival

Example non-limiting embodiments use various techniques to determine the correct temporal baseline. Such temporal baseline depends for example on the range of relative motion up to a particular velocity such as the current driving velocity. However, the temporal baseline is also affected by the velocity(ies) of moving objects (for example, the velocity of another vehicle or other object approaching the vehicle at some maximum velocity). Temporal baseline may also depend on for example a maximum required distance range, and a relatively nominal object size. Example non-limiting embodiments analyze whether, at the maximum distance range, a change in image size of one pixel should be some given fraction of the number of pixels change induced by the most urgent possible relative motion. See FIG. 52. So, for example, assume that example non-limiting embodiments test for n pixels of change from the maximum motion, that the object has size w and that the maximum distance is d. The projected size s in pixels is s=fw/d, where f is some focal length scaling. Assuming the maximum closing velocity is v, the change of size per time unit is the derivative $s'=-fwv/d^2$. Note that example non-limiting embodiments can substitute this expression for s into this to obtain s'=sv/d. For short time intervals of length t, the absolute value of the change in size is tsv/d. If example non-limiting embodiments require it to be at least n pixels, the requirement tsv/d>=n is derived. Example non-limiting embodiments can use this as a recipe for how much time to perform the motion analysis over given a certain size:

$$t=dn/(sv).$$

Thus, the smaller the bounding box, the longer example non-limiting embodiments should wait. Example non-limiting embodiments can use fixed values for d (such as 100 m say), n (6 pixels say), and v (30 m/s say). With these examples, example non-limiting embodiments get t=20/s.

With 20 pixels size, this amounts to one second and at 100 pixels size a 5th of a second. In particular, this analysis indicates that performing the calculation on subsequent frames would require 600 pixels size. Time-of-arrival can help disambiguate correspondence to RADAR measurements, and for very large objects, the angles are sufficient, so the motion expansion is often most relevant for vision-only cruise control and for distant objects.

Example embodiments determine the time of arrival (from the latest frame measurement at time t2) as follows. The scaling between the distance traveled from time t1 to time t2 and the distance left to travel is (d2/(d1-d2)). The assumption is constant motion, so if example non-limiting embodiments multiply that scaling by (t2-t1), the result is the time of arrival:

$$t=d2(t2-t1)/(d1-d2)$$

Some example embodiments work with inverse time of arrival (referred to as urgency u). If the formula for projected size in pixels is inverted to yield d=fw/s, using the inversion to substitute for d derives the formula:

$$u=(d1-d2)/(d2(t2-t1))=(s2/s1-1)/(t2-t1)$$

for the urgency. Note that when the second scale is larger than the first, the urgency becomes positive and it increases with a larger scale difference in a shorter time period. Note the importance for accurate time stamps t1 and t2 (or at least accurate time difference).

For any objects (e.g., insufficiently large objects) that do not generate a sufficient number of feature tracks, some example embodiments perform a special KLT alignment that includes scaling in its model in addition to translation. This is done for all bounding boxes that do not have more than some minimum number of feature tracks, and provides the same association and time-of-arrival measurements as the multi-feature-track version of the processing.

Distance

Some example embodiments derive a crude sense of distance for camera objects by mapping the lowest image row of the observed object onto a flat ground assumption, using the long-term pitch from the self-calibration, optionally adjusted over short time scales by image stabilization or the IMU assisted basic trajectory estimation. While simplistic, one of the properties of this method is that it behaves as a continuous distortion of actual distances. For high speeds, the road is usually flatter, so the estimate tends to be sensible over scales that are related to a certain reaction time. Distances closer to the horizon become increasingly stretched, so it is better to limit the distances before the horizon is reached. Some example embodiments do that by heuristically redefining the ground plane into a smooth ramp that becomes increasingly steep and curves into a wall at a certain height (e.g., 40-50 m; see FIG. 53), project the image rows onto that and take the resulting distance. The time of arrival values are then used to determine an object velocity that 'emulates' the measured time of arrival. The relative velocity (closing rate) that gives that emulation is simply distance multiplied by the urgency. The cruise control modules working with this output can pretend these are physical values.

This distorts distant objects to approximately 'stick' at that maximum distance. However, the distances are mostly needed to provide a reaction time hold-off distance and to provide crude suggestions for vision-RADAR association. More elaborate methods for estimating distance such as training a neural network directly to estimate distance may be useful. If LIDAR is present, it can be used to provide accurate distances up to the range of the LIDAR (which may be shorter than the ranges at which vision can detect and RADAR can provide distances at, depending on the LIDAR).

RADAR Detection and Tracking

Example embodiments store RADAR tracks in a similar rolling buffer table as the vision tracks. RADAR tracks typically come with accurate range and range rate, approximate bearing angle, and not so useful altitude angle.

Vision-RADAR Association

To match vision and RADAR tracks (see FIG. 54), example embodiments use the properties that are common between RADAR and vision tracks, which is mostly the bearing angle and the urgency. Example embodiments form a match score between tracks this way. Example embodiments can also use the crude inverse distances from vision with a large variance (low weight on this part of the match score). Example embodiments then use a short temporal sliding window to associate the tracks. That is, the example embodiments solve the problem using the data in the track tables over a small time interval. The benefit of using a temporal window is that the example embodiments can make decisions in light of information not only from the current moment, while still making tentative decisions that can be changed as new data becomes available. Example embodiments compute a pairwise association score matrix and then start assigning matches in a greedy fashion. Example embodiments can also check which pairings are 'happy' pairings in the sense that within the pair, both mates prefer each other over any other match. Pairings that do not have this property are questionable. It is possible here to take a conservative approach and use the one of all plausible matches that constrains longitudinal acceleration the most, but both false positives and negatives are problematic.

Freespace 3162

The example embodiments perform a deep learning processing that also produces a pixel-wise freespace image indicating all drivable regions in the image. This is not sufficient in the sense that embodiments also need 'freespace-velocity' or how fast the freespace changes. One case of this is the ego-vehicle driving after the tail of another vehicle, in which case the ego-vehicle should be confident that freespace opens up in front of it through the lead vehicle moving away. One example way to handle this is to work with the regions that reside within an object bounding box and assume those pixels move according to the motion analysis of the bounding box. Further semantic segmentation such as knowing what is an object that could move and what is static background can be useful in that regard. Some embodiments may also require to be conservative for all pixels that are not classified as vehicles (so for example never assuming that pedestrians move away). A more complete attempt is to perform motion analysis on all regions that are near the boundary of freespace.

The process is similar for LIDAR. Example non-limiting embodiments can either use a ground plane estimate near the vehicle and declare regions that have significant aggregations of points above the ground plane, or significant rates of change as obstacle regions. Example embodiments can also use motion segmentation to validate that a vehicle is moving out of the way providing a sufficient change rate of freespace, or can combine visual tracking and LIDAR distances. Another option is to determine freespace based on a convolutional neural network running on the LIDAR data considered as a depth map.

Dynamic Occupancy Grid 3102

The dynamic occupancy grid 3102 (see FIG. 55) is rendered using any of the data available, such as using freespace and the tracked bounding boxes, dynamic RADAR tracks, LIDAR points above the ground plane and a motion estimate by rate of change in depth in the LIDAR data regarded as a depth map. Example embodiments may do some form of motion segmentation and classification of ground points in order to avoid slivers of data that are incorrectly assigned.

Path Perception 3012

Example embodiments leverage all cues available for path perception 3012 (see FIG. 56 scenario). They get an estimate of the main path relative to the vehicle in terms of an off-center parameter (a positive or negative lateral offset from the center of the path), an off-orientation parameter (a positive or negative angular offset from the direction of the path) and a curvature parameter. In some embodiments, this is produced by a neural network trained from many examples of what the path driven forward in time is, combined with the current image. The training data is taken while holding steady in lane, and then augmented laterally and orientationally using synthetic rendering based on the main camera and two offset cameras. Example embodiments can similarly do this with LIDAR data. This procedure can be used with a classical planner/controller to define a path back to the center given a particular off-center/off-orientation/curvature and taking the inverse turning radius at the beginning of the path (with some temporal offset) to define the training examples. This training time control will train the network to predict the input to this controller 3006 and thereby make the path estimate explicit, providing the factoring desired and the opportunity to combine the result with other input, and to fuse it temporally if desired.

The data may be curated in different ways to provide training data appropriate for left and right forking, left and right turns as well as straight ahead. Running those networks concurrently gives the affordances for multiple path options in each situation, without any reliance on a map or even a route. Other embodiments use a rendering of the road network as well as the navigation route desired (essentially two layers indicating road/no road and route/not route) in a birds-eye view cutout of the map in a window around current GPS pose large enough to capture the localization uncertainty and enough of the complexity of the choices ahead. The route serves as a more refined intent compared to just left/straight/right and gives cues to the shape of the turn, requiring only that the network estimates the transformation to the current pose. Training data for this can be generated automatically by driving and shifting the map cut out by similar amounts as typical GPS errors. Example embodiments also use the output from the basic lane detection 3100*b*, which may give an estimate for the center path as well as lane edges.

Vehicle trajectories from the vision-RADAR associated tracks are also used to provide path hints. This is useful in cases where the markings are vague or almost gone, while there is a grid of cars or at least a lead vehicle that the ego-vehicle is following. A RADAR-associated vision track (distance from RADAR and angle, of for example bottom center of bounding box, from vision) from a lead vehicle in front of the ego-vehicle holding the same speed provides a continuous path 'bread-crumbing'. Example embodiments can use those as votes for where centers of lanes are. This can be misleading if vehicles are changing lanes, but is still helpful in very ambiguous situations and allows embodiments to follow convention if there is no other cue. All of the above measurements may be adjusted by the values for yaw obtained from self-calibration (and pitch is used for the ground projection). According to further embodiments, the direct shape of the road from a map may also be used.

Example embodiments then perform estimation over a temporal sliding window. The temporal sliding window may be preferable over a Kalman filter since it allows the embodiment to accept and reject information tentatively. A Kalman filter requires one to accept or reject measurements permanently, while new measurements may arrive to corroborate or invalidate a previous measurement. Using a temporal sliding window, example embodiments can perform a robust fitting procedure using all the input sources over the temporal window. The outputs of the estimation are the components of the lane-graph. Most important is the spline for the center of the lane, as well as the left and right lane edges. Example embodiments estimate both the ego-lane (the lane whose center is closest to the ego-vehicle), and also a lane to the left and right of that (if sufficient support). This is to support lane changes and to perform well when the vehicle is not perfectly centered in a lane. Example non-limiting embodiments also produce temporal association to the previous live estimate of the lane graph. Lane centers and lane edges are corresponded across time. Since they do not move much from frame to frame and ego-motion estimates are available, this is an easier determination than to decide whether a lane edge is left or right, which can be ill-defined during a lane change. However, the correspondence can be done backwards to the previous estimate once the new estimate is made and the only smoothing mechanism is that the sliding window uses similar overlapping data.

The association information can be used to keep an accumulating scalar that counts the fractional amount of lane change that has happened to the left or right between any two moments in time. Example embodiments implement this as a rolling buffer of scalar values and resetting the scalar when completing one pass through the buffer. The interface then allows reading the amount of lane change between any two moments in the recent past.

In-Path Determination 3120

FIG. 57 illustrates the problem of in-path determination. Example embodiments perform in-path determination 3120 between tracked objects and each relevant path. The path under consideration is projected into the image (or LIDAR coordinate system) rendered as a pixel map (see FIG. 57). Example embodiments take all the pixels in the bounding box in question that have been determined part of the object (for example all non-freespace points in the bounding box, or all pixels determined to be object points by semantic segmentation) and modulate them by a forward prediction (such as for example using the motion of the bounding box over the last half second extrapolated forward for one more second) and then perform a comparison between the pixel map of the object and the pixel map of the path. Example embodiments can then use some threshold on any overlapping area to decide if the object is encroaching on the path tested. For efficiency, this can be done at a pyramid scale that is adapted to the bounding box size so that there is an approximately fixed number of pixels used in the test.

In some embodiments, this process is conducted between all the objects and the main path plus a path parallel to it on the left and right. Objects can then be assigned to multiple lanes, as can the present ego-vehicle. If side cameras are available, it is also done for the lanes next to the present vehicle on both sides (and distance and velocity information is produced for such detections as well).

Wait Conditions Perception 3014

FIG. 58 illustrates a typical wait condition scenario. Example embodiments detect traffic lights similarly to obstacles using deep learning with a classification layer plus regressors for bounding boxes. A separate layer predicts red/green/yellow, and traffic lights are tracked the same way as other objects. Stop and yield signs are similarly detected. Example embodiments also train for detecting intersections by marking the entire visual intersection region and predicting bounding boxes for it. Here example embodiments may do a more careful geometric analysis across the entire area for which the semantic segmentation class indicates intersection, and look for the median voted for bottom, top, left and right. Example embodiments also detect visible wait lines using deep learning with regressors that predicts the end points. All these detections are passed to the map perception 3016 for triangulation and sent to mapping in the cloud 2022. The map with advanced localization 3026b is also used to validate and add to the information and to suggest traffic-light-turn association.

An association is performed between the mapped traffic lights and the live perception so that the state can be used to gate the appropriate path. For yields and multi-way stops, the surroundings are checked for contending traffic. In particular for multi-way stops, example embodiments wait until the ego-vehicle has stopped, and keep track of all other traffic in the general area in front of the ego-vehicle that is moving, as well as traffic that is pointing into the intersection from adjacent areas and stopped before the ego-vehicle. Example embodiments consider the wait condition cleared when there is nothing else moving in or towards an intended travel path and contending traffic waiting near the intersection either stopped after the ego-vehicle, have not moved for a long time, or the embodiment has established based on mapping statistics that it has right of way and they are not moving. Example embodiments then monitor the objects around the vehicle during negotiation of the intersection.

Map Perception 3016

FIG. 59 shows an example non-limiting map perception scenario. Due to sensor calibration and trajectory estimation, the problem is approximately reduced to finding three degrees of freedom that align two drive segments. The pose of the two drive trajectories is known approximately in the GPS coordinate system, to (for example and without limitation) an order of magnitude of 10 m (GPS localization accuracy can sometimes be much better, but is ultimately a distribution with higher uncertainties included). This means that drive trajectories that pass within 10 m of each other have a residual alignment that can be modeled as a local translation and rotation along the local ground shape anywhere the trajectories are close enough to share common drivable ground surface.

Mapping Landmark Detection

Relevant visual landmarks are road markings (parallel solid lines, dashes and dots, perpendicular lines, road images), road boundaries (points where drivable surface transitions into non-drivable surface that can be considered stationary), vertical landmarks such as poles, traffic signs and traffic lights. The visual landmarks are detected in some embodiments by a neural network with appropriate post processing.

Example embodiments also use stationary RADAR targets as landmarks, which in particular have the potential to improve longitudinal localization accuracy, as well as be useful on their own to provide information about whether a stationary RADAR target is expected in the infrastructure or unexpected such as a stopped vehicle.

LIDAR point clouds or triangulation of dense visual feature tracks can also be stored and used as 'landmarks' in the sense that they can contribute to alignment between drives. Example embodiments may consider these as a separate layer due to the higher data rates they generate. Some embodiments summarize point clouds in a way that supports alignment without encoding full surface shapes, such as using plane, line or surface fitting, or by detecting features. Another alternative is to use a 2D projection or slice.

Landmark Tracking and Triangulation

The 3D position of road markings and road boundaries is determined in some embodiments by back-projection near the vehicle into the ground plane (note that this can even happen after the vehicle has passed that portion of ground). If LIDAR is available, this can be improved upon by exact ground shape also further from the vehicle. Vertical landmarks, traffic signs and traffic lights are tracked and triangulated using a temporal window of observations. If LIDAR is available, the LIDAR distances can be used. Stationary RADAR targets are approximately determined in 3D from a single RADAR observation, but are carefully estimated from multiple observations. All 3D positions are determined relative to one of the vehicle poses, and all landmarks from a drive segment can thereby be chained into the same coordinate system using the estimated drive trajectory. Note however that the necessity of a global coordinate system is avoided.

Map Stream Encoding

The chain of poses coming out of the trajectory estimation 3030, 3030a together with the landmarks 3158 constitute a 'map stream' produced by each driving vehicle. Example embodiments encode this efficiently enough that it only amounts to a few bytes per meters of driving. The cost of transferring a few bytes per meter over modern mobile data channels to cloud 3022 is dwarfed by the costs of propelling the vehicle. This opens the possibility of having each vehicle contribute a map stream in real-time, and buffering data until a wifi hotspot can be used or cherry-picking only some drive segments can make the costs even lower.

Landmarks such as traffic lights, vertical landmarks and traffic signs are infrequent enough that encoding them with a few coordinate bytes relative to the current vehicle pose does not break bandwidth budgets. Road markings are encoded carefully as curves with 'on/off events'. The on/off events for dashes for example can be done with less than a byte per dash even before proper entropy encoding is accounted for (since there is typically less than a dash per meter and centimeter precision is generally sufficient). The sideways curvature of a sequence of road markings may be entropy encoded by predicting its lateral position likelihoods given its past trajectory. For example, an example embodiment may predict forward in steps of 25 cm and use 3 bits producing 8 discrete choices for the lateral position, adding up to 12 bits per meter. The full industrial strength solution may use arithmetic coding over a more granular distribution. A single map stream may contain plural four leg concurrent road marking lines on average. The moment-to-moment transformations of vehicle motion can also be encoded with arithmetic coding of the difference relative to a prediction assuming that the transformation curvature stays constant. GPS readings made by the vehicle are also encoded in the map stream.

As mentioned, point clouds may be handled as a separate layer. They are compressed as 1D or 2D signals.

Advanced Localization 3026b

The advanced localization 3026b localizes the vehicle to previous drives and thereby enables the final step in bringing in data from previous drives to assist with the current driving task.

Advance localization 3026b can combine the output from different landmark sources and also package up the information from different moments in time. This applies even if the implementation is more of a single mode kind, or based on some form of random or targeted sampling. Example embodiments evaluate some of the positions in the search space and then render into the whole search space. For example, if an embodiment picks a single winner with a Gaussian mode and a robustifying outlier mixture, it can render that Gaussian and outlier mixture into the whole space. This brute force representation is also well aligned with GPU parallelism, allowing the embodiment to explicitly test all possibilities with a manageable compute load. By finding a search space that can be assumed is complete in the sense that it captures all possibilities with non-negligible likelihood, an embodiment can 'invert' the order of decision making. Other embodiments can integrate all the specifics of the likelihoods from different data sources and moments in time in a system level search, optimization or sampling, in order to avoid committing to a mode prematurely inside one of the modules.

Example embodiments can calculate the pose (log) likelihood space for each moment, either completely independently or with some use of the prior data from previous poses to suggest which poses to test. The embodiment can use the estimated vehicle trajectory to aggregate the evidence backwards in time. For each pose hypothesis in the latest pose space, the estimated vehicle trajectory implies a chain of backwards poses for each of the previous moments. Since the trajectory is estimated in full six degrees of freedom (6 DOF), those poses may land slightly outside of the previous pose spaces, so embodiments may then project them to the nearest pose that is exactly inside the space. This allows fetching values from the previous pose spaces into the same coordinate system as the latest pose space. Embodiments can then use any combination, such as adding the log likelihoods with some decaying weight over time. Embodiments can also accommodate drift in the trajectory estimation by allowing the highest likelihood in a region to contribute to the accumulated likelihood in the next time instant. This leads to a dynamic programming procedure for accumulating estimates forward. The maximum point in the combined likelihood space can then be determined, and analyses can be performed on (for example and without limitation) confidence shapes, whether there are multiple modes, and how well supported the best solution is.

The kind of evidence to draw upon for measuring the likelihood contribution for each data source is how well data for projected objects (e.g., road markings, road boundaries, vertical landmarks, traffic signs, traffic lights, stationary RADAR targets, etc.) match current sensor values (using— as a non-limiting example—a pre-computed image such as a monotonic mapping of a distance transform for each landmark type to make the scoring consist of a projection followed by lookup and accumulation). For LIDAR point clouds, an embodiment could proceed similarly by considering the current sensor values as a depth map and comparing to a rendering of the map point cloud for this pose.

Cloud Mapping 3022

Map Stream Store (Drive Store)

In one example embodiment, a full mapping solution includes a constellation of cloud service components that receive the data from vehicles, processes the data to register drives together and serves vehicles with map data. They are more 'aggregate drives' than conventional maps.

The first component of this constellation of map services is the map stream store. This component holds the raw data contributed by vehicles, segmented by GPS tiles and linked so that they can be followed forwards and backwards through GPS tiles, with some amount of pruning based on time and redundancy. The data is held in raw form in some embodiments because it is already well compressed, and as such gives maximal flexibility for different algorithms for indexing, matching and map generation.

Drive Indexing

The drive indexer is closely related to the store. It allows retrieving drive segments by GPS and optionally filtering by an approximate segment route.

Drive Matching

Drive matching is the task of aligning multiple drives carefully to the precision afforded by landmarks. The typical operation is to find a candidate set of drive segments using the drive indexer. The candidate sets are hypothesized to be slightly different ways to drive through the same road segment or sequence of road segments. The basic operation is to be able to match two drive segments, which can then be extended to align multiple segments through several pairwise operations. The operation is very similar to that performed by localization, with the only difference that the drive matcher now has the whole drive (not only the past) from a certain point in time. Thus, example embodiments can use the same mechanism modified in some examples to bring all evidence to a pose likelihood space that is centered in the middle of the drive segments. Another alternative is to use a full 6 DOF iterative closest point procedure. Embodiments can match segments of a fixed length, say for example 50m, that are similar as judged by their GPS traces, and the result of the match is a 6 DOF pose-link between the poses within (e.g., near the middle of) the segments.

Drive Graph

The drive graph is the result of systematically performing drive matching for as many promising matches as possible across the whole scope of the mapping effort. References to the pose-links between drives are stored in such a way that they can be easily found from drive segments. Thus, in combination with the drive store, which allows traversing drives forwards and backwards, the pose-links allow hopping between matched drives at the places where they are expected to be matched the best.

Relative Coordinate Systems

The drive graph discussed above can be indexed into (via, for example, a GPS coordinate), but the drive segments are potentially more precisely related through drive matching than raw GPS coordinates would allow, and example embodiments do not force all drives into a common global coordinate system (like the GPS one). Coordinates of some entity are always relative to some other reference. In the GPS case, the reference system is a constellation of satellites. In photogrammetry, the choice of coordinate system is called gauge. Different choices of gauge make things look differently uncertain. For example, a gauge based on triangulated landmark points will make points look more certain but camera positions less certain, and vice versa. Similarly, using a system of satellites as reference for where a lane line or a stop line is, will limit accuracy by the ability to localize that lane line or stop line relative to the satellites. If embodiments instead use a reference drive in which the lane line or stop line was observed, then accuracy can be as high as the ability to register the current drive to the reference drive. That can be more accurate because embodiments rely on visual/LIDAR/RADAR landmarks that are near the vehicle, instead of going via a satellite system and back. Some embodiments therefore work with coordinate systems defined in terms of drives rather than the GPS coordinate system. In some embodiments, the optimal accuracy of each tile is not relative to the satellites but relative to the tile's own coordinate system, and that the relationship between tiles is considered through pose-links relating the coordinate system of one tile to the coordinate system of its neighboring tile (or work may be performed in each tile independently, which is also a functional approach).

Tile Map

For simplicity of working with drives in tiles without having to constantly reassess the coordinate system, example embodiments construct a tile map. See FIG. 60. This amounts to the addition of a pose-link between each drive and each of the GPS tiles that it is registered into. That is, example embodiments have tiled the globe into tiles based on the GPS coordinate system, say in 50 m square tiles for example, and for each drive, registered a bidirectional index link from the drive to each of the tiles that it passes through or nearly through (nearly being defined by the ~10 m GPS uncertainty). For each tile, embodiments try to match all the drives that it is linked to through drive matching, resulting in a number of pose-links and a number of connected components of drives. These connected components can be transformed into the same coordinate system via the pose-links, for example by performing a Dijkstra procedure starting from some root drive. This results in a registration of those drives that is potentially more accurate than GPS would allow. As a final step, the example non-limiting embodiment does its best to find the transformation (single transformation) that aligns the jointly registered drives to the GPS coordinate system (based naturally on all the GPS observations from all the clustered drives, for example with a model of a single translational offset for each drive (such as modeling atmospheric condition biases) plus an independent robustified Gaussian error for each GPS observation. This has the potential to register each connected component more precisely than individual GPS measurements or even traces, since embodiments are potentially leveraging very precise landmark alignment to join many bias-corrected GPS measurements together to register into the tile. This is akin to a 'visual-landmark-based differential GPS'.

Nevertheless, since the relations between tiles are 'not certified', embodiments also estimate and store pose-links between each connected component in each tile and connected components in neighboring tiles (and the same tile if applicable). These pose-links may not always exist, which means that the registration between the connected components in question is not more precisely known than GPS accuracy. When following a drive from one segment to the next, the drive itself is a natural pose-link between the two tiles (since it is recorded as a relative chain). The tile-map has a registration of the drive into the two different tiles, and wherever the chain is broken somewhere at the border between tiles, the pose-link within the drive will slightly disagree with the registration of the poses before it (into one of the tiles) and the poses after it (into the other tile). Thus that pose-link provides a pose-link between tiles that informs of the expected glitch between tiles. The embodiments can work directly with individual drives or use all drives that join two connected components and fuse their pose-links between tiles into a joint estimate.

In summary, the tile map allows example embodiments to work with tile-shaped connected components with pose-links between them, and in each connected component there is an already established coordinate position for all the data of the drives involved. There is still not a single enforced layout of the world data without glitches anywhere, so one way to work with the data is to start in one connected component of one tile, and lay the data out using a Dijkstra process with that as root. The tile map provides functions for laying out the data over a given set of tiles based on a specified tile and connected component as root, or simply a given specified tile (in which case the functions will find and start with one connected component and then proceed to add other components until all the data has been laid out).

Localization Tile Generation

For purposes of localization, example embodiments fuse the landmark information of each connected component of each tile in the tile graph. After the alignment, this amounts to associating landmarks such as road markings, road boundaries, vertical landmarks, traffic signs, traffic lights, stationary RADAR targets and point cloud surfaces, de-duping them and providing best estimates for them. Typically, since registration has been taken care of to best efforts, this amounts conceptually to finding peak support based on some radially decaying support measurement kernel and using non-max suppression with some related radius. Compact encoding of the localization tile is then performed, similar to the encoding of a map stream.

Localization in Multiple Tiles

Localization proceeds per tile (or more precisely per connected component in a tile). When approaching the edge of a tile, the pose-links between connected components are used to position the connected component from the next tile.

Other embodiments use separate localization in overlapping tiles. As long as overlapping tiles are available, with sufficient overlap to localize in a new tile before leaving a previous tile, it is possible to support continuous access to map information, without forcing the entire map into a single global coordinate system. The tiling can for example be achieved with straightforward square tiling with four-way redundancy, square tiling with shifting in each row to have three-way redundancy, or a hexagonal grid with three-way redundancy. The tile size is a tradeoff as it should be large enough to support strong localization by sufficient landmarks and small enough not to have alignment issues due to inaccuracy of trajectory estimation. Tiles should desirably also be small enough not to load unnecessary data.

Mapping Metadata

Data that is not directly related to registration is called metadata. Metadata is divided into two different classes, one that directly helps driving and one that is truly auxiliary data. For example, the type of metadata that helps driving is locations of intersections and wait conditions, which states of which traffic lights allow which lane trajectories to proceed (or to proceed but give way), in which areas to look for contending traffic at a multi-way stop, locations of parking spots, and trajectory statistics (although the latter is extracted from the core registration data). Examples of more auxiliary data are: which addresses correspond to which businesses, what is the typical density of traffic in a particular lane at a particular time of day and day of the week. To separate the metadata functionality from the registration implementation, the user is allowed to insert a piece of metadata relative to the vehicle pose of any of the drives that are going into the drive store. If information is only at the GPS level precision, this can simply be handled by inserting it relative to a GPS coordinate. However, if the information requires higher precision, the request is handled by the core registration layers issuing a coordinate system anchor to the user. From the user's point of view, the coordinate system anchor is a GUID and the coordinate system is expressed relative to the vehicle's current pose. The mechanism served by the core registration layers is that if the same GUID is referred to by the user, the registration will (to best effort) recover the same coordinate system as was used when the GUID was given to the user. Higher level service components can then insert and retrieve precisely positioned and oriented information by referring to the coordinate systems issued by the core registration layer. This mechanism allows separating the storage and ownership of data from the service supporting its precise registration (although the precise positioning does depend on the core registration service).

Example embodiments implement the core registration layers holding a target density of coordinate anchors internally, and issuing those anchors in response to user requests. It is also possible to generate the anchors on the fly in response to requests. The latter implementation allows more careful control of the density of anchors issued.

Cloud Lane Graph

In the drive layout implied by the tile map, embodiments look for segments that have enough common support, and thereby derive a lane graph that supports driving. Support could be measured by having at least a certain number of segments follow the same path with less than some translational (such as 30 cm) and orientational deviation (such as 5 degrees).

Embodiments solve a core lane graph estimation problem by developing a directed graph with points and tangents at each node. See FIG. 60. This is a mixed discrete/continuous estimation problem that in principle lends itself to formulation as a Bayesian estimation problem with an estimation of likelihood of occurrence. This has the benefit that it clearly separates the parameterization, the likelihood determination and prior definition, and the search/optimization approach. The lane changes are estimated in a second step after establishing the basic lane graph, by using statistics of lane changes in drives as well as the type of road markings and freespace detected in the drives.

A prior probability distribution can include cost terms (negative log prior likelihood terms) that favor a simpler graph, fewer nodes, fewer edges, fewer nodes with multiple edges. This is to avoid spurious lane segments that do not explain any drive data. Embodiments can also include terms that make lane segments that are parallel but do not share a node repel each other up to a minimum lane width (using something like a sigmoid shape or other rapid falloff to a constant value outside of the minimum lane width). This is to maintain stability for parallel segments of road with many drives and to regularize the number of lanes. Embodiments can also include terms that favor a nominal length for edges (such as 10 m).

The likelihood consists of how likely all the drives are given the graph. This is like a generative likelihood of picking a path through the graph arbitrarily with some arbitrary lane changes possible between close parallel segments. To score a drive, embodiments implement a procedure that finds the most likely paths through the graph to explain the drive. This procedure may be useful for two things, both to assign a path through an existing lane graph for a drive, and to adjust the continuous parameters of the splines. This procedure proceeds through dynamic programming. For each pose, the embodiments find the spline paths that are reasonably close and in the appropriate direction and measure the likelihood for each. This means that each pose gets a short list of possible edge point assignments. Then the embodiments add the likelihood of certain edge transitions, which results in a dynamic programming problem for the best path through the graph in the sense of a set of edge point assignments for each pose in the drive. The embodiments can then compute the derivatives of the cost of the best path with respect to the node parameters. If the embodiments already have the graph topology and approximate layout, they can thereby fine tune the node parameters of one tile (more precisely one connected component of a tile) using nonlinear refinement.

The embodiments come up with the initial graph topology and approximate layout in three steps: first determining basic lane segments, then finding forks/merges, and finally the lane change connections.

To determine the basic lane segments, each infinitesimal portion of a drive (which has a point and a direction) is modeled as a vote for that point and direction in the three-dimensional space of point+direction. The embodiments apply a wavelet shaped kernel which falls off at a portion of a lane width parallel to the direction and at a small angle, then suppressing points and directions up to some minimal lane width and angular separation, and then goes to zero. The embodiments then search for connected sets of points in the point+direction space that are parallel at a local maxima to the direction and that have positive accumulation of kernel votes (possibly with hysteresis).

Then the embodiments identify forks/merges. These are best identified as points where there is strong support for two individual segments transitioning into strong support for one segment. This is not necessarily exactly at the fork/merge point itself, but rather in the slightly larger structure around it. Some embodiments analyze a neighborhood to get the best results. For example, embodiments can decide on a circle radius and analyze every circle of that size, looking at how many well supported segments enter the circle and exit the circle. An analysis can be performed for each entry and exit segment to determine which is its most common corresponding exit and entry, respectively. When two different exit segments share the same entry segment, that is a fork, and when two different entry segments share the same exit segment, that is a merge.

To account for lane changes, embodiments identify clear cases where the vehicle is crossing lane lines. This is done with live perception (and optionally also indicator signals) to mark segments that are likely lane changes, which can then be removed from the core lane graph voting, but instead contribute to where lane change connections are. It is also possible to analyze the lane markings and parallelism to determine where lane changes are allowed and safe.

Cloud Wait Conditions

If the path information in the map gives a grid of 'switchable rails' to follow, wait conditions are the longitudinal constraints that may require wait or yield in cases where it may not be immediately obvious due to an obstacle in front of the vehicle. Mapping allows the embodiments to estimate these with more information than live perception. See FIG. 61 which shows wait conditions on the map as indicated by thick line segments.

The intersection detector that catches traffic light intersections and multi-way stops based on live appearance sends information bundled with the map stream of data. This also allows embodiments to aggregate this information from mapped drives. This is reinforced with the drive pattern information from the mapped drives, with intersecting driving directions, and cars waiting/stopping at repeatable locations.

The visual stop lines detected are also sent with the map stream. This refines the stopping point given by intersection detection. Again, the stop line information is also reinforced by mapped drives and detecting common stopping points along a rail.

Traffic lights are part of the registration landmarks, but are of course also critical in terms of their state. Embodiments mine the drives for stop line and lane path specific links to the traffic lights. In particular, if a vehicle is deemed to be stopped as the first car behind a stop line, an embodiment gathers statistics of the states of the traffic light seen from that stop line right before and after the vehicle proceeds on a particular route. This allows the embodiment to detect which traffic light switches state to allow a particular route. The embodiment also notes yield patterns such as during left turns across traffic.

Multi-way stops (essentially intersections with a stopping behavior without traffic lights where no one has complete right of way) are handled by having a center area connected to each stopping point. This area can to some extent be perceived live or estimated as the drivable area in front of a stopping point, but is also reinforced through mapping. Other traffic is detected and tracked in the center area as well as a contender area surrounding the center area. If other traffic (vehicles, bicyclists, pedestrians) are detected in this area and pointing towards the center area, then they are considered contenders. If they are present and stopped or already proceeding when the vehicle stops, they are judged to be ahead of the vehicle. If they are still moving in a way that is not directly threatening and are not yet adjacent to the center area, the vehicle is ahead of them.

While embodiments look out for other traffic intersecting or merging into the current vehicle path at high speed, yields and merges are frequent where the vehicle has to stop or slow down to give itself a chance to perceive competing traffic. Evidence for this is frequent slowdowns or stops in a particular place as well as traffic patterns intersecting or merging. If embodiment encounters the latter without the former, it judges the merge to be more like a highway entrance, while if it has both, it judges it to be a stopping merge. At such points, the embodiment uses the velocity statistics that are gathered for each lane and estimate the earliest point at which it has sufficient visibility corresponding to that velocity, as well as the actual first contention point. This allows it to carefully slow, stop and creep appropriately. Yields also include intersections where others have right of way, left turns through traffic and on-coming take-turn (i.e., where plural vehicles agree as to which one has the "next" turn) bottlenecks.

Map Matching

Map matching finds the correspondences between the localized map and other existing maps. This infuses the localized map with auxiliary information such as names of exits, points of interest, addresses, and human understandable routing destinations. See FIG. 62, which shows a representational view that schematically shows additional definitional information beyond paths. It is likely to come in multiple forms adapting to several providers of auxiliary information.

Example approaches do not base the automatic generation of the map on an existing map with human annotation, but rather perform a lighter form of matching afterwards. It is attractive for continuity reasons to maintain some data based on best effort GPS coordinates, as this is easier to maintain for a long period of time in a stable manner. This may not be true for data that needs very precise localization however.

Planning 3004

Example embodiments use a planning hierarchy. See FIG. 63. Conceptually, a route planner 3004e may run at the scale of the country providing scores for routes out of a city and running at the scale of a city providing scores for routes out of an area. Then there is a lane planner 3004c providing scores for lane sequences for the next few blocks, which comes up with requests for the most desirable behaviors. Then, there is a behavior planner 3004a, 3004b to score or just determine feasibility of different behaviors, such as lane change or staying in lane. Finally, a behavior selection 3004d is made as the most desirable feasible behavior and passed to control 3006 and actuation 3008. For some behaviors, such as lane change, the embodiments stick with it until it is determined to be done or aborted. The planning is repeated at some frequency (which can be higher for the smaller scale planning layers).

Route Planner 3004e

The route planner 3004e takes the large-scale map graph from the route map and a target node and current node. The target node and the current node may have been obtained by simple nearest neighbor lookup based on a GPS target point and the last known good GPS reading. The route planner 3004e in some embodiments runs a graph search algorithm (such as A*/D* or Dijkstra if the graph is small). It returns the best route through the graph from the current to the target node. For large scale problems, this can happen hierarchically, such as at continental US scale with a simpler graph with only highways and at city scale with a more detailed graph. Hierarchical planning uses a way-point from the larger scale plan that is sufficiently far away (while within the scope of the smaller scale planner) that any potential glitches at the hand-off point (due to differences between the granularities of planning) are negligible. Route planning as a whole (whether done hierarchically or not) produces a planned path that consists of a list of GPS waypoints. Such waypoints include a waypoint of a number of city blocks into the future (such as a kilometer for example) that is used as target for the lane planner. Other embodiments have each planner output costs for multiple alternatives for the next level of detailed planner.

Lane Planner 3004c

The lane planner 3004c takes the output of the route planner 3004e as input. It works with the mapped lane graph (and object poses within it according to advanced localization) and a target point and direction at some number of city blocks into the future from the route planner. The target point and direction is mapped to the best matching drivable point and direction in the lane graph (typically using GPS and compass direction). Then a graph search algorithm is run on the lane graph from a current edge in the lane graph to find the shortest path to the target point. Lane changes are included starting at the current point and at the beginning of each edge in the lane graph that has a lane change. Lane changes are penalized with a distance penalty (50 m say) that is less (25 m say) if the lane change is commenced immediately, so that if a lane change is required, it is planned to be performed diligently when available.

Basic Behavior Planner 3004a

The behavior planners 3004 determine feasibility of the basic behaviors such as staying in lane or changing lanes left or right, so that the feasible behaviors can be matched up with the most desired behavior from the lane planner 3004c. If a lane change is not determined to be safe and available, the default behavior is to stay in lane. The main three behaviors tested by the basic behavior planner 3004a is staying in lane and following any forks or choices in the lane graph to maximize the match with what the lane planner requested, or changing lane left or right and maximizing the match.

The basic behavior planner 3004a takes a tracked lane graph with wait conditions and in-path objects as input. The tracked lane graph can come either from mapping or live perception. Planner 3004a considers each of the paths available from the main path tree for some short distance (such as 50-100 m) without performing a lane change and compares each of them to the output of the lane planner 3004c to find the closest one. If advanced localization 3026b is not available, then the output of the route planner 3004e is used instead. Alternatively, if the next hard curvature in the route planner 3004e is right or left, the embodiment can favor forks right or left and lane change right or left. In addition to the main lane graph tree, some embodiments also start the same procedure from the lane graph edges after an immediate lane change left and right from current lane graph edge (if they exist). This gives three paths through the lane graph and one that is favored by the match to the lane planner 3004c output. Also, one of the paths should correspond to a previous root lane graph edge.

In some example embodiments, all three paths are processed for longitudinal control independently, essentially by running a longitudinal controller with the longitudinal constraints relevant for that behavior. For staying in lane, for example, that may include the objects and wait conditions in the main lane path. For lane change, the objects and wait conditions in the target lane are added as well, including objects beside the ego-vehicle and behind it. The result is a minimum deceleration amount (or maximum acceleration amount), or an outright safety rejection. In the basic behavior planner 3004a for lane change, some embodiments create a simple speed-dependent spline interpolation between the main lane and the target lane, and this is sent to the behavior selector 3004d to represent the lane change. The embodiments can create such a path so that it is available for cases where the ego-vehicle is already in a lane change. If only a main path is available from the lane graph, a backup is to use a path that goes just outside the lane edge.

Advanced Behavior Planner 3004b

The advanced behavior planner 3004b considers more free form forward trajectories than the basic behavior planner 3004a. To do that, advanced behavior planner 3004b takes the dynamic occupancy grid 3102 as input in addition to the input to the basic short-term planner 3004a. The advanced behavior planner 3004b then generates a fan of paths around the nominal path for the behavior in question, such as paths that are slightly laterally offset at the end with varying amounts of turning. In principle, any family of paths can be used, but a two or three-dimensional family of paths may a reasonable choice. The advanced behavior can also take object tracks into account. The paths are compared to the dynamic occupancy grid and is thereby checked for safety and what is desirable, such as comfort and agreement with the nominal path.

Behavior Selector 3004d

The behavior selector 3004d performs some simple logic based on the output of the behavior planners 3004a, 3004b and the requests from the lane planner 3004c. Unless the ego-vehicle is already in a lane change, the following logic is applied by some embodiments. If the lane planner 3004c requested that the ego-vehicle stay in lane, it simply stays in lane (meaning the embodiment passes the center path from the main lane in the lane graph to the controller 3006). If a lane change is requested by the lane planner 3004c, the embodiment starts it, provided it is determined to be available by the lane graph, safe and without heavy braking by the behavior planners 3004a, 3004b.

If the ego-vehicle is already in a lane change, the lane change is typically continued until it is determined to have been completed. This is monitored by looking at the off-center parameter in the tracked lane graph and processing through the quarter, half, three quarters of a lane change and then declaring the lane change has been completed. During the lane change, the path sent to the controller 3006 is the lane change path produced by the behavior planner 3004d.

Control 3006

The delineation between planning 3004 and control 3006 is not precisely defined in many implementations. The task of the controller module 3006 is to follow a forward trajectory (lateral and longitudinal) choice that has been sent from the behavior selector 3004d as closely as possible and that is close to something that can be implemented by the ego-vehicle. See e.g., FIG. 64. The controller 3006 uses tight feedback to handle unplanned events or behaviors that are not modeled or anything that causes discrepancies from the ideal, such as unexpected delay. In some embodiments, the controller 3006 uses a forward prediction model that takes control as an input variable, similar to a planner. The forward prediction model produces predictions that can be compared with the desired state (in this case the lateral and longitudinal path requested). The control that minimizes the discrepancy is found, with temporal filtering. The temporal filtering (such as in a standard PID controller) is helpful in some contexts since if there is no temporal element, any unmodeled delay may result in oscillations. In a basic pure pursuit model, a simple forward prediction model can be used together with a single look-ahead point where the discrepancy is measured.

Embodiments can also use model predictive control. In such a controller 3005, Euler forward integration (or any form of forward integration) of the differential equations that model the vehicle motion can be employed. Discrepancies can then be measured at multiple points in the future and balanced by some goal function. The modeling of the vehicle motion can include wheel slip and anything useful for accurate path reproduction. For longitudinal control, some embodiments use a standard PID controller with lookup tables based on the relative distance, relative velocity and ego-velocity. Comfort limits are put on acceleration (such as 5 m/s^2) and jerk. Similarly, speed dependent limits are put on steering angle and steering angle rate.

G. Additional Examples of Self-Driving Vehicles Using the Technology.

The technology may also be used for a self-driving patrol car, used either by law enforcement or corporate security. Self-driving patrol car is a modified version of self-driving vehicle (50) described above, with additional features designed for patrol and security functions. When used as a self-driving patrol car, the technology includes a vehicle body, a computer with the Advanced System-on-a-Chip for controlling the vehicle, and one or more neural network trained to perform a patrol and/or safety function. For example, a self-driving patrol car may include a CNN running on the car's DLA, trained to identify any of (1) at least one other vehicle, by identifying one or more of the other vehicle's license plate, make, or appearance (e.g., model, color), (2) a traffic accident, (3) an injured person, such as a bicyclist, pedestrian, or other bystander, (4) a fire, (5) a confrontation between people, (6) criminal activity, such as a break-in, or drug-dealing, or (7) road hazard, such as a downed tree, power line, debris, or pothole.

Infrared cameras are preferably used on self-driving patrol car, which are often used for night patrols to detect criminal activity, fires, and to locate people. Suitable infrared cameras include a compact thermal imaging camera with a 36 degree field of view, and an effective range of 300 m for people, and approximately twice that for larger, heat-emitting objects such as automobiles. In a preferred embodiment, longwave infrared ("LWIR") thermal camera cores may be used to provide a zoom capability, and when the Computer identifies a possible item of high interest that cannot be identified with sufficient confidence, the Computer stops the vehicle where safe and zooms in on the item for a more accurate assessment.

The self-driving patrol car may be configured to send wireless notification of the existence and location of identified event, using the vehicle's cellular wireless modem and antenna. Although the DLA is designed for fast and efficient inferencing using trained CNNs, the CNN may alternatively run on the System-on-a-Chip's GPU.

The self-driving patrol car may receive wireless notification of an all-points bulletin or Amber alert, identifying the make, model, and/or license plate of a vehicle being sought by law enforcement. This wireless notification may be received over police band radio, LTE, WCDMA, or even WiFi. The CNN, which may be running on the self-driving patrol car's DLA, identifies vehicles by make, model, and/or license plate, and passes the information to the self-driving patrol car's CPU, which executes a comparison between the information provided by the DLA and the vehicle being sought. Alternatively, the comparison may be executed on a separate X86 CPU, or on the self-driving patrol car's PVA.

The self-driving patrol car may have a plurality of Advanced Systems-on-a-Chip, for example, as shown in FIG. 22. In this example, one or more of the Advanced Systems-on-a-Chip will be configured to perform autonomous driving functions, while others of the Advanced Systems-on-a-Chip will be configured to perform patrol functions as discussed above. For example, the self-driving patrol car may have two Advanced Systems-on-a-Chip configured to perform autonomous driving, with six Advanced Systems-on-a-Chip for patrol, each of the six configured to perform to identify at least one of the following using a neural network running on either a DLA or GPU: (1) at least one other vehicle, by identifying a license plate, make, or appearance, (2) a traffic accident, (3) an injured person, such as a bicyclist, pedestrian, or other bystander, (4) a fire, (5) a confrontation between people, (6) criminal activity, such as a break-in, trespass, or dealing in illicit goods, or (7) road hazard, such as a downed tree, power line, debris, or pothole.

FIG. 65 illustrates a self-driving long-haul truck (50) and trailer (55). The truck (50) and trailer (55) includes many of the sensors described in the context of self-driving vehicle (50) of FIG. 4. In addition, trailer (55) includes weight and balance sensors (82), which provide the controller (100)

with information regarding the trailer's weight and weight distribution. The trailer further includes two inertial sensors (82(1) and 82(2)), which provide the controller (100) with information regarding the trailer's velocity, yaw, pitch, roll.

In addition, trailer (55) includes a plurality of surround cameras (72) sufficient to provide a complete 360 degree video around the trailer.

The trailer (55) preferably includes gust sensors (81) on both the starboard and port sides of the trailer, to help self-driving truck (50) identify and mitigate the effects of sudden and/or large cross-winds. Cross-wind stability and performance is an important problem for many classes of vehicles, and varies depending on vehicle type, loading, speed, and road surface conditions. Trucks, buses, shuttles, and even cars, are sensitive to crosswinds in various degrees. Cross-wind can be a major safety issue, especially for trucks, buses, and shuttles. Sensitivity to crosswind is greatest for lighter vehicles, high-speed, and road conditions such as ice, wet or slick pavement. Strong lateral gusts, as are often experienced on bridges, are particularly dangerous. A vehicle is subjected to different aerodynamic forces, including drag, lift, side, and aerodynamic moments including moments tending to cause yaw, roll and pitch. In case of strong side wind, the side force and lift force might cause the vehicle to overturn, fishtail, jackknife, or impair the vehicle's ability to maneuver.

Gust sensors (81) preferably determines both the airspeed in the longitudinal axis and the transverse axis, perpendicular to the trailer, providing the controller (100) with information regarding the cross-winds being experienced by the trailer. A wind speed meter may be used, mounted on the inside of the trailer with the pitot tube extended through a hole in the side of the trailer, so that the end of the pitot tube is exposed to the ambient air. In a preferred embodiment sensor (81) measures air pressure, and reports the results through an interface (e.g., USB). Controller (100) compares the results of the sensor (81) on the starboard and port sides and in the case of a large differential, identifies the presence, direction, and magnitude of a gust event and takes corrective action if necessary. Such comparison can also be performed on the dual-core Safety Cluster Engine ("SCE") (704), when present.

To guard against false positives and to provide additional safety, controller (100) may also evaluate the signals provided by the weight and balance sensors (82), which in the event of a large gust event should record a shift in the weight and balance to the side (starboard or port) opposite the gust. Alternatively, controller (100) can validate the result of the gust sensor (81) using the results of inertial sensors (82(1), 82(2)). For example, if IMUS (82) are placed near the upper corners of trailer (55), a large gust should register as a spike in lateral acceleration reported by IMUs (82). Using a combination of information received from the gust sensors (81), inertial sensors (82), and weight and balance sensors (83), controller (100) can determine the presence of a strong lateral gust and take corrective action—typically slowing the vehicle or in extremely high winds—to mitigate the risk that the truck will rollover or deviate out of the lane. In a preferred embodiment, when gusting conditions are present, controller (100) uses information from Map (212) to identify areas where gusts are more likely and proactively respond accordingly. For example, Map (212) identifies areas with overpasses, tree-lines, and open fields, which are associated with large gusts; as truck approaches those areas, controller (100) anticipates the gusts and reduces speed. Additional actions include increasing following distance to vehicles, and engaging self-driving truck's hazard lights, to alert other vehicles to the potentially hazardous condition. When gusting conditions exceed a threshold such that the truck cannot safely proceed, controller (100) execute the "Chauffeur to Safe Stop" mode, pulling the truck to the side of the road. Controller uses gust sensors (81) to continue to monitor conditions, communicating with the System-on-a-Chip's Always-On Sensor Processing Engine.

In a preferred embodiment, Controller (100) also monitors the gust sensors (81) to identify potential malfunction and/or ice blockage in a pitot tube, and may optionally control a heating coil or other suitable device to clear any ice or blockage in the sensors (81).

Trailer (55) is electrically connected to truck (50) through a CAN bus interconnect. Alternatively, trailer (55) may be wirelessly connected to truck's (50) network.

Because the truck has a large inertia and may have large momentum and be difficult to bring to a stop, truck (50) further preferably includes a long-range front camera (79), which provides additional information to controller (100).

FIG. 66 illustrates a self-driving two-level bus (56). The bus (56) includes many of the sensors described above, and described in the context of self-driving vehicle (50) of FIG. 4 and the truck and trailer of FIG. 65. In addition, bus includes four interior cameras (77) that are used to monitor the safety and security of the bus and its passengers.

FIG. 67 illustrates a self-driving articulated bus (57). The bus (57) includes many of the sensors described above, and in the context of self-driving vehicles described in FIG. 4, FIG. 65, and FIG. 66.

FIG. 68 illustrates a self-driving tiller truck (58), which is typically over 50 feet in length, allowing the truck to deliver the personnel, tools, equipment, necessary for responding to large fires and emergencies. The truck (58) includes many of the sensors described above, and in the context of self-driving vehicles described in FIG. 4, FIG. 65, FIG. 66, and FIG. 67.

A tiller truck is designed for enhanced maneuverability, with independent steering of the front and back wheels that allows the vehicle to navigate sharp turns, a critical feature for an emergency response vehicle. Just as a human-driven tiller truck has two drivers, with separate steering wheels for front and rear wheels, the self-driving tiller truck (58) has two controllers (100) for controlling the front and rear sections of the vehicle. First controller (100(1)) controls at least a first axle, while second controller (100(2)) controls at least a second axle. Each controller may comprise the computer for self-driving described above, in connection with FIG. 17, FIG. 18, FIG. 19, or FIG. 22, and may use the Advanced SoCs described above in connection with FIG. 8, FIG. 9, and FIG. 13.

The two controllers (100) in self-driving tiller truck (58) communicate with each other and coordinate in driving the vehicle, such that misunderstandings and confusion, which often occurs between two human drivers of a tiller truck, is eliminated. In one embodiment, a human driver controls steering of the front axle (1) and the vehicle's speed and acceleration, and the advanced computer for self-driving of the present technology controls the rear axle (2) and overrides the human driver when necessary to avoid collisions, lane departures, and other safety events.

In addition, self-driving tiller truck (58) preferably includes a plurality of infrared cameras, which are used to detect hot spots, fire, and locate people. Suitable infrared cameras include a compact thermal imaging camera with a 36 degree field of view, and an effective range of 300 m for people, and approximately twice that for larger, heat-emitting objects such as automobiles. In a preferred embodiment, longwave infrared ("LWIR") thermal camera cores may be used to provide a zoom capability, and when the Computer identifies a possible item of high interest that cannot be identified with sufficient confidence, the Computer stops the vehicle where safe and zooms in on the item for a more accurate assessment.

As was the case with the self-driving patrol car, the self-driving tiller truck (58) may be configured to send wireless notification of the existence and location of identified event, using the vehicle's cellular wireless modem and antenna. Although the DLA is designed for fast and efficient inferencing using trained CNNs, the CNN may alternatively run on the System-on-a-Chip's GPU.

According to an aspect of the technology, a system-on-a-chip for a self-driving vehicle is provided. In one or more embodiments, the SoC includes a Central Processing Unit complex, a Graphics Processing Unit, and an embedded hardware acceleration complex, comprising a programmable vision accelerator, a deep learning accelerator, and On-chip memory. In some embodiments, the Graphics Processing Unit comprises a plurality of streaming microprocessors that include independent parallel integer and floating-point data paths and/or independent thread scheduling capability. In one or more embodiments, the Graphics Processing Unit of the SoC includes memory substantially compliant to the High Bandwidth Memory (HBM) standard, including (without limitation) HBM2 memory. In some embodiments, the Graphics Processing Unit includes unified memory. According to further embodiments, the unified memory provides a single unified virtual address space for the Central Processing Unit complex and the Graphics Processing Unit.

According to one or more embodiments, the SoC can also include a safety cluster engine, comprising a plurality of processor cores, configured to operate in lockstep mode and function as a single core, and comparison logic to detect any differences between the operations performed by the plurality of processor cores. The SoC may also include a memory controller. The SoC can also include a boot and power management processor configured to control the system-on-a-chip's power state transitions, and/or to monitor the system-on-a-chip's thermal condition and responsively manage the system-on-a-chip's power states.

The system-on-a-chip can also comprise an L3 Cache shared by the Central Processing Unit complex and the Graphics Processing Unit in some embodiments. Embodiments can also include a plurality of temperature sensors, which may (without be limited thereto) be configured to detect the temperature of one or more of the Central Processing Unit complex group, the Graphics Processing Unit, and the acceleration cluster, and/or be implemented with one or more ring-oscillators whose output frequency is proportional to temperature.

The Central Processing Unit complex comprises a plurality of CPU cores, implemented in some embodiments as one or more clusters of CPU cores. In one or more embodiments, each CPU core in the plurality of CPU cores is coupled to on-chip L2 cache memory. Likewise, in embodiments implemented with one or more cluster(s) of CPU cores, the cluster of CPU cores may be coupled to on-chip L2 cache memory. In still further embodiments, each cluster of the plurality of clusters is coupled to a dedicated on-chip L2 cache memory. Each cluster of the plurality of clusters may be configured to be active independent of the status of the other clusters in the Central Processing Unit complex. In one or more embodiments, each cluster of the plurality of clusters is configured for heterogeneous multi-processing with one or more of the plurality of clusters.

The SoC can also include a power management processor. In non-limiting embodiments, the power management processor independently power-gates each core and/or each cluster. In one or more embodiments, the SoC includes memory (such as, without limitation, static random-access memory or "SRAM") coupled to one or both of the Programmable Vision Accelerator and the Deep Learning Accelerator.

The SoC can also include a video image compositor processor, which, in some embodiments, is configured to perform lens distortion correction on image data from at least one fisheye or wide-view camera sensor. The video image compositor processor may also be configured to perform temporal noise reduction on input from at least one camera sensor, and/or stereo rectification on image data received from two cameras.

In certain embodiments, the SoC may also include a real-time camera engine, a processor core, RAM coupled to the processor core, and an interrupt controller. Other embodiments can include an always-on sensor processing engine, itself comprising a processor core in low power mode, RAM coupled to the processor core, and an interrupt controller.

In preferred embodiments, the always-on sensor processing engine comprises a neural network trained to recognize the authorized operator of a vehicle. The always-on sensor processing engine (using the neural network, for example and without limitation) may be configured to unlock the vehicle when the neural network indicates that the authorized operator of a vehicle is at the vehicle, and to lock the vehicle when the neural network indicates that the authorized operator of a vehicle has left the vehicle.

System coherency fabric connecting the Central Processing Unit complex and the video image compositor processor can also be included in the SoC, according to one or more embodiments. The system coherency fabric comprises a coherency-cache-flush engine which facilitates software-based coherency with the non-coherent clients in the system. The system coherency fabric can also be used to connect the Central Processing Unit complex and the real-time camera engine, and/or the Central Processing Unit complex and the Always-On Sensor Processing Engine.

The programmable vision accelerator of embodiments of the SoC can include at least one processor, and at least one Direct Memory Access engine. In preferred embodiments, the programmable vision accelerator may itself comprise a first vector processor, a first instruction cache associated with the first vector processor, a first vector memory, associated with the first vector processor, a first Direct Memory Access engine, associated with the first vector processor, a second vector processor, a second instruction cache associated with the second vector processor, a second vector memory, associated with the second vector processor, and a second Direct Memory Access engine, associated with the second vector processor.

In example embodiments, the first vector processor is configured to execute a first computer vision algorithm, and the second vector processor is configured to execute a second computer vision algorithm. The first vector processor may be configured to execute the first computer vision algorithm on one portion of an image, and the second vector processor may be configured to execute a second computer vision algorithm on a different portion of the image, for example.

The first vector processor can be implemented as, or with a digital signal processor (DSP) for example. Likewise, the second vector processor can also be likewise implemented as or with a DSP. In further embodiments, one or both of the first and second vector processors can be implemented as a single instruction, multiple data (SIMD) and/or very long instruction word (VLIW) DSP.

The programmable vision accelerator can further include, in example, non-limiting embodiments, a digital signal processor optimized for computer vision, memory associated with the digital signal processor, and an instruction cache associated with the digital signal processor.

An aspect of the technology may be implemented as a system-on-a-chip for a self-driving vehicle. In preferred embodiments, the SoC includes a Central Processing Unit complex comprising a plurality of CPU cores and dedicated L2 cache memory, a Graphics Processing Unit comprising a plurality of GPU cores and dedicated L2 cache memory, and an embedded hardware acceleration complex that comprises a programmable vision accelerator, a deep learning accelerator, and dedicated SRAM connected to the programmable vision accelerator and the deep learning accelerator.

In one or more embodiments of this aspect, the Graphics Processing Unit includes HBM memory, such as (without limitation) HBM2 memory. The Graphics Processing Unit can also comprise a plurality of streaming microprocessors that include independent parallel integer and floating-point data paths and/or independent thread scheduling capability. According to further embodiments, the Graphics Processing Unit includes unified memory that provides a single unified virtual address space for the Central Processing Unit complex and the Graphics Processing Unit. Embodiments of the SoC may also include An L3 Cache shared by the Central Processing Unit complex and the Graphics Processing Unit.

In one or more embodiments of this aspect, the programmable vision accelerator comprises at least one digital signal processor, and at least one direct memory access engine. The programmable vision accelerator can comprise one or more sub-components including (without limitation): a digital signal processor optimized for computer vision, Memory associated with the digital signal processor, and an instruction cache associated with the digital signal processor.

Another aspect of the technology may be implemented as a computer for controlling an autonomous vehicle. In one or more embodiments, the computer may be implemented to include a first System-on-a-Chip, a second System-on-a-Chip, a first discrete Graphics Processing Unit coupled to the first System-on-a-Chip, a second discrete Graphics Processing Unit coupled to the second System-on-a-Chip, and a Microcontroller coupled to the first and second System-on-a-Chip.

According to preferred embodiments, the computer may also include a six-axis inertial measurement unit, which in non-limiting example embodiments may be coupled to the first System-on-a-Chip to provide information regarding the vehicle's acceleration and rotation to the first System-on-a-Chip. According to such embodiments, the first System-on-a-Chip is configured to perform sensor fusion on the information regarding the vehicle's acceleration and rotation.

The computer according to the third aspect may further include a switch for coupling the first System-on-a-Chip, second System-on-a-Chip, and the Microcontroller. The switch can be implemented as a PCIe Switch, and a discrete CPU (such as, without limitation, an X86 CPU) may be coupled to the switch in one or more embodiments.

The first System-on-a-Chip and the second System-on-a-Chip are coupled to a plurality of input ports for receiving sensor data, with a plurality of discrete Graphics Processing Units, each coupled to one of the Systems-on-a-Chip. A (third) a system-on-a-chip can also be included for interconnecting the plurality of Systems-on-a-Chip and the plurality of discrete Graphics Processing Units. According to embodiments, the plurality of Systems-on-a-Chip are coupled to each other, through (for example and without limitation), an inter-integrated circuit ($I^2C$) bus.

According to embodiments, each of the SoCs are mounted on a common printed circuit board and disposed within the same housing. The housing can include a cooling system that comprises (for example) a fansink and a fluid channel for transporting heat from the Systems-on-a-Chip. Alternatively, the housing may include a fansink and a hybrid heat transport module that comprises a fluid channel and/or an air channel for transporting heat from the Systems-on-a-Chip.

In preferred embodiments, the computer may include a plurality (e.g., 8 or more) SoCs and a similar number of discrete GPUs, each GPU being coupled to a microcontroller and a corresponding SoC. Point-to-point communications between the SoCs and discrete GPUs can be provided by a network switch.

Various neural networks can be executed on one or more of the SoCs. In example non-limiting embodiments, different neural networks can be executed on each SoC. For example, the first System-on-a-Chip can execute a neural network for pedestrian detection, the second System-on-a-Chip can execute a neural network for sign detection, the third System-on-a-Chip can execute a neural network for distance estimation, the fourth System-on-a-Chip can execute a neural network for lane detection, the fifth System-on-a-Chip can execute a neural network for collision avoidance, the sixth System-on-a-Chip can execute a neural network for a current occupancy grid, the seventh System-on-a-Chip can execute a neural network for a predicted occupancy grid, and the eighth System-on-a-Chip can execute a neural network for steering control.

According to embodiments, one or more neural networks can be specifically trained for a purpose, and on specific data. For example, the neural network for distance estimation may be trained for and on data generated by a LIDAR sensor.

Another aspect of the technology is directed to a system for controlling an autonomous vehicle that comprises a primary computer, a secondary computer, a Supervisory microcontroller unit (MCU) coupled to the first computer and the second computer, a plurality of camera sensors coupled to the first computer and the second computer, and a plurality of vehicle monitoring sensors coupled to at least one of the first and second computers. According to further embodiments, the primary computer is configured to receive input from the camera sensors and output at least one signal for controlling at least one vehicle actuator, and the secondary computer is configured to receive input from the camera sensors and output at least one signal for controlling at least one vehicle actuator. The supervisory MCU (implemented, in one or more embodiments as a third computer) meanwhile can be configured to compare the outputs from the primary computer and the secondary computer.

According to preferred embodiments, the system can also include a wireless device electrically coupled to the primary computer and configured to communicate with a wireless network. The wireless device may be configured to communicate the wireless network to receive update information regarding at least one neural network, or to update at least one neural network in response to the information, as non-limiting examples The primary computer can be configured to test and verify the updated neural network by running it in parallel with the current neural network and comparing the results, and to execute the updated neural network after it has been fully downloaded, tested, and verified. The wireless network can be one of any number of wireless networks; in example non-limiting embodiments, the wireless network can be an LTE network, a WCDMA network, a UMTS network, and/or a CDMA2000 network.

According to one or more embodiments, the system can also include a datacenter, comprising one or more GPU servers coupled to the wireless network and configured to perform a number of computing and operating tasks such as, without limitation, receiving training information collected by one or more vehicles and transmitted over the wireless network, training one or more neural networks using the information, and providing the trained neural network to the wireless network for transmittal to one or more autonomous vehicles.

The datacenter may be well-suited to perform other tasks, such as receiving image and object detection information collected by a vehicle and transmitted over the wireless network, executing a neural network on one or more of the GPU servers, using the image information as input, comparing the results of the neural network run on one or more of the GPU servers with the object detection information received from the vehicle, and sending a wireless control signal to the vehicle instructing the vehicle to instruct the passengers and execute a safe parking maneuver if the result of the comparison falls below a confidence threshold, The system can include a wireless device electrically coupled to the primary computer. Specifically, the wireless device can be configured to communicate with a wireless network and/or to receive updated map information from a wireless network. The updated map information can be stored by the primary computer in memory. In one or more embodiments, the wireless network used for this purpose can also be any one or more of an LTE, WCDMA, UMTS, CDMA2000 network. In one or more embodiments, the wireless device can also be configured to receive cooperative adaptive cruise control (CACC) information from the network regarding another vehicle.

In one or more embodiments, the system includes an HMI Display coupled to the primary computer and configured to indicate when the system has identified a traffic signal, traffic sign, bicycle, pedestrian, or obstacle in the road. The HMI Display can be further configured to indicate that the system is taking the appropriate action in response to the identified a traffic signal, traffic sign, bicycle, pedestrian, or obstacle in the road. According to these and other embodiments, the supervisory MCU can be further configured to output an alarm signal if the outputs from the first computer and the second computer are inconsistent.

According to yet another aspect, a system for controlling an autonomous vehicle is provided, which includes a primary computer; a secondary computer, comprising an ADAS system; a Supervisory MCU, coupled to the primary computer and the secondary computer; a plurality of camera sensors, coupled to the primary computer; one or more secondary sensors, coupled to the secondary computer; and a plurality of vehicle monitoring sensors, coupled to the primary computer. According to one or more embodiments, the primary computer is configured to receive input from the camera sensors and output at least one signal for controlling at least one vehicle actuator, the secondary computer is configured to receive input from the secondary sensors and output at least one second signal regarding the vehicle's operation, and the supervisory MCU is configured to compare the signals from the primary computer and the secondary computer.

The ADAS system may include one or more systems or SoCs from any number of vendors. The ADAS system may include (for example and without limitation) a forward crash warning unit, implemented with a field programmable gate array (FPGA) and a stereo video camera. The forward crash warning unit may be implemented in other suitable embodiments as an FPGA and a long-range RADAR unit, and/or a processor and a long-range RADAR unit.

The ADAS system may include (for example and without limitation) a lane departure warning unit, implemented with a field programmable gate array (FPGA) and a stereo video camera. The lane departure warning unit may be implemented in other suitable embodiments as an FPGA and a monocular camera unit, and/or a processor and a monocular camera unit.

The ADAS system may include (for example and without limitation) an automatic emergency braking (AEB) unit, implemented with a field programmable gate array (FPGA) and a stereo video camera. The AEB unit may be implemented in other suitable embodiments as an FPGA and a long-range RADAR unit, a processor and a long-range RADAR unit, and/or an application specific integrated circuit (ASIC) and a long-range RADAR unit.

The ADAS system may include (for example and without limitation) an automatic cruise control (ACC) unit, such as (without limitation) a longitudinal ACC unit and/or a lateral ACC unit. The longitudinal ACC unit may be configured to adjust the speed of the autonomous vehicle based on the distance to the immediately leading vehicle and the current speed of the ego vehicle. In one or more embodiments, the ACC unit(s) may be implemented with a forward-facing RADAR sensor. The AEB unit may be implemented in other suitable embodiments as an FPGA and a forward-facing RADAR sensor, a processor and a forward-facing RADAR sensor, and/or an ASIC and a forward-facing RADAR sensor. In one or more embodiments, the AEB unit may be implemented with a forward-facing camera, an FPGA and a forward-facing camera, a processor and a forward-facing camera, and/or an ASIC and a forward-facing camera. The forward-facing camera may include a stereo camera, in certain embodiments.

The ADAS system may include (for example and without limitation) a rear cross-traffic warning unit. In one or more embodiments, the rear cross-traffic warning unit may be implemented with an FPGA and one or more rear-facing cameras; and/or an FPGA (or processor) and a rear-facing, medium-range RADAR unit. The ADAS system may also include a blind-spot warning unit. In one or more embodiments, the blind-spot warning unit may be implemented with an FPGA and one or more cameras; and/or an FPGA (or processor) and one or more RADAR units.

In some embodiments the ADAS system includes a slippery road detection unit, implemented in one or more embodiments with a first angular velocity detector for determining a first angular velocity of at least one power-driven axle, a second angular velocity detector for detecting a second angular velocity of at least one freely rotating axle, and a processor configured to compare the first angular velocity and the second angular velocity to determine the level of friction on the road surface. According to embodiments, the slippery road detection unit further comprises a first vibration sensor to determine a first vibration of the power-driven axle, a second vibration sensor to determine a second vibration of the at least one freely rotating axle. In these embodiments, the processor can be further configured to compare the first vibration and second vibration to determine the level of friction on the road surface.

The processor in any of these ADAS implementations can itself include a CPU, and/or an ASIC. The supervisory MCU is further configured in preferred embodiments to control at least one actuator of the vehicle in accordance with the first signal if the outputs from the primary computer and the secondary computer are consistent, and/or to output an alarm signal if the outputs from the primary computer and the secondary computer are inconsistent. In further embodiments, the supervisory MCU is further configured to control the vehicle in accordance with the first signal if the MCU determines that the primary computer's output exceeds a confidence threshold, even if the outputs from the primary computer and the secondary computer are inconsistent.

In one or more embodiments, the ADAS system includes at least one RADAR sensor, and the supervisory MCU executes a neural network that is configured to determine conditions under which the secondary computer provides false alarms based on outputs from the primary computer and the secondary computer. The neural network executed by the MCU is trained to reduce the likelihood of a false alarm caused by the ADAS system(s). In certain embodiments, MCU can be trained to reduce the likelihood of false alarms caused by objects such as a metal drainage grate, metal manhole cover, metal garbage cans, etc.

A next aspect of the technology is directed to a system for controlling an autonomous vehicle. The system may comprise a primary computer, a secondary computer comprising an ADAS SoC, a Supervisory MCU, coupled to the first computer and the second computer, a first plurality of camera sensors, coupled to the first computer, a second plurality of camera sensors, coupled to the secondary computer, and a plurality of vehicle monitoring sensors, coupled to the first computer. In one or more embodiments, the first computer is configured to receive input from the camera sensors and output at least one signal for controlling at least one vehicle actuator, the second computer is configured to receive input from the camera sensors and output at least one signal for controlling at least one vehicle actuator, and the supervisory MCU is configured to compare the outputs from the first computer and the second computer.

The supervisory MCU is further configured in preferred embodiments to output an alarm signal if the outputs from the first computer and the second computer are inconsistent.

A next aspect of the technology is directed to a system for controlling an autonomous vehicle. In one or more embodiments the system includes a primary computer, a secondary computer comprising at least one CPU and one GPU, a Supervisory MCU, coupled to the first computer and the second computer, a plurality of camera sensors, coupled to the first computer and the second computer, and a plurality of vehicle monitoring sensors, coupled to the first computer. According to preferred embodiments, the first computer is configured to receive input from the camera sensors and output at least one signal for controlling at least one vehicle actuator, the second computer is configured to receive input from the camera sensors and output at least one signal for controlling at least one vehicle actuator, and the supervisory MCU is configured to compare the outputs from the first computer and the second computer.

In one or more embodiments, the supervisory MCU is further configured to output an alarm signal if the outputs from the first computer and the second computer are inconsistent. The plurality of camera sensors can include camera sensors with different capabilities and/or configurations. For example, the camera sensors can include one or more cameras from the following list: 1) one or more long range cameras, each with an approximate 25 degree field of view, 2) one or more shorter range cameras with an approximate 50 degree field of view, 3) one or more fish eye forward cameras with approximately 150 degree field of view, 4) one or more wide-angle cameras, and/or 5) one or more infrared cameras.

According to embodiments, the primary computer fuses data from the at least one infrared camera and data from at least one other camera to enhance pedestrian detection. At least one infrared camera from the one or more infrared cameras can comprise a passive infrared system. A separate infrared camera from the one or more infrared cameras can comprise an active infrared system. Yet another infrared camera can be a gated infrared camera.

In an example, non-limiting implementation, the plurality of camera sensors includes at least one long range camera with a horizontal field of view between 15 and 45 degrees, and at least one shorter range camera with a horizontal field of view between 45 and 75 degrees.

In another example, non-limiting implementation, the first plurality of camera sensors includes at least one fish eye forward camera with a horizontal field of view between 90 and 180 degrees. In another example, non-limiting implementation, the plurality of camera sensors includes at least four wide-angle cameras. In another example, non-limiting implementation, the first plurality of camera sensors includes at least one infrared camera. In another example, non-limiting implementation, the at least one infrared camera comprises a passive infrared system, and/or an active infrared system, and/or a gated infrared system. According to one or more of these implementations, the primary computer fuses data from the at least one infrared camera and data from at least one other camera to enhance pedestrian detection.

In another example, non-limiting implementation, the plurality of camera sensors includes at least four infrared cameras. In another example, non-limiting implementation, the system includes a LIDAR sensor coupled to the first computer. The LIDAR sensor can be (without limitation) a flash LIDAR sensor; and/or a solid-state LIDAR sensor; and/or be mounted on the front of the autonomous vehicle, with a horizontal field of view between 45 and 135 degrees.

In an example, non-limiting implementation, the system for controlling an autonomous vehicle includes multiple sensors disposed at various positions around the vehicle. Example configurations can include a first flash LIDAR sensor disposed at the front of the vehicle, a second flash LIDAR sensor disposed at the front of the vehicle, a third flash LIDAR sensor disposed at the front of the vehicle, and a fourth flash LIDAR sensor disposed at the rear of the vehicle. According to such an embodiment, the first computer is configured to receive information from the flash LIDAR sensors. The first computer can be coupled to, and be configured to receive information from, other sensors. An example configuration can include, for example, a RADAR sensor coupled to the first computer, and/or an ultrasonic/ultrasound sensor coupled to the first computer, and/or at least one sensor coupled to the first computer selected from the group of RADAR, LIDAR, and ultrasonic sensors.

In preferred embodiments, the system can include a neural network executing on at least one Deep Learning Accelerator on the first computer. In one or more embodiments, the neural network executing on at least one Deep Learning Accelerator on the first computer comprises a convolutional neural network (CNN). In another example embodiment, the CNN comprises a region-based convolutional neural network. The CNN can be trained for specific object detection and/or classification tasks. Example implementations include a CNN trained for object detection, and/or at least one of traffic sign detection, pedestrian detection, or vehicle detection.

In further embodiments, the CNN can be trained to detect a condition in which a camera lens is blocked by an obstruction. In response to the CNN's detection of the lens blockage condition, the primary computer sends a control signal to execute a lens clearing routine. According to such embodiments, the system can include one or more of: a nozzle for providing a stream of compressed air over one or more lenses when instructed by the primary computer executing the lens clearing routine, and/or a heater for heating the lens to reduce condensation, frost, or ice when instructed by the primary computer executing the lens clearing routine.

In preferred embodiments, one or more CNNs executed by the system can also be trained to detect camera malfunction.

In preferred embodiments, the system can include a computer vision algorithm executing on at least one Programmable Vision Accelerator on the first computer to perform certain tasks. For example, the computer vision algorithm can be executed to perform at least one of traffic sign detection, distance estimation, or vehicle detection.

One or more embodiments of the system can include an audio processing engine, comprising a digital signal processor for processing audio signals and an internal RAM. According to such embodiments, the first computer can execute a CNN trained to identify an emergency vehicle siren. The first computer can be configured to execute an emergency vehicle safety routine upon identifying such an emergency vehicle siren. The emergency vehicle safety routine can include, for example, one or more operations such as slowing the vehicle, pulling over to the side of the road, parking the vehicle, and idling the vehicle, until the emergency vehicle passes. The system can include one or more ultrasonic sensors. Information from the one or more ultrasonic sensors can be used by the first computer when executing the emergency vehicle safety routine. A discrete CPU—such as an X86 CPU—coupled to the first computer can be configured to execute the emergency vehicle safety routine.

Another aspect of the technology is directed to a system for controlling an autonomous vehicle having an ASIL D functional safety rating. In one or more embodiments, the system can comprise a computer for controlling an autonomous vehicle, a Forward Collision Warning system, having (for example and without limitation) at least an ASIL-B functional safety rating. According to such embodiments, the computer for controlling an autonomous vehicle may have (as an example and without limitation) at least an ASIL-C functional safety rating. According to specific embodiments, the autonomous vehicle may include any one or more of a self-driving truck that includes a tractor and a trailer. In one or more embodiments, the trailer comprises a plurality of weight and balance sensors. The trailer can also be electrically coupled to the tractor.

Further embodiments can include at least one gust sensor associated with the trailer for detecting the cross-wind applied to the trailer. The gust sensor may be implemented using, for example, a first sensor with a pitot tube on one side of the trailer, and a second sensor with a pitot tube on the other side of the trailer. The first and second sensors may be electrically coupled to the primary computer, and the primary computer is configured to compare the results from the first sensor and the second sensor to identify a lateral gust.

Other embodiments include a plurality of vehicle actuators for controlling the truck's acceleration, braking, and steering, with the primary computer being configured to use the comparison to control one or more of the vehicle actuators. A plurality of weight and balance sensors can be disposed in preferred embodiments to measure the weight and balance of the trailer and electrically coupled to the primary computer to provide information regarding the weight and balance of the trailer to the primary computer, which the primary computer uses to verify the comparison of the results from the first sensor and the second sensor to identify a gust.

According to preferred embodiments, the autonomous vehicle (e.g., self-driving truck) can include a plurality of inertial sensors associated with the trailer, for detecting at least one of the trailer's pitch, roll, and yaw. An MCU in the system is configured to use the information from the weight and balance sensors to limit at least one of the truck's velocity, acceleration, or deceleration.

According to preferred embodiments, the autonomous vehicle can include a camera sensor disposed in the trailer and electrically coupled to an SoC of the system. Other sensors can include a smoke-detector in the trailer. The SoC can be configured to execute a fire-response protocol in response to a signal from the smoke detector indicating a fire in the trailer. The fire-response protocol may include any one or more operations such as sending a wireless signal indicating the presence of a fire, sending a wireless signal indicating the location of the truck, and executing a park maneuver of the truck.

According to another aspect of the technology, a self-driving truck is provided that includes a first controllable axle, a first controller for controlling the first controllable axle and comprising a first SoC, a second controllable axle, a second controller for controlling the second controllable axle and comprising a second SoC. In one or more embodiments, the second controller comprises a Deep Learning Accelerator. In one or more embodiments, the self-driving truck includes at least one infrared camera located at the front of the vehicle. The infrared camera can include, for example, a zoom functionality. The self-driving truck can further comprise a plurality of infrared cameras (any which can include zoom functionality), located at the front, rear, and sides of the vehicle.

Yet another aspect of the technology includes a self-driving multi-passenger vehicle comprising a vehicle body; a seating area within the vehicle body for a plurality of passengers; a computer for controlling the vehicle; at least one camera in the vehicle body for monitoring the seating area, the camera being electrically coupled to the computer; at least one neural network trained to identify a safety condition and executing on the computer; and a wireless device for communicating with a cellular network. According to embodiments, the computer can be configured to send a notification of the safety condition via a wireless (e.g., cellular) network, such as any one or more of an LTE network and a WCDMA network.

Another aspect of the technology is directed to a self-driving patrol car comprising a vehicle body; a computer for controlling the vehicle; a plurality of cameras disposed around the vehicle body, the cameras electrically coupled to the computer; at least one neural network running on the computer, the neural network trained to locate at least one other vehicle; and a wireless device electrically coupled to the computer, the wireless device for communicating with a wireless network. According to one or more embodiments, the computer is configured to send a notification of the presence and location of the at least one other vehicle via a wireless (e.g., cellular) network, such as any one or more of an LTE network and a WCDMA network.

At least one embodiment includes at least one infrared camera located at the front of the vehicle. The infrared camera includes a zoom functionality in certain embodiments. A plurality of infrared cameras located at the front, rear, and sides of the vehicle can also be included, each of which can but is not required to have zoom functionality. In one or more embodiments, the neural network can be configured to perform inferencing and other processing tasks. These tasks may include, for example and without limitation, identification of at least one other vehicle by identifying a license plate, identification of at least one other vehicle by identifying a portion of a license plate and the other vehicle's make and model, and identification of the at least one other vehicle by identifying the other vehicle's appearance.

In preferred embodiments, the neural network can be executed by the computer on the Deep Learning Accelerator. In further embodiments, the computer executes the neural network on the GPU.

Another aspect of the technology includes a self-driving patrol car comprising a vehicle body; a computer for controlling the vehicle; a plurality of cameras disposed around the vehicle body, the cameras electrically coupled to the computer; at least one neural network running on the computer, the neural network trained to identify at least one safety condition, and a wireless device for communicating with a cellular network. In preferred embodiments, the computer is configured to send a notification of the presence and location of the at least one safety condition via the cellular network. The safety condition may include, without limitation, a fire; an automobile accident; an injured person; and/or a physical conflict between people.

In one or more embodiments, the computer executes the neural network on at least one of the Deep Learning Accelerator and the GPU. In one or more embodiments, one or both of the Deep Learning Accelerator and the GPU are comprised on a SoC.

A further aspect of the technology is directed to a method for controlling an autonomous vehicle that includes: executing a first neural network on a deep learning accelerator on a system-on-a-chip; executing a second neural network on a GPU on the system-on-a-chip; executing a first computer vision algorithm on a programmable vision accelerator on the system-on-a-chip, and controlling one or more actuators on the autonomous vehicle responsive to the output of the first neural network, second neural network, and the computer vision algorithm.

According to one or more embodiments, controlling the autonomous vehicle can also include: detecting a first angular velocity of at least one power-driven axle, detecting a second angular velocity of at least one freely rotating axle, comparing the first angular velocity and the second angular velocity to determine the level of friction on the road surface, and controlling one or more actuators on the autonomous vehicle responsive to the output of the first neural network, second neural network, the computer vision algorithm, and the comparison of the first angular velocity and the second angular velocity.

According to one or more embodiments, controlling the autonomous vehicle can also include: detecting a first vibration of the power-driven axle, detecting a second vibration sensor to determine a second vibration of the at least one freely rotating axle, and comparing the first vibration and second vibration to determine the level of friction on the road surface.

According to an example embodiment, controlling the autonomous vehicle can also include providing image information from at least one camera sensor as an input to either one or both of the first and second neural networks. According to an example embodiment, controlling the autonomous vehicle can also include providing image information from at least one infrared camera sensor as an input to one or both of the first and second neural networks.

According to another example embodiment, controlling the autonomous vehicle can also include providing image information from at least one monocular camera sensor as an input to either one or both of the first and second neural networks. According to an example embodiment, controlling the autonomous vehicle can also include providing image information from at least one stereo camera sensor as an input to one or both of the first and second neural networks.

According to another example embodiment, controlling the autonomous vehicle can also include providing information from at least one or more of a RADAR sensor, a LIDAR sensor, and an ultrasound sensor as an input to the first computer vision algorithm. In one or more embodiments, the LIDAR sensor can be implemented as one or more of a flash LIDAR sensor and a solid-state LIDAR sensor.

According to another example embodiment, controlling the autonomous vehicle can also include: running a third neural network on a deep learning accelerator on a second system-on-a-chip, running a fourth neural network on a GPU on the second system-on-a-chip, executing a second computer vision algorithm on a programmable vision accelerator on the second system-on-a-chip, comparing the outputs of the first system-on-a-chip and second system-on-a-chip, and controlling one or more actuators on the autonomous vehicle responsive to the comparison.

According to another example embodiment, controlling the autonomous vehicle can also include providing image information from at least one camera sensor as an input to the first neural network, and providing image information from at least one camera sensor as an input to the third neural network.

According to another example embodiment, controlling the autonomous vehicle can also include providing image information from at least one camera sensor as an input to the second neural network, and providing image information from at least one camera sensor as an input to the fourth neural network.

According to another example embodiment, controlling the autonomous vehicle can also include providing image information from at least one infrared camera sensor as an input to the first neural network, and providing image information from at least one camera sensor as an input to the third neural network.

According to another example embodiment, controlling the autonomous vehicle can also include providing image information from at least one infrared camera sensor as an input to the second neural network, and providing image information from at least one camera sensor as an input to the fourth neural network.

According to another example embodiment, controlling the autonomous vehicle can also include providing image information from at least one stereo camera sensor as an input to the first neural network, and providing information from at least one LIDAR sensor as an input to the third neural network.

According to another example embodiment, controlling the autonomous vehicle can also include providing image information from at least one monocular camera sensor as an input to the second neural network, and providing information from at least one LIDAR sensor as an input to the fourth neural network.

According to another example embodiment, controlling the autonomous vehicle can also include providing image information from at least one stereo camera sensor as an input to the first neural network and providing image information from at least one monocular camera sensor as an input to the third neural network.

According to another example embodiment, controlling the autonomous vehicle can also include providing image information from at least one stereo camera sensor as an input to the second neural network, and providing image information from at least one monocular camera sensor as an input to the fourth neural network.

According to another example embodiment, controlling the autonomous vehicle can also include providing information from at least one RADAR sensor as an input to the first computer vision algorithm and providing information from at least one RADAR sensor as an input to the second computer vision algorithm.

According to another example embodiment, controlling the autonomous vehicle can also include providing information from at least one LIDAR sensor as an input to the first computer vision algorithm, and providing information from at least one LIDAR sensor as an input to the second computer vision algorithm.

According to another example embodiment, controlling the autonomous vehicle can also include providing information from at least one ultrasound sensor as an input to the first computer vision algorithm, and providing information from at least one ultrasound sensor as an input to the second computer vision algorithm.

According to another example embodiment, controlling the autonomous vehicle can also include providing information from at least one flash LIDAR sensor as an input to the first computer vision algorithm and providing information from at least one flash LIDAR sensor as an input to the second computer vision algorithm.

One aspect of the technology is directed to a method for controlling an autonomous vehicle. The method can include: running a first plurality of neural networks on a deep learning accelerator on a system-on-a-chip, running a second plurality of neural networks on a GPU on the system-on-a-chip, executing a plurality of computer vision algorithm on a programmable vision accelerator on the system-on-a-chip, and controlling one or more actuators on the autonomous vehicle responsive to the outputs of the first plurality of neural networks, second plurality of neural networks, and the plurality of computer vision algorithms.

According to an example embodiment, controlling the autonomous vehicle can also include running a third plurality of neural networks on a deep learning accelerator on a second system-on-a-chip, running a fourth plurality of neural networks on a GPU on the second system-on-a-chip, executing a second plurality of computer vision algorithms on a programmable vision accelerator on the second system-on-a-chip, comparing the outputs of the first system-on-a-chip and second system-on-a-chip, and controlling one or more actuators on the autonomous vehicle responsive to the comparison.

According to another example embodiment, controlling the autonomous vehicle can also include providing input from one or more camera sensors to a primary computer; executing a first neural network on the primary computer; generating, in the first computer, at least one first signal for controlling at least one vehicle actuator; providing input from one or more camera sensors to a secondary computer; executing a second CNN on the secondary computer; generating, in the second computer, at least one second signal for controlling at least one vehicle actuator; providing the first signal and the second signal to a supervisory MCU; and comparing, in the MCU, the first signal and the second signal. In one or more embodiments, the MCU can be configured to generate an alarm signal if the first signal and the second signal are inconsistent.

Another aspect of the technology is directed to a method for controlling an autonomous vehicle that includes: providing input from one or more camera sensors to a primary computer; executing a first neural network on the primary computer to generate at least one first signal responsive to the input from the camera sensors; executing a computer vision algorithm on a Programmable Vision Accelerator to generate a second signal; and using the first signal the second signal to control at least one vehicle actuator.

Another aspect of the technology is directed to a method for controlling an autonomous vehicle, comprising: executing a neural network for pedestrian detection on a first System-on-a-Chip, to generate at least one first signal, executing a neural network for sign detection on a second System-on-a-Chip, to generate at least one second signal, executing a neural network for distance estimation on a third System-on-a-Chip, to generate at least one third signal, executing a neural network for lane detection on a fourth System-on-a-Chip, to generate at least one fourth signal, executing a neural network for collision avoidance on a fifth System-on-a-Chip, to generate at least one fifth signal, executing a neural network for current occupancy grids on a sixth System-on-a-Chip, to generate at least one sixth signal, executing a neural network for predicted occupancy grid on a seventh System-on-a-Chip, to generate at least seventh first signal, executing a neural network for steering control on an eighth System-on-a-Chip, to generate at least one eighth signal, executing a computer vision algorithm on a central processing unit to generate a least one ninth signal, and using the signals to control at least one vehicle actuator.

Another aspect provides a method for controlling an autonomous vehicle, comprising: providing input from one or more camera sensors to a primary computer, generating a first control signal responsive to the input, receiving a second signal from an automatic cruise control unit, evaluating whether the first control signal conflicts with the second signal, and controlling one or more vehicle actuators responsive to the evaluation. In preferred embodiments, the automatic cruise control unit can be either or both a longitudinal automatic cruise control unit and a lateral automatic cruise control unit. The automatic cruise control unit can also comprise a forward-facing RADAR sensor.

One or more aspects of the technology can be implemented using a method for controlling an autonomous vehicle, including: providing input from one or more camera sensors to a primary computer; generating a first control signal responsive to the input; receiving a second signal from one or more of: receiving a second signal from one or more of: 1) an Auto Emergency Braking unit, 2) a Forward Crash Warning unit, 3) a Lane Departure Warning unit, 4) a Collision Warning Unit, and 5) a Blind Spot Warning unit; evaluating whether the first control signal conflicts with the second signal, and controlling one or more vehicle actuators responsive to the evaluation. In one or more embodiments of this aspect, each of the Auto Emergency Braking unit, Forward Crash Warning unit, Lane Departure Warning unit, Collision Warning Unit, and Blind Spot Warning unit can comprise an FPGA and one or more of a stereo video camera and mono camera.

Yet another example aspect provides a method for controlling an autonomous vehicle, comprising: providing input from one or more camera sensors to a primary computer executing a convolutional neural network in a GPU, generating a first control signal responsive to the input, receiving a second signal from an automatic cruise control unit, evaluating whether the first control signal conflicts with the second signal, and controlling one or more vehicle actuators responsive to the evaluation.

An aspect of the technology can also include a method for controlling an autonomous vehicle, comprising: providing input from one or more camera sensors to a primary computer executing a convolutional neural network on a GPU, generating a first control signal responsive to the input; receiving a second signal from one or more of: 1) an Auto Emergency Braking unit, 2) a Forward Crash Warning unit, 3) a Lane Departure Warning, 4) a Collision Warning Unit, and 5) a blind spot warning unit; evaluating whether the first control signal conflicts with the second signal; and controlling one or more vehicle actuators responsive to the evaluation. In one or more embodiments of these aspects, the Auto Emergency Braking unit comprises an FPGA and a stereo video camera. In one or more embodiments of this aspect, each of the Auto Emergency Braking unit, Forward Crash Warning unit, Lane Departure Warning unit, Collision Warning Unit, and Blind Spot Warning unit can comprise an FPGA and one or more of a stereo video camera and mono camera.

An example aspect includes a method for controlling an autonomous vehicle, comprising: providing input from one or more camera sensors to a primary computer executing a convolutional neural network on a DLA; generating a first control signal responsive to the input; receiving a second signal from one or more of: 1) an Auto Emergency Braking unit, 2) a Forward Crash Warning unit, 3) a Lane Departure Warning unit, 4) a Collision Warning Unit, and 5) a Blind Spot Warning unit; evaluating whether the first control signal conflicts with the second signal; and controlling one or more vehicle actuators responsive to the evaluation. In one or more embodiments of this aspect, each of the Auto Emergency Braking unit, Forward Crash Warning unit, Lane Departure Warning unit, Collision Warning Unit, and Blind Spot Warning unit can comprise an FPGA and one or more of a stereo video camera and mono camera.

One or more aspects of the technology may be directed to a method for controlling an autonomous vehicle, comprising: training a first neural network in a GPU datacenter, providing the first neural network to the autonomous vehicle, training a second neural network in a GPU datacenter, providing the second neural network to the autonomous vehicle, storing the first neural network in memory in the autonomous vehicle, storing the second neural network in memory in the autonomous vehicle, receiving image information from at least one stereo camera sensor disposed on the front of the autonomous vehicle, receiving LIDAR information from at least one LIDAR sensor disposed on the front of the autonomous vehicle, running the first neural network on a primary computer in the autonomous vehicle using the image information as an input, running the second neural network on a primary computer in the autonomous vehicle using the LIDAR information as an input, and controlling the autonomous vehicle responsive to the outputs of the first and second neural networks.

In one or more embodiments, the method can further include receiving an updated instance of the first neural network via a wireless network, such as (without limitation), an LTE network, a WCDMA network, a UMTS network, and a CDMA2000 network. In one or more embodiments, the LIDAR sensor is a 3D Flash LIDAR.

In one or more embodiments, the method can also include applying the image information to a forward crash warning system and comparing the results of the primary computer and the forward crash warning system. One or both of the first and second neural networks may be executed on a deep learning accelerator and/or GPU, according to embodiments.

Example aspects can include a method for controlling an autonomous truck comprising a tractor and trailer, the method comprising: providing input from one or more camera sensors disposed on the tractor to a primary computer executing at least one convolutional neural network on a GPU, generating at least one first signal responsive to the input, receiving a second signal from a gust sensor disposed on the trailer, evaluating whether the second signal identifies a gust condition, and controlling one or more vehicle actuators responsive to the first signal and the evaluation.

Another example aspect can be implemented as a method for controlling an autonomous truck comprising a tractor and trailer, the method, comprising: providing input from one or more camera sensors disposed on the tractor to a primary computer executing at least one convolutional neural network running on a DLA, generating at least one first signal responsive to the input, receiving a second signal from at least one gust sensor disposed on the trailer, evaluating whether the second signal identifies a gust condition, and controlling one or more vehicle actuators responsive to the first signal and the evaluation.

Another aspect can include a method for controlling a self-driving patrol car, comprising: providing input from one or more camera sensors to a primary computer; executing a first neural network on one or both of a GPU on the primary computer; generating at least one first signal in the primary computer for controlling at least one vehicle actuator, providing input from one or more camera sensors to a secondary computer; executing (on the secondary computer) a second CNN trained to identify at least one other vehicle from image information; generating, in the second computer, at least one second signal identifying the presence or absence of at least one other vehicle; and sending a notification of the presence and location of the at least one other vehicle via a wireless network.

Another example aspect can be implemented as a method for controlling a self-driving patrol car, comprising: providing first image information to a primary computer comprising a CPU, GPU, and one or more hardware accelerators; executing a first neural network on at least one of the GPU, and one or more hardware accelerators on the primary computer with the first image information as input; generating, in the primary computer, at least one first signal for controlling at least one vehicle actuator; providing second image information to a secondary computer comprising CPU, GPU, and one or more hardware accelerators; executing a second neural network on at least one of the GPU, and the one or more hardware accelerators on the secondary computer, with the second image information as input; generating, in the secondary computer, at least one second signal indicating the presence or absence of at least one other vehicle; and transmitting a notification of the presence and location of the at least one other vehicle via a wireless network. The wireless network can include (without limitation): an LTE network, a WCDMA network, a UMTS network, and a CDMA2000 network.

Another aspect may be implemented as a method for controlling a self-driving patrol car, comprising: providing first image information to a primary computer comprising a CPU, GPU, and one or more hardware accelerators; executing a first neural network on at least one of the GPU, and one or more of the hardware accelerators on the primary computer with the first image information as input; generating, in the primary computer, at least one first signal for controlling at least one vehicle actuator; providing second image information to a secondary computer comprising CPU, GPU, and one or more hardware accelerators; executing a second neural network on at least one of the GPU, and one or more of the hardware accelerators on the secondary computer, with the second image information as input; generating, in the secondary computer, at least one second signal indicating the presence or absence of at least one safety condition; and transmitting a notification of the presence and location of the at least one safety condition via a wireless network. The wireless network can include (without limitation): an LTE network, a WCDMA network, a UMTS network, and a CDMA2000 network. In one or more embodiments, the safety condition can include (without limitation) one or more of: a fire, an automobile accident, an injured person, and a physical conflict between people. In one or more embodiments, one or both of the first and second image information comprises information from one or more infrared cameras.

Aspects of the technology include implementing a method for controlling a self-driving tiller truck, comprising: providing first image information to a primary computer comprising a CPU, GPU, and one or more hardware accelerators; executing a first neural network on at least one of the GPU, and one or more of the hardware accelerators on the primary computer, with the first image information as input; generating, in the primary computer, at least one first signal for controlling at least one vehicle actuator associated with a first controllable axle; providing second image information to a secondary computer comprising CPU, GPU, and one or more hardware accelerators; executing a second neural network on at least one of the GPU, and one or more of the hardware accelerators on the secondary computer, with the second image information as input; and generating, in the secondary computer, at least one second signal for controlling at least one vehicle actuator associated with a second controllable axle.

Aspects of the technology can include a method for controlling a self-driving bus, comprising: providing first image information to a primary computer comprising a CPU, GPU, and one or more hardware accelerators; executing a first neural network on at least one of the GPU, and one or more of the hardware accelerators on the primary computer, with the first image information as input; generating, in the primary computer, at least one first signal for controlling at least one vehicle actuator; providing second image information to a second computer comprising CPU, GPU, and one or more hardware accelerators, the second image information comprising an image of at least a portion of the interior of the passenger compartment of the bus; executing a second neural network on at least one of the GPU, and one or more of the hardware accelerators on the secondary computer, with the second image information as input; executing a second neural network on one of the hardware accelerators on the secondary computer, with the second image information as input; generating, in the secondary computer, at least one second signal indicating the presence or absence of at least one safety condition; and transmitting a notification of the presence and location of the at least one safety condition via a wireless network. The wireless network can include (without limitation): an LTE network, a WCDMA network, a UMTS network, and a CDMA2000 network. In one or more embodiments, the safety condition can include (without limitation) one or more of: a fire, an injured bus passenger or pedestrian, and a physical conflict between bus passengers. In one or more embodiments, one or both of the first and second image information comprises information from one or more infrared cameras.

All documents referenced herein are expressly incorporated by reference for all purposes as if expressly set forth.

While the invention has been described in terms of what is presently considered to be the most practical and preferred embodiments, it is to be understood that the invention is not to be limited to the disclosed embodiments. For example, unless expressly stated, the invention is not limited to any type or number of sensors; any number or type of sensors falling within the language of the claims may be used. Moreover, as an example, while the discussion above has been presented using NVIDIA hardware as an example, any type or number of processor(s) can be used. On the contrary, is intended to cover various modifications and equivalent arrangements included within the spirit and scope of the appended claims.

The invention claimed is:

1. A system-on-a-chip for an autonomous vehicle including:
   at least one central processing unit (CPU) cluster or CPU complex supporting virtualization, wherein the CPU cluster or CPU complex is configured to perform serial work, and includes multiple CPU cores and associated L2 caches and comprises processing cores that support simplified power state entry sequences in software with work offloaded to microcode, at least one graphics processing unit (GPU) providing massively parallel processing, an embedded hardware accelerator cluster comprising:
   at least one deep learning hardware-based accelerator configured to execute neural networks, and
   a programmable vision accelerator; and
   at least one memory device interface structured to connect the system-on-a-chip to at least one memory device storing instructions that when executed by the system-on-the-chip, configure the system-on-a-chip to operate as an autonomous vehicle controller configured to receive camera sensor data and LIDAR sensor data,
   wherein the at least one CPU cluster or complex supporting virtualization, the at least one GPU providing massively parallel processing, the at least one programmable vision accelerator, and the at least one deep learning hardware-based accelerator configured to execute neural networks comprising the system-on-a-chip interoperate to process at least the received camera sensor data and the LIDAR sensor data to perform lane detection.

2. The system-on-a-chip of claim 1 wherein the system-on-a-chip is structured and designed to enable the autonomous vehicle controller to be substantially compliant with level 5 full autonomous driving as defined by SAE specification J3016.

3. The system-on-a-chip of claim 1 wherein the system-on-a-chip is structured and designed to enable the autonomous vehicle controller to be substantially compliant with integrity level "D" defined by ISO Standard 26262.

4. A system-on-a-chip for an autonomous vehicle including:
   at least one central processing unit (CPU) supporting virtualization,
   at least one graphics processing unit (GPU) providing massively parallel processing that is programmable and uses a tensor instruction set including at least eight streaming processors each with at least a L1 cache and sharing an L2 cache, wherein each streaming processor incorporate a number of mixed-precision processing cores partitioned into multiple processing blocks, wherein each streaming processor includes independent thread scheduling capability,
   at least one programmable vision accelerator,
   at least one deep learning accelerator configured to execute neural networks, and
   at least one memory device interface structured to connect the system-on-a-chip to at least one memory device storing instructions that when executed by system-on-the-chip, configure the system-on-a-chip to operate as an autonomous vehicle controller configured to receive LIDAR sensor data,
   wherein the at least one CPU supporting virtualization, the at least one GPU providing massively parallel processing, the at least one programmable vision accelerator, and the at least one deep learning accelerator configured to execute neural networks comprising the system-on-a-chip interoperate to process the LIDAR sensor data and a trajectory estimation to provide an object perceptor that perceives object affordances.

5. The system-on-a-chip of claim 4 wherein the at least one CPU, the at least one GPU, the at least one programmable vision accelerator, and the at least one deep learning accelerator configured to execute neural networks are structured and interconnected to enable the autonomous vehicle controller to be substantially compliant with integrity level "D" defined by Standard 26262 of the International Organization for Standardization.

6. The system-on-a-chip of claim 4 wherein the system-on-a-chip is configured for controlling an autonomous vehicle and includes at least one memory device connected to the system-on-a-chip, the memory device storing instructions that when executed by the CPU, the GPU and a neural network accelerated by the deep learning accelerator, provides autonomous vehicle control that is substantially compliant with Automotive Safety Integrity Level D defined by Standard 26262 of the International Organization for Standardization, wherein the CPU and GPU are further configured to provide a navigator for executing a route plan generated based at least in part on a world model maintained based on perceived affordances from one or more perceptors, wherein the navigator comprises:
   a route planner for generating a route plan based on the world model;
   a control planner for generating one or more control operations to complete a route based on the route plan; and
   an actuator interface for performing the one or more control operations to execute the route plan.

7. The system-on-a-chip of claim 1 wherein the fast CPU cluster or CPU complex includes at least eight CPU cores in a coherent multi-processor configuration.

8. The system-on-a-chip of claim 7 wherein the CPU cluster or CPU complex supports simultaneous cluster operation wherein any combination of clusters can be active at any given time.

9. The system-on-a-chip of claim 7 wherein the CPU cores are organized as four dual-core clusters, wherein each cluster has a dedicated Level 2 (L2) unified cache.

10. The system-on-a-chip of claim 7 further including a high-speed coherency fabric that connects the CPU cluster or CPU complex and allows heterogeneous multi-processing with all CPU cores.

11. The system-on-a-chip of claim 1 further including individual hardware blocks that are clock-gated automatically when idle, including plural core clocks that are gated when a corresponding CPU core is not actively executing instructions due to execution of WFI (Wait for interrupt)/WFE (Wait for event) instructions.

12. The system-on-a-chip of claim 1 wherein each core is independently power-gated.

13. The system-on-a-chip of claim 1 wherein each core cluster is independently clock-gated and all cores are clock-gated or power-gated.

14. The system-on-a-chip of claim 1 wherein each core cluster is independently power-gated and all cores are power-gated.

15. The system-on-a-chip of claim 1 wherein the CPU cluster or CPU complex is configured to manage power states, wherein allowed power states and expected wakeup times are specified, and hardware/microcode determines power states to enter for different hierarchical hardware levels of the system-on-a-chip.

16. The system-on-a-chip of claim 1 wherein the fast CPU cluster or CPU complex comprises processing cores that support simplified power state entry sequences in software with work offloaded to microcode.

17. The system-on-a-chip of claim 1 wherein the at least one GPU providing massively parallel processing is programmable and the deep learning accelerator comprises a tensor processing unit configured to execute the neural networks based on an tensor instruction set.

18. The system-on-a-chip of claim 17 wherein the at least one GPU includes at least eight streaming multiprocessors, each with at least a L1 cache and sharing an L2 cache.

19. The system-on-a-chip of claim 18 wherein the at least one GPU is power-optimized for performance in automotive embedded use applications.

20. The system-on-a-chip of claim 19 wherein the at least one GPU is fabricated on a FinFET (Fin field effect transistor) high-performance manufacturing process.

21. The system-on-a-chip of claim 18 wherein each streaming multiprocessor incorporates a number of mixed-precision processing cores partitioned into multiple processing blocks.

22. The system-on-a-chip of claim 21 wherein each of the processing blocks comprises FP32 Cores, FP64 Cores, INT32 Cores, mixed-precision Tensor Cores, an instruction cache, a warp scheduler, a dispatch unit, and a Register File.

23. The system-on-a-chip of claim 21 wherein each of the processing blocks includes independent parallel integer and floating-point data paths, providing for efficient execution of workloads with a mix of computation and addressing calculations.

24. The system-on-a-chip of claim 21 wherein each streaming processor includes independent thread scheduling capability.

25. The system-on-a-chip of claim 21 wherein each streaming processor includes a combined L1 data cache and shared memory unit.

26. A system-on-a-chip for an autonomous vehicle including:
at least one central processing unit (CPU) supporting virtualization,
at least one graphics processing unit (GPU) providing massively parallel processing,
a Level 3 cache available to both the at least one CPU and the at least one GPU, an embedded hardware accelerator cluster comprising:
at least one deep learning hardware-based accelerator configured to execute neural networks, and
a programmable vision accelerator; and
at least one memory device interface structured to connect the system-on-a-chip to at least one memory device storing instructions that when executed by the system-on-the-chip, configure the system-on-a-chip to operate as an autonomous vehicle controller configured to receive camera sensor data and LIDAR sensor data,
wherein the at least one CPU supporting virtualization, the at least one GPU providing massively parallel processing, the at least one programmable vision accelerator, and the at least one deep learning hardware-based accelerator configured to execute neural networks comprising the system-on-a-chip interoperate to process at least the received camera sensor data and the LIDAR sensor data to perform lane detection.

27. The system-on-a-chip of claim 26 wherein the L3 cache comprises a write-back cache which keeps track of cache lines in MEI states.

28. The system-on-a-chip of claim 27 wherein the L3 cache comprises at least 4 MB.

29. A system-on-a-chip for an autonomous vehicle including:
at least one central processing unit (CPU) supporting virtualization,
at least one graphics processing unit (GPU) providing massively parallel processing, wherein the at least one GPU includes real time ray tracing hardware-based acceleration to determine positions and extents of objects,
an embedded hardware accelerator cluster comprising:
at least one deep learning hardware-based accelerator configured to execute neural networks, and
a programmable vision accelerator; and
at least one memory device interface structured to connect the system-on-a-chip to at least one memory device storing instructions that when executed by the system-on-the-chip, configure the system-on-a-chip to operate as an autonomous vehicle controller configured to receive camera sensor data and LIDAR sensor data,
wherein the at least one CPU supporting virtualization, the at least one GPU providing massively parallel processing, the at least one programmable vision accelerator, and the at least one deep learning hardware-based accelerator configured to execute neural networks comprising the system-on-a-chip interoperate to process at least the received camera sensor data and the LIDAR sensor data to perform lane detection.

30. The system-on-a-chip of claim 1 wherein the at least one deep learning accelerator includes one or more tensor processing units.

31. The system-on-a-chip of claim 30 wherein the one or more tensor processing units are configured for single-instance convolution function supporting INT8/INT16/FP16 data type for both features and weights.

32. The system-on-a-chip of claim 1 wherein the at least one programmable vision accelerator is configured to accelerate computer vision algorithms for autonomous driving, the programmable vision accelerator comprising at least one reduced instruction set computer ("RISC") core, at least one direct memory access (DMA) circuit, and at least one vector processor.

33. The system-on-a-chip of claim 32 wherein the DMA circuit supports at least six dimensions of addressing.

34. The system-on-a-chip of claim 32 wherein the vector processor is configured to perform semi-dense or dense regular computation.

35. The system-on-a-chip of claim 4 wherein the at least one CPU supporting virtualization comprises a CPU cluster or CPU complex.

36. The system-on-a-chip of claim 35 wherein the CPU cluster or CPU complex is configured to perform serial work, and includes multiple CPU cores and associated L2 Caches.

37. The system-on-a-chip of claim 36 wherein the CPU cluster or CPU complex includes at least eight CPU cores in a coherent multi-processor configuration.

38. The system-on-a-chip of claim 37 wherein the CPU cluster or CPU complex supports simultaneous cluster operation wherein any combination of clusters can be active at any given time.

39. The system-on-a-chip of claim 37 wherein the CPU cores are organized as four dual-core clusters, wherein each cluster has a dedicated Level 2 (L2) unified cache.

40. The system-on-a-chip of claim 37 further including a high-speed coherency fabric that connects the CPU cluster or CPU complex and allows heterogeneous multi-processing with all CPU cores.

41. The system-on-a-chip of claim 36 further including individual hardware blocks that are clock-gated automatically when idle, including plural core clocks that are gated when a corresponding CPU core is not actively executing instructions due to execution of WFI (Wait for interrupt)/WFE (Wait for event) instructions.

42. The system-on-a-chip of claim 36 wherein each core is independently power-gated.

43. The system-on-a-chip of claim 36 wherein each core cluster is independently clock-gated and all cores are clock-gated or power-gated.

44. The system-on-a-chip of claim 36 wherein each core cluster is independently power-gated and all cores are power-gated.

45. The system-on-a-chip of claim 36 wherein the CPU cluster or CPU complex is configured to manage power states, wherein allowed power states and expected wakeup times are specified, and hardware/microcode determines power states to enter for different hierarchical hardware levels of the system-on-a-chip.

46. The system-on-a-chip of claim 36 wherein the CPU cluster or CPU complex comprises processing cores that support simplified power state entry sequences in software with work offloaded to microcode.

47. The system-on-a-chip of claim 4 wherein the at least one GPU is power-optimized for performance in automotive embedded use applications.

48. The system-on-a-chip of claim 47 wherein the at least one GPU is fabricated on a FinFET (Fin field effect transistor) high-performance manufacturing process.

49. The system-on-a-chip of claim 4 wherein each of the processing blocks comprises FP32 Cores, FP64 Cores, INT32 Cores, mixed-precision Tensor Cores, an instruction cache, a warp scheduler, a dispatch unit, and a Register File.

50. The system-on-a-chip of claim 4 wherein each of the processing blocks includes independent parallel integer and floating-point data paths, providing for efficient execution of workloads with a mix of computation and addressing calculations.

51. The system-on-a-chip of claim 4 wherein each streaming processor includes a combined L1 data cache and shared memory unit.

52. A system-on-a-chip for an autonomous vehicle including:
- at least one central processing unit (CPU) supporting virtualization,
- at least one graphics processing unit (GPU) providing massively parallel processing,
- a Level 3 cache available to both the at least one CPU and the at least one GPU,
- at least one programmable vision accelerator,
- at least one deep learning accelerator configured to execute neural networks, and
- at least one memory device interface structured to connect the system-on-a-chip to at least one memory device storing instructions that when executed by system-on-the-chip, configure the system-on-a-chip to operate as an autonomous vehicle controller configured to receive LIDAR sensor data,
- wherein the at least one CPU supporting virtualization, the at least one GPU providing massively parallel processing, the at least one programmable vision accelerator, and the at least one deep learning accelerator configured to execute neural networks comprising the system-on-a-chip interoperate to process the LIDAR sensor data and a trajectory estimation to provide an object perceptor that perceives object affordances.

53. The system-on-a-chip of claim 52 wherein the L3 cache comprises a write-back cache which keeps track of cache lines in MEI states.

54. The system-on-a-chip of claim 53 wherein the L3 cache comprises at least 4 MB.

55. A system-on-a-chip for an autonomous vehicle including:
- at least one central processing unit (CPU) supporting virtualization,
- at least one graphics processing unit (GPU) providing massively parallel processing, the at least one GPU including real time ray tracing hardware-based acceleration to determine positions and extents of objects,
- at least one programmable vision accelerator,
- at least one deep learning accelerator configured to execute neural networks, and
- at least one memory device interface structured to connect the system-on-a-chip to at least one memory device storing instructions that when executed by system-on-the-chip, configure the system-on-a-chip to operate as an autonomous vehicle controller configured to receive LIDAR sensor data,
- wherein the at least one CPU supporting virtualization, the at least one GPU providing massively parallel processing, the at least one programmable vision accelerator, and the at least one deep learning accelerator configured to execute neural networks comprising the system-on-a-chip interoperate to process the LIDAR sensor data and a trajectory estimation to provide an object perceptor that perceives object affordances.

56. A system-on-a-chip of claim 55 wherein the at least one deep learning accelerator includes one or more tensor processing units.

57. The system-on-a-chip of claim 56 wherein the one or more tensor processing units are configured for single-instance convolution function supporting INT8/INT16/FP16 data type for both features and weights.

58. The system-on-a-chip of claim 4 wherein the programmable vision accelerator is configured to accelerate computer vision algorithms for autonomous driving, the programmable vision accelerator comprising at least one reduced instruction set computer ("RISC") core, at least one direct memory access (DMA) circuit, and at least one vector processor.

59. A system-on-a-chip for an autonomous vehicle including:
- at least one central processing unit (CPU) supporting virtualization,
- at least one graphics processing unit (GPU) providing massively parallel processing,
- at least one programmable vision accelerator,
- at least one deep learning accelerator configured to execute neural networks, and
- at least one memory device interface structured to connect the system-on-a-chip to at least one memory device storing instructions that when executed by system-on-the-chip, configure the system-on-a-chip to operate as an autonomous vehicle controller configured to receive LIDAR sensor data,
- wherein the at least one CPU supporting virtualization, the at least one GPU providing massively parallel processing, the at least one programmable vision accelerator, and the at least one deep learning accelerator configured to execute neural networks comprising the system-on-a-chip interoperate to process the LIDAR sensor data and a trajectory estimation to provide an object perceptor that perceives object affordances,
- wherein the programmable vision accelerator is configured to accelerate computer vision algorithms for autonomous driving, the programmable vision accelerator comprising at least one reduced instruction set computer ("RISC") core, at least one direct memory access (DMA) circuit configured to support at least six dimensions of addressing, and at least one vector processor.

60. A system-on-a-chip for an autonomous vehicle including:
- at least one central processing unit (CPU) supporting virtualization,
- at least one graphics processing unit (GPU) providing massively parallel processing,
- at least one programmable vision accelerator,
- at least one deep learning accelerator configured to execute neural networks, and
- at least one memory device interface structured to connect the system-on-a-chip to at least one memory device storing instructions that when executed by system-on-the-chip, configure the system-on-a-chip to operate as an autonomous vehicle controller configured to receive LIDAR sensor data,
- wherein the at least one CPU supporting virtualization, the at least one GPU providing massively parallel processing, the at least one programmable vision accelerator, and the at least one deep learning accelerator configured to execute neural networks comprising the system-on-a-chip interoperate to process the LIDAR sensor data and a trajectory estimation to provide an object perceptor that perceives object affordances, wherein the programmable vision accelerator is configured to accelerate computer vision algorithms for autonomous driving, the programmable vision accelerator comprising at least one reduced instruction set computer ("RISC") core, at least one direct memory access (DMA) circuit, and a vector processor configured to perform semi-dense or dense regular computation.

* * * * *